US012272822B2

(12) United States Patent
Takahashi et al.

(10) Patent No.: US 12,272,822 B2
(45) Date of Patent: Apr. 8, 2025

(54) METHOD FOR MANUFACTURING POSITIVE ELECTRODE ACTIVE MATERIAL, AND SECONDARY BATTERY

(71) Applicant: SEMICONDUCTOR ENERGY LABORATORY CO., LTD., Atsugi (JP)

(72) Inventors: Masahiro Takahashi, Kanagawa (JP); Mayumi Mikami, Kanagawa (JP); Yohei Momma, Kanagawa (JP); Teruaki Ochiai, Kanagawa (JP); Jyo Saitou, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 16/624,319

(22) PCT Filed: Jun. 14, 2018

(86) PCT No.: PCT/IB2018/054351
§ 371 (c)(1),
(2) Date: Dec. 19, 2019

(87) PCT Pub. No.: WO2019/003025
PCT Pub. Date: Jan. 3, 2019

(65) Prior Publication Data
US 2020/0176770 A1 Jun. 4, 2020

(30) Foreign Application Priority Data

Jun. 26, 2017 (JP) .................................. 2017-124100
Oct. 13, 2017 (JP) .................................. 2017-199061
(Continued)

(51) Int. Cl.
H01M 4/525 (2010.01)
C01G 51/66 (2025.01)
(Continued)

(52) U.S. Cl.
CPC ............ *H01M 4/525* (2013.01); *C01G 51/66* (2013.01); *C01G 53/66* (2013.01);
(Continued)

(58) Field of Classification Search
CPC ........... H01M 4/13915; H01M 4/1315; H01M 4/505; H01M 4/525; C01G 51/42–64; C01G 53/44–64; C01G 45/1214–1292
See application file for complete search history.

(56) References Cited

U.S. PATENT DOCUMENTS 4,302,518 A 11/1981 Goodenough et al.
4,668,595 A 5/1987 Yoshino et al.
(Continued)

FOREIGN PATENT DOCUMENTS

CN 001421952 A 6/2003
CN 001715193 A 1/2006
(Continued)

OTHER PUBLICATIONS

Xia.H et al., "Phase Transitions and High-Voltage Electrochemical Behavior of LiCoO2 Thin Films Grown by Pulsed Laser Deposition", J. Electrochem. Soc. (Journal of the Electrochemical Society), 2007, vol. 154, No. 4, pp. A337-A342.
(Continued)

Primary Examiner — Jeremiah R Smith
(74) Attorney, Agent, or Firm — Fish & Richardson P.C.

(57) ABSTRACT

A positive electrode active material has a small difference in a crystal structure between the charged state and the discharged state. For example, the crystal structure and volume of the positive electrode active material, which has a layered rock-salt crystal structure in the discharged state and a pseudo-spinel crystal structure in the charged state at a high voltage of approximately 4.6 V, are less likely to be changed by charging and discharging as compared with those of a (Continued)

known positive electrode active material. In order to form the positive electrode active material having the pseudo-spinel crystal structure in the charged state, it is preferable that a halogen source such as a fluorine and a magnesium source be mixed with particles of a composite oxide containing lithium, a transition metal, and oxygen, which is synthesized in advance, and then the mixture be heated at an appropriate temperature for an appropriate time.

12 Claims, 58 Drawing Sheets

(30) Foreign Application Priority Data

Jan. 19, 2018 (JP) .................................. 2018-007052
Apr. 5, 2018 (JP) .................................. 2018-072924

(51) Int. Cl.
| | |
|---|---|
| *C01G 53/66* | (2025.01) |
| *H01M 4/13915* | (2010.01) |
| *H01M 10/0525* | (2010.01) |
| *C01G 45/1214* | (2025.01) |
| *C01G 51/42* | (2025.01) |
| *C01G 53/44* | (2025.01) |
| *H01M 4/02* | (2006.01) |
| *H01M 4/1315* | (2010.01) |

(52) U.S. Cl.
CPC ... *H01M 4/13915* (2013.01); *H01M 10/0525* (2013.01); *C01G 45/1214* (2013.01); *C01G 51/42* (2013.01); *C01G 53/44* (2013.01); *C01P 2002/32* (2013.01); *C01P 2002/52* (2013.01); *C01P 2002/72* (2013.01); *C01P 2002/77* (2013.01); *C01P 2002/85* (2013.01); *C01P 2002/88* (2013.01); *C01P 2004/04* (2013.01); *C01P 2006/40* (2013.01); *C01P 2006/42* (2013.01); *H01M 2004/028* (2013.01); *H01M 4/1315* (2013.01)

(56) References Cited

U.S. PATENT DOCUMENTS

| | | |
|---|---|---|
| 5,240,794 A | 8/1993 | Thackeray et al. |
| 5,443,929 A | 8/1995 | Yamamoto et al. |
| 5,604,396 A | 2/1997 | Watanabe et al. |
| 5,705,291 A | 1/1998 | Amatucci et al. |
| 5,783,333 A | 7/1998 | Mayer |
| 5,824,278 A | 10/1998 | Yao |
| 5,834,139 A | 11/1998 | Shodai et al. |
| 5,871,866 A | 2/1999 | Barker et al. |
| 5,910,382 A | 6/1999 | Goodenough et al. |
| 6,085,015 A | 7/2000 | Armand et al. |
| 6,127,065 A | 10/2000 | Yamamoto et al. |
| 6,136,475 A | 10/2000 | Tsutsumi et al. |
| 6,218,050 B1 | 4/2001 | Yoon et al. |
| 6,277,521 B1 | 8/2001 | Gao et al. |
| 6,346,348 B1 | 2/2002 | Nakajima et al. |
| 6,458,487 B1 | 10/2002 | Takeuchi et al. |
| 6,514,640 B1 | 2/2003 | Armand et al. |
| 6,582,814 B2 | 6/2003 | Swiler et al. |
| 6,589,499 B2 | 7/2003 | Gao et al. |
| 6,680,143 B2 | 1/2004 | Thackeray et al. |
| 6,737,195 B2 | 5/2004 | Kweon et al. |
| 6,753,111 B2 | 6/2004 | Kweon et al. |
| 6,846,592 B2 | 1/2005 | Kweon et al. |
| 6,878,490 B2 | 4/2005 | Gao et al. |
| 6,919,144 B2 | 7/2005 | Miyazaki et al. |
| 6,974,601 B2 | 12/2005 | Kweon et al. |
| 6,984,469 B2 | 1/2006 | Kweon et al. |
| 7,018,741 B2 | 3/2006 | Suhara et al. |
| 7,138,209 B2 | 11/2006 | Kweon et al. |
| 7,294,435 B2 | 11/2007 | Miyamoto et al. |
| 7,303,840 B2 | 12/2007 | Thackeray et al. |
| 7,309,546 B2 | 12/2007 | Kweon et al. |
| 7,368,071 B2 | 5/2008 | Dahn et al. |
| 7,393,476 B2 | 7/2008 | Shiozaki et al. |
| 7,504,180 B2 | 3/2009 | Tatsumi et al. |
| 7,635,536 B2 | 12/2009 | Johnson et al. |
| 7,691,535 B2 | 4/2010 | Shiozaki et al. |
| 7,709,148 B2 | 5/2010 | Kawasato et al. |
| 7,709,151 B2 | 5/2010 | Inoue et al. |
| 7,736,807 B2 | 6/2010 | Hasegawa et al. |
| 7,790,308 B2 | 9/2010 | Johnson et al. |
| 7,892,679 B2 | 2/2011 | Shimizu et al. |
| 7,927,506 B2 | 4/2011 | Park |
| 7,935,270 B2 | 5/2011 | Park |
| 8,003,256 B2 | 8/2011 | Ohishi |
| 8,007,941 B2 | 8/2011 | Kweon et al. |
| 8,034,486 B2 | 10/2011 | Kweon et al. |
| 8,080,340 B2 | 12/2011 | Thackeray et al. |
| RE43,276 E | 3/2012 | Kweon et al. |
| 8,236,449 B2 | 8/2012 | Nakura |
| 8,470,477 B2 | 6/2013 | Miwa et al. |
| 8,476,510 B2 | 7/2013 | Swager et al. |
| 8,557,440 B2 | 10/2013 | Yu et al. |
| 8,685,569 B2 | 4/2014 | Oguni et al. |
| 8,685,570 B2 | 4/2014 | Miwa et al. |
| 8,709,654 B2 | 4/2014 | Takeuchi et al. |
| 8,753,532 B2 | 6/2014 | Levasseur et al. |
| 8,808,918 B2 | 8/2014 | Jung et al. |
| 8,865,018 B2 | 10/2014 | Jo et al. |
| 8,877,377 B2 | 11/2014 | Hosoya |
| 8,877,381 B2 | 11/2014 | Yasuda et al. |
| 8,883,351 B2 | 11/2014 | Todoriki et al. |
| 8,906,547 B2 | 12/2014 | Taniguchi et al. |
| 8,927,148 B2 | 1/2015 | Kawakami |
| 8,945,770 B2 | 2/2015 | Koo et al. |
| 8,945,772 B2 | 2/2015 | Kawakami et al. |
| 8,951,448 B2 | 2/2015 | Toyama et al. |
| 8,962,189 B2 | 2/2015 | Fujiki et al. |
| 9,048,495 B2 | 6/2015 | Sun et al. |
| 9,105,926 B2 | 8/2015 | Fujiki et al. |
| 9,225,003 B2 | 12/2015 | Yukawa |
| 9,227,850 B2 | 1/2016 | Ooishi |
| 9,293,236 B2 | 3/2016 | Kawakami et al. |
| 9,362,557 B2 | 6/2016 | Watanabe et al. |
| 9,385,366 B2 | 7/2016 | Yamakaji et al. |
| 9,391,322 B2 | 7/2016 | Liu et al. |
| 9,478,796 B2 | 10/2016 | Li et al. |
| 9,505,631 B2 | 11/2016 | Masukuni et al. |
| 9,515,313 B2 | 12/2016 | Umeyama et al. |
| 9,614,225 B2 | 4/2017 | Park |
| 9,666,326 B2 | 5/2017 | Kawakami et al. |
| 9,698,420 B2 | 7/2017 | Ishizaki et al. |
| 9,786,903 B2 | 10/2017 | Ryu et al. |
| 9,812,709 B2 | 11/2017 | Endoh et al. |
| 9,843,073 B2 | 12/2017 | Yoneda et al. |
| 9,871,246 B2 | 1/2018 | Kim et al. |
| 9,899,664 B2 | 2/2018 | Yamaki et al. |
| 9,923,244 B2 | 3/2018 | Takanashi et al. |
| 10,115,999 B2 | 10/2018 | Ohuchi et al. |
| 10,128,495 B2 | 11/2018 | Satow et al. |
| 10,243,215 B2 | 3/2019 | Shitaba et al. |
| 10,361,432 B2 | 7/2019 | Takaichi et al. |
| 10,418,627 B2 | 9/2019 | Hirose et al. |
| 10,454,102 B2 | 10/2019 | Ikenuma et al. |
| 10,707,482 B2 | 7/2020 | Hirose et al. |
| 10,777,815 B2 | 9/2020 | Kanada et al. |
| 11,121,405 B2 | 9/2021 | Yoneda et al. |
| 2001/0010807 A1 | 8/2001 | Matsubara |
| 2002/0102459 A1 | 8/2002 | Hosoya et al. |
| 2002/0110736 A1 | 8/2002 | Kweon et al. |
| 2002/0164156 A1 | 11/2002 | Bilbrey |
| 2002/0195591 A1 | 12/2002 | Ravet et al. |
| 2003/0104279 A1 | 6/2003 | Miyazaki et al. |
| 2003/0134186 A1 | 7/2003 | Shizuki |
| 2004/0142241 A1* | 7/2004 | Nagayama ............ C01G 51/44 429/231.3 |
| 2004/0191628 A1 | 9/2004 | Inoue et al. |

(56) References Cited

U.S. PATENT DOCUMENTS

| | | |
|---|---|---|
| 2004/0229123 A1 | 11/2004 | Takahashi et al. |
| 2004/0229124 A1 | 11/2004 | Miyamoto et al. |
| 2004/0234857 A1 | 11/2004 | Shiozaki et al. |
| 2005/0019662 A1 | 1/2005 | Suhara et al. |
| 2006/0051671 A1 | 3/2006 | Thackeray et al. |
| 2006/0051673 A1 | 3/2006 | Johnson et al. |
| 2006/0121352 A1 | 6/2006 | Kejha et al. |
| 2006/0188780 A1 | 8/2006 | Fujii et al. |
| 2006/0263690 A1 | 11/2006 | Suhara et al. |
| 2006/0275664 A1 | 12/2006 | Ohzuku et al. |
| 2006/0286459 A1 | 12/2006 | Zhao et al. |
| 2007/0026315 A1 | 2/2007 | Lampe-Onnerud et al. |
| 2007/0072086 A1 | 3/2007 | Nakagawa |
| 2007/0099086 A1 | 5/2007 | Kang et al. |
| 2007/0117014 A1 | 5/2007 | Saito et al. |
| 2007/0122712 A1 | 5/2007 | Kang et al. |
| 2007/0148546 A1 | 6/2007 | Shimizu et al. |
| 2007/0160906 A1 | 7/2007 | Tooyama et al. |
| 2007/0212609 A1 | 9/2007 | Iwami |
| 2007/0224506 A1 | 9/2007 | Ooyama et al. |
| 2008/0131780 A1 | 6/2008 | Kawasato et al. |
| 2008/0166637 A1 | 7/2008 | Inagaki et al. |
| 2008/0241693 A1 | 10/2008 | Fukuchi et al. |
| 2009/0011335 A1 | 1/2009 | Takeda et al. |
| 2009/0017383 A1 | 1/2009 | Suhara et al. |
| 2009/0068562 A1 | 3/2009 | Yew et al. |
| 2009/0087731 A1 | 4/2009 | Fukui et al. |
| 2009/0104532 A1 | 4/2009 | Hosoya |
| 2009/0123813 A1 | 5/2009 | Chiang et al. |
| 2009/0123842 A1 | 5/2009 | Thackeray et al. |
| 2009/0148772 A1 | 6/2009 | Kawasato et al. |
| 2009/0220862 A1 | 9/2009 | Toyama et al. |
| 2010/0019194 A1 | 1/2010 | Fujiwara et al. |
| 2010/0035147 A1 | 2/2010 | Kotato et al. |
| 2010/0086854 A1* | 4/2010 | Kumar ............... H01M 4/1315 429/223 |
| 2010/0129714 A1 | 5/2010 | Toyama et al. |
| 2010/0129715 A1 | 5/2010 | Saito et al. |
| 2010/0143784 A1 | 6/2010 | Johnson et al. |
| 2010/0143799 A1 | 6/2010 | Park |
| 2010/0159330 A1 | 6/2010 | Sugiura et al. |
| 2010/0173197 A1* | 7/2010 | Li ............... H01M 4/525 252/182.1 |
| 2010/0178464 A1 | 7/2010 | Choi et al. |
| 2010/0216024 A1 | 8/2010 | Kanno et al. |
| 2010/0233542 A1 | 9/2010 | Endo et al. |
| 2010/0247986 A1 | 9/2010 | Toyama et al. |
| 2010/0248033 A1 | 9/2010 | Kumar et al. |
| 2010/0294985 A1 | 11/2010 | Suhara et al. |
| 2011/0033749 A1 | 2/2011 | Uchida et al. |
| 2011/0059367 A1 | 3/2011 | Morita et al. |
| 2011/0076564 A1 | 3/2011 | Yu et al. |
| 2011/0200879 A1 | 8/2011 | Saito et al. |
| 2011/0229757 A1 | 9/2011 | Kawakami et al. |
| 2011/0256437 A1 | 10/2011 | Katsuki et al. |
| 2011/0269023 A1 | 11/2011 | Kawakami et al. |
| 2011/0297876 A1 | 12/2011 | Masukuni et al. |
| 2011/0300441 A1 | 12/2011 | Kawakami |
| 2012/0034516 A1 | 2/2012 | Koo et al. |
| 2012/0045692 A1 | 2/2012 | Takemura et al. |
| 2012/0052396 A1 | 3/2012 | Tsuchida et al. |
| 2012/0064406 A1 | 3/2012 | Sato et al. |
| 2012/0064409 A1 | 3/2012 | Zhamu et al. |
| 2012/0082897 A1 | 4/2012 | Saito et al. |
| 2012/0088151 A1 | 4/2012 | Yamazaki et al. |
| 2012/0088156 A1 | 4/2012 | Nomoto et al. |
| 2012/0118149 A1 | 5/2012 | Dabrowski et al. |
| 2012/0244430 A1 | 9/2012 | Yamazaki et al. |
| 2012/0256337 A1 | 10/2012 | Yokoyama et al. |
| 2012/0258358 A1 | 10/2012 | Yura et al. |
| 2012/0258365 A1 | 10/2012 | Yokoyama et al. |
| 2012/0258369 A1 | 10/2012 | Yokoyama et al. |
| 2012/0261622 A1 | 10/2012 | Honma |
| 2012/0295163 A1 | 11/2012 | Yanagita et al. |
| 2012/0308891 A1 | 12/2012 | Todoriki et al. |
| 2012/0315544 A1 | 12/2012 | Yasuda et al. |
| 2012/0328951 A1 | 12/2012 | Hirohashi et al. |
| 2012/0328956 A1 | 12/2012 | Oguni et al. |
| 2012/0330044 A1 | 12/2012 | Hou |
| 2013/0017435 A1 | 1/2013 | Sato et al. |
| 2013/0040193 A1 | 2/2013 | Tsuchida et al. |
| 2013/0045418 A1 | 2/2013 | Oguni et al. |
| 2013/0052534 A1* | 2/2013 | Fujiki ............... H01M 4/525 429/219 |
| 2013/0052547 A1 | 2/2013 | Ogino et al. |
| 2013/0065120 A1 | 3/2013 | Miwa et al. |
| 2013/0078516 A1 | 3/2013 | Taniguchi et al. |
| 2013/0084384 A1 | 4/2013 | Yamakaji |
| 2013/0089786 A1 | 4/2013 | Jeong et al. |
| 2013/0130103 A1 | 5/2013 | Kim et al. |
| 2013/0134051 A1 | 5/2013 | Takahashi et al. |
| 2013/0156683 A1 | 6/2013 | Holzapfel et al. |
| 2013/0156942 A1 | 6/2013 | Yamakaji et al. |
| 2013/0157034 A1 | 6/2013 | Choi et al. |
| 2013/0164619 A1 | 6/2013 | Yamakaji et al. |
| 2013/0177806 A1 | 7/2013 | Caldwell et al. |
| 2013/0183579 A1 | 7/2013 | Kim et al. |
| 2013/0183582 A1 | 7/2013 | Halalay et al. |
| 2013/0189585 A1 | 7/2013 | Kang et al. |
| 2013/0190449 A1 | 7/2013 | Kinloch et al. |
| 2013/0202953 A1 | 8/2013 | Sharma et al. |
| 2013/0212879 A1 | 8/2013 | Ogino |
| 2013/0230770 A1 | 9/2013 | Oya et al. |
| 2013/0266858 A1 | 10/2013 | Inoue et al. |
| 2013/0266859 A1 | 10/2013 | Todoriki et al. |
| 2013/0313471 A1 | 11/2013 | Endo et al. |
| 2013/0316237 A1 | 11/2013 | Miki |
| 2013/0323596 A1 | 12/2013 | Morita et al. |
| 2013/0337320 A1 | 12/2013 | Yukawa |
| 2014/0004412 A1 | 1/2014 | Ogino |
| 2014/0023920 A1 | 1/2014 | Yamazaki et al. |
| 2014/0057165 A1 | 2/2014 | Yamakaji et al. |
| 2014/0079995 A1 | 3/2014 | Wakada |
| 2014/0099554 A1 | 4/2014 | Inoue et al. |
| 2014/0127567 A1 | 5/2014 | Kuriki et al. |
| 2014/0127568 A1 | 5/2014 | Kawakami et al. |
| 2014/0131633 A1 | 5/2014 | Ito et al. |
| 2014/0162132 A1 | 6/2014 | Ishii et al. |
| 2014/0166946 A1 | 6/2014 | Miwa et al. |
| 2014/0184172 A1 | 7/2014 | Momo et al. |
| 2014/0212759 A1 | 7/2014 | Blangero et al. |
| 2014/0234700 A1 | 8/2014 | Moriwaka et al. |
| 2014/0242463 A1 | 8/2014 | Song et al. |
| 2014/0295068 A1 | 10/2014 | Nanba et al. |
| 2014/0332715 A1 | 11/2014 | Kawakami et al. |
| 2014/0356718 A1 | 12/2014 | Ito et al. |
| 2014/0370184 A1 | 12/2014 | Takemura et al. |
| 2015/0014581 A1 | 1/2015 | Kawakami et al. |
| 2015/0014605 A1 | 1/2015 | Kawakami et al. |
| 2015/0064565 A1 | 3/2015 | Todoriki et al. |
| 2015/0093648 A1 | 4/2015 | Son et al. |
| 2015/0099161 A1 | 4/2015 | Hitotsuyanagi et al. |
| 2015/0099178 A1 | 4/2015 | Kawakami et al. |
| 2015/0099179 A1 | 4/2015 | Ikenuma et al. |
| 2015/0123050 A1 | 5/2015 | Yamazaki et al. |
| 2015/0155556 A1 | 6/2015 | Kawakami et al. |
| 2015/0166348 A1 | 6/2015 | Ikenuma et al. |
| 2015/0221933 A1 | 8/2015 | Mizawa et al. |
| 2015/0243978 A1 | 8/2015 | Shon et al. |
| 2015/0262762 A1 | 9/2015 | Ikenuma et al. |
| 2015/0325855 A1 | 11/2015 | Kawakami et al. |
| 2015/0333320 A1 | 11/2015 | Tamaki et al. |
| 2015/0333324 A1 | 11/2015 | Umeyama et al. |
| 2015/0357641 A1 | 12/2015 | Sugie et al. |
| 2015/0380737 A1 | 12/2015 | Kawasato et al. |
| 2016/0006032 A1 | 1/2016 | Paulsen et al. |
| 2016/0028080 A1 | 1/2016 | Sugiura |
| 2016/0064726 A1 | 3/2016 | Ikenuma et al. |
| 2016/0087315 A1 | 3/2016 | Oyama |
| 2016/0104880 A1 | 4/2016 | Gao et al. |
| 2016/0118646 A1 | 4/2016 | Ikenuma |
| 2016/0118658 A1 | 4/2016 | Kawakami et al. |
| 2016/0156030 A1 | 6/2016 | Sun et al. |
| 2016/0164089 A1 | 6/2016 | Kawakami et al. |

(56) References Cited

U.S. PATENT DOCUMENTS

| | | | |
|---|---|---|---|
| 2016/0276658 | A1 | 9/2016 | Choi et al. |
| 2016/0276659 | A1 | 9/2016 | Choi et al. |
| 2016/0285086 | A1 | 9/2016 | Zhu et al. |
| 2016/0285102 | A1 | 9/2016 | Shitaba et al. |
| 2016/0329533 | A1 | 11/2016 | Tajima |
| 2016/0336595 | A1 | 11/2016 | Choi et al. |
| 2016/0349905 | A1 | 12/2016 | Momma et al. |
| 2016/0380271 | A1 | 12/2016 | Ochiai et al. |
| 2017/0005364 | A1 | 1/2017 | Yamazaki et al. |
| 2017/0018797 | A1 | 1/2017 | Murashi et al. |
| 2017/0040594 | A1 | 2/2017 | Yamaki et al. |
| 2017/0062819 | A1 | 3/2017 | Ikenuma |
| 2017/0069907 | A1 | 3/2017 | Zhu et al. |
| 2017/0117589 | A1 | 4/2017 | Tajima et al. |
| 2017/0187035 | A1 | 6/2017 | Yanagihara et al. |
| 2017/0207444 | A1 | 7/2017 | Yanagihara et al. |
| 2017/0229707 | A1 | 8/2017 | Dahn et al. |
| 2017/0256817 | A1 | 9/2017 | Kadoma et al. |
| 2017/0309910 | A1 | 10/2017 | Jo et al. |
| 2018/0013130 | A1 | 1/2018 | Ochiai et al. |
| 2018/0019462 | A1 | 1/2018 | Kadoma et al. |
| 2018/0034045 | A1 | 2/2018 | Xia et al. |
| 2018/0040888 | A1 | 2/2018 | Park et al. |
| 2018/0040897 | A1 | 2/2018 | Park et al. |
| 2018/0076489 | A1 | 3/2018 | Mikami et al. |
| 2018/0090782 | A1 | 3/2018 | Choi et al. |
| 2018/0102536 | A1 | 4/2018 | Kawakami et al. |
| 2018/0102539 | A1 | 4/2018 | Hur et al. |
| 2018/0108944 | A1 | 4/2018 | Yamakaji |
| 2018/0145317 | A1 | 5/2018 | Momma et al. |
| 2018/0145325 | A1 | 5/2018 | Yi et al. |
| 2018/0145368 | A1 | 5/2018 | Ochiai et al. |
| 2018/0190976 | A1 | 7/2018 | Blangero et al. |
| 2018/0254477 | A1 | 9/2018 | Horikawa et al. |
| 2018/0366729 | A1 | 12/2018 | Yanagita et al. |
| 2020/0144601 | A1 | 5/2020 | Takahashi et al. |
| 2020/0152961 | A1 | 5/2020 | Momma et al. |
| 2021/0020935 | A1 | 1/2021 | Takahashi et al. |
| 2021/0028456 | A1 | 1/2021 | Takahashi et al. |
| 2021/0408593 | A1 | 12/2021 | Yoneda et al. |

FOREIGN PATENT DOCUMENTS

| | | |
|---|---|---|
| CN | 001981396 A | 6/2007 |
| CN | 101148263 A | 3/2008 |
| CN | 101156260 A | 4/2008 |
| CN | 101414680 A | 4/2009 |
| CN | 101867041 A | 10/2010 |
| CN | 102339998 A | 2/2012 |
| CN | 102447107 A | 5/2012 |
| CN | 102569775 B | 7/2012 |
| CN | 102610806 A | 7/2012 |
| CN | 102694201 A | 9/2012 |
| CN | 102779976 A | 11/2012 |
| CN | 102969490 A | 3/2013 |
| CN | 103022502 A | 4/2013 |
| CN | 103490060 A | 1/2014 |
| CN | 104701534 A | 6/2015 |
| CN | 105024047 A | 11/2015 |
| CN | 105051946 A | 11/2015 |
| CN | 105164054 A | 12/2015 |
| CN | 105594028 A | 5/2016 |
| CN | 105655554 A | 6/2016 |
| CN | 106025212 A | 10/2016 |
| CN | 106099098 A | 11/2016 |
| CN | 106207162 A | 12/2016 |
| CN | 106876778 A | 6/2017 |
| CN | 108110225 A | 6/2018 |
| EP | 1317008 A | 6/2003 |
| EP | 1469539 A | 10/2004 |
| EP | 2500967 A | 9/2012 |
| EP | 3312916 A | 4/2018 |
| EP | 3361535 A | 8/2018 |
| EP | 3646402 A | 5/2020 |
| EP | 3783707 A | 2/2021 |
| JP | 05-314965 A | 11/1993 |
| JP | 05-314995 A | 11/1993 |
| JP | 08-037007 A | 2/1996 |
| JP | 08-100107 A | 4/1996 |
| JP | 08-236114 A | 9/1996 |
| JP | 11-025983 A | 1/1999 |
| JP | 11-096993 A | 4/1999 |
| JP | 11-233150 A | 8/1999 |
| JP | 3031546 | 4/2000 |
| JP | 2000-203842 A | 7/2000 |
| JP | 3172388 | 6/2001 |
| JP | 2001-319692 A | 11/2001 |
| JP | 2002-216760 A | 8/2002 |
| JP | 2002-352802 A | 12/2002 |
| JP | 2003-068306 A | 3/2003 |
| JP | 2003-221235 A | 8/2003 |
| JP | 2003-229129 A | 8/2003 |
| JP | 2003-331824 A | 11/2003 |
| JP | 2004-014381 A | 1/2004 |
| JP | 2004-103566 A | 4/2004 |
| JP | 2004-196604 A | 7/2004 |
| JP | 2004-288579 A | 10/2004 |
| JP | 2004-342554 A | 12/2004 |
| JP | 2005-158612 A | 6/2005 |
| JP | 2005-225734 A | 8/2005 |
| JP | 2005-302510 A | 10/2005 |
| JP | 2005-332629 A | 12/2005 |
| JP | 2006-164758 A | 6/2006 |
| JP | 2006-261132 A | 9/2006 |
| JP | 2006-318928 A | 11/2006 |
| JP | 2006-318929 A | 11/2006 |
| JP | 2007-128714 A | 5/2007 |
| JP | 2007-213866 A | 8/2007 |
| JP | 3959333 | 8/2007 |
| JP | 2008-060033 A | 3/2008 |
| JP | 2008-166156 A | 7/2008 |
| JP | 2008-277265 A | 11/2008 |
| JP | 4259393 | 4/2009 |
| JP | 2009-104805 A | 5/2009 |
| JP | 2009-179501 A | 8/2009 |
| JP | 2010-080407 A | 4/2010 |
| JP | 2010-102895 A | 5/2010 |
| JP | 2010-135090 A | 6/2010 |
| JP | 2010-232001 A | 10/2010 |
| JP | 2010-244847 A | 10/2010 |
| JP | 2010-272239 A | 12/2010 |
| JP | 2011-082133 A | 4/2011 |
| JP | 2011-138718 A | 7/2011 |
| JP | 4739780 | 8/2011 |
| JP | 2011-210694 A | 10/2011 |
| JP | 2012-043794 A | 3/2012 |
| JP | 2012-066944 A | 4/2012 |
| JP | 2012-074366 A | 4/2012 |
| JP | 2012-084257 A | 4/2012 |
| JP | 2012-169217 A | 9/2012 |
| JP | 2012-209077 A | 10/2012 |
| JP | 2013-012410 A | 1/2013 |
| JP | 2013-062082 A | 4/2013 |
| JP | 2013-087040 A | 5/2013 |
| JP | 2013-091581 A | 5/2013 |
| JP | 2013-100197 A | 5/2013 |
| JP | 2013-246936 A | 12/2013 |
| JP | 2014-049239 A | 3/2014 |
| JP | 2014-063707 A | 4/2014 |
| JP | 2014-063708 A | 4/2014 |
| JP | 2014-116111 A | 6/2014 |
| JP | 2015-015169 A | 1/2015 |
| JP | 2015-069958 A | 4/2015 |
| JP | 2015-082374 A | 4/2015 |
| JP | 2015-088450 A | 5/2015 |
| JP | 2015-099722 A | 5/2015 |
| JP | 2015-156363 A | 8/2015 |
| JP | 2015-201432 A | 11/2015 |
| JP | 2016-076454 A | 5/2016 |
| JP | 2017-021942 A | 1/2017 |
| JP | 2017-091777 A | 5/2017 |
| JP | 2018-088407 A | 6/2018 |
| JP | 2018-092934 A | 6/2018 |
| JP | 2018-147726 A | 9/2018 |

(56) References Cited

FOREIGN PATENT DOCUMENTS

| | | |
|---|---|---|
| JP | 2019-179758 A | 10/2019 |
| JP | 2020-021742 A | 2/2020 |
| JP | 2020-145202 A | 9/2020 |
| KR | 2003-0044855 A | 6/2003 |
| KR | 2008-0024105 A | 3/2008 |
| KR | 2008-0089195 A | 10/2008 |
| KR | 2009-0040216 A | 4/2009 |
| KR | 2009-0111130 A | 10/2009 |
| KR | 10-1007504 | 1/2011 |
| KR | 2016-0023990 A | 3/2016 |
| KR | 2016-0092946 A | 8/2016 |
| KR | 2017-0025873 A | 3/2017 |
| KR | 2017-0056537 A | 5/2017 |
| TW | 201717457 | 5/2017 |
| TW | 201721942 | 6/2017 |
| WO | WO-2003/081698 | 10/2003 |
| WO | WO-2004/102700 | 11/2004 |
| WO | WO-2006/009177 | 1/2006 |
| WO | WO-2006/109930 | 10/2006 |
| WO | WO-2006123572 A1 * | 11/2006 ............... B05D 5/12 |
| WO | WO-2009/119104 | 10/2009 |
| WO | WO-2010/064127 | 6/2010 |
| WO | WO-2011/141486 | 11/2011 |
| WO | WO-2011/155781 | 12/2011 |
| WO | WO-2012/005180 | 1/2012 |
| WO | WO-2012/029729 | 3/2012 |
| WO | WO-2012/091015 | 7/2012 |
| WO | WO-2012/124242 | 9/2012 |
| WO | WO-2012/132387 | 10/2012 |
| WO | WO-2012/176903 | 12/2012 |
| WO | WO-2014/061653 | 4/2014 |
| WO | WO-2014/098238 | 6/2014 |
| WO | WO-2014/132550 | 9/2014 |
| WO | WO-2014/181885 | 11/2014 |
| WO | WO-2015/050176 | 4/2015 |
| WO | WO-2015/136881 | 9/2015 |
| WO | WO-2015/163356 | 10/2015 |
| WO | WO-2016/042437 | 3/2016 |
| WO | WO-2018/211375 | 11/2018 |
| WO | WO-2019/003025 | 1/2019 |

OTHER PUBLICATIONS

Sun.Y et al., "Role of AlF3 Coating on LiCoO2 Particles during Cycling to Cutoff Voltage above 4.5 V", J. Electrochem. Soc. (Journal of the Electrochemical Society), 2009, vol. 156, No. 12, pp. A1005-A1010.

Araki.K et al., "Electrochemical properties of LiNi1/3Co1/3Mn1/3O2 cathode material modified by coating with Al2O3 nanoparticles", Journal of Power Sources, 2014, vol. 269, pp. 236-243.

Kim.H et al., "Capacity fading behavior of Ni-rich layered cathode materials in Li-ion full cells", Journal of Electroanalytical Chemistry, 2016, vol. 782, pp. 168-173.

Lin.F et al., "Surface reconstruction and chemical evolution of stoichiometric layered cathode materials for lithium-ion batteries", Nature Communications, Mar. 27, 2014, vol. 5, pp. 3529-1-3529-9.

Yano.A et al., "Surface Structure and High-Voltage Charge/Discharge Characteristics of Al-Oxide Coated LiNi1/3Co1/3Mn1/3O2 Cathodes", J. Electrochem. Soc. (Journal of the Electrochemical Society), 2015, vol. 162, No. 2, pp. A3137-A3144.

Yano.A et al., "Surface Structure and High-Voltage Charging/Discharging Performance of Low-Content Zr-Oxide-Coated LiNi1/3Co1/3Mn1/3O2", J. Electrochem. Soc. (Journal of the Electrochemical Society), 2016, vol. 163, No. 2, pp. A75-A82.

Chen.Z et al., "Staging Phase Transitions in LixCoO2", J. Electrochem. Soc. (Journal of the Electrochemical Society), 2002, vol. 149, No. 12, pp. A1604-A1609.

Okumura.T et al., "Correlation of lithium ion distribution and X-ray absorption near-edge structure in O3- and O2-lithium cobalt oxides from first-principle calculation", Journal of Materials Chemistry, 2012, vol. 22, pp. 17340-17348.

Motohashi.T et al., "Electronic phase diagram of the layered cobalt oxide system LixCoO2 ($0.0 \leq x \leq 1.0$)", Phys. Rev. B (Physical Review. B), Oct. 9, 2009, vol. 80, No. 16, pp. 165114-1-155114-9.

Counts.W et al., "Fluoride Model Systems: II, The Binary Systems CaF2—BeF2, MgF2—BeF2, and LiF—MgF2", J. Am. Ceram. Soc. (Journal of the American Ceramic Society), 1953, vol. 36, No. 1, pp. 12-17.

Taiwanese Office Action (Application No. 108141056) Dated May 18, 2020.

European Search Report (Application No. 18822711.0) Dated Jun. 25, 2020.

Hong.W et al., "Modification of LiCoO2 by Surface Coating with MgO/TiO2/SiO2 for High-Performance Lithium-Ion Battery", Electrochemical and Solid-State Letters, Dec. 20, 2005, vol. 9, No. 2, pp. A82-A85.

Park.S et al., "Novel Surface Modification Technique to Improve Electrochemical Performance of LiCoO2 at High Voltage", Electrochemical and Solid-State Letters, Apr. 21, 2005, vol. 8, No. 6, pp. A299-A302.

Jo.C et al., "An effective method to reduce residual lithium compounds on Ni-rich Li[Ni0.6Co0.2Mn0.2]O2 active material using a phosphoric acid derived Li3PO4 nanolayer", Nano Research, Dec. 4, 2014, vol. 8, No. 5, pp. 1464-1479, Springer.

Tebbe.J et al., "Mechanisms of LiCoO2 Cathode Degradation by Reaction with HF and Protection by Thin Oxide Coatings", ACS Applied Materials & Interfaces, Oct. 12, 2015, vol. 7, No. 43, pp. 24265-24278.

Bensalah.N et al., "Review on Synthesis, Characterizations, and Electrochemical Properties of Cathode Materials for Lithium Ion Batteries", Journal of Material Science & Engineering, 2016, vol. 5, No. 4, pp. 1000258-1-1000258-21.

Lu.Y et al., "Recent progress on lithium-ion batteries with high electrochemical performance", Science China Chemistry, Feb. 25, 2019, vol. 62, No. 5, pp. 533-548.

Yano.A et al., "LiCoO2 Degradation Behavior in the High-Voltage Phase Transition Region and Improved Reversibility with Surface Coating", J. Electrochem. SOC. (Journal of the Electrochemical Society), 2017, vol. 164, No. 1, pp. A6116-A6122.

Mladenov.M et al., "Effect of Mg doping and MgO-surface modification on the cycling stability of LiCoO2 electrodes.", Electrochemistry Communications, Aug. 1, 2001, vol. 3, No. 8, pp. 410-416.

Koyama.Y et al., "Co K-edge Xanes of LiCoO2 and CoO2 with a variety of structures by supercell density functional calculations with a core hole", Phys. Rev. B (Physical Review. B), Feb. 27, 2012, vol. 85, No. 7, pp. 075129-1-075129-7.

Quinlan.R et al., "XPS Investigation of the Electrolyte Induced Stabilization of LiCoO2 and "AlPO4"-Coated LiCoO2 Composite Electrodes", J. Electrochem. Soc. (Journal of the Electrochemical Society), Dec. 3, 2015, vol. 163, No. 2, pp. A300-A308.

Xiao.B, "Surface Modifification of Electrode Materials for Lithium-Ion Batteries", Graduate Program in Mechanical and Materials Engineering, 2006, pp. 1-235.

Ohnishi.M et al., "Investigation of the surface degradation of LiCoO2 particles in the cathode materials of Li-ion batteries using FIB-TOF-SIMS", Journal of Surface Analysis, 2013, vol. 20, No. 2, pp. 99-110.

Iwaya.K et al., "Impact of Lithium-Ion Ordering on Surface Electronic States of LixCoO2", Phys. Rev. Lett. (Physical Review Letters), Sep. 20, 2013, vol. 111, No. 12, pp. 126104-1-126104-5.

Zou.M et al., "Synthesis of High-Voltage (4.5 V) Cycling Doped LiCoO2 for Use in Lithium Rechargeable Cells", Chem. Mater. (Chemistry of Materials), Dec. 16, 2003, vol. 15, No. 25, pp. 4699-4702.

Schipper.F et al., "Study of Cathode Materials for Lithium-Ion Batteries: Recent Progress and New Challenges", Inorganics, Apr. 28, 2017, vol. 5, No. 2, pp. 1-29.

Thackeray.M et al., "Li2MnO3-stabilized LiMO2(M=Mn, Ni, Co) electrodes for lithium-ion batteries", J. Mater. Chem. (Journal of Materials Chemistry), 2007, vol. 17, pp. 3112-3125.

(56) References Cited

OTHER PUBLICATIONS

Lee.S et al., "Antiferromagnetic ordering in Li2MnO3 single crystals with a two-dimensional honeycomb lattice", Journal of Physics: Condensed Matter, Nov. 14, 2012, vol. 24, No. 45, pp. 456004-1-456004-9.
Dreyer.D et al., "The Chemistry of Graphene Oxide", Chemical Society Reviews, Nov. 3, 2009, vol. 39, No. 1, pp. 228-240.
Johnson.C et al., "Lithium-manganese oxide electrodes with layered-spinel composite structures xLi2MnO3·(1-x)Li1+yMn2-yO4(0<x<1,0≤y≤0.33) for lithium batteries", Electrochemistry Communications, May 1, 2005, vol. 7, No. 5, pp. 528-536, Elsevier.
Katsuno.H et al., "Growth modes in two-dimensional heteroepitaxy on an elasticsubstrate", J. Cryst. Growth (Journal of Crystal Growth), Feb. 15, 2005, vol. 275, No. 1-2, pp. e283-e288, Elsevier.
McCalla.E et al., "The spinel and cubic rocksalt solid-solutions in the Li—Mn—Ni oxide pseudo-ternary system", Solid State Ionics, May 2, 2013, vol. 242, pp. 1-9, Elsevier.
Mukai.K et al., "Magnetic properties of the chemically delithiated LixMn2O4 with 0.07≤xx≤1", Journal of Solid State Chemistry, May 1, 2011, vol. 184, No. 5, pp. 1096-1104.
Wang.Z et al., "EELS analysis of cation valence states and oxygen vacancies in magnetic oxides", Micron, Oct. 1, 2000, vol. 31, No. 5, pp. 571-580, Elsevier.
Tan.H et al., "Oxidation state and chemical shift investigation in transition metal oxides by EELS", Ultramicroscopy, May 1, 2012, vol. 116, pp. 24-33, Elsevier.
Berbenni.V et al., "Thermogravimetry and X-Ray Diffraction Study of the Thermal Decomposition Processes in Li2CO3—MnCO3 Mixtures", Journal of Analytical and Applied Pyrolysis, 2002, vol. 62, pp. 45-62.
Taguchi.N et al., "Characterization of MgO-coated-LiCoO2 particles by analytical transmission electron microscopy", Journal of Power Sources, 2016, vol. 328, pp. 161-166, Elsevier.
Khedr.A et al., "Synthesis, Structure, and Electrochemistry of Sm-Modified LiMn2O4 Cathode Materials for Lithium-Ion Batteries", J. Electron. Mater.(Journal of Electronic Materials), Apr. 23, 2013, vol. 42, No. 6, pp. 1275-1281.
Joshi.T et al., "Effects of Dissolved Transition Metals on the Electrochemical Performance and SEI Growth in Lithium-Ion Batteries", J. Electrochem. Soc. (Journal of the Electrochemical Society), 2014, vol. 161, No. 12, pp. A1915-A1921.
Gabrisch.H et al., "Hexagonal to Cubic Spinel Transformation in Lithiated Cobalt Oxide TEM Investigation", J. Electrochem. Soc. (Journal of the Electrochemical Society), 2004, vol. 151, No. 6, pp. A891-A897.
Yamamoto.K et al., "Stabilization of the Electronic Structure at the Cathode/Electrolyte Interface via MgO Ultra-thin Layer during Lithium-ions Insertion/Extraction", Electrochemistry, Oct. 5, 2014, vol. 82, No. 10, pp. 891-896.
Yamamoto.K et al., "In situ Total-Reflection Fluorescence X-Ray Absorption Spectroscopic Study on Stability at LiFePO4 / Electrolyte Interface", 224th ECS Meeting Abstract, Oct. 27, 2013, p. 923.
Wang.Z et al., "Electrochemical Evaluation and Structural Characterization of Commercial LiCoO2 Surfaces Modified with MgO for Lithium-Ion Batteries", J. Electrochem. Soc. (Journal of the Electrochemical Society), Mar. 4, 2002, vol. 149, No. 4, pp. A466-A471.
Lee.Y et al., "Phase Transitions of Bare and Coated LixCoO2 (x=0.4 and 0.24) at 300° C.", J. Electrochem. Soc. (Journal of the Electrochemical Society), Jul. 28, 2005, vol. 152, No. 9, pp. A1824-A1827.
Geder.J et al., "Impact of active material surface area on thermal stability of LiCoO2 cathode", Journal of Power Sources, Jul. 1, 2014, vol. 257, pp. 286-292, Elsevier.
Chung.K et al., "Structural Studies on the Effects of ZrO2 Coating on LiCoO2 during Cycling Using In Situ X-Ray Diffraction Technique", J. Electrochem. Soc. (Journal of the Electrochemical Society), 2006, vol. 153, No. 11, pp. A2152-A2157.
Liu.L et al., "Electrochemical and In Situ Synchrotron XRD Studies on Al2O3-Coated LiCoO2 Cathode Material", J. Electrochem. Soc. (Journal of the Electrochemical Society), 2004, vol. 151, No. 9, pp. A1344-A1351.
Benecke.M et al., "Effect of LiF on Hot-Pressing of MgO", J. Am. Ceram. Soc. (Journal of the American Ceramic Society), Jul. 1, 1967, vol. 50, No. 7, pp. 365-368.
Hart.P et al., "Densification Mechanisms in Hot-Pressing of Magnesia with a Fugitive Liquid", J. Am. Ceram. Soc. (Journal of the American Ceramic Society), Feb. 1, 1970, vol. 53, No. 2, pp. 83-86.
Tukamoto.H et al., "Electronic Conductivity of LiCoO2 and Its Enhancement by Magnesium Doping", J. Electrochem. Soc. (Journal of the Electrochemical Society), Sep. 1, 1997, vol. 144, No. 9, pp. 3164-3168.
Ohzuku.T et al., "Solid-State Redox Reactions of LiCoO2 (R-3m) for 4 Volt Secondary Lithium Cells", J. Electrochem. Soc. (Journal of the Electrochemical Society), Nov. 1, 1994, vol. 141, No. 11, pp. 2972-2977.
Amatucci.G et al., "CoO2, The End Member of the LixCoO2 Solid Solution", J. Electrochem. Soc. (Journal of the Electrochemical Society), Mar. 1, 1996, vol. 143, No. 3, pp. 1114-1123.
Wang.Z et al., "Structural and electrochemical characterizations of surface-modified LiCoO2 cathode materials for Li-ion batteries", Solid State Ionics, Jun. 2, 2002, vol. 148, No. 3-4, pp. 335-342, Elsevier.
Zou.M et al., "Synthesis and Electrochemical Performance of High Voltage Cycling LiM0.05Co0.95O2 as Cathode Material for Lithium Rechargeable Cells", Electrochemical and Solid-State Letters, 2004, vol. 7, No. 7, pp. A176-A179.
Wang.Z et al., "Improving the cycling stability of LiCoO2 at 4.5 V through co-modification by Mg doping and zirconium oxyfluoride coating", Ceramics Internationa, 2015, vol. 41, No. 1, pp. 469-474.
Cho.Y et al., "High Performance LiCoO2 Cathode Materials at 60° C. for Lithium Secondary Batteries Prepared by the Facile Nanoscale Dry-Coating Method", J. Electrochem. Soc. (Journal of the Electrochemical Society), 2010, vol. 157, No. 5, pp. A617-A624.
Wang.Z et al., "Mg doping and zirconium oxyfluoride coating co-modification to enhance the high-voltage performance of LiCoO2 for lithium ion battery", Journal of Alloys and Compounds, Feb. 5, 2015, vol. 621, pp. 212-219.
Kweon.H et al., "Effects of metal oxide coatings on the thermal stability and electrical performance of LiCoCO2 in a Li-ion cell", Journal of Power Sources, Feb. 16, 2004, vol. 126, pp. 156-162, Elsevier.
Shim.J et al., "Effects of MgO Coating on the Structural and Electrochemical Characteristics of LiCoO2 as Cathode Materials for Lithium Ion Battery", Chem. Mater. (Chemistry of Materials), Mar. 24, 2014, vol. 26, No. 8, pp. 2537-2543.
Zhao.H et al., "Improvement of electrochemical stability of LiCoO2 cathode by a nano-crystalline coating", Journal of Power Sources, May 20, 2004, vol. 132, pp. 195-200, Elsevier.
Iriyama.Y et al., "Effects of surface modification by MgO on interfacial reaction of lithium cobalt oxide thin film electrode", Journal of Power Sources, Oct. 5, 2004, vol. 137, pp. 111-116, Elsevier.
Shim.J et al., "Effects of MgO Coating on the Structural and Electrochemical Characteristics of LiCoO2 as Cathode Materials for Lithium Ion Battery", Chem. Mater. (Chemistry of Materials), [e.g. ), Suppor] Supporting Information, Mar. 24, 2014, vol. 26, No. 8, pp. 31-33.
Orikasa.Y et al., "Origin of Surface Coating Effect for MgO on LiCoO2 to Improve the Interfacial Reaction between Electrode and Electrolyte", Adv. Mater.Interfaces (Advanced Materials Interfaces), Aug. 28, 2014, vol. 1, No. 9, pp. 1400195-1-1400195-8.
Shim.J et al., "Synergistic effects of coating and doping for lithium ion battery cathode materials: synthesis and characterization of lithium titanate-coated LiCoO2 with Mg doping", Electrochimica ACTA, Dec. 20, 2015, vol. 186, pp. 201-208, Elsevier.
Cho.J et al., "Comparison of Al2O3- and AlPO4-coated LiCoO2 cathode materials for a Li-ion cell", Journal of Power Sources, 2005, vol. 146, pp. 58-64, Elsevier.

(56) References Cited

OTHER PUBLICATIONS

Jin.Y et al., "Electrochemical Characterizations of Commercial LiCoO2 Powders with Surface Modified by Li3PO4 Nanoparticles", Electrochemical and Solid-State Letters, Apr. 3, 2006, vol. 9, No. 6, pp. A273-A276.

Alcantara.R et al., "SPES, 6Li MAS NMR, and Ni3+ EPR evidence for the formation of Co2+-containing spinel phases in LiCoO2 cycled electrode materials", Journal of Electroanalytical Chemistry, Aug. 28, 1998, vol. 454, No. 1-2, pp. 173-181.

Shi.S et al., "Enhanced cycling stability of Li[Li 0.2Mn0.54Ni0.13Co0.13]O2 by surface modification of MgO with melting impregnation method", Electrochimica Acta, Nov. 1, 2012, vol. 88, pp. 671-679.

Antaya.M et al., "Preparation and Characterization of LiCoO2 Thin Films by Laser Ablation Deposition", J. Electrochem. Soc. (Journal of the Electrochemical Society), Mar. 1, 1993, vol. 140, No. 3, pp. 575-578.

Eom.J et al., "M3(PO4)2-Nanoparticle-Coated LiCoO2 vs LiCo0.96M0.04O2(M=Mg and Zn) on Electrochemical and Storage Characteristics", J. Electrochem. Soc. (Journal of the Electrochemical Society), Jan. 8, 2008, vol. 155, No. 3, pp. A201-A205.

Kim.Y et al., "Suppression of Cobalt Dissolution from the LiCoO2 Cathodes with Various Metal-Oxide Coatings", J. Electrochem. Soc. (Journal of the Electrochemical Society), 2003, vol. 150, No. 12, pp. A1723-A1725.

Fang.T et al., "Effect of calcination temperature on the electrochemical behavior of ZnO-coated LiCoO2 cathode", Surface & Coatings Technology , Apr. 19, 2006, vol. 201, No. 3-4, pp. 1886-1893, Elsevier.

International Search Report (Application No. PCT/IB2018/054351) Dated Oct. 2, 2018.

Written Opinion (Application No. PCT/IB2018/054351) Dated Oct. 2, 2018.

Shim.J et al., "Characterization of Spinel LixCo2O4-Coated LiCoO2 Prepared with Post-Thermal Treatment as a Cathode Material for Lithium Ion Batteries", Chem. Mater. (Chemistry of Materials), Apr. 10, 2015, vol. 27, No. 9, pp. 3273-3279.

Liu.A et al., "Synthesis of Mg and Mn Doped LiCoO2 and Effects on High Voltage Cycling", J. Electrochem. Soc. (Journal of the Electrochemical Society), Jun. 2, 2017, vol. 164, No. 7, pp. A1655-A1664.

Belsky.A et al., "New developments in the Inorganic Crystal Structure Database (ICSD): Accessibility in support of materials research and design.", Acta. Cryst.(Acta Crystallographica Section B), Jun. 1, 2002, vol. B58, No. 3, pp. 364-369.

Sun.Y et al., "High-energy cathode material for long-life and safe lithium batteries", Nature Materials, Mar. 22, 2009, vol. 8, pp. 320-324.

Antolini.E, "LiCoO2: formation, structure, lithium and oxygen nonstoichiometry, electrochemical behaviour and transport properties", Solid State Ionics, 2004, vol. 170, No. 3-4, pp. 159-171.

Ding.Y et al., "Preparation of nano-structured LiFePO4/graphene composites by co-precipitation method", Electrochemistry Communications, 2010, vol. 12, No. 1, pp. 10-13, Elsevier.

Ceder.G et al., "Identification of cathode materials for lithium batteries guided by first-principles calculations", Nature, Apr. 16, 1998, vol. 392, pp. 694-696.

Gopukumar.S et al., "Synthesis and electrochemical performance of tetravalent doped LiCoO2 in lithium rechargeable cells", Solid State Ionics, 2003, vol. 159, pp. 223-232, Elsevier.

Taiwanese Office Action (Application No. 109140360) Dated Jun. 22, 2021.

Min.J et al., "Simple, robust metal fluoride coating on layered Li1.23Ni0.13Co0.14Mn0.56O2 and its effects on enhanced electrochemical properties", Electrochemica Acta, Jun. 30, 2013, vol. 100, pp. 10-17.

European Search Report (Application No. 20198665.0) Dated Jan. 25, 2021.

Chinese Office Action (Application No. 202010737147.4) Dated Apr. 30, 2021.

Taiwanese Office Action (Application No. 109133864) Dated May 14, 2021.

Chinese Office Action (Application No. 201880011201.8) Dated Jan. 17, 2022.

Indian Office Action (Application No. 201917053243) Dated Jul. 7, 2021.

Physical Chemistry of Molten Salts, Jul. 1, 1963, pp. 45-50, China Industry Publishing.

Notification of Reexamination (Application No. 202010737147.4) Dated Jun. 1, 2022.

Chinese Office Action (Application No. 201880011201.8) Dated Oct. 7, 2023.

Exhibit 1032 of IPR2023-01016, portions of JP-2015-201432A and Full translation.

Exhibit 1028 of IPR2023-01349, Full translation of JP-2015-201432A.

Appendix C of EPR 90/019,535, portions of JP-2015-201432A and Full translation.

Exhibit 1041 of EPR 90/019,535, JP-2015-201432A and Full translation.

Appendix LL of EPR 90/019,447, JP-2012-074366A and Full translation.

* cited by examiner

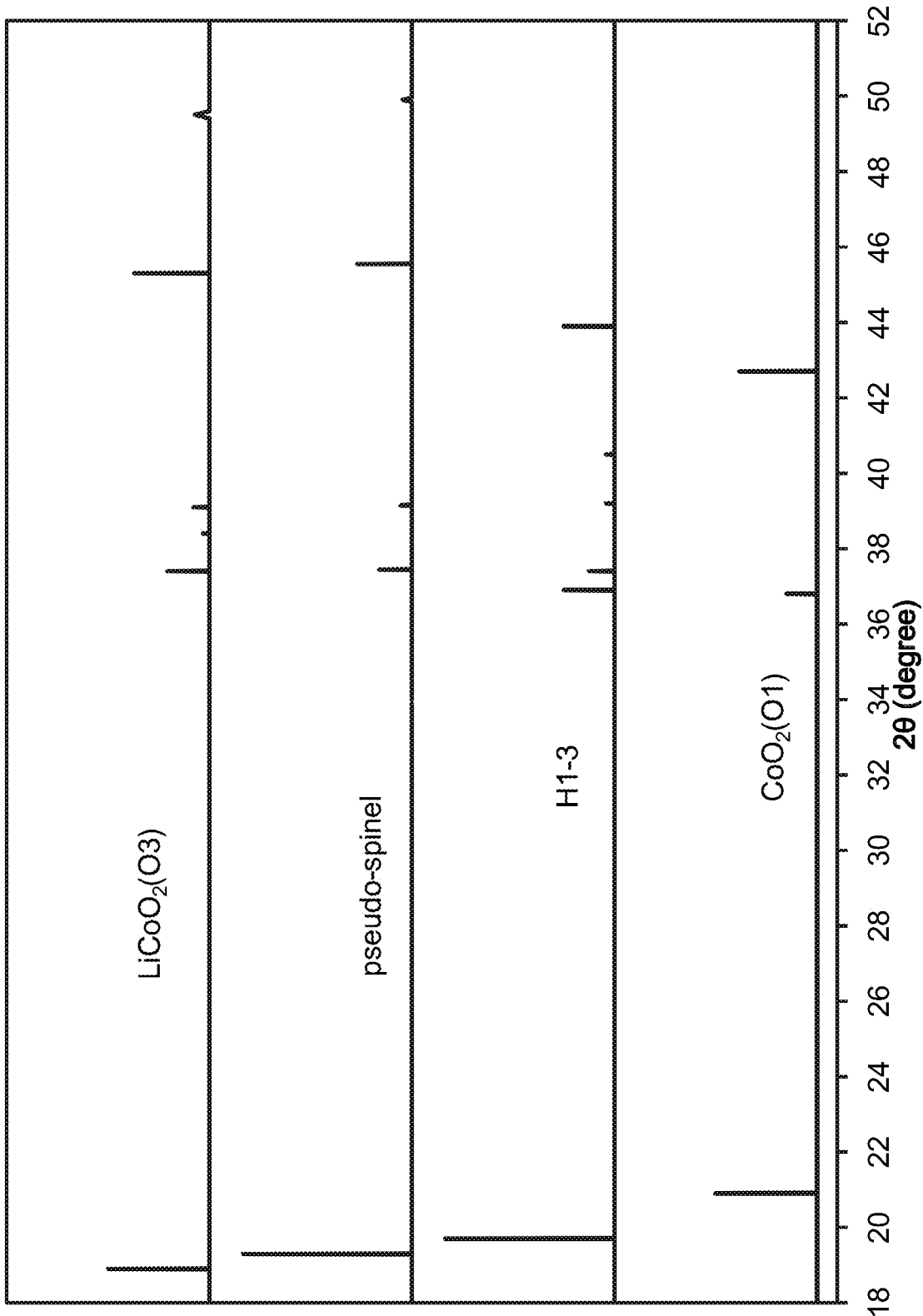

pseudo-spinel

Co: hexacoordinatated oxygen site $Co_3O_4$ spinel

Co(A): A site, tetracoordinated oxygen site

Co(B): B site, hexacoordinated oxygen site

FIG. 23A
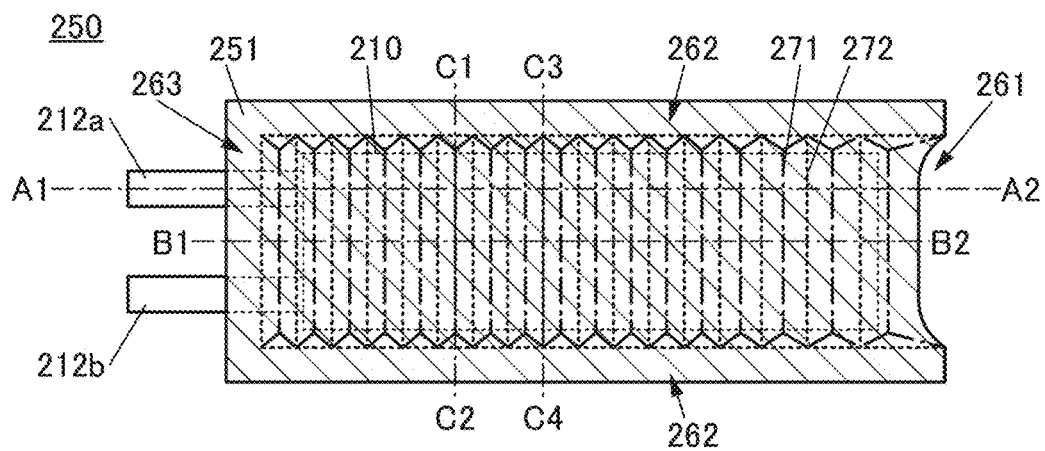
FIG. 23B1 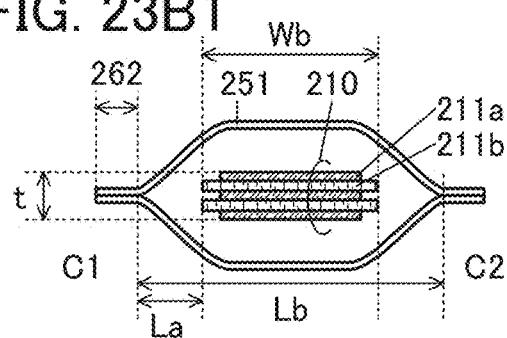 FIG. 23B2 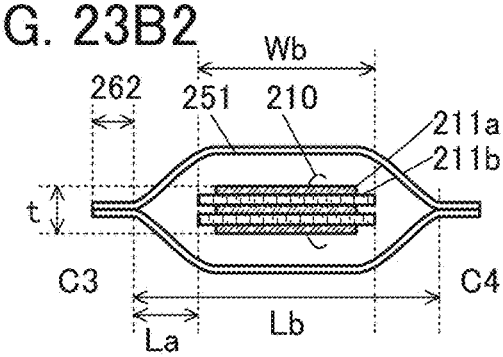
FIG. 23C
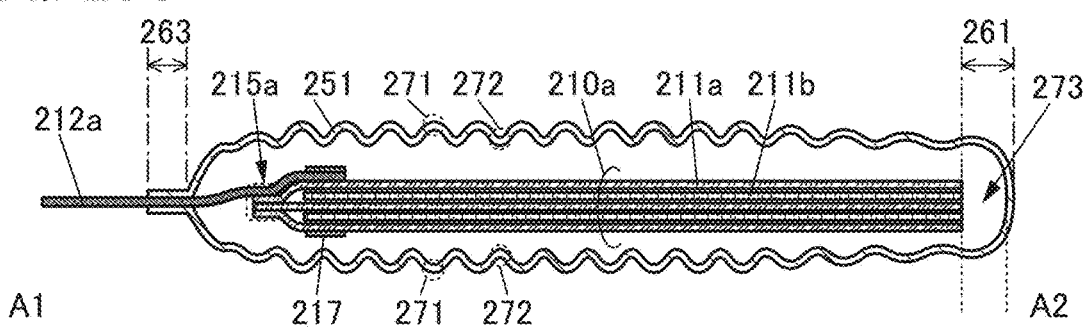
FIG. 23D
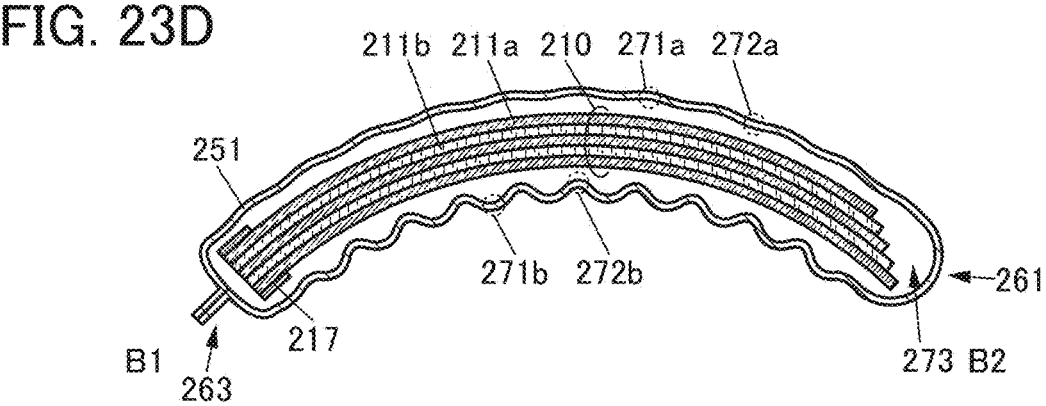

FIG. 29 particle size distribution
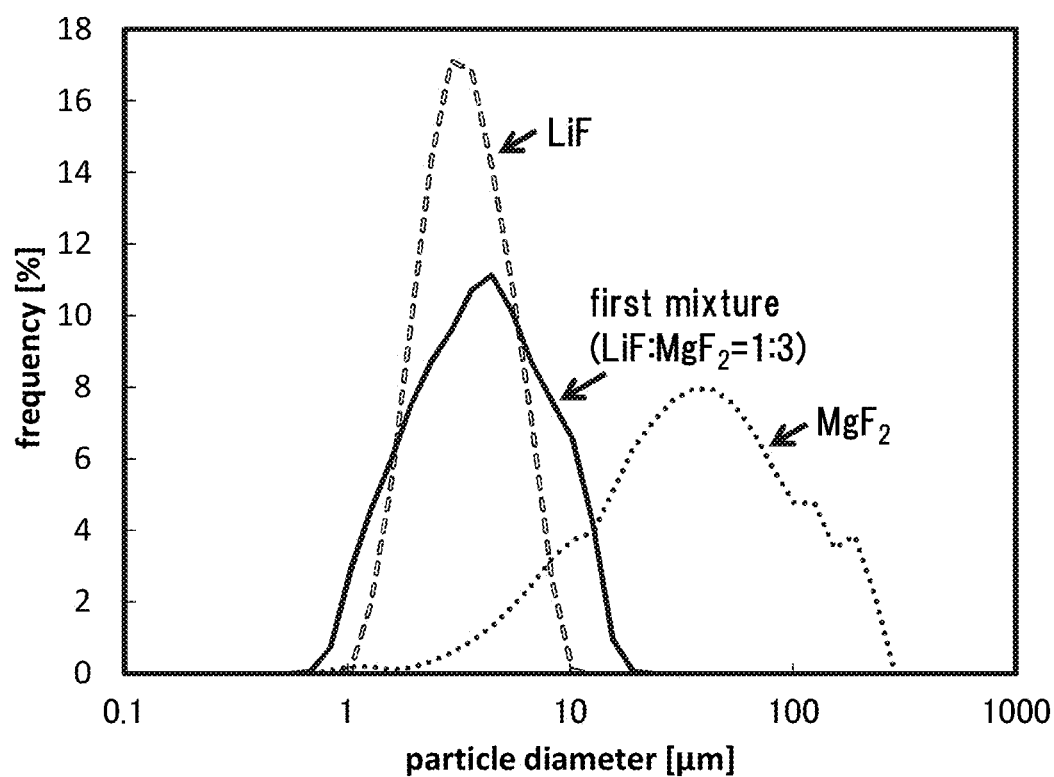

FIG. 30A
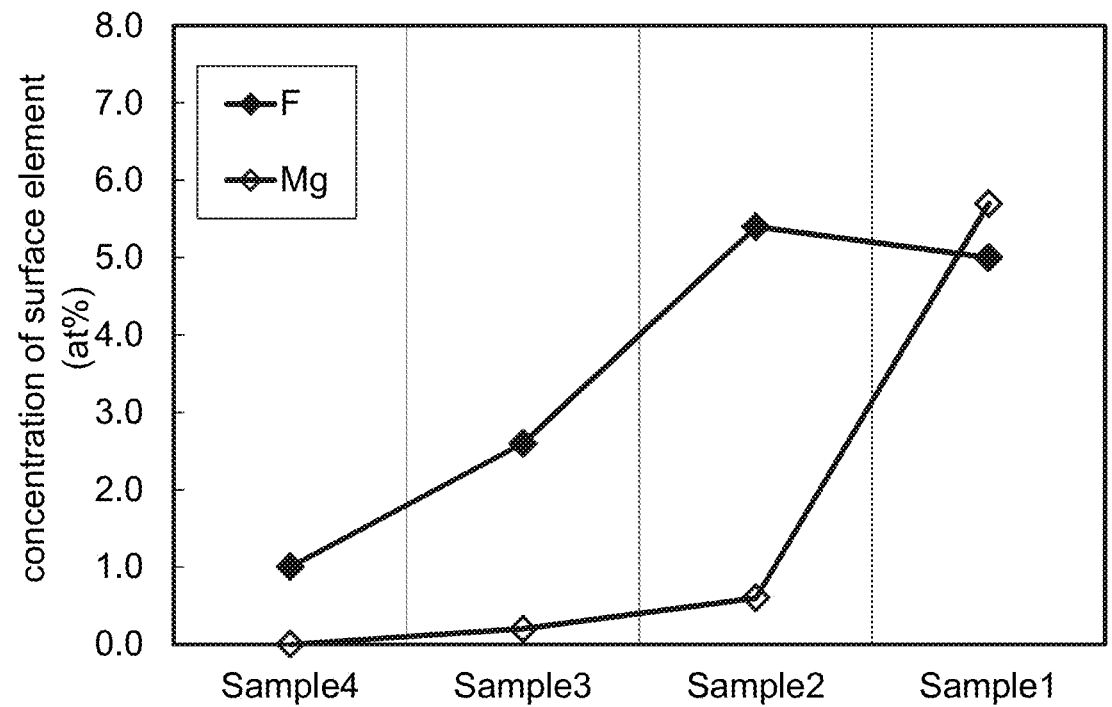
FIG. 30B1
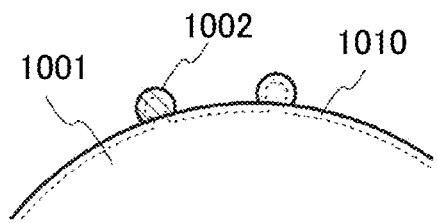
FIG. 30B2
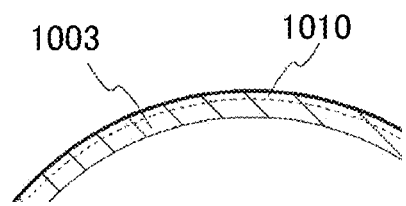

FIG. 32A1 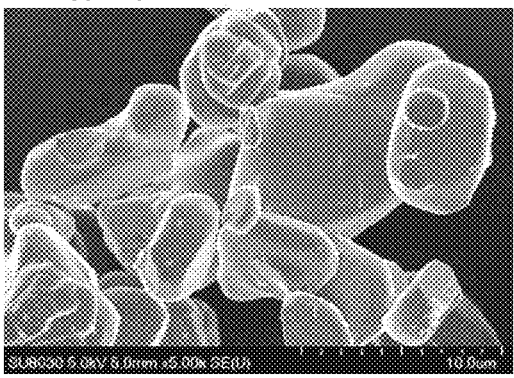
FIG. 32A2 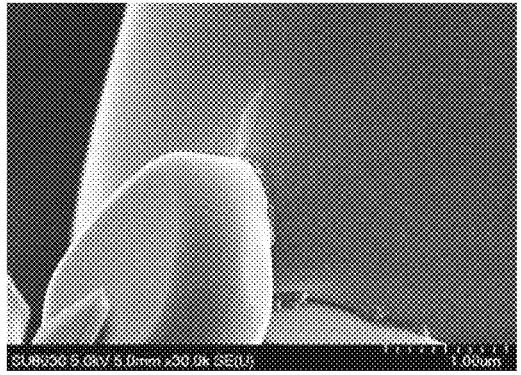
FIG. 32B1 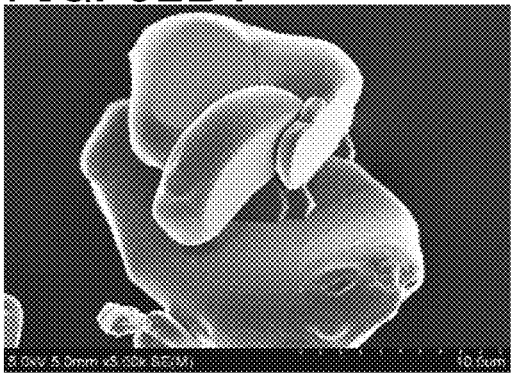
FIG. 32B2 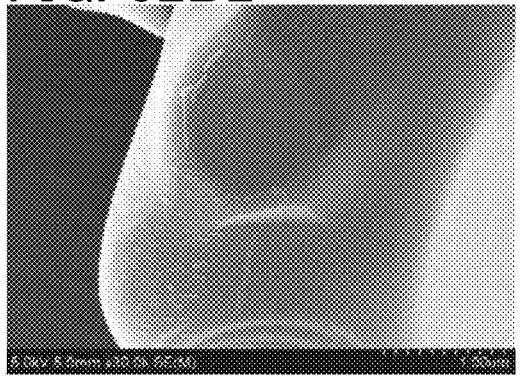
FIG. 32C1 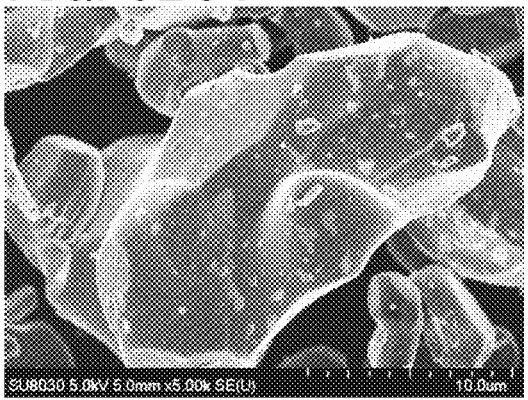
FIG. 32C2 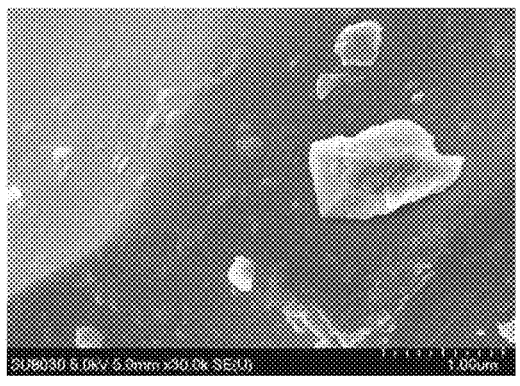
FIG. 32D1 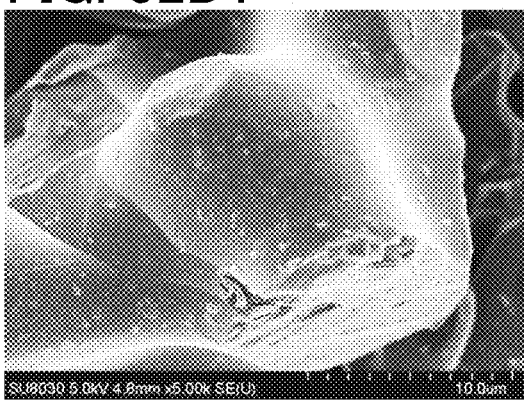
FIG. 32D2 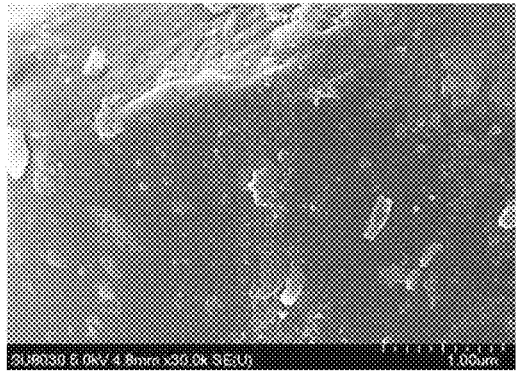

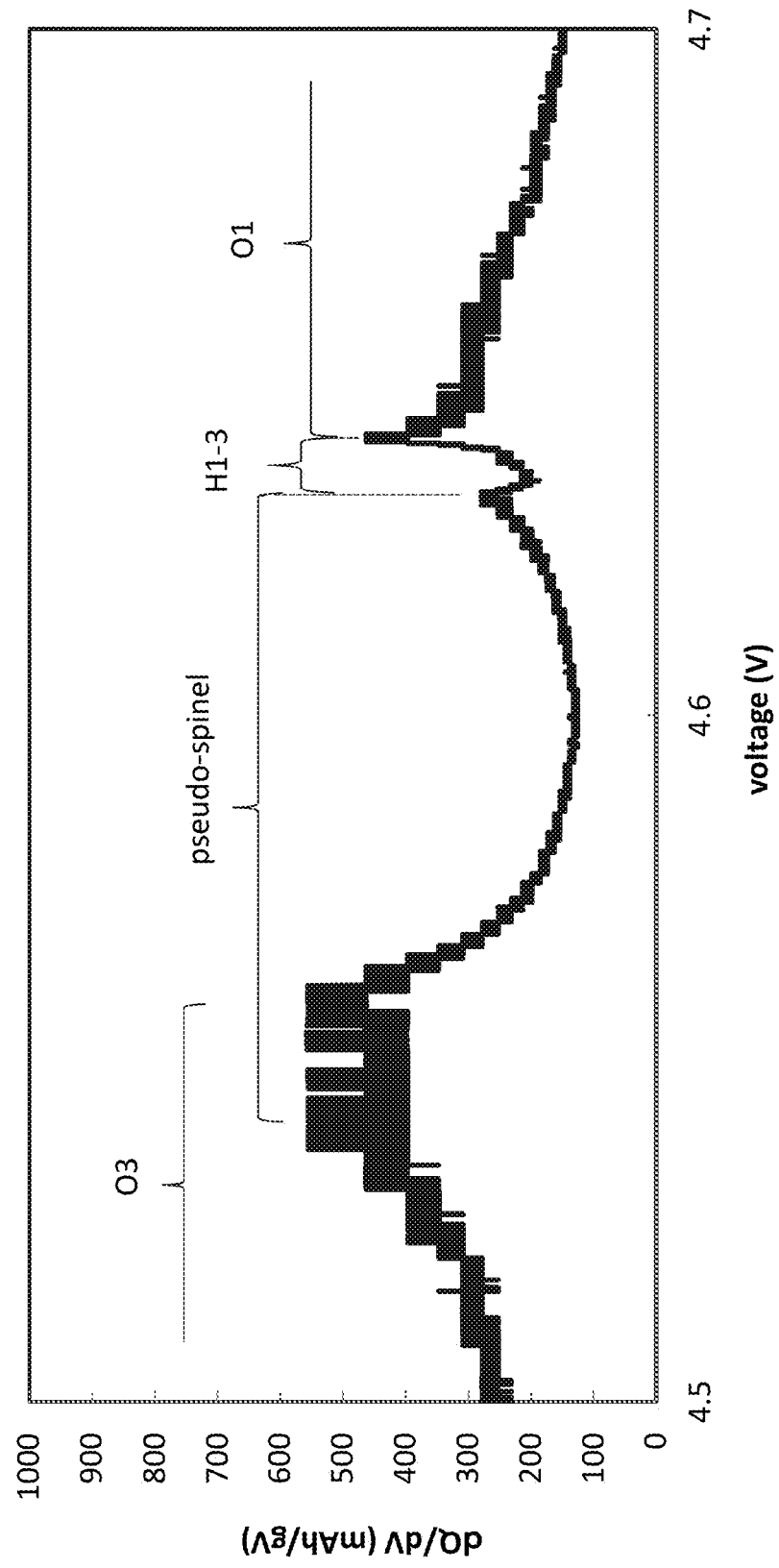

US 12,272,822 B2

METHOD FOR MANUFACTURING POSITIVE ELECTRODE ACTIVE MATERIAL, AND SECONDARY BATTERY

TECHNICAL FIELD

One embodiment of the present invention relates to an object, a method, or a manufacturing method. The present invention relates to a process, a machine, manufacture, or a composition of matter. One embodiment of the present invention relates to a semiconductor device, a display device, a light-emitting device, a power storage device, a lighting device, an electronic device, or a manufacturing method thereof. In particular, one embodiment of the present invention relates to a positive electrode active material that can be used in a secondary battery, a secondary battery, and an electronic device including a secondary battery.

Note that a power storage device in this specification refers to every element and/or device having a function of storing electric power. For example, a storage battery (also referred to as secondary battery) such as a lithium-ion secondary battery, a lithium-ion capacitor, and an electric double layer capacitor are included in the category of the power storage device.

Note that electronic devices in this specification mean all devices including power storage devices, and electro-optical devices including power storage devices, information terminal devices including power storage devices, and the like are all electronic devices.

BACKGROUND ART

In recent years, a variety of power storage devices such as lithium-ion secondary batteries, lithium-ion capacitors, and air batteries have been actively developed. In particular, demand for lithium-ion secondary batteries with high output and high energy density has rapidly grown with the development of the semiconductor industry, for portable information terminals such as mobile phones, smartphones, tablets, and laptop computers; portable music players; digital cameras; medical equipment; next-generation clean energy vehicles such as hybrid electric vehicles (HEV), electric vehicles (EV), and plug-in hybrid electric vehicles (PHEV); and the like. The lithium-ion secondary batteries are essential as rechargeable energy supply sources for today's information society.

The performance required for lithium-ion secondary batteries includes increased energy density, improved cycle characteristics, safe operation under a variety of environments, and longer-term reliability, for example.

Thus, improvement of a positive electrode active material has been studied to increase the cycle characteristics and the capacity of lithium-ion secondary batteries (Patent Document 1 and Patent Document 2). A crystal structure of a positive electrode active material also has been studied (Non-Patent Documents 1 to 3).

X-ray diffraction (XRD) is one of methods used for analysis of a crystal structure of a positive electrode active material. With the use of inorganic crystal structure database (ICSD) described in Non-Patent Document 5, XRD data can be analyzed.

REFERENCES

Patent Documents

[Patent Document 1] Japanese Patent Application Laid-Open No. 2002-216760
[Patent Document 2] Japanese Patent Application Laid-Open No. 2006-261132

Non-Patent Document

[Non-Patent Document 1] Toyoki Okumura, et al., "Correlation of lithium ion distribution and X-ray absorption near-edge structure in O3- and O2-lithium cobalt oxides from first-principle calculation", *Journal of Materials Chemistry*, 22, 2012, pp. 17340-17348.

[Non-Patent Document 2] T. Motohashi, et al., "Electronic phase diagram of the layered cobalt oxide system $Li_xCoO_2$ ($0.0 \leq x \leq 1.0$)", *Physical Review B*, 80 (16); 165114.

[Non-Patent Document 3] Zhaohui Chen, et al., "Staging Phase Transitions in $Li_xCoO_2$", *Journal of The Electrochemical Society*, 149 (12), 2002, A1604-A1609.

[Non-Patent Document 4] W. E. Counts, et al., *Journal of the American Ceramic Society*, (1953), 36, [1] 12-17. FIG. 01471.

[Non-Patent Document 5] Belsky, A. et al., "New developments in the Inorganic Crystal Structure Database (ICSD): accessibility in support of materials research and design", Acta Cryst., (2002), B58, 364-369.

DISCLOSURE OF INVENTION

An object of one embodiment of the present invention is to provide a positive electrode active material that has higher capacity and excellent charge and discharge cycle characteristics for a lithium-ion secondary battery, and a manufacturing method thereof. Another object of one embodiment of the present invention is to provide a manufacturing method of a positive electrode active material with high productivity. Another object of one embodiment of the present invention is to provide a positive electrode active material that suppresses a decrease in capacity caused by charge and discharge cycles when included in a lithium-ion secondary battery. Another object of one embodiment of the present invention is to provide a high-capacity secondary battery. Another object of one embodiment of the present invention is to provide a secondary battery with excellent charge and discharge characteristics. Another object of one embodiment of the present invention is to provide a positive electrode active material in which dissolution of a transition metal such as cobalt is inhibited even when a state being charged with high voltage is held for a long time. Another object of one embodiment of the present invention is to provide a highly safe or highly reliable secondary battery.

Another object of one embodiment of the present invention is to provide novel materials, novel active material particles, novel storage devices, or a manufacturing method thereof.

Note that the descriptions of these objects do not disturb the existence of other objects. In one embodiment of the present invention, there is no need to achieve all the objects. Other objects can be derived from the description of the specification, the drawings, and the claims.

In order to achieve the above objects, a positive electrode active material of one embodiment of the present invention has a small change in a crystal structure between the charged state and the discharged state. For example, the crystal structure and volume of the positive electrode active material, which has a layered rock-salt crystal structure in the discharged state and a pseudo-spinel crystal structure in the charged state at a high voltage of approximately 4.6 V, are less likely to be changed by charging and discharging as compared with those of a known positive electrode active material.

In order to form the positive electrode active material having the pseudo-spinel crystal structure in the charged state, it is preferable that a halogen source such as a fluorine source or a chlorine source and a magnesium source be mixed with particles of a composite oxide containing lithium, a transition metal, and oxygen, which is synthesized in advance, and then the mixture be heated at an appropriate temperature for an appropriate time.

Halogen and magnesium are impurities for the layered rock-salt crystal structure. Therefore, composite oxide particles with few impurities are synthesized first, so that particles having the layered rock-salt crystal structure with few defects can be obtained. Then, the halogen source such as the fluorine source or the chlorine source and the magnesium source are added to the material to be heated at an appropriate temperature for an appropriate time, so that the positive electrode active material with few defects and the pseudo-spinel crystal structure in the charged state can be formed.

One embodiment of the present invention is a method for forming a positive electrode active material, including the steps of: mixing a lithium source, a fluorine source, and a magnesium source to form a first mixture; mixing a composite oxide containing lithium, a transition metal, and oxygen with the first mixture to form a second mixture; and heating the second mixture.

In the composite oxide containing lithium, the transition metal, and oxygen, concentrations of elements other than lithium, the transition metal, or oxygen are preferably less than or equal to 5,000 ppm wt when analysis is performed by a glow discharge mass spectroscopy.

In the above, the first mixture preferably contains lithium fluoride (LiF) as the lithium source and the fluorine source.

In the above, the first mixture preferably contains magnesium fluoride ($MgF_2$) as the fluorine source and the magnesium source, and a molar ratio of the lithium fluoride (LiF) to the magnesium fluoride ($MgF_2$) is preferably x:1 ($0.1 \leq x \leq 0.5$).

In the above, an atomic ratio of the transition metal TM in the composite oxide containing lithium, the transition metal, and oxygen in the second mixture to magnesium $Mg_{Mix1}$ in the first mixture Mix1 is preferably 1:y ($0.001 \leq y \leq 0.01$).

In the above, the heating temperature in the heating step of the second mixture is preferably higher than or equal to 600° C. and lower than or equal to 950° C.

In the above, the heating time in the heating step of the second mixture is preferably longer than or equal to 2 hours, further preferably longer than or equal to 60 hours.

Another embodiment of the present invention is a secondary battery including a positive electrode including the positive electrode active material formed by the above method and a negative electrode.

According to one embodiment of the present invention, a positive electrode active material that has higher capacity and excellent charge and discharge cycle characteristics for a lithium-ion secondary battery, and a manufacturing method thereof can be provided. According to another embodiment of the present invention, a manufacturing method of a positive electrode active material with high productivity can be provided. According to another embodiment of the present invention, a positive electrode active material that suppresses a decrease in capacity caused by charge and discharge cycles when included in a lithium-ion secondary battery can be provided. According to another embodiment of the present invention, a high-capacity secondary battery can be provided. According to another embodiment of the present invention, a secondary battery with excellent charge and discharge characteristics can be provided. According to another object of one embodiment of the present invention, a positive electrode active material in which dissolution of a transition metal such as cobalt is inhibited even when a state being charged with high voltage is held for a long time. According to another embodiment of the present invention, a highly safe or highly reliable secondary battery can be provided. A novel material, novel active material particles, a novel storage device, or a manufacturing method thereof can be provided.

BRIEF DESCRIPTION OF DRAWINGS

FIG. 5 shows XRD patterns calculated from crystal structures;

FIGS. 15A-1, 15A-2, 15B-1, and 15B-2 each illustrate an example of a secondary battery;

FIGS. 23A, 23B1, 23B2, 23C, and 23D illustrate a bendable secondary battery;

FIG. 29 is a graph showing particle size distribution of LiF, $MgF_2$, and the first mixture in Example 1;

FIG. 30A is a graph showing XPS analysis results of positive electrode active materials in Example 1, and FIGS. 30B1 and 30B2 illustrate a particle;

FIGS. 32A1, 32A2, 32B1, 32B2, 32C1, 32C2, 32D1, and 32D2 are each a STEM image of a positive electrode active material in Example 1;

FIG. 47 is a graph showing dQ/dVvsV of Sample 1 in Example 1;

BEST MODE FOR CARRYING OUT THE INVENTION

Figure 1:
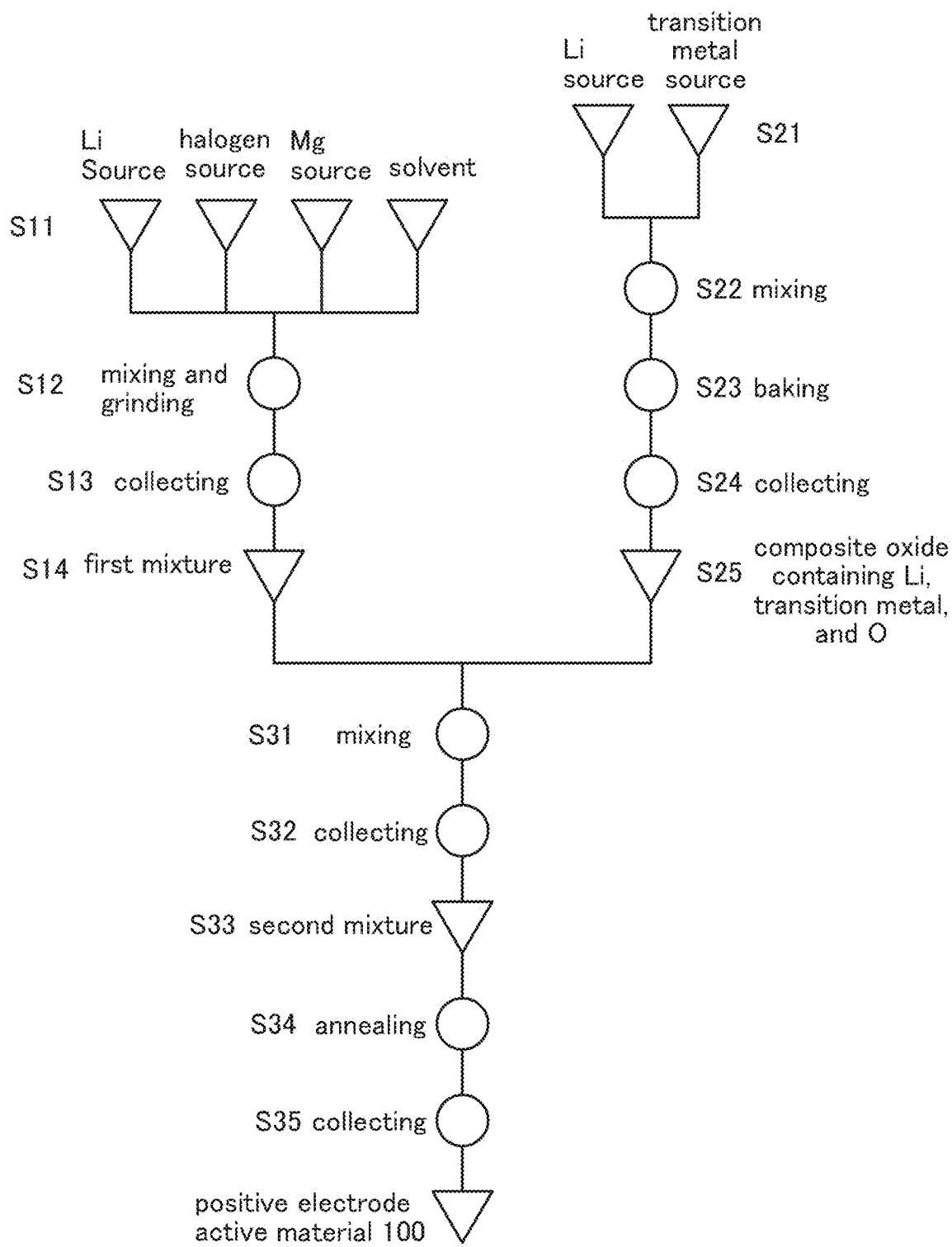
FIG. 1 shows an example of a forming method of a positive electrode active material of one embodiment of the present invention.

Hereinafter, embodiments of the present invention will be described in detail with reference to the drawings. Note that the present invention is not limited to the description below, and it is easily understood by those skilled in the art that modes and details of the present invention can be modified in various ways. In addition, the present invention should not be construed as being limited to the description in the following embodiments.

In this specification and the like, crystal planes and orientations are indicated by the Miller index. In the crystallography, a bar is placed over a number in the expression of crystal planes and orientations; however, in this specification and the like, crystal planes and orientations are in some cases expressed by placing a minus sign (−) at the front of a number instead of placing the bar over a number because of patent expression limitations. Furthermore, an individual direction which shows an orientation in crystal is denoted by "[ ]", a set direction which shows all of the equivalent orientations is denoted by "< >", an individual plane which shows a crystal plane is denoted by "( )", and a set plane having equivalent symmetry is denoted by "{ }".

In this specification and the like, segregation refers to a phenomenon in which in a solid made of a plurality of elements (e.g., A, B, and C), a certain element (e.g., B) is spatially non-uniformly distributed.

In this specification and the like, a surface portion of a particle of an active material or the like refers to a region from the surface to a depth of approximately 10 nm. A plane generated by a crack may also be referred to as the surface. A region whose position is deeper than that of the surface portion is referred to as an inner portion.

In this specification and the like, a layered rock-salt crystal structure of a composite oxide containing lithium and a transition metal refers to a crystal structure in which a rock-salt ion arrangement where cations and anions are alternately arranged is included and lithium and the transition metal are regularly arranged to form a two-dimensional plane, so that lithium can be two-dimensionally diffused. Note that a defect such as a cation or anion vacancy may exist. In the layered rock-salt crystal structure, strictly, a lattice of a rock-salt crystal is distorted in some cases.

In this specification and the like, a rock-salt crystal structure refers to a structure in which cations and anions are alternately arranged. Note that a cation or anion vacancy may exist.

In this specification and the like, a pseudo-spinel crystal structure of a composite oxide containing lithium and a transition metal refers to a space group R-3m, which is not a spinel crystal structure but a crystal structure in which oxygen atoms are hexacoordinated to ions such as cobalt and magnesium, and the cation arrangement has symmetry similar to that of the spinel crystal structure. Note that in the pseudo-spinel crystal structure, oxygen atoms are tetracoordinated to a light element such as lithium in some cases. In that case, the ion arrangement also has symmetry like that of the spinel crystal structure.

The pseudo-spinel crystal structure can be regarded as a crystal structure that contains Li between layers randomly and is similar to $CdCl_2$ crystal structure. The crystal structure similar to the $CdCl_2$ crystal structure is close to a crystal structure of lithium nickel oxide ($Li_{0.06}NiO_2$) that is charged until charge depth reaches 0.94; however, pure lithium cobalt oxide or a layered rock-salt positive electrode active material containing a large amount of cobalt is known not to have such a crystal structure generally.

Anions of a layered rock-salt crystal and anions of a rock-salt crystal each form a cubic close-packed structure (face-centered cubic lattice structure). Anions of a pseudo-spinel crystal are also presumed to form a cubic closest packed structure. When a pseudo-spinel crystal is in contact with a layered rock-salt crystal and a rock-salt crystal, there is a crystal plane at which orientations of cubic closest packed structures formed of anions are aligned with each other. A space group of each of the layered rock-salt crystal and the pseudo-spinel crystal is R-3m, which is different from a space group Fm-3m of a general rock-salt crystal and a space group Fd-3m of a rock-salt crystal having the simplest symmetry; thus, the Miller index of the crystal plane satisfying the above conditions in the layered rock-salt crystal and the pseudo-spinel crystal is different from that in the rock-salt crystal. In this specification, a state where the orientations of the cubic closest packed structures formed of anions in the layered rock-salt crystal, the pseudo-spinel crystal, and the rock-salt crystal are aligned with each other is referred to as a state where crystal orientations are substantially aligned with each other in some cases.

Whether the crystal orientations in two regions are substantially aligned with each other or not can be judged from a transmission electron microscope (TEM) image, a scanning transmission electron microscope (STEM) image, a high-angle annular dark field scanning transmission electron microscope (HAADF-STEM) image, an annular bright-field scanning transmission electron microscope (ABF-STEM) image, and the like. X-ray diffraction (XRD), electron diffraction, neutron diffraction, and the like can also be used for judging. In the TEM image and the like, alignment of cations and anions can be observed as repetition of bright lines and dark lines. When the orientations of cubic closest packed structures of the layered rock-salt crystal and the rock-salt crystal are aligned with each other, a state where an angle between the repetition of bright lines and dark lines in the layered rock-salt crystal and the repetition of bright lines and dark lines in the rock-salt crystal is less than or equal to 5°, preferably less than or equal to 2.5° is observed. Note that, in the TEM image and the like, a light element such as oxygen or fluorine is not clearly observed in some cases; however, in such a case, alignment of orientations can be judged by arrangement of metal elements.

In this specification and the like, a theoretical capacity of a positive electrode active material refers to the amount of electricity obtained when all lithium that can be inserted into and extracted from the positive electrode active material is extracted. For example, the theoretical capacity of $LiCoO_2$ is 274 mAh/g, the theoretical capacity of $LiNiO_2$ is 274 mAh/g, and the theoretical capacity of $LiMn_2O_4$ is 148 mAh/g.

In this specification and the like, charge depth obtained when all lithium that can be inserted into and extracted from a positive electrode active material is inserted is 0, and charge depth obtained when all lithium that can be inserted into and extracted from a positive electrode active material is extracted is 1.

In this specification and the like, charging refers to transfer of lithium ions from a positive electrode to a negative electrode in a battery and transfer of electrons from the negative electrode to the positive electrode in an external circuit. Charging of a positive electrode active material refers to extraction of lithium ions. A positive electrode active material with a charge depth of greater than or equal to 0.74 and less than or equal to 0.9, specifically greater than or equal to 0.8 and less than or equal to 0.83 is referred to as a high-voltage charged positive electrode active material. Thus, for example, $LiCoO_2$ charged to greater than or equal to 219.2 mAh/g is a high-voltage charged positive electrode active material. In addition, $LiCoO_2$ that is subjected to a constant current charging at 25° C. and higher than or equal to 4.525 V and lower than or equal to 4.65 V (in the case where lithium is used for a counter electrode), and then subjected to a constant voltage charging until the current value becomes 0.01 C or ⅕ to 1/100 of the current value at the time of the constant current charging is also referred to as a high-voltage charged positive electrode active material.

Similarly, discharging refers to transfer of lithium ions from a negative electrode to a positive electrode in a battery and transfer of electrons from the positive electrode to the negative electrode in an external circuit. Discharging of a positive electrode active material refers to insertion of lithium ions. A positive electrode active material with a charge depth of less than or equal to 0.06 or a positive electrode active material from which more than or equal to 90% or of the charge capacity is discharged from a state where the positive electrode active material is charged with high voltage is referred to as a sufficiently discharged positive electrode active material. For example, $LiCoO_2$ with a charge capacity of 219.2 mAh/g is a high-voltage charged positive electrode active material, and a positive electrode active material from which more than or equal to 197.3 mAh/g, which is 90% of the charge capacity, is discharged is a sufficiently discharged positive electrode active material. In addition, $LiCoO_2$ that is subjected to a constant current discharging at 25° C. until the battery voltage becomes lower than or equal to 3 V (in the case where lithium is used for a counter electrode) is also referred to as a sufficiently discharged positive electrode active material.

In this specification and the like, an unbalanced phase change refers to a phenomenon that causes a nonlinear change in physical quantity. For example, an unbalanced phase change might occur around peaks in a dQ/dV curve obtained by differentiating capacitance (Q) with voltage (V) (dQ/dV), which probably largely changes the crystal structure.

Embodiment 1

[Forming Method of Positive Electrode Active Material]

First, an example of forming method of a positive electrode active material 100, which is one embodiment of the present invention, is described with reference to FIG. 1. FIG. 2 shows another specific example of the forming method.
<Step S11>

Figure 2:
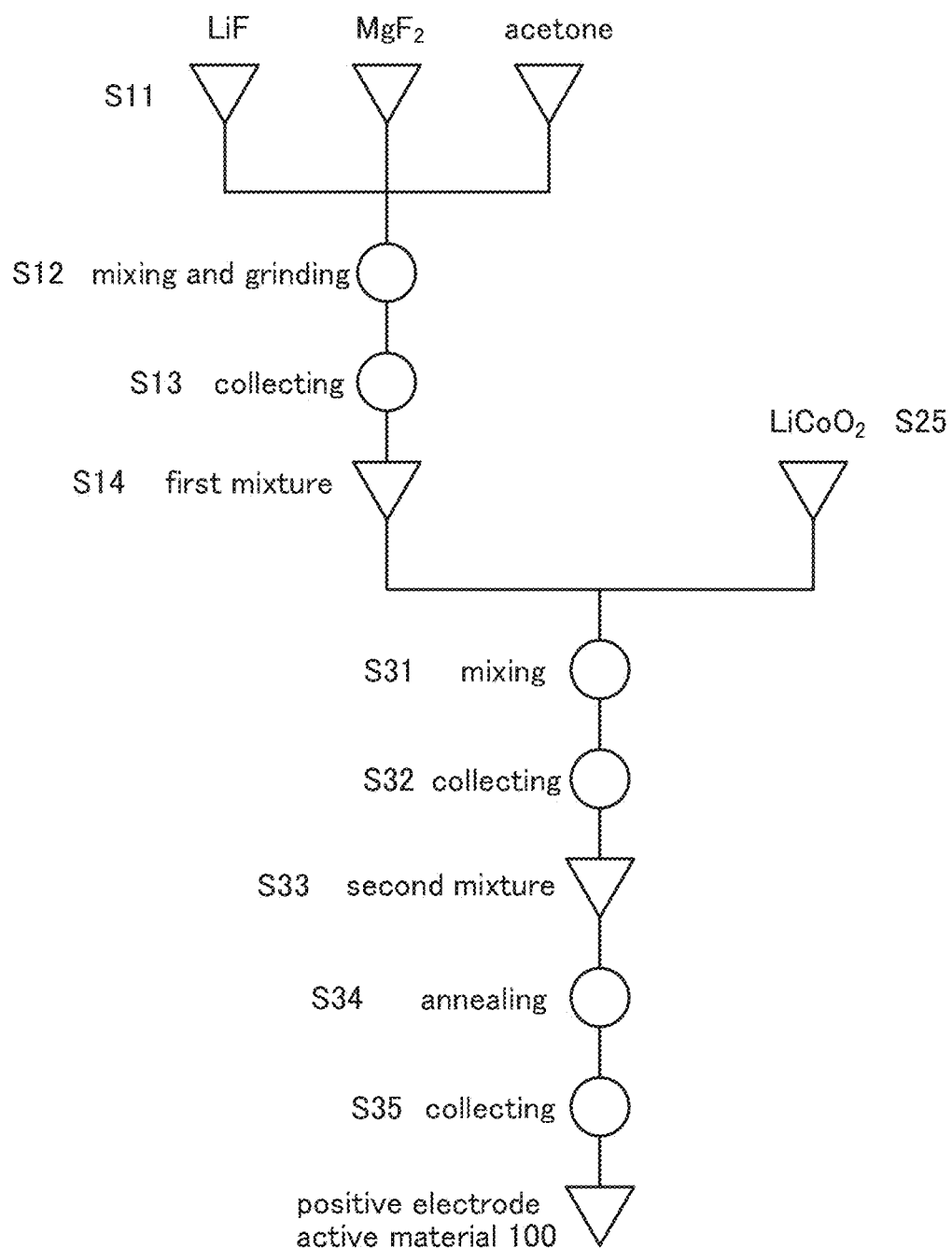
FIG. 2 shows another example of a forming method of a positive electrode active material of one embodiment of the present invention.

As shown in Step S11 in FIG. 1, a halogen source such as a fluorine source or a chlorine source and a magnesium source are prepared as materials of the first mixture. In addition, a lithium source is preferably prepared.

As the fluorine source, for example, lithium fluoride, magnesium fluoride, or the like can be used. Among them, lithium fluoride having a relatively low melting point of 848° C. is preferably used because it is easily melted in the annealing process described later. As the chlorine source, for example, lithium salt, magnesium salt, or the like can be used. As the magnesium source, for example, magnesium fluoride, magnesium oxide, magnesium hydroxide, magnesium carbonate, or the like can be used. As the lithium source, for example, lithium fluoride, lithium carbonate, or the like can be used. That is, lithium fluoride can be used as both the lithium source and the fluorine source. In addition, magnesium fluoride can be used as both the fluorine source and the magnesium source.

In this embodiment, lithium fluoride (LiF) is prepared as the fluorine source and the lithium source, and magnesium fluoride ($MgF_2$) is prepared as the fluorine source and the magnesium source (Step S11 in FIG. 2). When lithium fluoride (LiF) and magnesium fluoride ($MgF_2$) are mixed at a molar ratio of approximately 65:35, the effect of reducing the melting point becomes the highest (Non-Patent Document 4). When the proportion of lithium fluoride increases, cycle characteristics might deteriorate because of a too large amount of lithium fluoride. Therefore, the molar ratio of lithium fluoride (LiF) to magnesium fluoride ($MgF_2$) is preferably x:1 ($0 \leq x \leq 1.9$), further preferably =x:1 ($0.1 \leq x \leq 0.5$), still further preferably x:1 (x=0.33 or the vicinity thereof). Note that in this specification and the like, "vicinity" means a value greater than 0.9 times and smaller than 1.1 times a certain value.

In the case where the following mixing and grinding steps are performed by a wet method, a solvent is prepared. As the solvent, ketone such as acetone, alcohol such as ethanol or isopropanol, ether, dioxane, acetonitrile, N-methyl-2-pyrrolidone (NMP), or the like can be used. An aprotic solvent that hardly reacts with lithium is preferably used. In this embodiment, acetone is used (Step S11 in FIG. 2).

<Step S12>

Next, the materials of the first mixture are mixed and ground (Step S12 in FIG. 1 and FIG. 2). Although the mixing can be performed by either a dry method or a wet method, a wet method is preferable because the materials can be ground to the smaller size. For example, a ball mill, a bead mill, or the like can be used for the mixing. When the ball mill is used, a zirconia ball is preferably used as media, for example. The mixing and grinding steps are preferably performed sufficiently to pulverize the first mixture.

<Step S13, Step S14>

The materials mixed and ground in the above manner are collected (Step S13 in FIG. 1 and FIG. 2), whereby the first mixture is obtained (Step S14 in FIG. 1 and FIG. 2).

The first mixture preferably has an average particle diameter (D50, also referred to as median diameter) of greater than or equal to 600 nm and less than or equal to 20 µm, further preferably greater than or equal to 1 µm and less than or equal to 10 µm. When mixed with a composite oxide containing lithium, a transition metal, and oxygen in the later step, the first mixture pulverized to such a small size is easily attached to the surfaces of the composite oxide particles uniformly. The first mixture is preferably attached to the surfaces of the composite oxide particles uniformly because halogen and magnesium are easily distributed to the surface portion of the composite oxide particles after heating. When there is a region not containing halogen or magnesium in the surface portion, the positive electrode active material might be less likely to have a pseudo-spinel crystal structure, which is described later, in the charged state.

<Step S21>

Next, as shown in Step S21 in FIG. 1, a lithium source and a transition metal source are prepared as the materials of a composite oxide containing lithium, a transition metal, and oxygen.

As the lithium source, for example, lithium carbonate, lithium fluoride, or the like can be used.

As the transition metal, at least one of cobalt, manganese, and nickel can be used. The composite oxide containing lithium, a transition metal, and oxygen preferably has a layered rock-salt crystal structure, and thus cobalt, manganese, and nickel are preferably mixed at the ratio at which the composite oxide can have the layered rock-salt crystal structure. In addition, aluminum may be added to the transition metal as long as the composite oxide can have the layered rock-salt crystal structure.

As the transition metal source, oxide of the transition metal, hydroxide of the transition metal, or the like can be used. As the cobalt source, for example, cobalt oxide, cobalt hydroxide, or the like can be used. As the manganese source, manganese oxide, manganese hydroxide, or the like can be used. As the nickel source, nickel oxide, nickel hydroxide, or the like can be used. As the aluminum source, aluminum oxide, aluminum hydroxide, or the like can be used.

<Step S22>

Next, the lithium source and the transition metal source are mixed (Step S22 in FIG. 1). The mixing can be performed by a dry method or a wet method. For example, a ball mill, a bead mill, or the like can be used for the mixing. When the ball mill is used, a zirconia ball is preferably used as media, for example.

<Step S23>

Next, the materials mixed in the above manner are heated. This step can be referred to as baking or first heating to distinguish this step from heating step performed later. The heating is preferably performed at higher than or equal to 800° C. and lower than 1100° C., further preferably at higher than or equal to 900° C. and lower than or equal to 1000° C., and still further preferably at approximately 950° C. Excessively low temperature might result in insufficient decomposition and melting of the starting materials. By contrast, excessively high temperature might cause excessive reduction of the transition metal, evaporation of lithium, and the like, leading to a defect in which cobalt has a valence of two, for example.

The heating time is preferably longer than or equal to 2 hours and shorter than or equal to 20 hours. Baking is preferably performed in an atmosphere with few moisture such as a dry air (e.g., a dew point is lower than or equal to −50° C., further preferably lower than or equal to −100° C.). For example, it is preferable that the heating be performed at 1000° C. for 10 hours, the temperature rising rate be 200° C./h, and the flow rate of a dry atmosphere be 10 L/min. After that, the heated materials can be cooled to room temperature. The temperature decreasing time from the specified temperature to room temperature is preferably longer than or equal to 10 hours and shorter than or equal to 50 hours, for example.

Note that the cooling is not necessarily performed to room temperature in Step S23. As long as Steps S24, S25, and S31 to S34 can be performed without any problems, the cooling may be performed to a temperature higher than room temperature.

<Step S24, Step S25>

The materials baked in the above manner are collected (Step S24 in FIG. 1), whereby the composite oxide containing lithium, the transition metal, and oxygen is obtained (Step S25 in FIG. 1). Specifically, lithium cobalt oxide, lithium manganese oxide, lithium nickel oxide, lithium cobalt oxide in which manganese is substituted for part of cobalt, or lithium nickel-manganese-cobalt oxide is obtained.

Alternatively, a composite oxide containing lithium, a transition metal, and oxygen that is synthesized in advance can be used in Step S25 (See FIG. 2). In that case, Steps S21 to S24 can be omitted.

In the case where the composite oxide containing lithium, a transition metal, and oxygen that is synthesized in advance is used, the composite oxide with few impurities is preferably used. In this specification and the like, lithium, cobalt, nickel, manganese, aluminum, and oxygen are used as the main components of the composite oxide containing lithium, the transition metal, and oxygen and the positive electrode active material, and elements other than the above main components are regarded as impurities. For example, when a glow discharge mass spectroscopy is performed, the total impurity concentration is preferably less than or equal to 10,000 ppm wt, further preferably less than or equal to 5,000 ppm wt. In particular, the total impurity concentration of transition metals such as titanium and arsenic is preferably less than or equal to 3,000 ppm wt, further preferably 1,500 ppm wt.

For example, as lithium cobalt oxide synthesized in advance, a lithium cobalt oxide particle (CELL SEED C-10N) manufactured by NIPPON CHEMICAL INDUSTRIAL CO., LTD. can be used. This is lithium cobalt oxide in which the average particle diameter (D50) is approximately 12 μm, and in the impurity analysis by a glow discharge mass spectroscopy (GD-MS), the concentrations of magnesium and fluorine are less than or equal to 50 ppm wt, the concentrations of calcium, aluminum, and silicon are less than or equal to 100 ppm wt, the concentration of nickel is less than or equal to 150 ppm wt, the concentration of sulfur is less than or equal to 500 ppm wt, the concentration of arsenic is less than or equal to 1,100 ppm wt, and the concentrations of elements other than lithium, cobalt, or oxygen are less than or equal to 150 ppm wt.

Alternatively, a lithium cobalt oxide particle (CELLSEED C-5H) manufactured by NIPPON CHEMICAL INDUSTRIAL CO., LTD. can be used. This is lithium cobalt oxide in which the average particle diameter (D50) is approximately 6.5 μm, and the concentrations of elements other than lithium, cobalt, or oxygen are approximately equal to or less than those of C-10N in the impurity analysis by GD-MS.

In this embodiment, cobalt is used as the transition metal, and the lithium cobalt oxide particle (CELLSEED C-10N manufactured by NIPPON CHEMICAL INDUSTRIAL CO., LTD.) is used (See FIG. 2).

The composite oxide containing lithium, the transition metal, and oxygen used in Step S25 preferably has a layered rock-salt crystal structure with few defects and distortions. Therefore, the composite oxide preferably includes few impurities. In the case where the composite oxide containing lithium, the transition metal, and oxygen includes a lot of impurities, the crystal structure is highly likely to have a lot of defects and distortions.

<Step S31>

Next, the first mixture and the composite oxide containing lithium, the transition metal, and oxygen are mixed (Step S31 in FIG. 1 and FIG. 2). The atomic ratio of the transition metal TM contained in the composite oxide containing lithium, the transition metal, and oxygen to magnesium $Mg_{Mix1}$ contained in the first mixture Mix1 is preferably 1:y ($0.0005 \leq y \leq 0.03$), further preferably 1:y ($0.001 \leq y \leq 0.01$), and still further preferably approximately 1:0.005.

The mixing in Step S31 is preferably performed under a milder condition than the mixing in Step S12 not to damage the particles of the composite oxide. For example, a condition with lower spinning rate or shorter time than the mixing in Step S12 is preferable. It can be said that a dry method has a calmer condition than a wet method. For example, a ball mill, a bead mill, or the like can be used for the mixing. When the ball mill is used, a zirconia ball is preferably used as media, for example.

<Step S32, Step S33>

The materials mixed in the above manner are collected (Step S32 in FIGS. 1 and 2), whereby the second mixture is obtained (Step S33 in FIGS. 1 and 2).

This embodiment describes a method of adding the mixture of lithium fluoride and magnesium fluoride to lithium cobalt oxide with few impurities; however, one embodiment of the present invention is not limited thereto. A mixture obtained through baking after addition of a magnesium source and a fluorine source to the starting material of lithium cobalt oxide can be used instead of the second mixture in Step S33. In that case, there is no need to separate Steps S11 to S14 and Steps S21 to S25, which enables simple and productive process.

Alternatively, lithium cobalt oxide to which magnesium and fluorine are added in advance may be used. When the lithium cobalt oxide to which magnesium and fluorine are added is used, the process can be simplified because the steps before Step S32 can be omitted.

In addition, a magnesium source and a fluorine source may be further added to the lithium cobalt oxide to which magnesium and fluorine are added in advance.

<Step S34>

Next, the second mixture is heated. This step can be referred to as annealing or second heating to distinguish this step from the heating step performed before.

The annealing is preferably performed at an appropriate temperature for an appropriate time. The appropriate temperature and time depend on the conditions such as particle size and composition of the composite oxide containing lithium, the transition metal, and oxygen obtained in Step S25. In the case where the particle size is small, the annealing is preferably performed at a lower temperature or for a shorter time than the case where the particle size is large, in some cases.

When the average particle diameter (D50) of the particles in Step S25 is approximately 12 μm, the annealing is preferably performed at higher than or equal to 600° C. and lower than or equal to 950° C., for example. The annealing is preferably performed for longer than or equal to 3 hours, further preferably longer than or equal to 10 hours, and still further preferably longer than or equal to 60 hours, for example.

On the other hand, when the average particle diameter (D50) of the particles in Step S25 is approximately 5 μm, the annealing is preferably performed at higher than or equal to 600° C. and lower than or equal to 950° C., for example. The annealing is preferably performed for longer than or equal to 1 hour and shorter than or equal to 10 hours, further preferably approximately 2 hours, for example.

The temperature decreasing time after the annealing is, for example, preferably longer than or equal to 10 hours and shorter than or equal to 50 hours.

It is considered that when the second mixture is annealed, a material having a low melting point (e.g., lithium fluoride having a melting point of 848° C.) in the first mixture is melted first and distributed to the surface portion of the composite oxide particle. Next, the melted material decreases the melting points of other materials, presumably resulting in melting of other materials. For example, magnesium fluoride (melting point: 1263° C.) is melted and distributed to the surface portion of the composite oxide particle.

Then, the elements included in the first mixture distributed to the surface portion probably form a solid solution in the composite oxide containing lithium, the transition metal, and oxygen.

The elements included in the first mixture diffuse faster in the surface portion and the vicinity of the grain boundary than inside the composite oxide particles. Therefore, the concentrations of magnesium and halogen in the surface portion and the vicinity of the grain boundary are higher than those of magnesium and halogen inside the composite oxide particle. As described later, the higher the magnesium concentration in the surface portion and the vicinity of the grain boundary is, the more effectively the change in the crystal structure can be reduced.

<Step S35>

The materials annealed in the above manner are collected, whereby the positive electrode active material 100 of one embodiment of the present invention is obtained.

In the manner shown in FIG. 1 and FIG. 2, the positive electrode active material having the pseudo-spinel crystal structure with few defects after high-voltage charging can be obtained. A positive electrode active material in which the pseudo-spinel crystal structure accounts for more than or equal to 50% when analyzed by Rietveld analysis has excellent cycle characteristics and rate characteristics.

The positive electrode active material having the pseudo-spinel crystal structure after high-voltage charging is effectively formed when the positive electrode active material includes magnesium and fluorine and is formed through annealing at an appropriate temperature for an appropriate time. A magnesium source and a fluorine source may be added to the starting material of the composite oxide. However, when the melting points of the magnesium source and the fluorine source are higher than the baking temperature, the magnesium source and the fluorine source added to the starting material of the composite oxide might not be melted, resulting in insufficient diffusion. In that case, there is a high possibility that the layered rock-salt crystal structure has a lot of defects or distortions. As a result, the pseudo-spinel crystal structure after high-voltage charging also might have defects or distortions.

Thus, it is preferable that a composite oxide having a layered rock-salt crystal structure with few impurities, defects, and distortions be obtained first. Then, the composite oxide, a magnesium source, and a fluorine source are preferably mixed and annealed in the later step to form a solid solution of magnesium and fluorine in the surface portion of the composite oxide. In this matter, the positive electrode active material having the pseudo-spinel crystal structure with few defects and distortions after high-voltage charging can be formed.

The positive electrode active material 100 formed through the above steps may be covered with another material. In addition, further heating may be performed.

For example, the positive electrode active material 100 and a compound containing phosphoric acid can be mixed and heated after the mixing. When the compound containing phosphoric acid is mixed, dissolution of a transition metal such as cobalt in the positive electrode active material 100 can be inhibited even when a state being charged with high voltage is held for a long time. Heating after the mixing enables more uniform coverage with phosphoric acid.

As the compound containing phosphoric acid, for example, lithium phosphate, ammonium dihydrogenphosphate can be used. The mixing can be performed by a solid phase method, for example. The heating can be performed at higher than or equal to 800° C. for 2 hours, for example.

[Structure of Positive Electrode Active Material]

Figure 3:
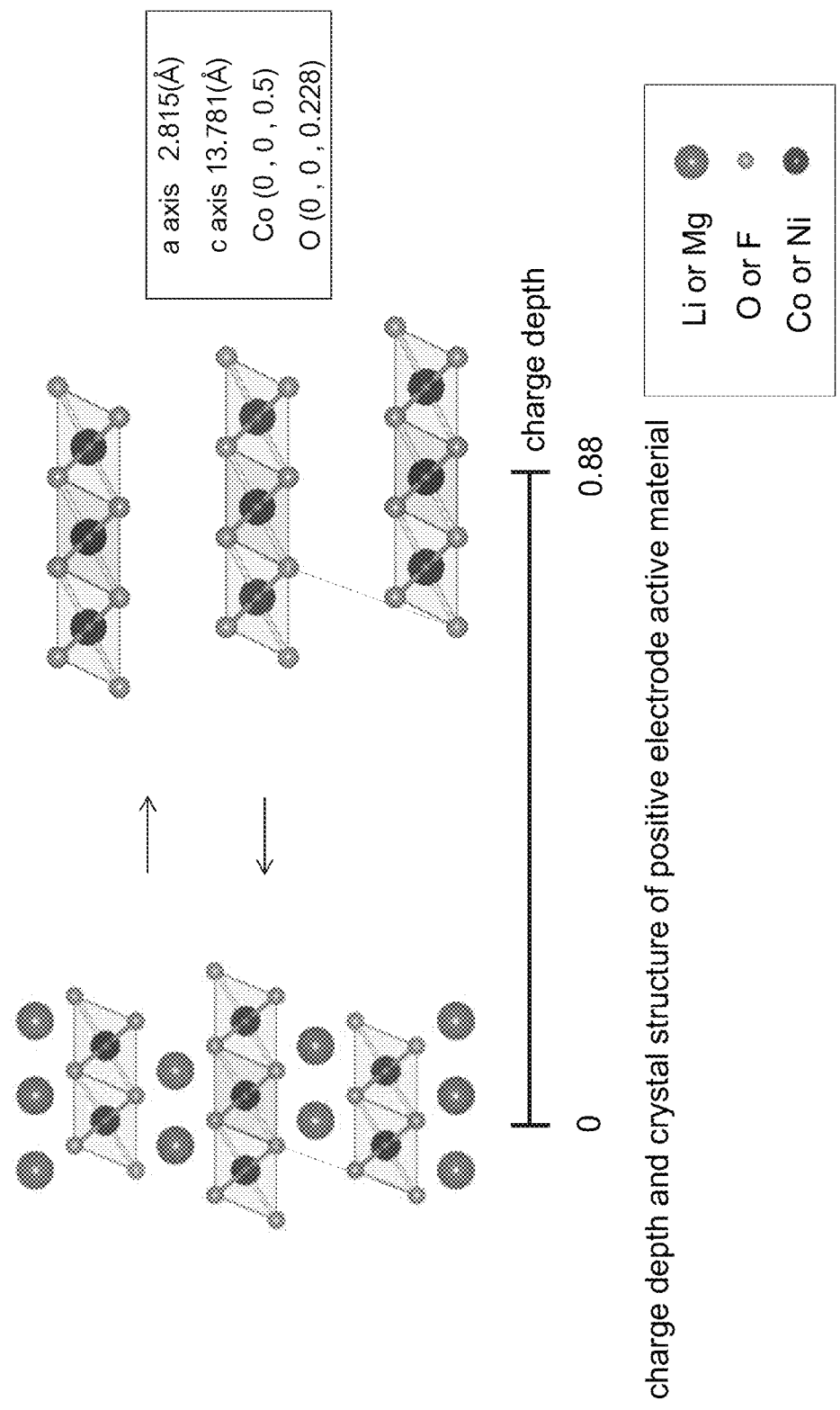
FIG. 3 illustrates charge depth and crystal structure of a positive electrode active material of one embodiment of the present invention.
Figure 4:
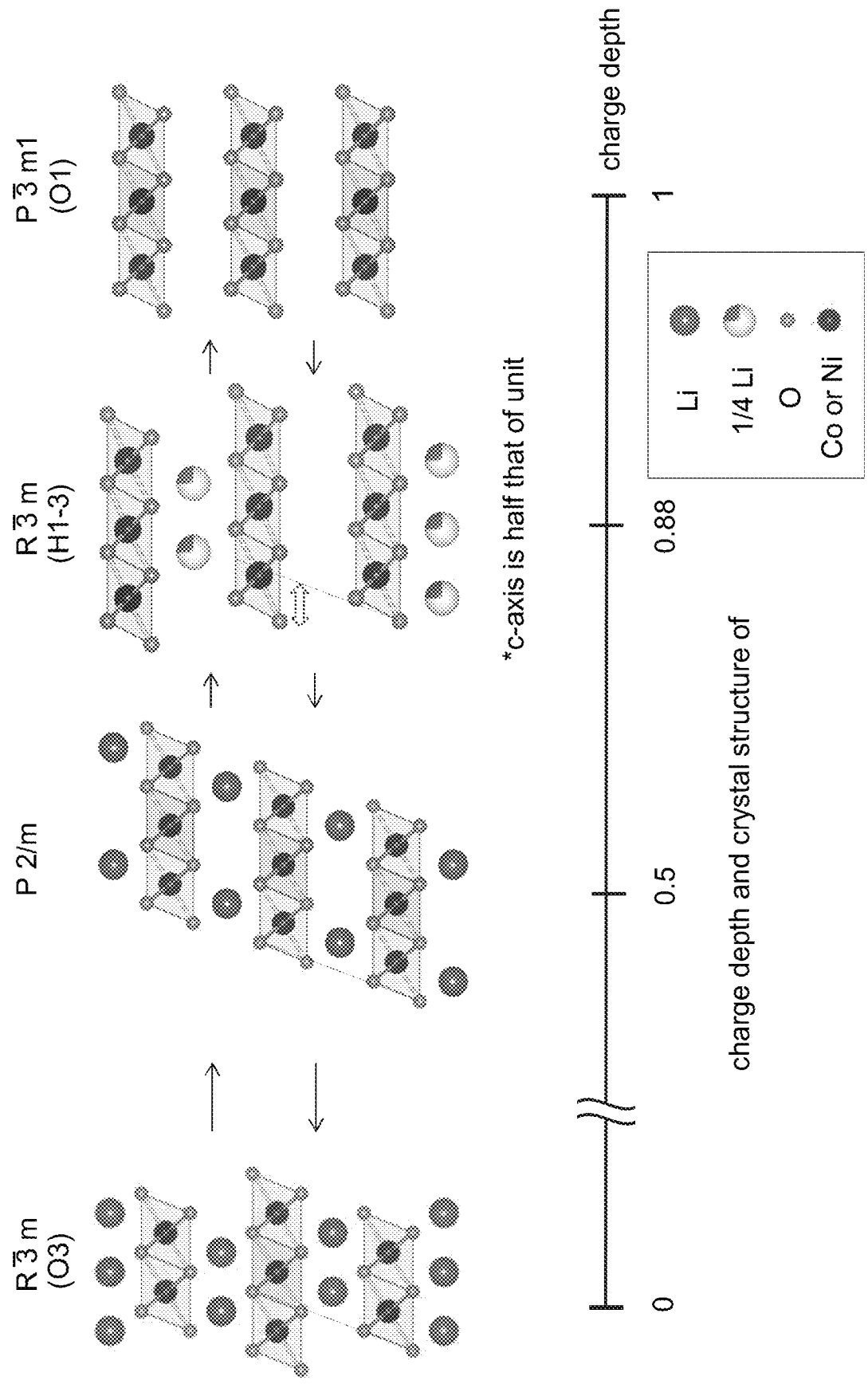
FIG. 4 illustrates charge depth and crystal structures of a conventional positive electrode active material.

Next, the positive electrode active material 100 of one embodiment of the present invention that can be formed in the above manner and a conventional positive electrode active material are explained with reference to FIG. 3 and FIG. 4, and then, a difference between the materials is described. In FIG. 3 and FIG. 4, the case where cobalt is used as a transition metal contained in the positive electrode active material is described. Note that the conventional positive electrode active material described in FIG. 4 is simple lithium cobalt oxide ($LiCoO_2$) in which an element other than lithium, cobalt, or oxygen is neither added to an inner portion nor applied to a surface portion.

<Conventional Positive Electrode Active Material>

As described in Non-Patent Documents 1 and 2, and the like, the crystal structure of lithium cobalt oxide $LiCoO_2$, which is one of the conventional positive electrode active materials, changes with the charge depth. FIG. 4 illustrates typical crystal structures of lithium cobalt oxide.

As illustrated in FIG. 4, lithium cobalt oxide with a charge depth of 0 (in the discharged state) includes a region having the crystal structure of the space group R-3m, and includes three $CoO_2$ layers in a unit cell. Thus, this crystal structure is referred to as an O3-type structure in some cases. Note that the $CoO_2$ layer has a structure in which octahedral geometry with oxygen atoms hexacoordinated to cobalt continues on a plane in the edge-sharing state.

Furthermore, $LiCoO_2$ with a charge depth of 1 has the crystal structure of the space group P-3m1 and includes one $CoO_2$ layer in a unit cell. Thus, this crystal structure is referred to as an O1-type structure in some cases.

Moreover, lithium cobalt oxide with a charge depth of approximately 0.88 has the crystal structure of the space group R-3m. This structure can also be regarded as a structure in which $CoO_2$ structures such as P-3m1(O1) and $LiCoO_2$ structures such as R-3m(O3) are alternately stacked. Thus, this crystal structure is referred to as an H1-3 type structure in some cases. Note that the number of cobalt atoms per unit cell in the actual H1-3 type structure is twice that of cobalt atoms per unit cell in other structures. However, in this specification including FIG. 4, the c-axis of the H1-3 type structure is half that of the unit cell for easy comparison with the other structures.

When high-voltage charging with a charge depth of approximately 0.88 or more and discharging are repeated, the crystal structure of lithium cobalt oxide repeatedly changes between the H1-3 type structure and the R-3m(O3) structure in the discharged state (i.e., an unbalanced phase change).

However, there is a large difference in the positions of the $CoO_2$ layers between these two crystal structures. As indicated by the dotted line and the arrow in FIG. 4, the $CoO_2$ layer in the H1-3 type structure largely shifts from that in the R-3m(O3) structure. Such a large structural change might adversely affect stability of the crystal structure.

A difference in volume is also large. The H1-3 type structure and the O3-type structure in the discharged state that contain the same number of cobalt atoms have a difference in volume of 3.5% or more.

In addition, a structure in which $CoO_2$ layers are arranged continuously, such as P-3m1(O1), included in the H1-3 type structure is highly likely to be unstable.

Thus, the repeated high-voltage charging and discharging gradually break the crystal structure of lithium cobalt oxide. The broken crystal structure deteriorates the cycle characteristics. This is probably because the broken crystal structure reduces the number of sites where lithium can stably exist and makes it difficult to insert and extract lithium.

Positive Electrode Active Material of One Embodiment of the Present Invention

<<Inner Portion>>

By contrast, the positive electrode active material 100 of one embodiment of the present invention does not largely vary in crystal structure and volume in comparison with the same number of transition metal atoms between the sufficiently discharged state and the high-voltage charged state.

FIG. 3 illustrates the crystal structures of the positive electrode active material 100 before being charged and discharged and after being charged and discharged. The positive electrode active material 100 is a composite oxide containing lithium, cobalt, and oxygen. In addition to the above elements, the positive electrode active material 100 preferably contains magnesium and halogen such as fluorine or chlorine.

The crystal structure with a charge depth of 0 (in the discharged state) in FIG. 3 is R-3m(O3) as in FIG. 4. By contrast, the positive electrode active material 100 of one embodiment of the present invention, which is sufficiently charged and has a charge depth of approximately 0.88, has a crystal structure different from the crystal structures in FIG. 4. The crystal structure of the space group R-3m is referred to as pseudo-spinel crystal structure in this specification and the like. Although lithium is not illustrated in the pseudo-spinel crystal structure in FIG. 3 to show the symmetry of cobalt atoms and the symmetry of oxygen atoms, approximately 12 atomic % lithium with respect to cobalt practically exists between the $CoO_2$ layers. In both the O3-type structure and the pseudo-spinel crystal structure, a slight amount of magnesium preferably exists between the $CoO_2$ layers, i.e., in lithium sites. In addition, a slight amount of halogen such as fluorine preferably exists in oxygen sites at random.

In the positive electrode active material 100, a change in the crystal structure caused by extraction of a large amount of lithium during high-voltage charging is reduced as compared with conventional $LiCoO_2$. As indicated by the dotted lines in FIG. 3, for example, there is little difference in the positions of the $CoO_2$ layers between the crystal structures.

In the positive electrode active material 100, a difference in the volume per unit cell between the O3-type structure with a charge depth of 0 and the pseudo-spinel crystal structure with a charge depth of 0.88 is less than or equal to 2.5%, specifically, less than or equal to 2.2%.

Thus, the crystal structure is unlikely to be broken by repeated high-voltage charging and discharging.

Note that in the unit cell of the pseudo-spinel crystal structure, coordinates of cobalt and oxygen can be represented by (0, 0, 0.5) and (0, 0, x), respectively, within the range of $0.20 \leq x \leq 0.25$.

A slight amount of magnesium randomly existing between the $CoO_2$ layers, i.e., in lithium sites, can reduce a difference in the positions of the $CoO_2$ layers. Thus, magnesium between the $CoO_2$ layers makes it easier to obtain the pseudo-spinel crystal structure. Therefore, magnesium is preferably distributed over the particle of the positive electrode active material 100. To distribute magnesium over the particle, heat treatment is preferably performed in the manufacturing process of the positive electrode active material 100.

However, excessively high heat treatment temperature causes cation mixing, so that magnesium is highly likely to enter the cobalt sites. Magnesium in the cobalt sites loses the effect of maintaining the R-3m structure. Furthermore, when the heat treatment temperature is excessively high, cobalt might be reduced to have a valence of two or lithium might be evaporated, for example.

In view of the above, a halogen compound such as a fluorine compound is preferably added to lithium cobalt oxide before the heat treatment for distributing magnesium over the particle. The added halogen compound decreases a melting point of lithium cobalt oxide. The decreased melting point makes it easier to distribute magnesium over the particle at a temperature at which the cation mixing is unlikely to occur. Furthermore, the fluorine compound probably increases corrosion resistance to hydrofluoric acid generated by decomposition of an electrolyte solution.

Note that although the case where the positive electrode active material 100 is a composite oxide containing lithium, cobalt, and oxygen is described so far, nickel may be contained in addition to cobalt. In that case, the proportion Ni/(Co+Ni), the proportion of nickel atoms (Ni) to the sum of cobalt atoms and nickel atoms (Co+Ni), is preferably less than 0.1, further preferably less than or equal to 0.075.

When a state being charged with high voltage is held for a long time, the transition metal in the positive electrode active material dissolves in the electrolyte solution, and the crystal structure might be broken. However, when nickel is contained at the above proportion, dissolution of the transition metal from the positive electrode active material 100 can be inhibited in some cases.

The added nickel decreases charging and discharging voltage, and thus, charging and discharging can be performed at a lower voltage in the case of the same capacity. As a result, dissolution of the transition metal and decomposition of the electrolyte solution might be inhibited. Here, the charging and discharging voltage is, for example, a voltage within the range from the charge depth of 0 to the predetermined charge depth.

<<Surface Portion>>

Magnesium is preferably distributed over the particle of the positive electrode active material 100, and further preferably, the magnesium concentration in the surface portion of the particle is higher than the average magnesium concentration in the whole particle. In other words, the magnesium concentration in the surface portion of the particle measured by XPS or the like is preferably higher than the average magnesium concentration in the whole particle measured by ICP-MS or the like. The whole surface of the particle is a kind of crystal defects and lithium is extracted from the surface during charging; thus, the lithium concentration in the surface of the particle tends to be lower than that inside the particle. Therefore, the surface of the particle tends to be unstable and its crystal structure is likely to be broken. The higher the magnesium concentration in the surface portion is, the more effectively the change in the crystal structure can be reduced. In addition, a high magnesium concentration in the surface portion promises to increase the corrosion resistance to hydrofluoric acid generated by the decomposition of the electrolyte solution.

In addition, the concentration of halogen such as fluorine in the surface portion of the positive electrode active material 100 is preferably higher than the average concentration in the whole particle. When halogen exists in the surface portion in contact with the electrolyte solution, the corrosion resistance to hydrofluoric acid can be effectively increased.

As described above, the surface portion of the positive electrode active material 100 preferably has a composition different from that in the inner portion, i.e., the concentrations of magnesium and fluorine are higher than that in the inner portion. The composition preferably has a crystal structure stable at normal temperature. Thus, the surface portion may have a crystal structure different from that of the inner portion. For example, at least part of the surface portion of the positive electrode active material 100 may have a rock-salt crystal structure. Note that in the case where the surface portion and the inner portion have different crystal structures, the orientations of crystals in the surface portion and the inner portion are preferably substantially aligned with each other.

However, in the surface portion where only MgO is contained or MgO and CoO(II) form a solid solution, it is difficult to insert and extract lithium. Thus, the surface portion should contain at least cobalt, and also contain lithium in the discharged state to have the path through which lithium is inserted and extracted. The cobalt concentration is preferably higher than the magnesium concentration.

<<Grain Boundary>>

A slight amount of magnesium or halogen contained in the positive electrode active material 100 may randomly exist in the inner portion, but part of these elements is preferably segregated at the grain boundary.

In other words, the magnesium concentration in the crystal grain boundary and its vicinity of the positive electrode active material 100 is preferably higher than that in the other regions in the inner portion. The halogen concentration in the crystal grain boundary and its vicinity is also preferably higher than that in the other regions in the inner portion.

As the surface of the particle, the crystal grain boundary is plane defects, and thus tends to be unstable and start varying in the crystal structure. Therefore, the higher the magnesium concentration in the crystal grain boundary and its vicinity is, the more effectively the change in the crystal structure can be reduced.

Even when cracks are generated along the crystal grain boundary of the particle of the positive electrode active material 100, high concentrations of magnesium and halogen in the crystal grain boundary and its vicinity increase the concentrations of magnesium and halogen in the vicinity of the surface generated by the cracks. Thus, the positive electrode active material including cracks can also have an increased corrosion resistance to hydrofluoric acid.

Note that in this specification and the like, the vicinity of the crystal grain boundary refers to a region of approximately 10 nm from the grain boundary.

<<Particle Size>>

A too large particle size of the positive electrode active material 100 causes problems such as difficulty in lithium diffusion and surface roughness of an active material layer in coating to a current collector. By contrast, a too small particle size causes problems such as difficulty in supporting the active material layer in coating to the current collector and overreaction with an electrolyte solution. Therefore, D50 is preferably more than or equal to 1 μm and less than or equal to 100 μm, further preferably more than or equal to 2 μm and less than or equal to 40 μm, and still further preferably more than or equal to 5 μm and less than or equal to 30 μm.

<Analysis Method>

To determine whether or not a positive electrode active material is the positive electrode active material 100 of one embodiment of the present invention that has a pseudo-spinel crystal structure when charged with high voltage, a high-voltage charged positive electrode is analyzed by XRD, electron diffraction, neutron diffraction, electron spin resonance (ESR), nuclear magnetic resonance (NMR), or the like. The XRD is particularly preferable because the symmetry of a transition metal such as cobalt in the positive electrode active material can be analyzed with high resolution, the degrees of crystallinity can be compared with each other, the crystal orientations can be compared with each other, distortion of lattice arrangement and the crystallite size can be analyzed, and a positive electrode obtained only by disassembling a secondary battery can be measured with sufficient accuracy, for example.

As described above, the positive electrode active material 100 of one embodiment of the present invention has a small change in the crystal structure between the high-voltage charged state and the discharged state. A material, of which 50% or more of crystal structure largely change between the high-voltage charged state and the discharged state, is not preferable because the material cannot withstand the high-voltage charging and discharging. It should be noted that the objective crystal structure is not obtained in some cases only by addition of impurity elements. For example, the positive electrode active material that is lithium cobalt oxide containing magnesium and fluorine has 60 wt % or more pseudo-spinel crystal structure in some cases, and has 50 wt % or more H1-3 type structure in other cases, when charged with high voltage. At a predetermined voltage, the positive electrode active material has almost 100 wt % pseudo-spinel crystal structure, and at a voltage higher than the predetermined voltage, the positive electrode active material has the H1-3 type structure in some cases. Thus, to determine whether or not the positive electrode active material is the positive electrode active material 100 of one embodiment of the present invention, the crystal structure should be analyzed by XRD, for example.

However, a positive electrode active material in the high-voltage charged state or the discharged state has a change in the crystal structure when exposed to air, in some cases. For example, a pseudo-spinel crystal structure changes into an H1-3 type structure, in some cases. Thus, all samples are preferably handled in an inert atmosphere such as an argon atmosphere.

<<Charging Method>>

High-voltage charging for determining whether or not a composite oxide is the positive electrode active material 100 of one embodiment of the present invention can be performed on a CR2032 coin cell (with a diameter of 20 mm and a height of 3.2 mm) in which lithium is used for a counter electrode.

More specifically, a positive electrode can be formed by coating a positive electrode current collector made of aluminum foil with slurry in which the positive electrode active material, a conductive additive, and a binder are mixed.

A lithium metal can be used for a counter electrode. Note that when the counter electrode is formed using a material other than the lithium metal, the potential of a secondary battery differs from the potential of the positive electrode. Unless otherwise specified, the voltage and the potential in this specification and the like refer to the potential of a positive electrode.

As an electrolyte contained in an electrolyte solution, 1 mol/L lithium hexafluorophosphate (LiPF$_6$) can be used. As the electrolyte solution, a solution in which ethylene carbonate (EC) and diethyl carbonate (DEC) at a volume ratio of 3:7 and vinylene carbonate (VC) at a 2 wt % are mixed can be used.

As a separator, 25-μm-thick polypropylene can be used.

Stainless steel (SUS) can be used for a positive electrode can and a negative electrode can.

The coin cell formed under the above conditions is subjected to constant current charging at 4.6 V and 0.5 C and then subjected to constant voltage charging until the current value reaches 0.01 C. Here, 1 C is set to 137 mA/g, and the temperature is set to 25° C. After the charging is performed in this manner, the coin cell is disassembled in a glove box with an argon atmosphere to take out the positive electrode, whereby the high-voltage charged positive electrode active material can be obtained. In order to inhibit reaction with components in the external environment, the taken positive electrode active material is preferably enclosed in an argon atmosphere in performing various analyses later. For example, XRD can be performed on the positive electrode active material enclosed in an airtight container with an argon atmosphere.

<<XRD>>

FIG. 5 shows ideal powder XRD patterns with a CuKα1 ray that are calculated from models of a pseudo-spinel crystal structure and an H1-3 type structure. For comparison, FIG. 5 also shows ideal XRD patterns calculated from the crystal structure of $LiCoO_2(O3)$ with a charge depth of 0 and the crystal structure of $CoO_2(O1)$ with a charge depth of 1. Note that the patterns of $LiCoO_2(O3)$ and $CoO_2(O1)$ are made from crystal structure data obtained from Inorganic Crystal Structure Database (ICSD) (see Non-Patent Document 5) with Reflex Powder Diffraction, which is a module of Materials Studio (BIOVIA). The range of 2θ is from 15° to 75°, the step size is 0.01, the wavelength $\lambda 1$ is $1.540562 \times 10^{-10}$ m, the wavelength $\lambda 2$ is not set, and a single monochromator is used. The pattern of the H1-3 type structure is made from the crystal structure data disclosed in Non-Patent Document 3 under the above conditions. The pseudo-spinel crystal structure is estimated from the XRD pattern of the positive electrode active material of one embodiment of the present invention, the crystal structure is fitted with TOPAS Version 3 (crystal structure analysis software manufactured by Bruker Corporation), and the XRD patterns of the pseudo-spinel crystal structure are made in a similar manner to other structures.

As shown in FIG. 5, the pseudo-spinel crystal structure has diffraction peaks at 2θ of 19.30±0.20° (greater than or equal to 19.10° and less than or equal to 19.50°) and 2θ of 45.55±0.10° (greater than or equal to 45.45° and less than or equal to 45.65°). More specifically, the pseudo-spinel crystal structure has sharp diffraction peaks at 2θ of 19.30±0.10° (greater than or equal to 19.20° and less than or equal to 19.40°) and 2θ of 45.55±0.05° (greater than or equal to 45.50° and less than or equal to 45.60°). However, the H1-3 type structure and $CoO_2$(P-3m1, O1) do not have peaks at these positions. Thus, the peaks at 2θ of 19.30±0.20° and 2θ of 45.55±0.10° in the high-voltage charged state can be the features of the positive electrode active material 100 of one embodiment of the present invention.

It can be said that the positions of the peaks observed by XRD in the crystal structure with a charge depth of 0 are close to those of the peaks in the high-voltage charged state. More specifically, differences in the positions of two or more, preferably three or more of the main diffraction peaks between the crystal structures are preferably 2θ=0.7 or less, further preferably 2θ=0.5 or less.

Although the high-voltage charged positive electrode active material 100 of one embodiment of the present invention has the pseudo-spinel crystal structure, not all the particles necessarily have the pseudo-spinel crystal structure. Some of the particles may have another crystal structure or be amorphous. Note that when the XRD patterns are analyzed by the Rietveld analysis, the pseudo-spinel crystal structure preferably accounts for more than or equal to 50 wt %, further preferably more than or equal to 60 wt %, and still further preferably more than or equal to 66 wt % of the positive electrode active material. The positive electrode active material in which the pseudo-spinel crystal structure accounts for more than or equal to 50 wt %, preferably more than or equal to 60 wt %, and further preferably more than or equal to 66 wt % can have sufficiently good cycle characteristics.

Furthermore, even after 100 or more cycles of charging and discharging, the pseudo-spinel crystal structure preferably accounts for more than or equal to 35 wt %, further preferably more than or equal to 40 wt %, and still further preferably more than or equal to 43 wt %, in the Rietveld analysis.

The crystallite size of the pseudo-spinel structure of the positive electrode active material particle is decreased by at most approximately one-tenth that of $LiCoO_2(O3)$ in the discharged state. Thus, the peak of the pseudo-spinel crystal structure can be clearly observed after the high-voltage charging even under the same XRD measurement conditions as those of a positive electrode before the charging and discharging. By contrast, simple $LiCoO_2$ has a small crystallite size and a broad and small peak although it can partly have a structure similar to the pseudo-spinel crystal structure. The crystallite size can be calculated from the half width of the XRD peak.

The layered rock-salt crystal structure of the particle of the positive electrode active material in the discharged state, which can be estimated from the XRD patterns, preferably has small lattice constant of the c-axis. The lattice constant of the c-axis increases when a foreign element is substituted at the lithium site or cobalt enters a tetracoordinated oxygen site (site A), for example. For this reason, the positive electrode active material with excellent cycle characteristics probably can be obtained in the following manner: a composite oxide having a layered rock-salt crystal structure with few defects such as foreign element substitutions and $Co_3O_4$ having the spinel crystal structure is formed; a magnesium source and a fluorine source are mixed with the composite oxide; and then magnesium is inserted into the lithium site.

The lattice constant of the c-axis in the crystal structure of the positive electrode active material in the discharged state before annealing is preferably less than or equal to $14.060 \times 10^{-10}$ m, further preferably less than or equal to $14.055 \times 10^{-10}$ m, and still further preferably less than or equal to $14.051 \times 10^{-10}$ m. The lattice constant the of c-axis after annealing is preferably less than or equal to $14.060 \times 10^{-10}$ m.

In order to make the lattice constant of the c-axis be within the above range, the amount of impurities is preferably as small as possible. In particular, the amount of added transition metals other than cobalt, manganese, or nickel is preferably as small as possible; specifically, less than or equal to 3,000 ppm wt, further preferably less than or equal to 1,500 ppm wt. In addition, cation mixing between lithium and cobalt, manganese, and nickel is preferably less likely to occur.

Note that the characteristics apparent from the XRD pattern are those of the structure of the inner portion of the positive electrode active material. In a positive electrode active material with an average diameter (D50) of approximately 1 µm to 100 µm, the volume of a surface portion is negligible compared with that of an inner portion, and therefore is highly unlikely to appear in the XRD pattern even when the surface portion has a crystal structure different from that of the inner portion in the positive electrode active material 100.

<<ESR>>

Figure 6A:
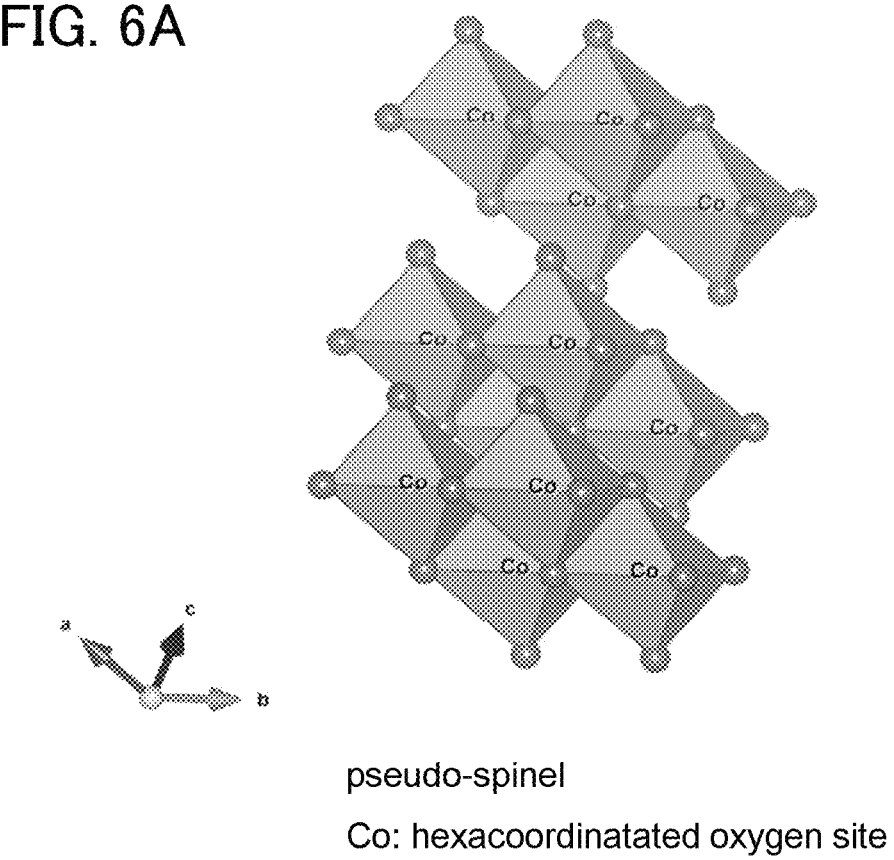
FIGS. 6A and 6B show a crystal structure and magnetism of a positive electrode active material of one embodiment of the present invention.
Figure 6B:
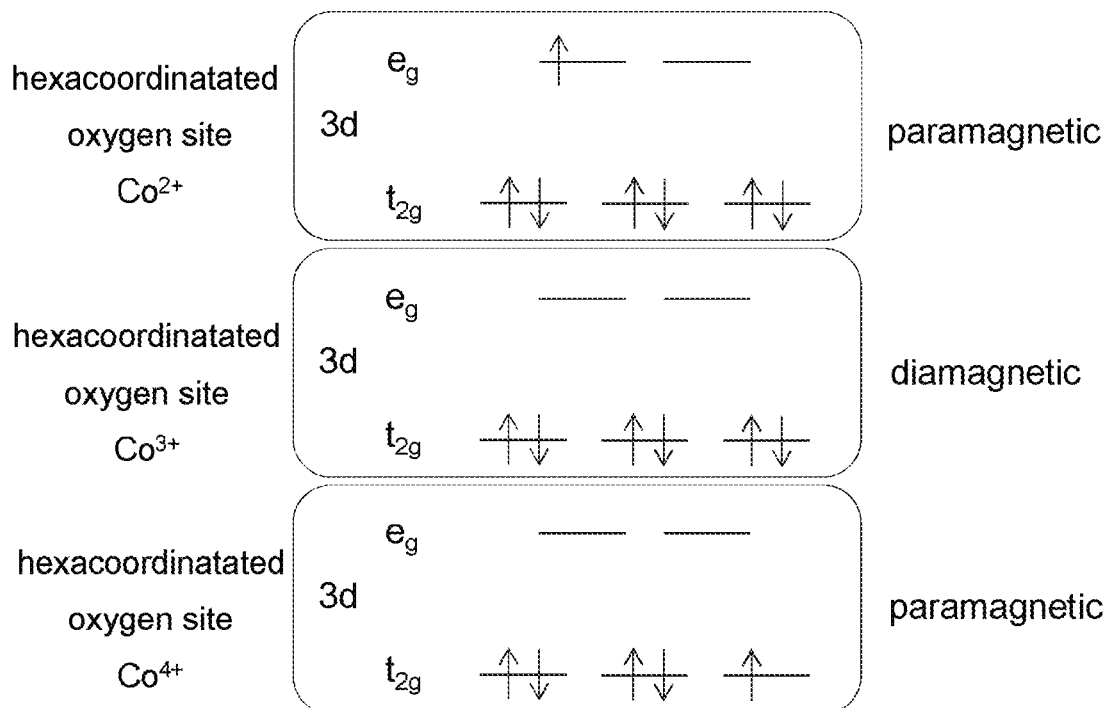

Here, the case in which differences between the pseudo-spinel crystal structure and another crystal structure are determined using ESR is described with reference to FIGS. 6A and 6B and FIGS. 7A and 7B. In the pseudo-spinel crystal structure, cobalt exists in the hexacoordinated oxygen site, as illustrated in FIG. 3 and FIG. 6A. In cobalt in the hexacoordinated oxygen site, a 3d orbital is divided into an $e_g$ orbital and a $t_{2g}$ orbital as shown in FIG. 6B, and the energy of the $t_{2g}$ orbital located aside from the direction in which oxygen exists is low. Part of cobalt in the hexacoordinated oxygen site is diamagnetic $Co^{3+}$ in which the entire $t_{2g}$ orbital is filled. Another part of cobalt in the hexacoordinated oxygen site may be paramagnetic $Co^{2+}$ or $Co^{4+}$. Although both $Co^{2+}$ and $Co^{4+}$ have one unpaired electron and thus cannot be distinguished from each other by ESR, paramagnetic cobalt may be either $Co^{2+}$ or $Co^{4+}$ depending on the valences of surrounding elements.

According to some previous documents, a positive electrode active material can have a spinel crystal structure that does not contain lithium in the surface portion in the charged state. In that case, the positive electrode active material contains $Co_3O_4$ having a spinel crystal structure illustrated in FIG. 7A.

When the spinel is represented by a general formula $A[B_2]O_4$, an element A exists in a tetracoordinated oxygen site and an element B exists in a hexacoordinated oxygen site. In this specification and the like, the tetracoordinated oxygen site is referred to as a site A, and the hexacoordinated oxygen site is referred to as a site B in some cases.

Figure 7A:
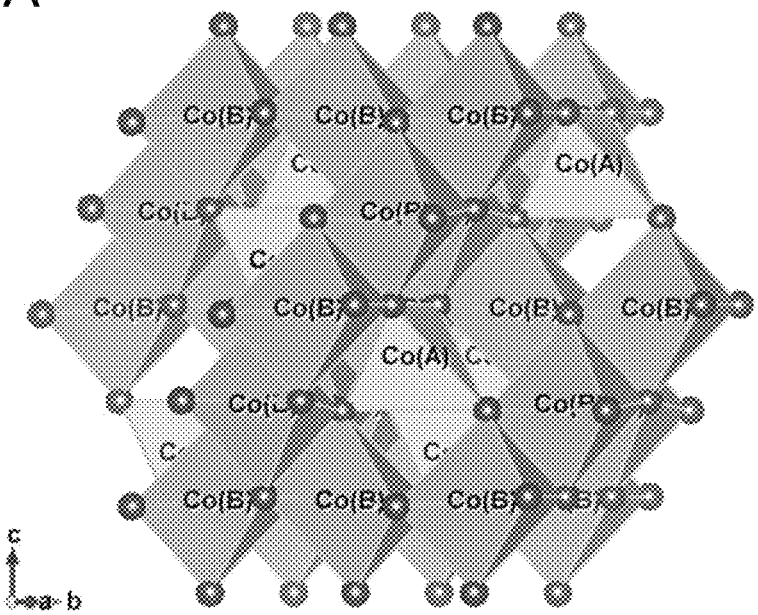
FIGS. 7A and 7B show a crystal structure and magnetism of a conventional positive electrode active material.
Figure 7B:
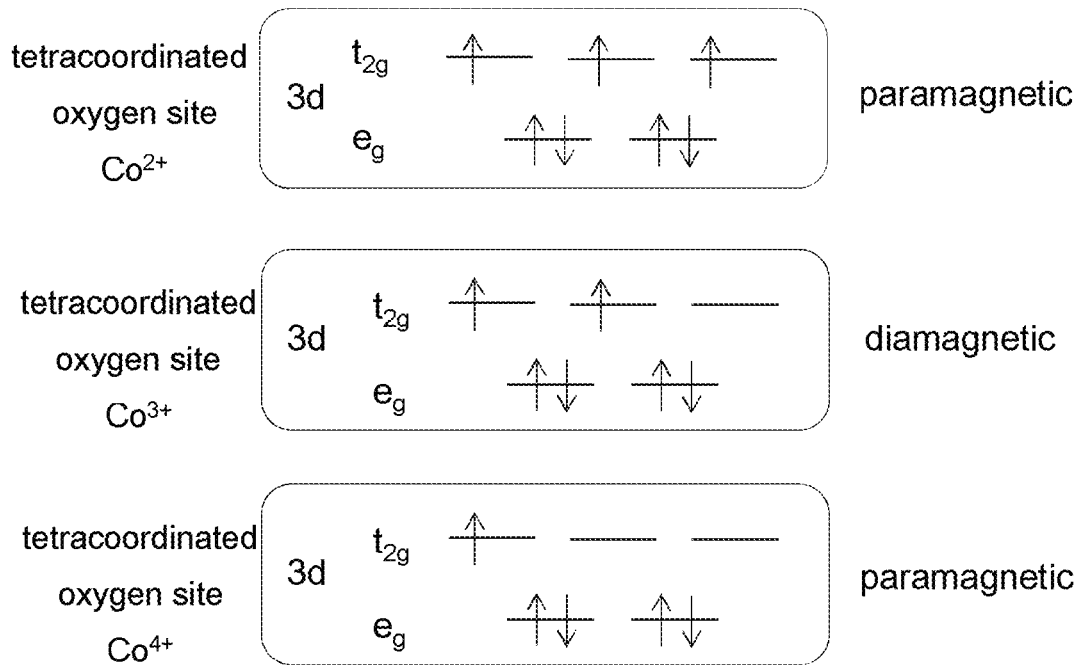

In $Co_3O_4$ having the spinel crystal structure, cobalt exists not only in the hexacoordinated oxygen site B, but also in the tetracoordinated oxygen site A. In cobalt in the tetracoordinated oxygen site, the energy of the $e_g$ orbital is lower than that of the $t_{2g}$ orbital as shown in FIG. 7B. Thus, each of $Co^{2+}$, $Co^{3+}$, and $Co^{4+}$ in the tetracoordinated oxygen site includes an unpaired electron and therefore is paramagnetic. Accordingly, when the particles that sufficiently contain $Co_3O_4$ having the spinel crystal structure are analyzed by ESR or the like, the peaks attributed to paramagnetic cobalt, $Co^{2+}$, $Co^{3+}$, or $Co^{4+}$ in the tetracoordinated oxygen site, should be observed.

However, in the positive electrode active material 100 of one embodiment of the present invention, the peaks attributed to paramagnetic cobalt in the tetracoordinated oxygen site are too small in number to observe. This means, unlike the spinel crystal structure, the pseudo-spinel crystal structure in this specification and the like does not contain an enough amount of cobalt in the tetracoordinated oxygen site to be detected by ESR. That is, the peaks attributed to $Co_3O_4$ having the spinel crystal structure that can be analyzed by ESR or the like in the positive electrode active material of one embodiment of the present invention are lower than the peaks in the conventional positive electrode active material, or too small in number to observe, in some cases. $Co_3O_4$ having the spinel crystal structure does not contribute to the charge and discharge reaction; thus, the amount of $Co_3O_4$ having the spinel crystal structure is preferably as small as possible. From the ESR analysis results, it can be determined that the positive electrode active material 100 is different from the conventional positive electrode active material.

<<XPS>>

A region from the surface to a depth of approximately 2 nm to 8 nm (normally, approximately 5 nm) can be analyzed by X-ray photoelectron spectroscopy (XPS); thus, the concentrations of elements in approximately half of the surface portion can be quantitatively analyzed. The bonding states of the elements can be analyzed by narrow scanning. Note that the quantitative accuracy of XPS is approximately ±1 atomic % in many cases. The lower detection limit is approximately 1 atomic % but depends on the element.

When the positive electrode active material 100 is analyzed by XPS and the cobalt concentration is set to 1, the relative value of the magnesium concentration is preferably greater than or equal to 0.4 and less than or equal to 1.5, further preferably greater than or equal to 0.45 and less than 1.00. Furthermore, the relative value of the concentration of halogen such as fluorine is preferably greater than or equal to 0.05 and less than or equal to 1.5, further preferably greater than or equal to 0.3 and less than or equal to 1.00.

In addition, when the positive electrode active material 100 is analyzed by XPS, a peak indicating the bonding energy of fluorine with another element is preferably higher than or equal to 682 eV and lower than 685 eV, further preferably approximately 684.3 eV. This bonding energy is different from that of lithium fluoride (685 eV) and that of magnesium fluoride (686 eV). That is, the positive electrode active material 100 containing fluorine is preferably in the bonding state other than lithium fluoride and magnesium fluoride.

Furthermore, when the positive electrode active material 100 is analyzed by XPS, a peak indicating the bonding energy of magnesium with another element is preferably higher than or equal to 1302 eV and lower than 1304 eV, further preferably approximately 1303 eV. This bonding energy is different from that of magnesium fluoride (1305 eV) and is close to that of magnesium oxide. That is, the positive electrode active material 100 containing magnesium is preferably in the bonding state other than magnesium fluoride.

<<EDX>>

In the EDX measurement, the measurement in which a region is scanned to be measured two-dimensionally is referred to as EDX surface analysis in some cases. The measurement in which data of a linear region is extracted from the EDX surface analysis to measure the atomic concentration distribution in the positive electrode active material particle is referred to as linear analysis in some cases.

The concentrations of magnesium and fluorine in the inner portion, the surface portion, and the vicinity of the crystal grain boundary can be quantitatively analyzed by the EDX surface analysis (e.g., element mapping). In addition, the peak of the concentrations of magnesium and fluorine can be analyzed by the EDX linear analysis.

When the positive electrode active material 100 is subjected to the EDX linear analysis, a peak of the magnesium concentration in the surface portion is preferably observed in a region from the surface of the positive electrode active material 100 to a depth of 3 nm toward the center, further preferably to a depth of 1 nm, and still further preferably to a depth of 0.5 nm.

The distribution of fluorine in the positive electrode active material 100 preferably overlaps with the distribution of magnesium. Thus, in the EDX linear analysis, a peak of the fluorine concentration in the surface portion is preferably observed in a region from the surface of the positive electrode active material 100 to a depth of 3 nm toward the center, further preferably to a depth of 1 nm, and still further preferably to a depth of 0.5 nm.

When the positive electrode active material 100 is subjected to linear analysis or surface analysis, the atomic ratio of magnesium to cobalt (Mg/Co) in the vicinity of the crystal grain boundary is preferably greater than or equal to 0.020 and less than or equal to 0.50, further preferably greater than or equal to 0.025 and less than or equal to 0.30, and still further preferably greater than or equal to 0.030 and less than or equal to 0.20.

<<dQ/dVvsV Curve>>

When the positive electrode active material 100 of one embodiment of the present invention is discharged at a low rate such as 0.2 C or less after high-voltage charging, a characteristic change in voltage appears just before the end of discharging, in some cases. This change can be clearly observed when at least one peak appears within the range of 3.5 V to 3.9 V in dQ/dVvsV curve calculated from the discharge curve.

Embodiment 2

In this embodiment, examples of materials that can be used for a secondary battery containing the positive electrode active material 100 described in the above embodiment are described. In this embodiment, a secondary battery in which a positive electrode, a negative electrode, and an electrolyte solution are wrapped in an exterior body is described as an example.

[Positive Electrode]

The positive electrode includes a positive electrode active material layer and a positive electrode current collector.

<Positive Electrode Active Material Layer>

The positive electrode active material layer contains at least a positive electrode active material. The positive electrode active material layer may contain other materials such as a coating film of the active material surface, a conductive additive, and a binder, in addition to the positive electrode active material.

As the positive electrode active material, the positive electrode active material 100 described in the above embodiment can be used. A secondary battery including the positive electrode active material 100 described in the above embodiment can have high capacity and excellent cycle characteristics.

Examples of the conductive additive include a carbon material, a metal material, and a conductive ceramic material. Alternatively, a fiber material may be used as the conductive additive. The content of the conductive additive in the active material layer is preferably greater than or equal to 1 wt % and less than or equal to 10 wt %, further preferably greater than or equal to 1 wt % and less than or equal to 5 wt %.

A network for electric conduction can be formed in the active material layer by the conductive additive. The conductive additive also allows the maintenance of a path for electric conduction between the positive electrode active material particles. The addition of the conductive additive to the active material layer increases the electric conductivity of the active material layer.

Examples of the conductive additive include natural graphite, artificial graphite such as mesocarbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (e.g., acetylene black (AB)), graphite (black lead) particles, graphene, and fullerene. Alternatively, metal powder or metal fibers of copper, nickel, aluminum, silver, gold, or the like, a conductive ceramic material, or the like can be used.

Alternatively, a graphene compound may be used as the conductive additive.

A graphene compound has excellent electrical characteristics of high conductivity and excellent physical properties of high flexibility and high mechanical strength in some cases. Furthermore, a graphene compound has a planar shape. A graphene compound enables low-resistance surface contact. Furthermore, a graphene compound has extremely high conductivity even with a small thickness in some cases and thus allows a conductive path to be formed in an active material layer efficiently even with a small amount. Thus, a graphene compound is preferably used as the conductive additive, in which case the area where the active material and the conductive additive are in contact with each other can be increased. The graphene compound serving as the conductive additive is preferably formed with a spray dry apparatus as a coating film to cover the entire surface of the active material, in which case the electrical resistance can be reduced in some cases. Here, it is particularly preferable to use, for example, graphene, multilayer graphene, or RGO as a graphene compound. Note that RGO refers to a compound obtained by reducing graphene oxide (GO), for example.

In the case where an active material with a small particle diameter (e.g., 1 μm or less) is used, the specific surface area of the active material is large and thus more conductive paths for the active material particles are needed. Thus, the amount of conductive additive tends to increase and the carried amount carried amount of active material tends to decrease relatively. When the carried amount carried amount of active material decreases, the capacity of the secondary battery also decreases. In such a case, a graphene compound that can efficiently form a conductive path even with a small amount is particularly preferably used as the conductive additive because the carried amount of active material does not decrease.

A cross-sectional structure example of an active material layer 200 containing a graphene compound as a conductive additive is described below.

Figure 8A:
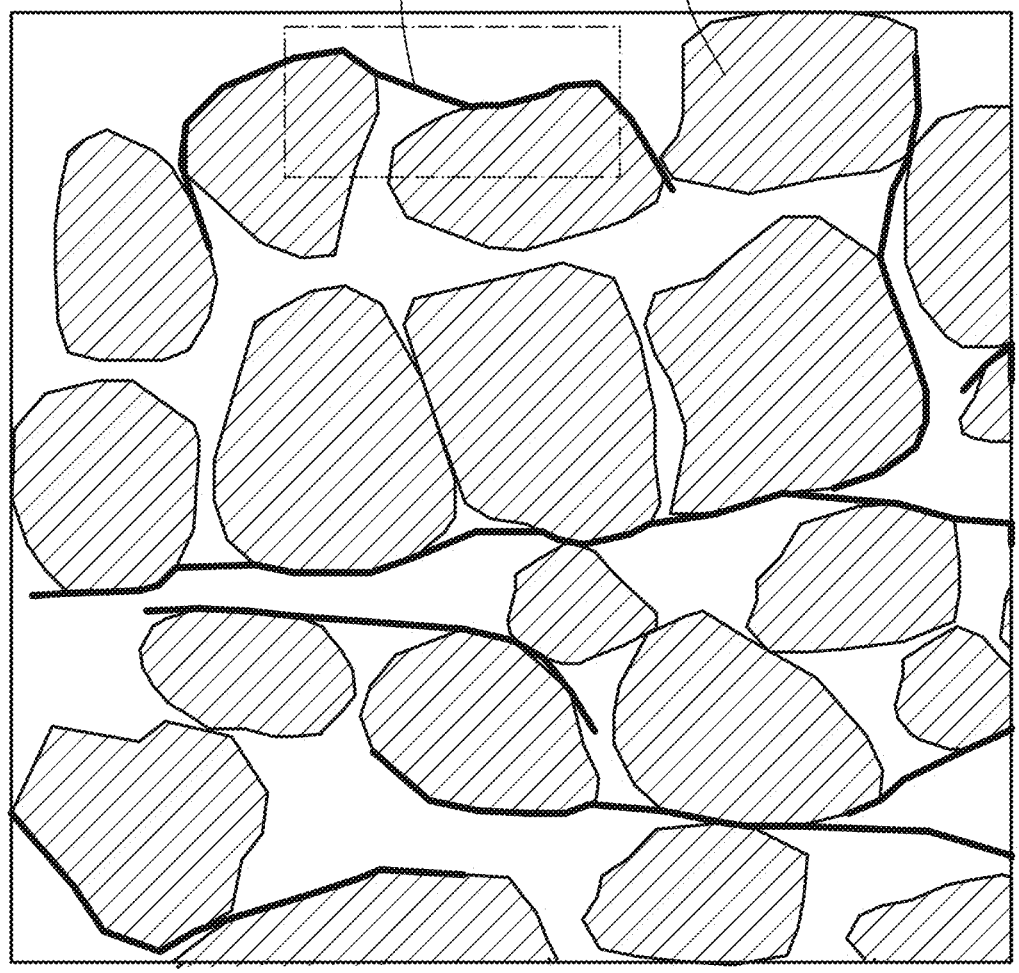
FIGS. 8A and 8B are cross-sectional views of an active material layer containing a graphene compound as a conductive additive.

FIG. 8A is a longitudinal sectional view of the active material layer 200. The active material layer 200 includes particles of the positive electrode active material 100, a graphene compound 201 serving as a conductive additive, and a binder (not illustrated). Here, graphene or multilayer graphene may be used as the graphene compound 201, for example. The graphene compound 201 preferably has a sheet-like shape. The graphene compound 201 may have a sheet-like shape formed of a plurality of sheets of multilayer graphene and/or a plurality of sheets of graphene that partly overlap with each other.

Figure 8B:
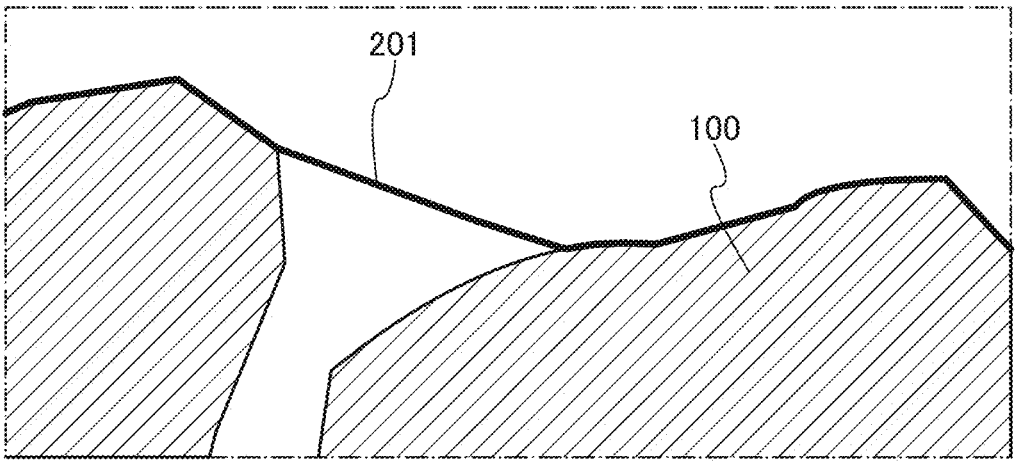

The longitudinal cross section of the active material layer 200 in FIG. 8B shows substantially uniform dispersion of the sheet-like graphene compounds 201 in the active material layer 200. The graphene compounds 201 are schematically shown by thick lines in FIG. 8B but are actually thin films each having a thickness corresponding to the thickness of a single layer or a multi-layer of carbon molecules. The plurality of graphene compounds 201 are formed to partly coat or adhere to the surfaces of the plurality of particles of the positive electrode active material 100, so that the graphene compounds 201 make surface contact with the particles of the positive electrode active material 100.

Here, the plurality of graphene compounds are bonded to each other to form a net-like graphene compound sheet (hereinafter, referred to as a graphene compound net or a graphene net). The graphene net covering the active material can function as a binder for bonding active materials. The amount of binder can thus be reduced, or the binder does not have to be used. This can increase the proportion of the active material in the electrode volume or weight. That is to say, the capacity of the secondary battery can be increased.

Here, it is preferable to perform reduction after a layer to be the active material layer 200 is formed in such a manner that graphene oxide is used as the graphene compound 201 and mixed with an active material. When graphene oxide with extremely high dispersibility in a polar solvent is used for the formation of the graphene compounds 201, the graphene compounds 201 can be substantially uniformly dispersed in the active material layer 200. The solvent is removed by volatilization from a dispersion medium in which graphene oxide is uniformly dispersed, and the graphene oxide is reduced; hence, the graphene compounds 201 remaining in the active material layer 200 partly overlap with each other and are dispersed such that surface contact is made, thereby forming a three-dimensional conduction path. Note that graphene oxide can be reduced either by heat treatment or with the use of a reducing agent, for example.

Unlike conductive additive particles that make point contact with an active material, such as acetylene black, the graphene compound 201 is capable of making low-resistance surface contact; accordingly, the electrical conduction between the particles of the positive electrode active material 100 and the graphene compounds 201 can be improved with a smaller amount of the graphene compound 201 than that of a normal conductive additive. Thus, the proportion of the positive electrode active material 100 in the active material layer 200 can be increased, resulting in increased discharge capacity of the secondary battery.

It is possible to form a graphene compound serving as a conductive additive as a coating film to cover the entire surface of the active material and to form a conductive path between the active materials using the graphene compound in advance with a spray dry apparatus.

As the binder, a rubber material such as styrene-butadiene rubber (SBR), styrene-isoprene-styrene rubber, acrylonitrile-butadiene rubber, butadiene rubber, or ethylene-propylene-diene copolymer can be used, for example. Alternatively, fluororubber can be used as the binder.

For the binder, for example, water-soluble polymers are preferably used. As the water-soluble polymers, for example, a polysaccharide can be used. As the polysaccharide, for example, a cellulose derivative such as carboxymethyl cellulose (CMC), methyl cellulose, ethyl cellulose, hydroxypropyl cellulose, diacetyl cellulose, or regenerated cellulose or starch can be used. It is further preferable that such water-soluble polymers be used in combination with any of the above rubber materials.

Alternatively, as the binder, a material such as polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, polyisobutylene, polyethylene terephthalate, nylon, polyvinylidene fluoride (PVDF), polyacrylonitrile (PAN), ethylene-propylene-diene polymer, polyvinyl acetate, or nitrocellulose is preferably used.

A plurality of the above materials may be used in combination for the binder.

For example, a material having a significant viscosity modifying effect and another material may be used in combination. For example, a rubber material or the like has high adhesion or high elasticity but may have difficulty in viscosity modification when mixed in a solvent. In such a case, a rubber material or the like is preferably mixed with a material having a significant viscosity modifying effect, for example. As a material having a significant viscosity modifying effect, for example, a water-soluble polymer is preferably used. An example of a water-soluble polymer having an especially significant viscosity modifying effect is the above-mentioned polysaccharide; for example, a cellulose derivative such as carboxymethyl cellulose (CMC), methyl cellulose, ethyl cellulose, hydroxypropyl cellulose, diacetyl cellulose, or regenerated cellulose, or starch can be used.

Note that a cellulose derivative such as carboxymethyl cellulose obtains a higher solubility when converted into a salt such as a sodium salt or an ammonium salt of carboxymethyl cellulose, and accordingly, easily exerts an effect as a viscosity modifier. The high solubility can also increase the dispersibility of an active material and other components in the formation of slurry for an electrode. In this specification, cellulose and a cellulose derivative used as a binder of an electrode include salts thereof.

The water-soluble polymers stabilize viscosity by being dissolved in water and allow stable dispersion of the active material and another material combined as a binder, such as styrene-butadiene rubber, in an aqueous solution. Furthermore, a water-soluble polymer is expected to be easily and stably adsorbed to an active material surface because it has a functional group. Many cellulose derivatives such as carboxymethyl cellulose have functional groups such as a hydroxyl group and a carboxyl group. Because of functional groups, polymers are expected to interact with each other and cover an active material surface in a large area.

In the case where the binder covering or being in contact with the active material surface forms a film, the film is expected to serve as a passivation film to suppress the decomposition of the electrolyte solution. Here, the passivation film refers to a film without electric conductivity or a film with extremely low electric conductivity, and can inhibit the decomposition of an electrolytic solution at a potential at which a battery reaction occurs in the case where the passivation film is formed on the active material surface, for example. It is preferred that the passivation film can conduct lithium ions while suppressing electric conduction.

<Positive Electrode Current Collector>

The positive electrode current collector can be formed using a material that has high conductivity, such as a metal like stainless steel, gold, platinum, aluminum, or titanium, or an alloy thereof. It is preferable that a material used for the positive electrode current collector not dissolve at the potential of the positive electrode. Alternatively, the positive electrode current collector can be formed using an aluminum alloy to which an element that improves heat resistance, such as silicon, titanium, neodymium, scandium, or molybdenum, is added. Still alternatively, a metal element that forms silicide by reacting with silicon may be used. Examples of the metal element that forms silicide by reacting with silicon include zirconium, titanium, hafnium, vanadium, niobium, tantalum, chromium, molybdenum, tungsten, cobalt, and nickel. The current collector can have a foil-like shape, a plate-like shape (sheet-like shape), a net-like shape, a punching-metal shape, an expanded-metal shape, or the like as appropriate. The current collector preferably has a thickness greater than or equal to 5 mm and less than or equal to 30 mm.

[Negative Electrode]

The negative electrode includes a negative electrode active material layer and a negative electrode current collector. The negative electrode active material layer may contain a conductive additive and a binder.

<Negative Electrode Active Material>

As a negative electrode active material, for example, an alloy-based material or a carbon-based material can be used.

For the negative electrode active material, an element that enables charge-discharge reactions by an alloying reaction and a dealloying reaction with lithium can be used. For example, a material containing at least one of silicon, tin, gallium, aluminum, germanium, lead, antimony, bismuth, silver, zinc, cadmium, indium, and the like can be used. Such elements have higher capacity than carbon. In particular, silicon has a high theoretical capacity of 4200 mAh/g. For this reason, silicon is preferably used as the negative electrode active material. Alternatively, a compound containing any of the above elements may be used. Examples of the compound include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn. Here, an element that enables charge-discharge reactions by an alloying reaction and a dealloying reaction with lithium, a compound containing the element, and the like may be referred to as an alloy-based material.

In this specification and the like, SiO refers, for example, to silicon monoxide. Note that SiO can alternatively be expressed as $SiO_x$. Here, x preferably has an approximate value of 1. For example, x is preferably more than or equal to 0.2 and less than or equal to 1.5, further preferably more than or equal to 0.3 and less than or equal to 1.2.

As the carbon-based material, graphite, graphitizing carbon (soft carbon), non-graphitizing carbon (hard carbon), carbon nanotube, graphene, carbon black, and the like may be used.

Examples of graphite include artificial graphite and natural graphite. Examples of artificial graphite include mesocarbon microbeads (MCMB), coke-based artificial graphite, and pitch-based artificial graphite. As artificial graphite, spherical graphite having a spherical shape can be used. For example, MCMB is preferably used because it may have a spherical shape. Moreover, MCMB may preferably be used because it can relatively easily have a small surface area. Examples of natural graphite include flake graphite and spherical natural graphite.

Graphite has a low potential substantially equal to that of a lithium metal (higher than or equal to 0.05 V and lower than or equal to 0.3 V vs. $Li/Li^+$) when lithium ions are intercalated into graphite (while a lithium-graphite intercalation compound is formed). For this reason, a lithium-ion secondary battery can have a high operating voltage. In addition, graphite is preferred because of its advantages such as a relatively high capacity per unit volume, relatively small volume expansion, low cost, and higher level of safety than that of a lithium metal.

As the negative electrode active material, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten dioxide ($WO_2$), or molybdenum dioxide ($MoO_2$) can be used.

Still alternatively, for the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 $mAh/cm^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. Note that in the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active materials; for example, a transition metal oxide which does not form an alloy with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

For the conductive additive and the binder that can be included in the negative electrode active material layer, materials similar to those of the conductive additive and the binder that can be included in the positive electrode active material layer can be used.

<Negative Electrode Current Collector>

For the negative electrode current collector, a material similar to that of the positive electrode current collector can be used. Note that a material which is not alloyed with carrier ions such as lithium is preferably used for the negative electrode current collector.

[Electrolyte Solution]

The electrolyte solution contains a solvent and an electrolyte. As the solvent of the electrolyte solution, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, ethyl acetate, methyl propionate, ethyl propionate, propyl propionate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

Alternatively, the use of one or more ionic liquids (room temperature molten salts) that are less likely to burn and volatize as the solvent of the electrolyte solution can prevent a secondary battery from exploding or catching fire even when the secondary battery internally shorts out or the internal temperature increases owing to overcharging or the like. An ionic liquid contains a cation and an anion, specifically, an organic cation and an anion. Examples of the organic cation used for the electrolyte solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolyte solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

As an electrolyte dissolved in the above-described solvent, one of lithium salts such as $LiPF_6$, $LiClO_4$, $LiAsF_6$, $LiBF_4$, $LiAlCl_4$, $LiSCN$, $LiBr$, $LiI$, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

The electrolyte solution used for a secondary battery is preferably highly purified and contains small numbers of dust particles and elements other than the constituent elements of the electrolyte solution (hereinafter, also simply referred to as impurities). Specifically, the weight ratio of impurities to the electrolyte solution is less than or equal to 1%, preferably less than or equal to 0.1%, and further preferably less than or equal to 0.01%.

Furthermore, an additive agent such as vinylene carbonate, propane sultone (PS), tert-butylbenzene (TBB), fluoroethylene carbonate (FEC), lithium bis(oxalate)borate (LiBOB), or a dinitrile compound such as succinonitrile or adiponitrile may be added to the electrolyte solution. The concentration of a material to be added in the whole solvent is, for example, higher than or equal to 0.1 wt % and lower than or equal to 5 wt %.

Alternatively, a polymer gelled electrolyte obtained in such a manner that a polymer is swelled with an electrolyte solution may be used.

When a polymer gel electrolyte is used, safety against liquid leakage and the like is improved. Furthermore, a secondary battery can be thinner and more lightweight.

As a polymer that undergoes gelation, a silicone gel, an acrylic gel, an acrylonitrile gel, a polyethylene oxide-based gel, a polypropylene oxide-based gel, a fluorine-based polymer gel, or the like can be used.

Examples of the polymer include a polymer having a polyalkylene oxide structure, such as polyethylene oxide (PEO); PVDF; polyacrylonitrile; and a copolymer containing any of them. For example, PVDF-HFP, which is a copolymer of PVDF and hexafluoropropylene (HFP) can be used. The formed polymer may be porous.

Instead of the electrolyte solution, a solid electrolyte including an inorganic material such as a sulfide-based inorganic material or an oxide-based inorganic material, or a solid electrolyte including a high-molecular material such as a polyethylene oxide (PEO)-based high-molecular material may alternatively be used. When the solid electrolyte is used, a separator and a spacer are not necessary. Furthermore, the battery can be entirely solidified; therefore, there is no possibility of liquid leakage and thus the safety of the battery is dramatically increased.

[Separator]

The secondary battery preferably includes a separator. As the separator, for example, paper; nonwoven fabric; glass fiber; ceramics; or synthetic fiber containing nylon (polyamide), vinylon (polyvinyl alcohol-based fiber), polyester, acrylic, polyolefin, or polyurethane can be used. The separator is preferably formed to have an envelope-like shape to wrap one of the positive electrode and the negative electrode.

The separator may have a multilayer structure. For example, an organic material film such as polypropylene or polyethylene can be coated with a ceramic-based material, a fluorine-based material, a polyamide-based material, a mixture thereof, or the like. Examples of the ceramic-based material include aluminum oxide particles and silicon oxide particles. Examples of the fluorine-based material include PVDF and polytetrafluoroethylene. Examples of the polyamide-based material include nylon and aramid (meta-based aramid and para-based aramid).

When the separator is coated with the ceramic-based material, deterioration of the separator in charging and discharging at high voltage can be suppressed and thus the reliability of the secondary battery can be improved because oxidation resistance is improved. In addition, when the separator is coated with the fluorine-based material, the separator is easily brought into close contact with an electrode, resulting in high output characteristics. When the separator is coated with the polyamide-based material, in particular, aramid, the safety of the secondary battery is improved because heat resistance is improved.

For example, both surfaces of a polypropylene film may be coated with a mixed material of aluminum oxide and aramid. Alternatively, a surface of the polypropylene film that is in contact with the positive electrode may be coated with the mixed material of aluminum oxide and aramid, and a surface of the polypropylene film that is in contact with the negative electrode may be coated with the fluorine-based material.

With the use of a separator having a multilayer structure, the capacity per volume of the secondary battery can be increased because the safety of the secondary battery can be maintained even when the total thickness of the separator is small.

[Exterior Body]

For an exterior body included in the secondary battery, a metal material such as aluminum or a resin material can be used, for example. A film-like exterior body can also be used. As the film, for example, a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

[Charging and Discharging Methods]

The secondary battery can be charged and discharged in the following manner, for example.

<<CC Charging>>

Figure 9A:
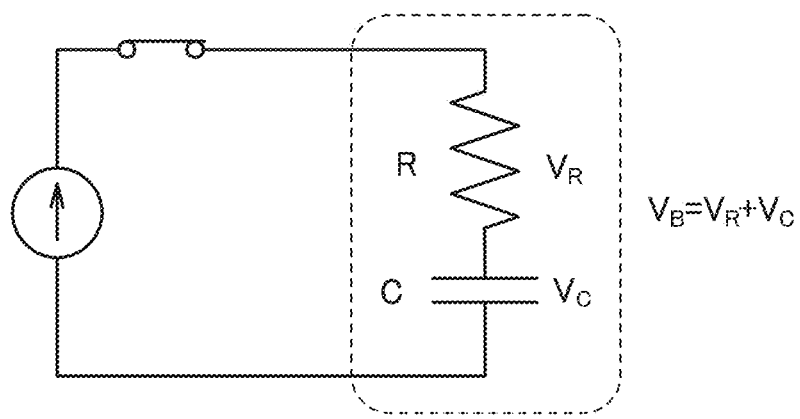
FIGS. 9A to 9C show a charging method of a secondary battery.

First, CC charging, which is one of charging methods, is described. CC charging is a charging method in which a constant current is made to flow to a secondary battery in the whole charging period and charging is terminated when the voltage reaches a predetermined voltage. The secondary battery is assumed to be an equivalent circuit with internal resistance R and secondary battery capacitance C as illustrated in FIG. 9A. In that case, a secondary battery voltage $V_B$ is the sum of a voltage $V_R$ applied to the internal resistance R and a voltage $V_C$ applied to the secondary battery capacitance C.

While the CC charging is performed, a switch is on as illustrated in FIG. 9A, so that a constant current I flows to the secondary battery. During the period, the current I is constant; thus, according to the Ohm's law ($V_R=R \times I$), the voltage $V_R$ applied to the internal resistance R is also constant. By contrast, the voltage $V_C$ applied to the secondary battery capacitance C increases over time. Accordingly, the secondary battery voltage $V_B$ increases over time.

Figure 9B:
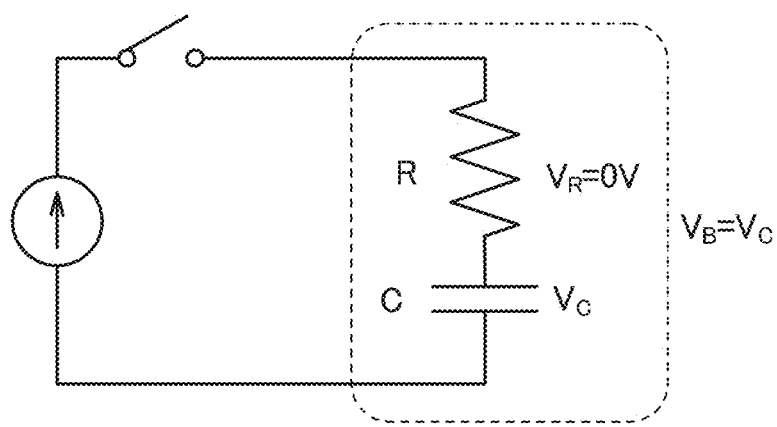

When the secondary battery voltage $V_B$ reaches a predetermined voltage, e.g., 4.3 V, the charging is terminated. On termination of the CC charging, the switch is turned off as illustrated in FIG. 9B, and the current I becomes 0. Thus, the voltage $V_R$ applied to the internal resistance R becomes 0 V. Consequently, the secondary battery voltage $V_B$ is decreased.

Figure 9C:
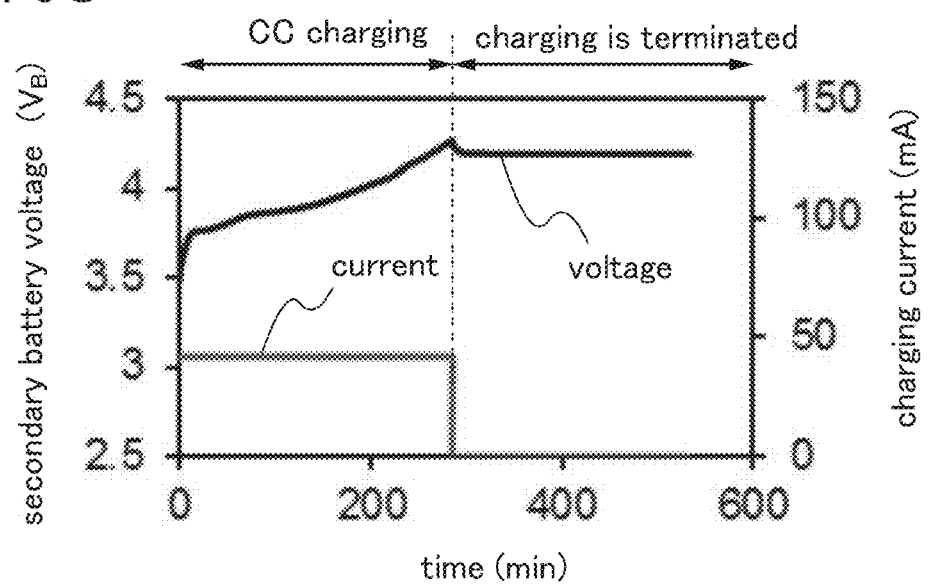

FIG. 9C shows an example of the secondary battery voltage $V_B$ and charging current during a period in which the CC charging is performed and after the CC charging is terminated. The secondary battery voltage $V_B$ increases while the CC charging is performed, and slightly decreases after the CC charging is terminated.

<<CCCV Charging>>

Next, CCCV charging, which is a charging method different from the above-described method, is described. CCCV charging is a charging method in which CC charging is performed until the voltage reaches a predetermined voltage and then constant voltage (CV) charging is performed until the amount of current flow becomes small, specifically, a termination current value.

Figure 10A:
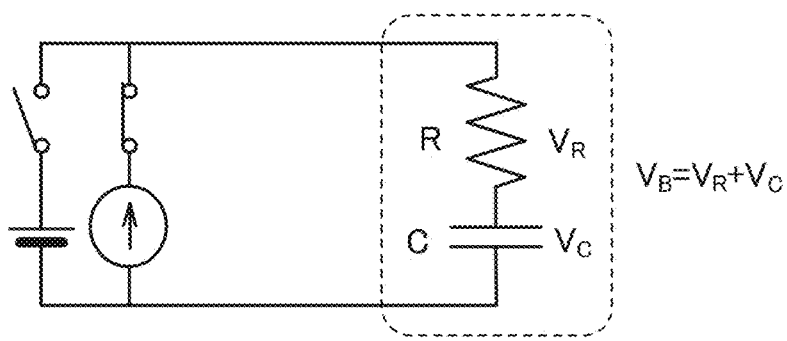
FIGS. 10A to 10D show a charging method of a secondary battery.

While the CC charging is performed, a switch of a constant current power source is on and a switch of a constant voltage power source is off as illustrated in FIG. 10A, so that the constant current I flows to the secondary battery. During the period, the current I is constant; thus, according to the Ohm's law ($V_R = R \times I$), the voltage $V_R$ applied to the internal resistance R is also constant. By contrast, the voltage $V_C$ applied to the secondary battery capacitance C increases over time. Accordingly, the secondary battery voltage $V_B$ increases over time.

Figure 10B:
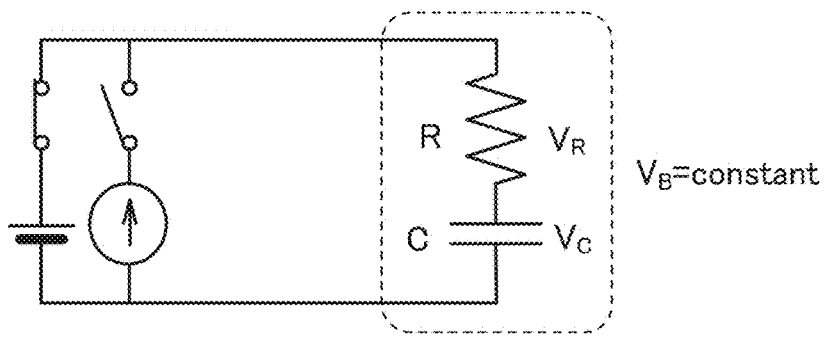

When the secondary battery voltage $V_B$ reaches a predetermined voltage, e.g., 4.3 V, switching is performed from the CC charging to the CV charging. While the CV charging is performed, the switch of the constant voltage power source is on and the switch of the constant current power source is off as illustrated in FIG. 10B; thus, the secondary battery voltage $V_B$ is constant. By contrast, the voltage $V_C$ applied to the secondary battery capacitance C increases over time. Since $V_B = V_R + V_C$ is satisfied, the voltage $V_R$ applied to the internal resistance R decreases over time. As the voltage $V_R$ applied to the internal resistance R decreases, the current I flowing to the secondary battery also decreases according to the Ohm's law ($V_R = R \times I$).

Figure 10C:
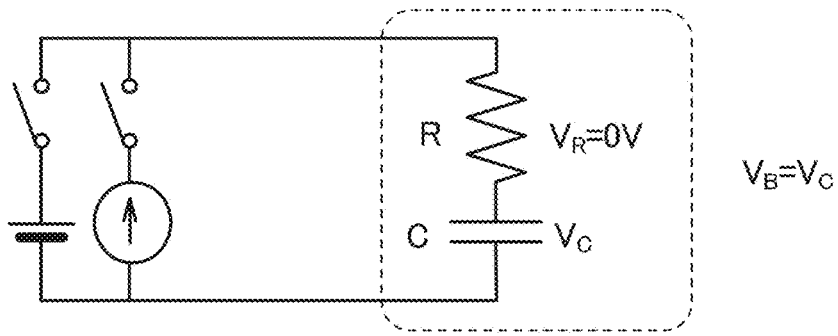

When the current I flowing to the secondary battery becomes a predetermined current, e.g., approximately 0.01 C, charging is terminated. On termination of the CCCV charging, all the switches are turned off as illustrated in FIG. 10C, so that the current I becomes 0. Thus, the voltage $V_R$ applied to the internal resistance R becomes 0 V. However, the voltage $V_R$ applied to the internal resistance R becomes sufficiently small by the CV charging; thus, even when a voltage drop no longer occurs in the internal resistance R, the secondary battery voltage $V_B$ hardly decreases.

Figure 10D:
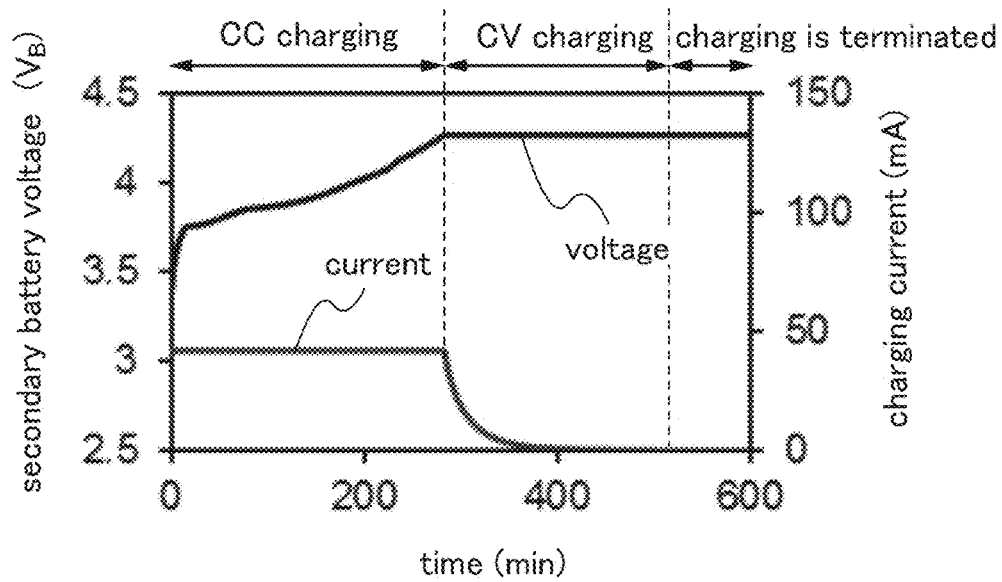

FIG. 10D shows an example of the secondary battery voltage $V_B$ and charging current while the CCCV charging is performed and after the CCCV charging is terminated. Even after the CCCV charging is terminated, the secondary battery voltage $V_B$ hardly decreases.

<<CC Discharging>>

Next, CC discharging, which is one of discharging methods, is described. CC discharging is a discharging method in which a constant current is made to flow from the secondary battery in the whole discharging period, and discharging is terminated when the secondary battery voltage $V_B$ reaches a predetermined voltage, e.g., 2.5 V.

Figure 11:
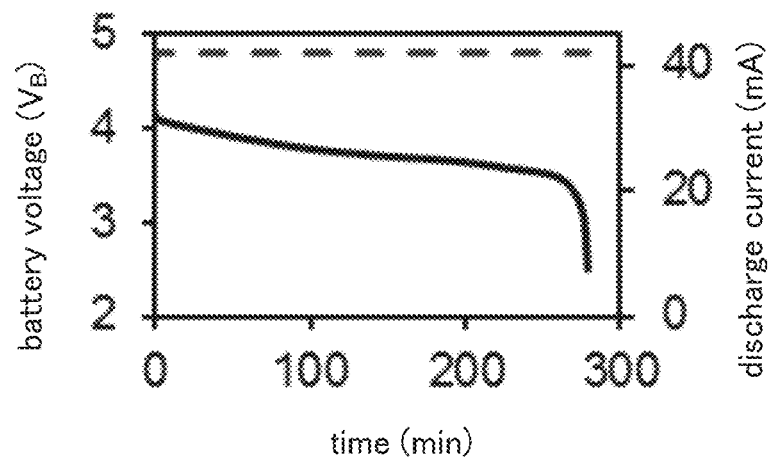
FIG. 11 shows a discharging method of a secondary battery.

FIG. 11 shows an example of the secondary battery voltage $V_B$ and discharging current while the CC discharging is performed. As discharging proceeds, the secondary battery voltage $V_B$ decreases.

Next, a discharge rate and a charge rate are described. The discharge rate refers to the relative ratio of discharging current to battery capacity and is expressed in a unit C. A current of approximately 1 C in a battery with a rated capacity X (Ah) is X A. The case where discharging is performed at a current of 2X A is rephrased as follows: discharging is performed at 2 C. The case where discharging is performed at a current of X/5 A is rephrased as follows: discharging is performed at 0.2 C. Similarly, the case where charging is performed at a current of 2X A is rephrased as follows: charging is performed at 2 C, and the case where charging is performed at a current of X/5 A is rephrased as follows: charging is performed at 0.2 C.

Embodiment 3

In this embodiment, examples of a shape of a secondary battery containing the positive electrode active material 100 described in the above embodiment are described. For the materials used for the secondary battery described in this embodiment, refer to the description of the above embodiment.

[Coin-Type Secondary Battery]

Figure 12A:
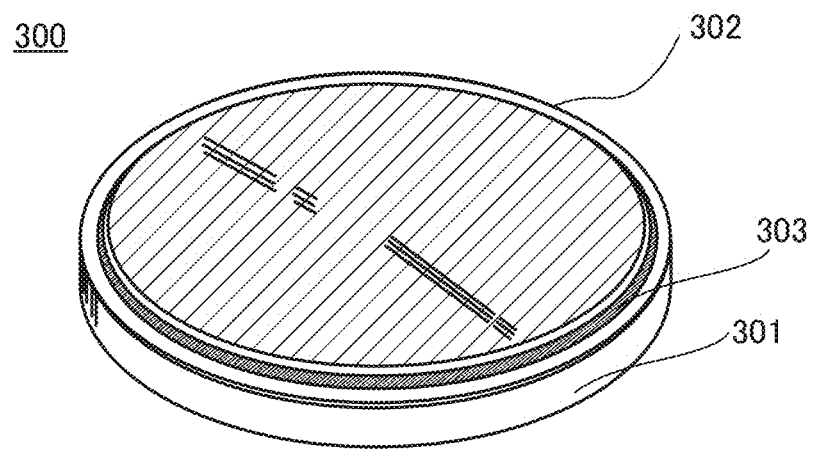
FIGS. 12A to 12C illustrate a coin-type secondary battery.
Figure 12B:
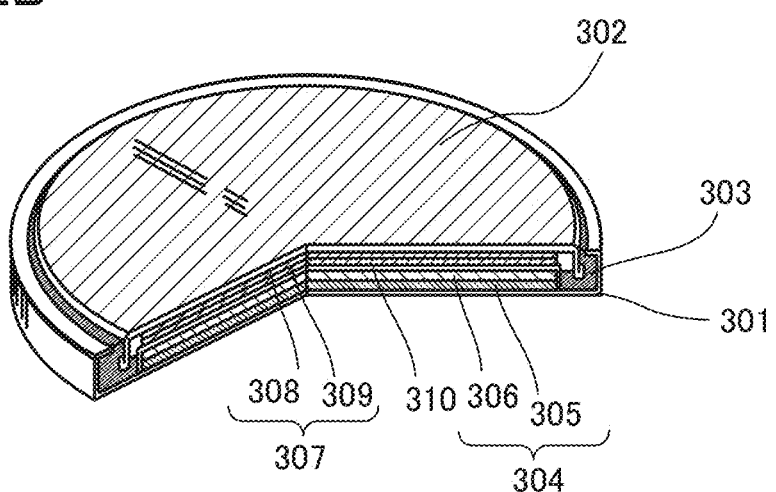

First, an example of a coin-type secondary battery is described. FIG. 12A is an external view of a coin-type (single-layer flat type) secondary battery, and FIG. 12B is a cross-sectional view thereof.

In a coin-type secondary battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. A negative electrode 307 includes a negative electrode current collector 308 and a negative electrode active material layer 309 provided in contact with the negative electrode current collector 308.

Note that only one surface of each of the positive electrode 304 and the negative electrode 307 used for the coin-type secondary battery 300 is provided with an active material layer.

For the positive electrode can 301 and the negative electrode can 302, a metal having corrosion resistance to an electrolyte solution, such as nickel, aluminum, or titanium, an alloy of such a metal, or an alloy of such a metal and another metal (e.g., stainless steel) can be used. Alternatively, the positive electrode can 301 and the negative electrode can 302 are preferably covered with nickel, aluminum, or the like in order to prevent corrosion due to the electrolyte solution. The positive electrode can 301 and the negative electrode can 302 are electrically connected to the positive electrode 304 and the negative electrode 307, respectively.

The negative electrode 307, the positive electrode 304, and a separator 310 are immersed in the electrolyte solution. Then, as illustrated in FIG. 12B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 located therebetween. In such a manner, the coin-type secondary battery 300 can be manufactured.

When the positive electrode active material described in the above embodiment is used in the positive electrode 304, the coin-type secondary battery 300 with high capacity and excellent cycle characteristics can be obtained.

Here, a current flow in charging a secondary battery will be described with reference to FIG. 12C. When a secondary battery using lithium is regarded as a closed circuit, lithium ions transfer and a current flows in the same direction. Note that in the secondary battery using lithium, an anode and a cathode change places in charging and discharging, and an oxidation reaction and a reduction reaction occur on the corresponding sides; hence, an electrode with a high reaction potential is called a positive electrode and an electrode with a low reaction potential is called a negative electrode. For this reason, in this specification, the positive electrode is referred to as a "positive electrode" or a "plus electrode" and the negative electrode is referred to as a "negative electrode" or a "minus electrode" in all the cases where charging is performed, discharging is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the term "anode" or "cathode" is used, it should be mentioned that the anode or the cathode is which of the one at the time of charging or the one at the time of discharging and corresponds to which of a positive (plus) electrode or a negative (minus) electrode.

Figure 12C:
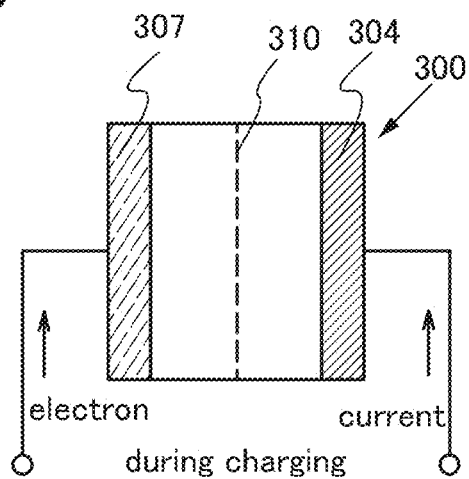

Two terminals in FIG. 12C are connected to a charger, and the secondary battery 300 is charged. As the charging of the secondary battery 300 proceeds, a potential difference between electrodes increases.

[Cylindrical Secondary Battery]

Figure 13A:
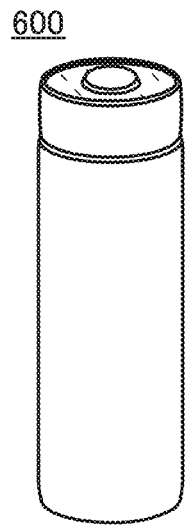
FIGS. 13A to 13D illustrate a cylindrical secondary battery.
Figure 13B:
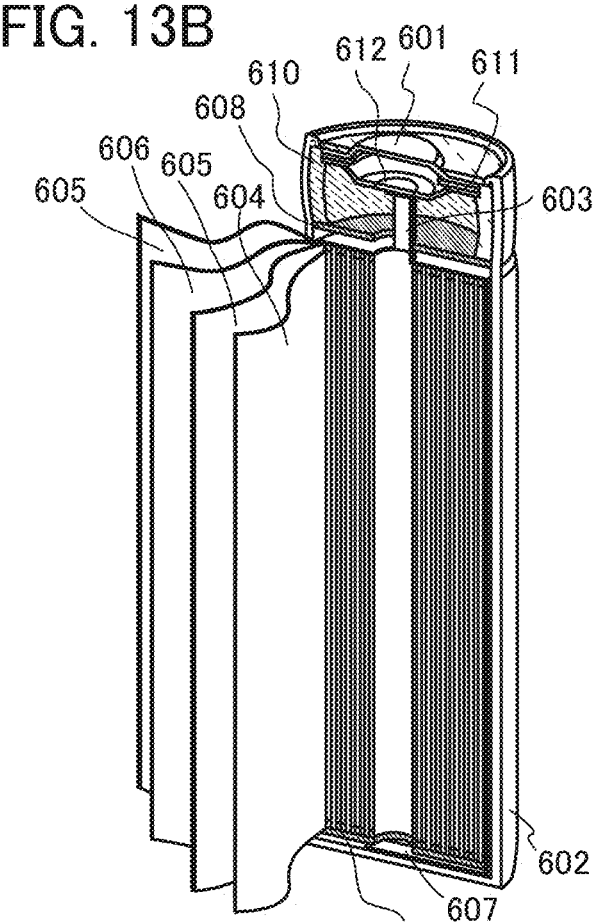

Next, an example of a cylindrical secondary battery is described with reference to FIGS. 13A to 13D. FIG. 13A illustrates an external view of a secondary battery 600. FIG. 13B is a schematic cross-sectional view of the cylindrical secondary battery 600. The cylindrical secondary battery 600 includes, as illustrated in FIG. 13B, a positive electrode cap (battery lid) 601 on the top surface and a battery can (outer can) 602 on the side and bottom surfaces. The positive electrode cap and the battery can (outer can) 602 are insulated from each other by a gasket (insulating gasket) 610.

Inside the battery can 602 having a hollow cylindrical shape, a battery element in which a strip-like positive electrode 604 and a strip-like negative electrode 606 are wound with a strip-like separator 605 located therebetween is provided. Although not illustrated, the battery element is wound around a center pin. One end of the battery can 602 is close and the other end thereof is open. For the battery can 602, a metal having corrosion resistance to an electrolyte solution, such as nickel, aluminum, or titanium, an alloy of such a metal, or an alloy of such a metal and another metal (e.g., stainless steel) can be used. Alternatively, the battery can 602 is preferably covered with nickel, aluminum, or the like in order to prevent corrosion due to the electrolyte solution. Inside the battery can 602, the battery element in which the positive electrode, the negative electrode, and the separator are wound is provided between a pair of insulating plates 608 and 609 that face each other. Furthermore, a nonaqueous electrolyte solution (not illustrated) is injected inside the battery can 602 provided with the battery element. As the nonaqueous electrolyte solution, a nonaqueous electrolyte solution that is similar to that of the coin-type secondary battery can be used.

Since the positive electrode and the negative electrode of the cylindrical storage battery are wound, active materials are preferably formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Barium titanate ($BaTiO_3$)-based semiconductor ceramic or the like can be used for the PTC element.

Figure 13C:
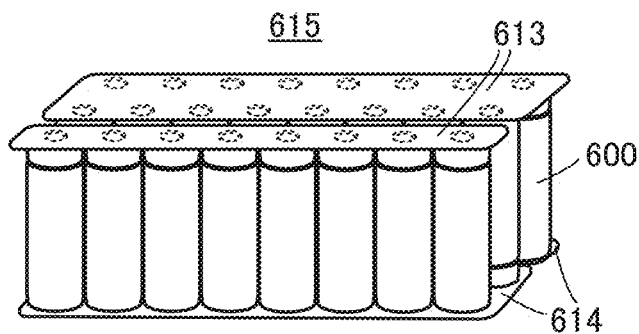

Alternatively, as illustrated in FIG. 13C, a plurality of secondary batteries 600 may be provided between a conductive plate 613 and a conductive plate 614 to form a module 615. The plurality of secondary batteries 600 may be connected in parallel, connected in series, or connected in series after being connected in parallel. With the module 615 including the plurality of secondary batteries 600, large electric power can be extracted.

Figure 13D:
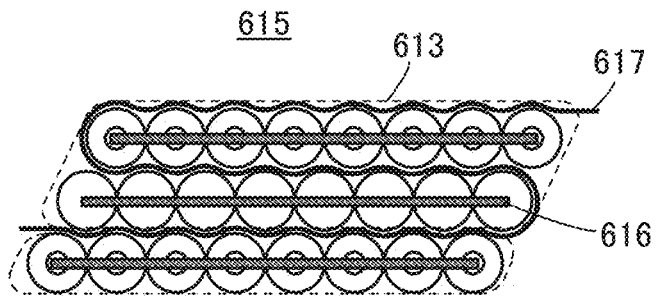

FIG. 13D is a top view of the module 615. The conductive plate 613 is shown by a dotted line for clarity of the drawing. As illustrated in FIG. 13D, the module 615 may include a wiring 616 electrically connecting the plurality of secondary batteries 600 with each other. It is possible to provide the conductive plate over the wiring 616 to overlap with each other. In addition, a temperature control device 617 may be provided between the plurality of secondary batteries 600. The secondary batteries 600 can be cooled with the temperature control device 617 when overheated, whereas the secondary batteries 600 can be heated with the temperature control device 617 when cooled too much. Thus, the performance of the module 615 is less likely to be influenced by the outside temperature. A heating medium included in the temperature control device 617 preferably has an insulating property and incombustibility.

When the positive electrode active material described in the above embodiment is used in the positive electrode 604, the cylindrical secondary battery 600 with high capacity and excellent cycle characteristics can be obtained.

[Structure Examples of Secondary Battery]

Other structure examples of secondary batteries are described with reference to FIGS. 14A and 14B, FIGS. 15A-1, 15A-2, 15B-1, and 15B-2, FIGS. 16A and 16B, FIG. 17, and FIGS. 18A to 18C.

Figure 14A:
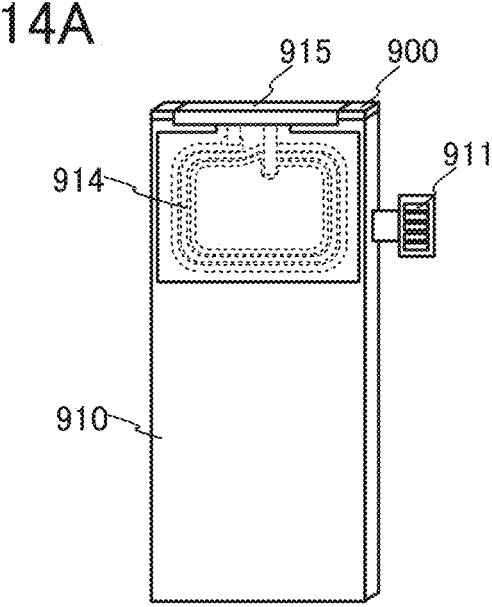
FIGS. 14A and 14B illustrate an example of a secondary battery.
Figure 14B:
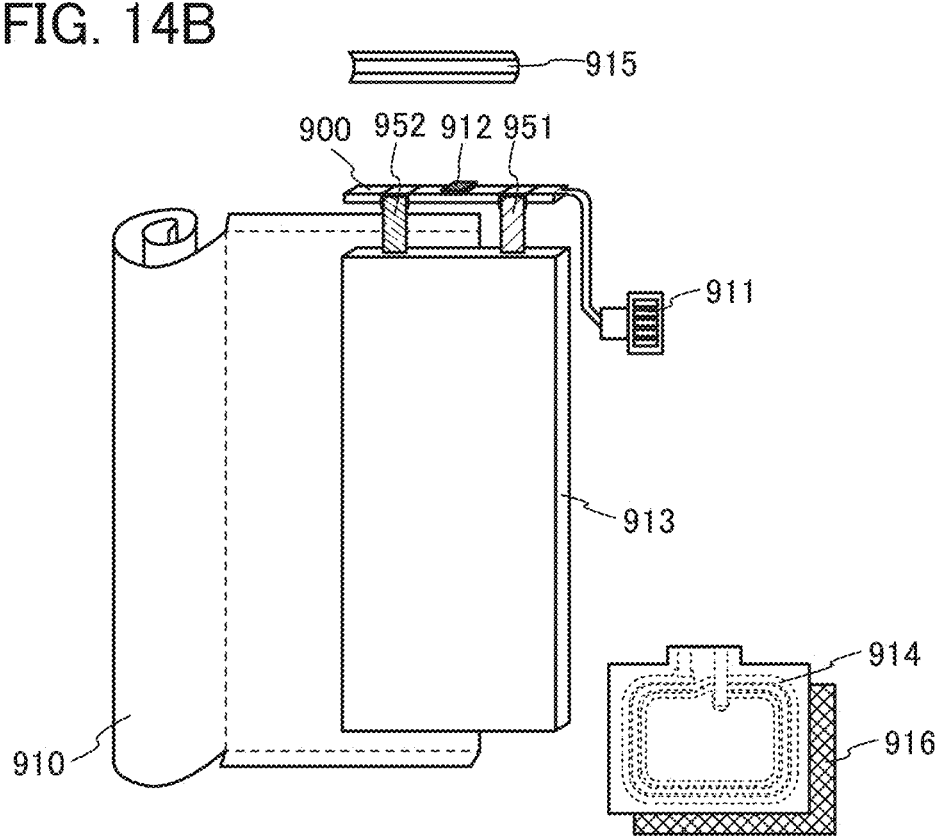

FIGS. 14A and 14B are external views of a secondary battery. A secondary battery 913 is connected to an antenna 914 and an antenna 915 with a circuit board 900 positioned therebetween. A label 910 is attached to the secondary battery 913. In addition, as illustrated in FIG. 14B, the secondary battery 913 is connected to a terminal 951 and a terminal 952.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear surface of the circuit board 900. Note that the shape of each of the antennas 914 and 915 is not limited to a coil shape and may be a linear shape or a plate shape. Furthermore, a planar antenna, an aperture antenna, a traveling-wave antenna, an EH antenna, a magnetic-field antenna, a dielectric antenna, or the like may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

A layer 916 is provided between the secondary battery 913 and the antennas 914 and 915. The layer 916 has a function of blocking an electromagnetic field from the secondary battery 913, for example. As the layer 916, for example, a magnetic body can be used.

Note that the structure of the secondary battery is not limited to that illustrated in FIGS. 14A and 14B.

Figures 1, 15A:
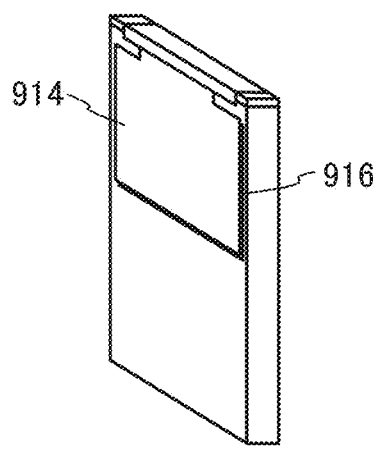
Figures 2, 15A:
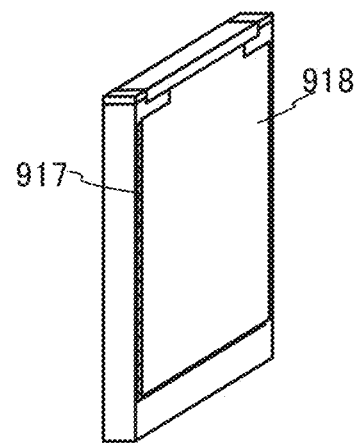

For example, as shown in FIGS. 15A-1 and 15A-2, two opposite surfaces of the secondary battery 913 in FIGS. 14A and 14B may be provided with respective antennas. FIG. 15A-1 is an external view illustrating one side of the opposite surfaces, and FIG. 15A-2 is an external view illustrating the other side of the opposite surfaces. For portions similar to those in FIGS. 14A and 14B, refer to the description of the secondary battery illustrated in FIGS. 14A and 14B as appropriate.

As illustrated in FIG. 15A-1, the antenna 914 is provided on one of the opposite surfaces of the secondary battery 913 with the layer 916 interposed therebetween, and as illustrated in FIG. 15A-2, the antenna 918 is provided on the other of the opposite surfaces of the secondary battery 913 with a layer 917 interposed therebetween. The layer 917 has a function of blocking an electromagnetic field from the secondary battery 913, for example. As the layer 917, for example, a magnetic body can be used.

With the above structure, both of the antennas 914 and 918 can be increased in size. The antenna 918 has a function of communicating data with an external device, for example. An antenna with a shape that can be used for the antenna 914, for example, can be used as the antenna 918. As a system for communication using the antenna 918 between the secondary battery and another device, a response method that can be used between the secondary battery and another device, such as near field communication (NFC), can be employed.

Figures 1, 15B:
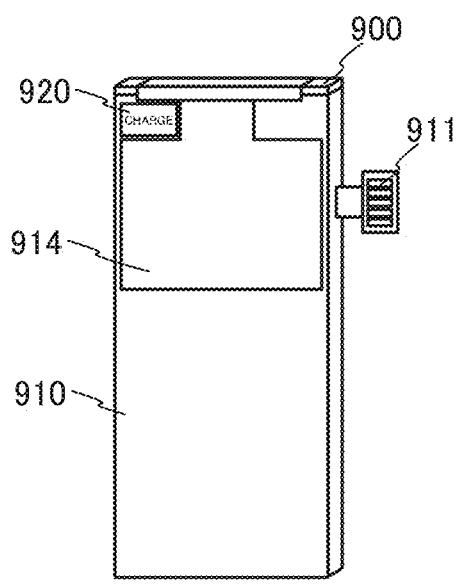
Figures 2, 15B:
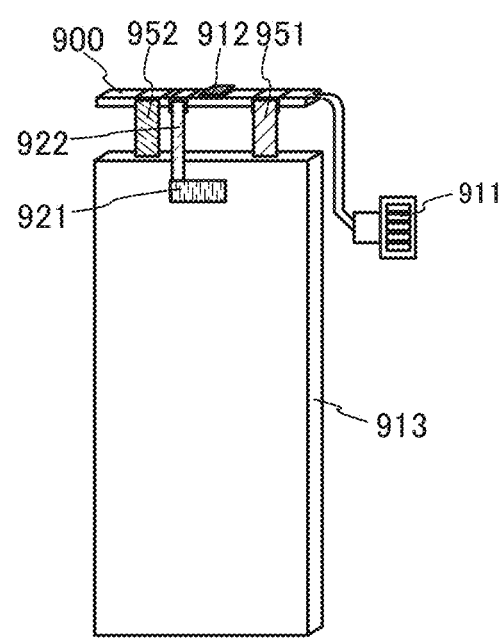

Alternatively, as illustrated in FIG. 15B-1, the secondary battery 913 in FIGS. 14A and 14B may be provided with a display device 920. The display device 920 is electrically connected to the terminal 911. Note that the label 910 is not necessarily provided in a portion where the display device 920 is provided. For portions similar to those in FIGS. 14A and 14B, refer to the description of the secondary battery illustrated in FIGS. 14A and 14B as appropriate.

The display device 920 can display, for example, an image showing whether charging is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Alternatively, as illustrated in FIG. 15B-2, the secondary battery 913 illustrated in FIGS. 14A and 14B may be provided with a sensor 921. The sensor 921 is electrically connected to the terminal 911 via a terminal 922. For portions similar to those in FIGS. 14A and 14B, refer to the description of the secondary battery illustrated in FIGS. 14A and 14B as appropriate.

The sensor 921 has a function of measuring, for example, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays. With the sensor 921, for example, data on an environment (e.g., temperature) where the secondary battery is placed can be acquired and stored in a memory inside the circuit 912.

Furthermore, structure examples of the secondary battery 913 are described with reference to FIGS. 16A and 16B and FIG. 17.

Figure 16A:
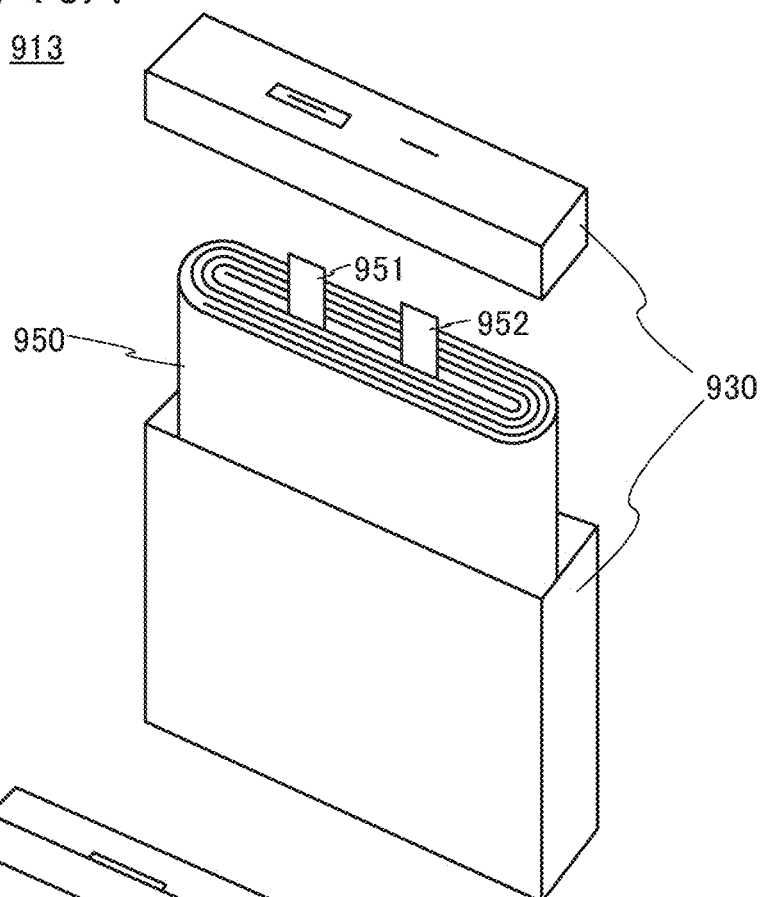
FIGS. 16A and 16B each illustrate an example of a secondary battery.

The secondary battery 913 illustrated in FIG. 16A includes a wound body 950 provided with the terminals 951 and 952 inside a housing 930. The wound body 950 is immersed in an electrolyte solution inside the housing 930. The terminal 952 is in contact with the housing 930. An insulator or the like inhibits contact between the terminal 951 and the housing 930. Note that in FIG. 16A, the housing 930 divided into two pieces is illustrated for convenience; however, in the actual structure, the wound body 950 is covered with the housing 930 and the terminals 951 and 952 extend to the outside of the housing 930. For the housing 930, a metal material (e.g., aluminum) or a resin material can be used.

Figure 16B:
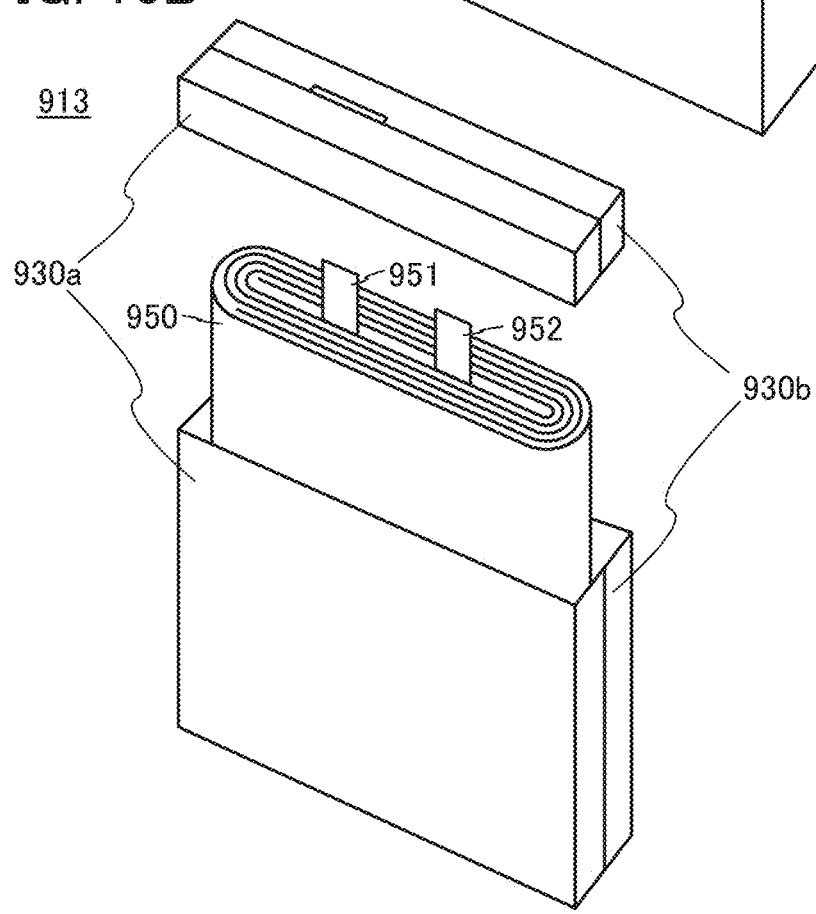

Note that as illustrated in FIG. 16B, the housing 930 in FIG. 16A may be formed using a plurality of materials. For example, in the secondary battery 913 in FIG. 16B, a housing 930a and a housing 930b are bonded to each other, and the wound body 950 is provided in a region surrounded by the housing 930a and the housing 930b.

For the housing 930a, an insulating material such as an organic resin can be used. In particular, when a material such as an organic resin is used for the side on which an antenna is formed, blocking of an electric field from the secondary battery 913 can be inhibited. When an electric field is not significantly blocked by the housing 930a, an antenna such as the antennas 914 and 915 may be provided inside the housing 930a. For the housing 930b, a metal material can be used, for example.

Figure 17:
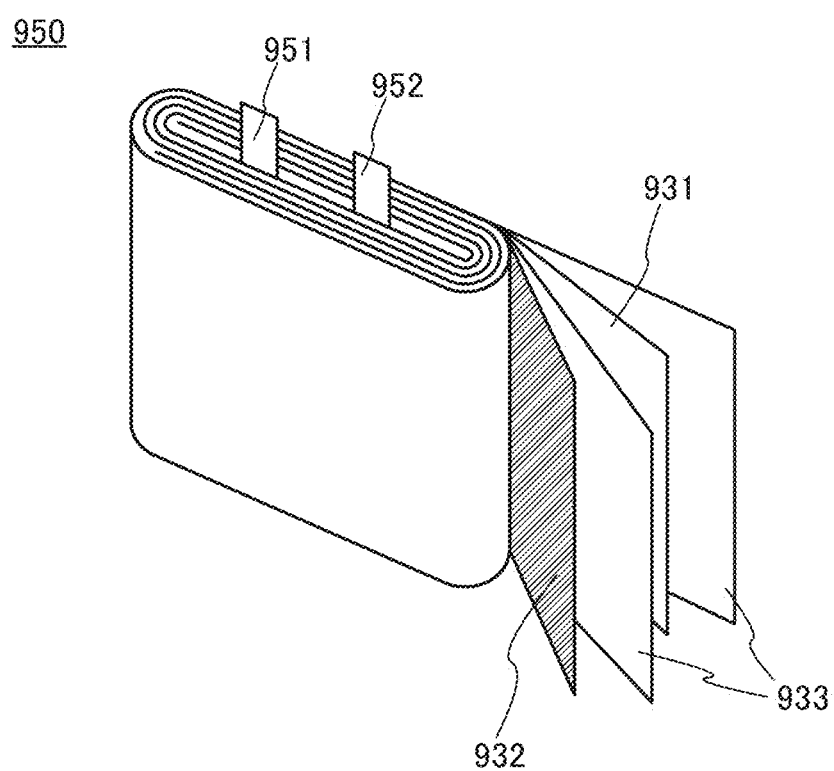
FIG. 17 illustrates an example of a secondary battery.

FIG. 17 illustrates the structure of the wound body 950. The wound body 950 includes a negative electrode 931, a positive electrode 932, and separators 933. The wound body 950 is obtained by winding a sheet of a stack in which the negative electrode 931 overlaps with the positive electrode 932 with the separator 933 provided therebetween. Note that a plurality of stacks each including the negative electrode 931, the positive electrode 932, and the separator 933 may be stacked.

The negative electrode 931 is connected to the terminal 911 in FIGS. 14A and 14B via one of the terminals 951 and 952. The positive electrode 932 is connected to the terminal 911 in FIGS. 14A and 14B via the other of the terminals 951 and 952.

When the positive electrode active material described in the above embodiment is used in the positive electrode 932, the secondary battery 913 with high capacity and excellent cycle characteristics can be obtained.

[Laminated Secondary Battery]

Next, an example of a laminated secondary battery is described with reference to FIGS. 18A to 18C, FIGS. 19A and 19B, FIG. 20, FIG. 21, FIGS. 22A to 22C, FIGS. 23A, 23B1, 23B2, 23C, and 23D, and FIGS. 24A and 24B. When the laminated secondary battery has flexibility and is used in an electronic device at least part of which is flexible, the secondary battery can be bent as the electronic device is bent.

A laminated secondary battery 980 is described with reference to FIGS. 18A to 18C. The laminated secondary battery 980 includes a wound body 993 illustrated in FIG. 18A. The wound body 993 includes a negative electrode 994, a positive electrode 995, and separators 996. The wound body 993 is, like the wound body 950 illustrated in FIG. 17, obtained by winding a sheet of a stack in which the negative electrode 994 overlaps with the positive electrode 995 with the separator 996 provided therebetween.

Note that the number of stacks each including the negative electrode 994, the positive electrode 995, and the separator 996 may be determined as appropriate depending on required capacity and element volume. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

Figure 18A:
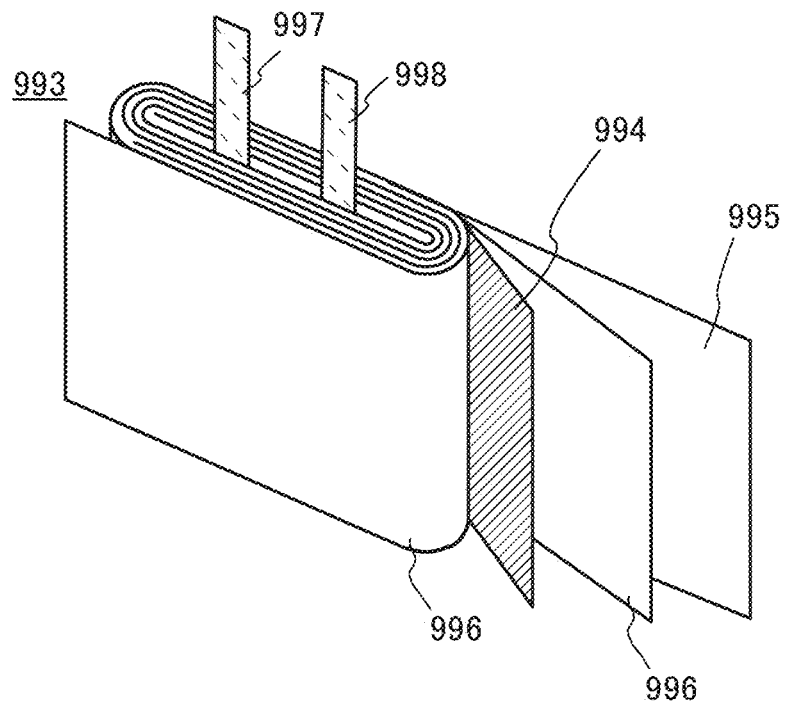
FIGS. 18A to 18C illustrate a laminated secondary battery.
Figure 18B:
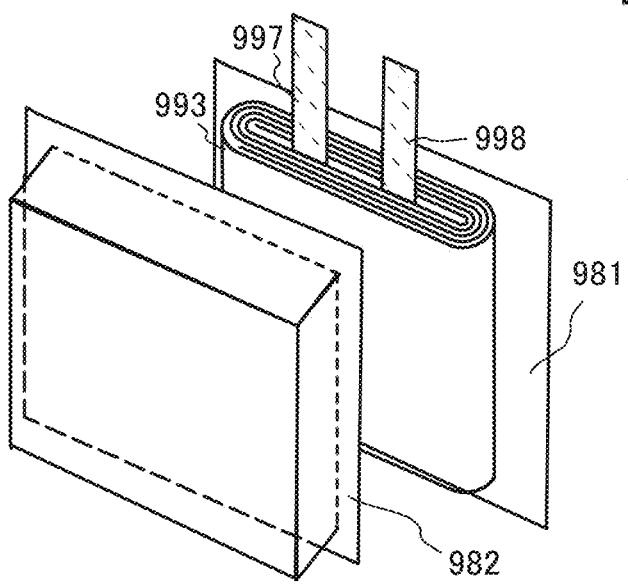
Figure 18C:
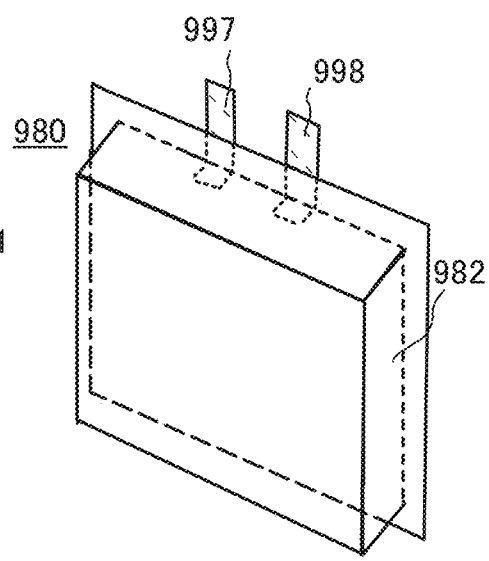

As illustrated in FIG. 18B, the wound body 993 is packed in a space formed by bonding a film 981 and a film 982 having a depressed portion that serve as exterior bodies by thermocompression bonding or the like, whereby the secondary battery 980 illustrated in FIG. 18C can be formed. The wound body 993 includes the lead electrode 997 and the lead electrode 998, and is immersed in an electrolyte solution inside a space surrounded by the film 981 and the film 982 having a depressed portion.

For the film 981 and the film 982 having a depressed portion, a metal material such as aluminum or a resin material can be used, for example. With the use of a resin material for the film 981 and the film 982 having a depressed portion, the film 981 and the film 982 having a depressed portion can be changed in their forms when external force is applied; thus, a flexible storage battery can be manufactured.

Although FIGS. 18B and 18C illustrate an example where a space is formed by two films, the wound body 993 may be placed in a space formed by bending one film.

When the positive electrode active material described in the above embodiment is used in the positive electrode 995, the secondary battery 980 with high capacity and excellent cycle characteristics can be obtained.

Figure 19A:
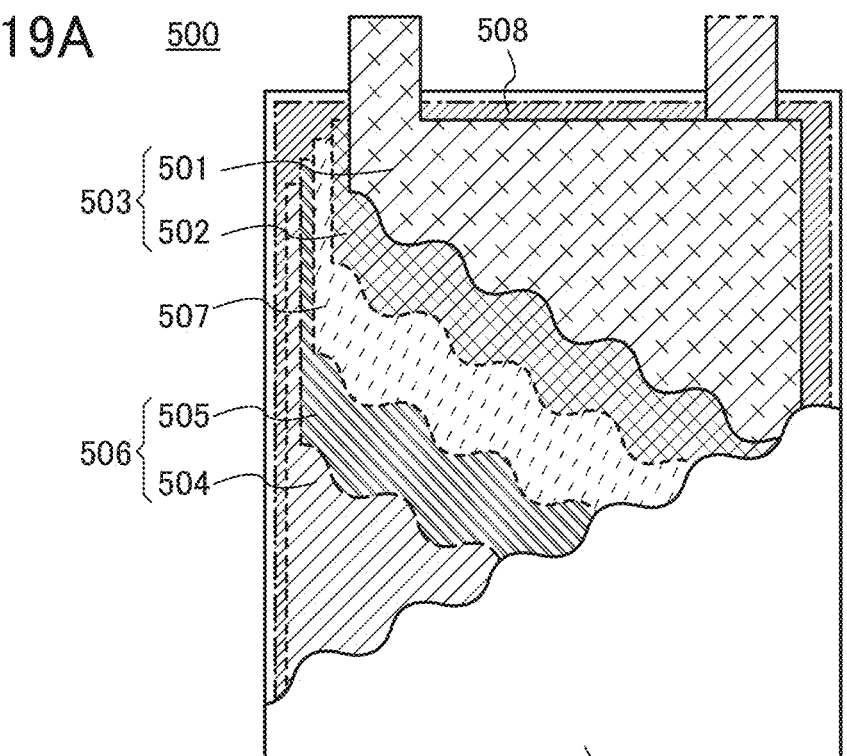
FIGS. 19A and 19B illustrate a laminated secondary battery.
Figure 19B:
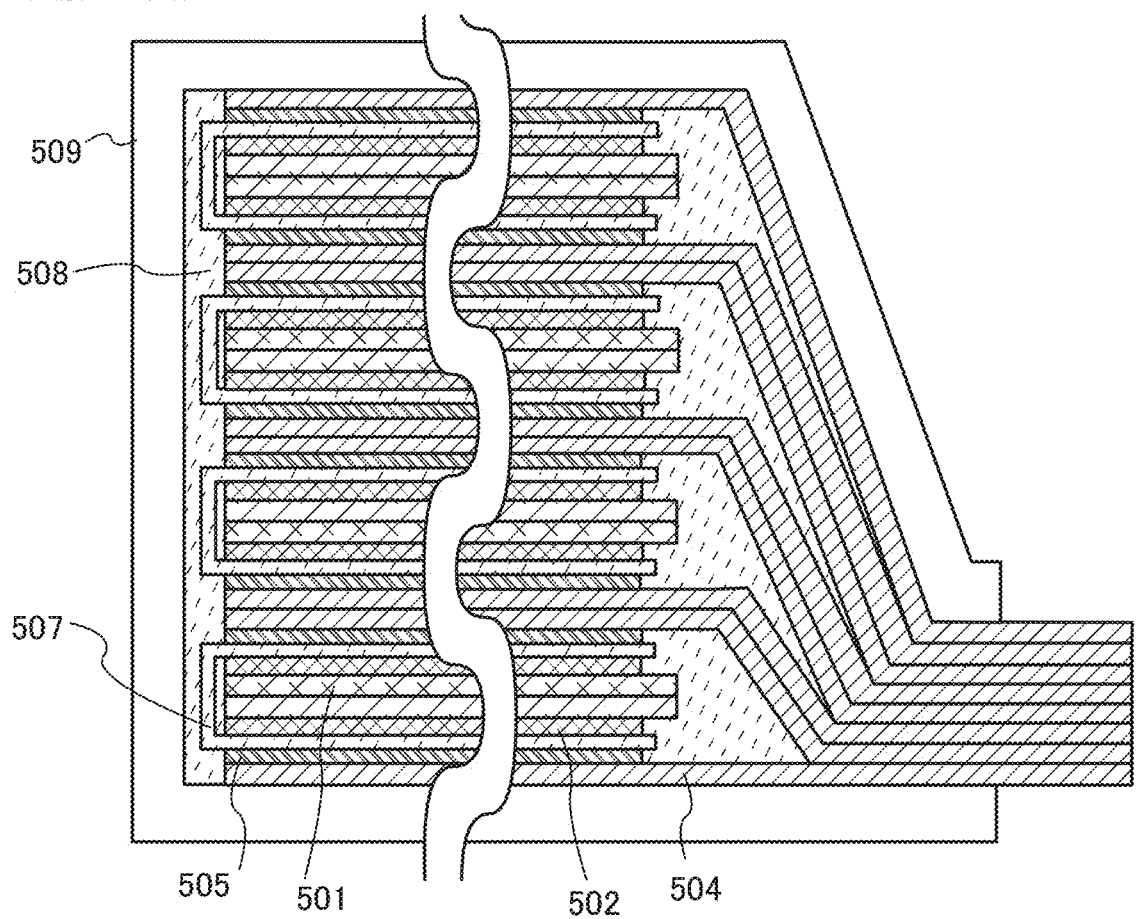

In FIGS. 18A to 18C, an example in which the secondary battery 980 includes a wound body in a space formed by films serving as exterior bodies is described; however, as illustrated in FIGS. 19A and 19B, a secondary battery may include a plurality of strip-shaped positive electrodes, a plurality of strip-shaped separators, and a plurality of strip-shaped negative electrodes in a space formed by films serving as exterior bodies, for example.

A laminated secondary battery 500 illustrated in FIG. 19A includes a positive electrode 503 including a positive electrode current collector 501 and a positive electrode active material layer 502, a negative electrode 506 including a negative electrode current collector 504 and a negative electrode active material layer 505, a separator 507, an electrolyte solution 508, and an exterior body 509. The separator 507 is provided between the positive electrode 503 and the negative electrode 506 in the exterior body 509. The exterior body 509 is filled with the electrolyte solution 508. The electrolyte solution described in Embodiment 2 can be used as the electrolyte solution 508.

In the laminated secondary battery 500 illustrated in FIG. 19A, the positive electrode current collector 501 and the negative electrode current collector 504 also serve as terminals for electrical contact with the outside. For this reason, the positive electrode current collector 501 and the negative electrode current collector 504 may be arranged so that part of the positive electrode current collector 501 and part of the negative electrode current collector 504 are exposed to the outside of the exterior body 509. Alternatively, a lead electrode and the positive electrode current collector 501 or the negative electrode current collector 504 may be bonded to each other by ultrasonic welding, and instead of the positive electrode current collector 501 and the negative electrode current collector 504, the lead electrode may be exposed to the outside of the exterior body 509.

In the laminated secondary battery 500, as the exterior body 509, for example, a laminate film having a three-layer structure where a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide resin, a polyester resin, or the like is provided as the outer surface of the exterior body over the metal thin film can be used.

FIG. 19B illustrates an example of a cross-sectional structure of the laminated secondary battery 500. Although FIG. 19A illustrates an example in which only two current collectors are included for simplicity, an actual battery includes a plurality of electrode layers as illustrated in FIG. 19B.

The example in FIG. 19B includes 16 electrode layers. The laminated secondary battery 500 has flexibility even though including 16 electrode layers. FIG. 19B illustrates a structure including 8 layers of negative electrode current collectors 504 and 8 layers of positive electrode current collectors 501, i.e., 16 layers in total. Note that FIG. 19B illustrates a cross section of the lead portion of the negative electrode, and 8 negative electrode current collectors 504 are bonded to each other by ultrasonic welding. It is needless to say that the number of electrode layers is not limited to 16, and may be more than 16 or less than 16. With a large number of electrode layers, the secondary battery can have high capacity. By contrast, with a small number of electrode layers, the secondary battery can have small thickness and high flexibility.

Figure 20:
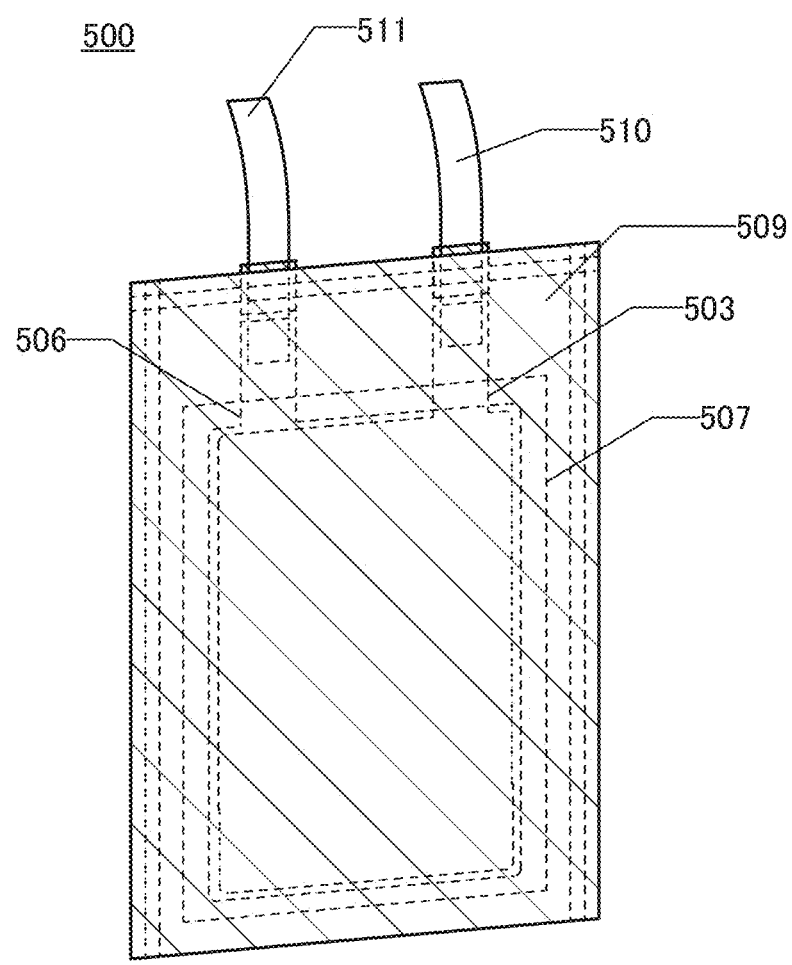
FIG. 20 is an external view of a secondary battery.
Figure 21:
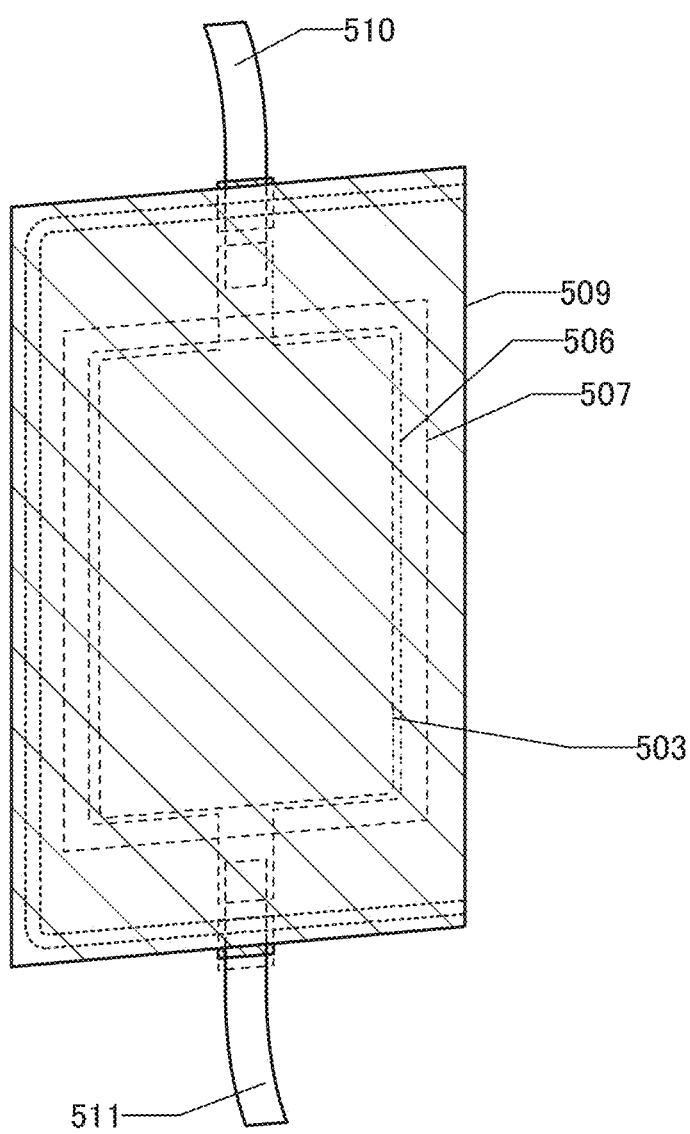
FIG. 21 is an external view of a secondary battery.

FIGS. 20 and 21 each illustrate an example of the external view of the laminated secondary battery 500. In FIGS. 20 and 21, the positive electrode 503, the negative electrode 506, the separator 507, the exterior body 509, a positive electrode lead electrode 510, and a negative electrode lead electrode 511 are included.

Figure 22A:
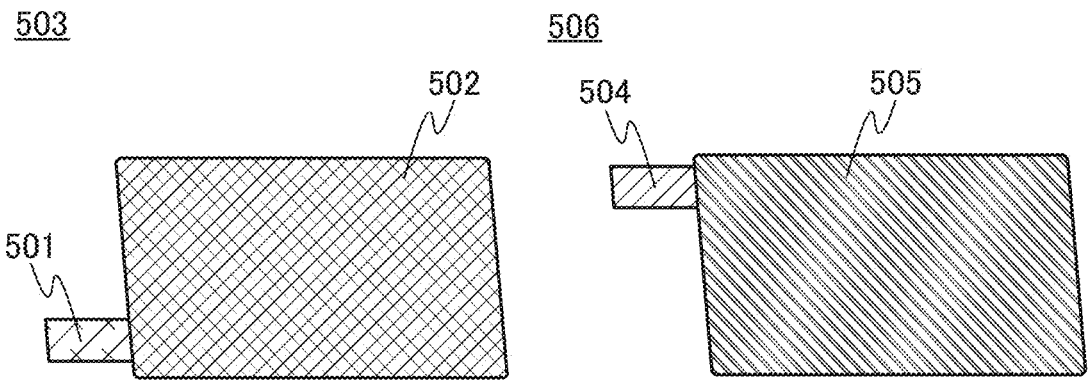
FIGS. 22A to 22C illustrate a manufacturing method of a secondary battery.

FIG. 22A illustrates external views of the positive electrode 503 and the negative electrode 506. The positive electrode 503 includes the positive electrode current collector 501, and the positive electrode active material layer 502 is formed on a surface of the positive electrode current collector 501. The positive electrode 503 also includes a region where the positive electrode current collector 501 is partly exposed (hereinafter, referred to as a tab region). The negative electrode 506 includes the negative electrode current collector 504, and the negative electrode active material layer 505 is formed on a surface of the negative electrode current collector 504. The negative electrode 506 also includes a region where the negative electrode current collector 504 is partly exposed, that is, a tab region. The areas and the shapes of the tab regions included in the positive electrode and the negative electrode are not limited to those illustrated in FIG. 22A.

[Manufacturing Method of Laminated Secondary Battery]

Figure 22B:
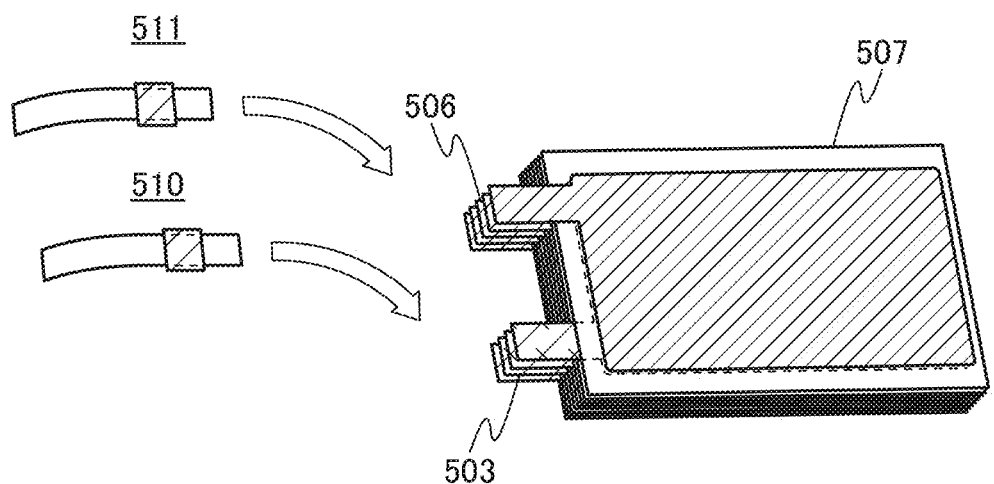

Here, an example of a manufacturing method of the laminated secondary battery whose external view is illustrated in FIG. 20 is described with reference to FIGS. 22B and 22C.

First, the negative electrode 506, the separator 507, and the positive electrode 503 are stacked. FIG. 22B illustrates a stack including the negative electrode 506, the separator 507, and the positive electrode 503. The secondary battery described here as an example includes 5 negative electrodes and 4 positive electrodes. Next, the tab regions of the positive electrodes 503 are bonded to each other, and the tab region of the positive electrode on the outermost surface and the positive electrode lead electrode 510 are bonded to each other. The bonding can be performed by ultrasonic welding, for example. In a similar manner, the tab regions of the negative electrodes 506 are bonded to each other, and the tab region of the negative electrode on the outermost surface and the negative electrode lead electrode 511 are bonded to each other.

After that, the negative electrode 506, the separator 507, and the positive electrode 503 are placed over the exterior body 509.

Figure 22C:
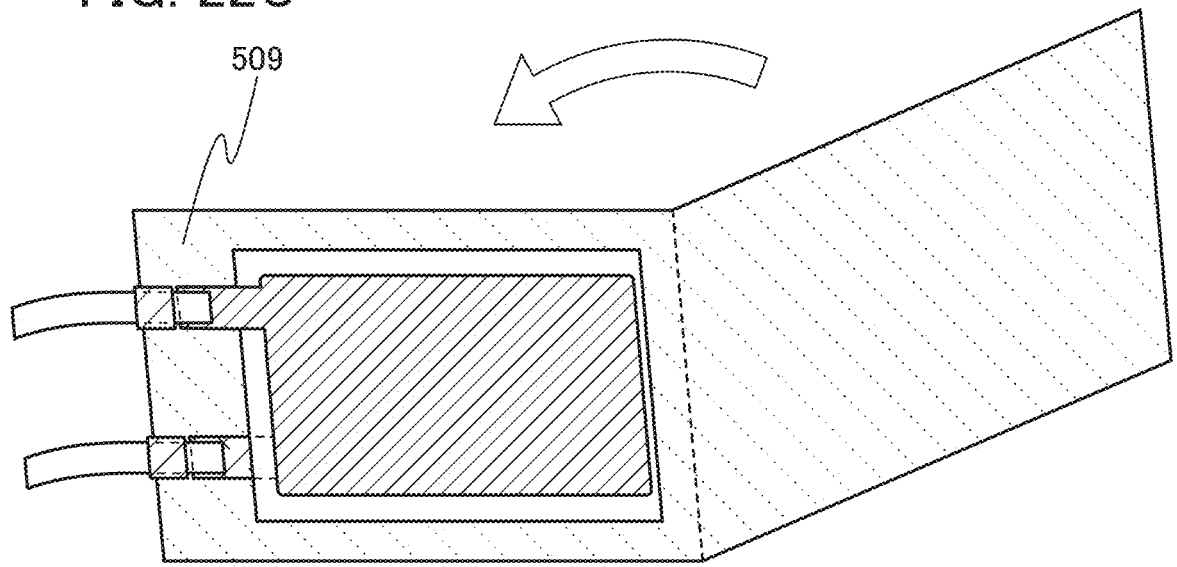

Subsequently, the exterior body 509 is folded along a dashed line as illustrated in FIG. 22C. Then, the outer edges of the exterior body 509 are bonded to each other. The bonding can be performed by thermocompression, for example. At this time, a part (or one side) of the exterior body 509 is left unbonded (to provide an inlet) so that the electrolyte solution 508 can be introduced later.

Next, the electrolyte solution 508 (not illustrated) is introduced into the exterior body 509 from the inlet of the exterior body 509. The electrolyte solution 508 is preferably introduced in a reduced pressure atmosphere or in an inert atmosphere. Lastly, the inlet is sealed by bonding. In the above manner, the laminated secondary battery 500 can be manufactured.

When the positive electrode active material described in the above embodiment is used in the positive electrode 503, the secondary battery 500 with high capacity and excellent cycle characteristics can be obtained.

[Bendable Secondary Battery]

Next, an example of a bendable secondary battery is described with reference to FIGS. 23A, 23B1, 23B2, 23C, and 23D and FIGS. 24A and 24B.

FIG. 23A is a schematic top view of a bendable secondary battery 250. FIGS. 23B1, 23B2, and 23C are schematic cross-sectional views taken along the cutting line C1-C2, the cutting line C3-C4, and the cutting line A1-A2, respectively, in FIG. 23A. The secondary battery 250 includes an exterior body 251 and a positive electrode 211a and a negative electrode 211b held in the exterior body 251. A lead 212a electrically connected to the positive electrode 211a and a lead 212b electrically connected to the negative electrode 211b are extended to the outside of the exterior body 251. In addition to the positive electrode 211a and the negative electrode 211b, an electrolyte solution (not illustrated) is enclosed in a region surrounded by the exterior body 251.

Figure 24A:
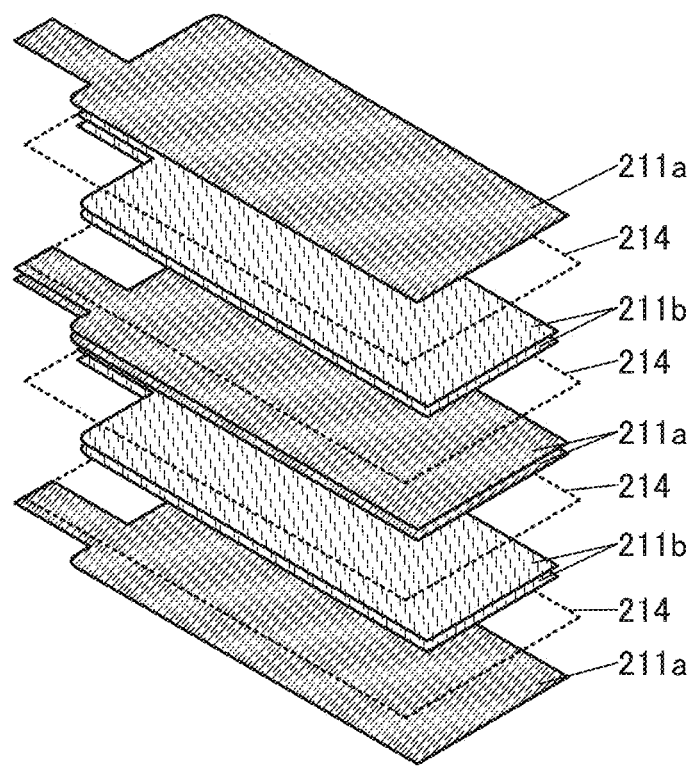
FIGS. 24A and 24B illustrate a bendable secondary battery.
Figure 24B:
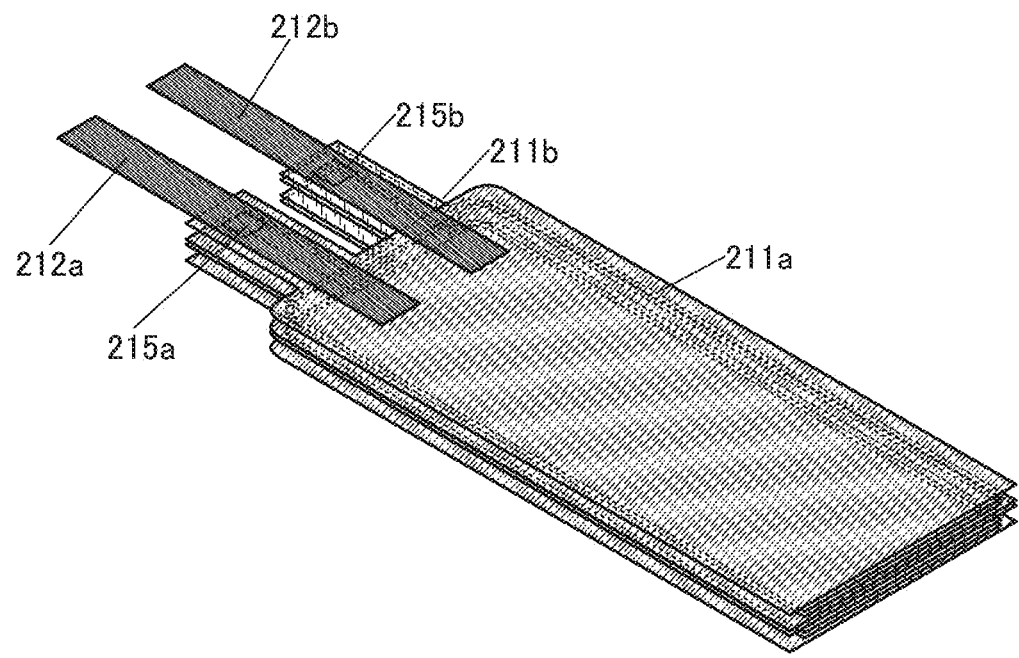

FIGS. 24A and 24B illustrate the positive electrode 211a and the negative electrode 211b included in the secondary battery 250. FIG. 24A is a perspective view illustrating the stacking order of the positive electrode 211a, the negative electrode 211b, and a separator 214. FIG. 24B is a perspective view illustrating the lead 212a and the lead 212b in addition to the positive electrode 211a and the negative electrode 211b.

As illustrated in FIG. 24A, the secondary battery 250 includes a plurality of strip-shaped positive electrodes 211a, a plurality of strip-shaped negative electrodes 211b, and a plurality of separators 214. The positive electrode 211a and the negative electrode 211b each include a projected tab portion and a portion other than the tab portion. A positive electrode active material layer is formed on one surface of the positive electrode 211a other than the tab portion, and a negative electrode active material layer is formed on one surface of the negative electrode 211b other than the tab portion.

The positive electrodes 211a and the negative electrodes 211b are stacked so that surfaces of the positive electrodes 211a on each of which the positive electrode active material is not formed are in contact with each other and that surfaces of the negative electrodes 211b on each of which the negative electrode active material is not formed are in contact with each other.

Furthermore, the separator 214 is provided between the surface of the positive electrode 211a on which the positive electrode active material is formed and the surface of the negative electrode 211b on which the negative electrode active material is formed. In FIG. 24A, the separator 214 is shown by a dotted line for easy viewing.

In addition, as illustrated in FIG. 24B, the plurality of positive electrodes 211a are electrically connected to the lead 212a in a bonding portion 215a. The plurality of negative electrodes 211b are electrically connected to the lead 212b in a bonding portion 215b.

Next, the exterior body 251 is described with reference to FIGS. 23B1, 23B2, 23C, and 23D.

The exterior body 251 has a film-like shape and is folded in half with the positive electrodes 211a and the negative electrodes 211b between facing portions of the exterior body 251. The exterior body 251 includes a folded portion 261, a pair of seal portions 262, and a seal portion 263. The pair of seal portions 262 is provided with the positive electrodes 211a and the negative electrodes 211b positioned therebetween and thus can also be referred to as side seals. The seal portion 263 includes portions overlapping with the lead 212a and the lead 212b and can also be referred to as a top seal.

Part of the exterior body 251 that overlaps with the positive electrodes 211a and the negative electrodes 211b preferably has a wave shape in which crest lines 271 and trough lines 272 are alternately arranged. The seal portions 262 and the seal portion 263 of the exterior body 251 are preferably flat.

FIG. 23B1 shows a cross section along the part overlapping with the crest line 271. FIG. 23B2 shows a cross section along the part overlapping with the trough line 272. FIGS. 23B1 and 23B2 correspond to cross sections of the secondary battery 250, the positive electrodes 211a, and the negative electrodes 211b in the width direction.

Here, the distance between end portions of the positive electrode 211a and the negative electrode 211b in the width direction and the seal portion 262, that is, the distance between the end portions of the positive electrode 211a and the negative electrode 211b and the seal portion 262 is referred to as a distance La. When the secondary battery 250 changes in shape, for example, is bent, the positive electrode 211a and the negative electrode 211b change in shape such that the positions thereof are shifted from each other in the length direction as described later. At the time, if the distance La is too short, the exterior body 251 and the positive electrode 211a and the negative electrode 211b are rubbed hard against each other, so that the exterior body 251 is damaged in some cases. In particular, when a metal film of the exterior body 251 is exposed, the metal film might be corroded by the electrolyte solution. Therefore, the distance La is preferably set as long as possible. However, if the distance La is too long, the volume of the secondary battery 250 is increased.

The distance La between the positive and negative electrodes 211a and 211b and the seal portion 262 is preferably increased as the total thickness of the stacked positive electrodes 211a and negative electrodes 211b is increased.

Specifically, when the total thickness of the stacked positive electrodes 211a, negative electrodes 211b, and separators 214 (not illustrated) is referred to as a thickness t, the distance La is preferably 0.8 times or more and 3.0 times or less, further preferably 0.9 times or more and 2.5 times or less, and still further preferably 1.0 times or more and 2.0 times or less as large as the thickness t. When the distance La is in the above range, a compact battery highly reliable for bending can be obtained.

Furthermore, when the distance between the pair of seal portions 262 is referred to as a distance Lb, it is preferred that the distance Lb be sufficiently longer than the widths of the positive electrode 211a and the negative electrode 211b (here, a width Wb of the negative electrode 211b). In that case, even when the positive electrode 211a and the negative electrode 211b come into contact with the exterior body 251 by change in the shape of the secondary battery 250, such as repeated bending, the position of part of the positive electrode 211a and the negative electrode 211b can be shifted in the width direction; thus, the positive and negative electrodes 211a and 211b and the exterior body 251 can be effectively prevented from being rubbed against each other.

For example, the difference between the distance Lb (i.e., the distance between the pair of seal portions 262) and the width Wb of the negative electrode 211b is preferably 1.6 times or more and 6.0 times or less, further preferably 1.8 times or more and 5.0 times or less, and still further preferably 2.0 times or more and 4.0 times or less as large as the thickness t of the positive electrode 211a and the negative electrode 211b.

In other words, the distance Lb, the width Wb, and the thickness t preferably satisfy the relationship of Formula 1 below.

[Formula 1]

$$Lb - Wb/2t \geq a \quad \text{(Formula 1)}$$

In the formula, a is 0.8 or more and 3.0 or less, preferably 0.9 or more and 2.5 or less, further preferably 1.0 or more and 2.0 or less.

FIG. 23C illustrates a cross section including the lead 212a and corresponds to a cross section of the secondary battery 250, the positive electrode 211a, and the negative electrode 211b in the length direction. As illustrated in FIG. 23C, a space 273 is preferably provided between the end portions of the positive electrode 211a and the negative electrode 211b in the length direction and the exterior body 251 in the folded portion 261.

FIG. 23D is a schematic cross-sectional view of the secondary battery 250 in a state of being bent. FIG. 23D corresponds to a cross section along the cutting line B1-B2 in FIG. 23A.

When the secondary battery 250 is bent, a part of the exterior body 251 positioned on the outer side in bending is unbent and the other part positioned on the inner side changes its shape as it shrinks. More specifically, the part of the exterior body 251 positioned on the outer side in bending changes its shape such that the wave amplitude becomes smaller and the length of the wave period becomes larger. By contrast, the part of the exterior body 251 positioned on the inner side changes its shape such that the wave amplitude becomes larger and the length of the wave period becomes smaller. When the exterior body 251 changes its shape in this manner, stress applied to the exterior body 251 due to bending is relieved, so that a material itself of the exterior body 251 does not need to expand and contract. Thus, the secondary battery 250 can be bent with weak force without damage to the exterior body 251.

Furthermore, as illustrated in FIG. 23D, when the secondary battery 250 is bent, the positions of the positive electrode 211a and the negative electrode 211b are shifted relatively. At this time, ends of the stacked positive electrodes 211a and negative electrodes 211b on the seal portion 263 side are fixed by a fixing member 217. Thus, the plurality of positive electrodes 211a and the plurality of negative electrodes 211b are more shifted at a position closer to the folded portion 261. Therefore, stress applied to the positive electrode 211a and the negative electrode 211b is relieved, and the positive electrode 211a and the negative electrode 211b themselves do not need to expand and contract. Consequently, the secondary battery 250 can be bent without damage to the positive electrode 211a and the negative electrode 211b.

Furthermore, the space 273 is provided between the positive and negative electrodes 211a and 211b and the exterior body 251, whereby the relative positions of the positive electrode 211a and the negative electrode 211b can be shifted while the positive electrode 211a and the negative electrode 211b located on an inner side when the secondary battery 250 is bent do not come in contact with the exterior body 251.

In the secondary battery 250 illustrated in FIGS. 23A, 23B1, 23B2, 23C, and 23D and FIGS. 24A and 24B, the exterior body, the positive electrode 211a, and the negative electrode 211b are less likely to be damaged and the battery characteristics are less likely to deteriorate even when the secondary battery 250 is repeatedly bent and unbent. When the positive electrode active material described in the above embodiment are used in the positive electrode 211a included in the secondary battery 250, a battery with more excellent cycle characteristics can be obtained.

Embodiment 4

In this embodiment, examples of electronic devices each including the secondary battery of one embodiment of the present invention are described.

First, FIGS. 25A to 25G show examples of electronic devices including the bendable secondary battery described in Embodiment 3. Examples of electronic devices each including a bendable secondary battery include television sets (also referred to as televisions or television receivers), monitors of computers or the like, digital cameras and digital video cameras, digital photo frames, mobile phones (also referred to as cellular phones or mobile phone devices), portable game machines, portable information terminals, audio reproducing devices, and large game machines such as pachinko machines.

In addition, a flexible secondary battery can be incorporated along a curved inside/outside wall surface of a house or a building or a curved interior/exterior surface of an automobile.

Figure 25A:
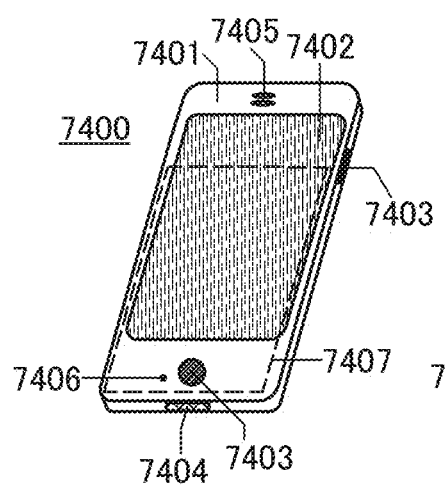
FIGS. 25A to 25H illustrates examples of electronic devices.

FIG. 25A illustrates an example of a mobile phone. A mobile phone 7400 is provided with a display portion 7402 incorporated in a housing 7401, operation buttons 7403, an external connection port 7404, a speaker 7405, a microphone 7406, and the like. Note that the mobile phone 7400 includes a secondary battery 7407. When the secondary battery of one embodiment of the present invention is used as the secondary battery 7407, a lightweight mobile phone with a long lifetime can be provided.

Figure 25B:
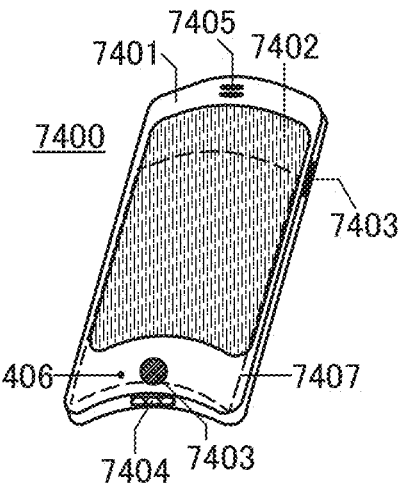
Figure 25C:
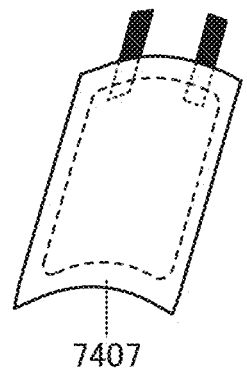

FIG. 25B illustrates the mobile phone 7400 that is bent. When the whole mobile phone 7400 is bent by the external force, the secondary battery 7407 included in the mobile phone 7400 is also bent. FIG. 25C illustrates the curved secondary battery 7407. The secondary battery 7407 is a thin storage battery. The secondary battery 7407 is fixed in a state of being bent. Note that the secondary battery 7407 includes a lead electrode electrically connected to a current collector. The current collector is, for example, copper foil, and partly alloyed with gallium; thus, adhesion between the current collector and an active material layer in contact with the current collector is improved and the secondary battery 7407 can have high reliability even in a state of being bent.

Figure 25D:
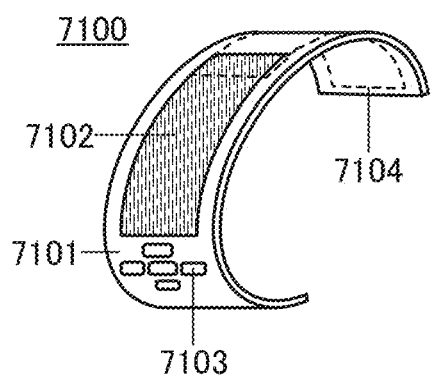
Figure 25E:

FIG. 25D illustrates an example of a bangle-type display device. A portable display device 7100 includes a housing 7101, a display portion 7102, operation buttons 7103, and a secondary battery 7104. FIG. 25E illustrates the curved secondary battery 7104. When the display device is worn on a user's arm while the secondary battery 7104 is bent, the housing changes its shape and the curvature of part or the whole of the secondary battery 7104 is changed. Note that the radius of curvature of a curve at a point refers to the radius of the circular arc that best approximates the curve at that point. The reciprocal of the radius of curvature is curvature. Specifically, part or the whole of the housing or the main surface of the secondary battery 7104 is changed in the range of radius of curvature from 40 mm to 150 mm inclusive. When the radius of curvature at the main surface of the secondary battery 7104 is greater than or equal to 40 mm and less than or equal to 150 mm, the reliability can be kept high. When the secondary battery of one embodiment of the present invention is used as the secondary battery 7104, a lightweight portable display device with a long lifetime can be provided.

Figure 25F:
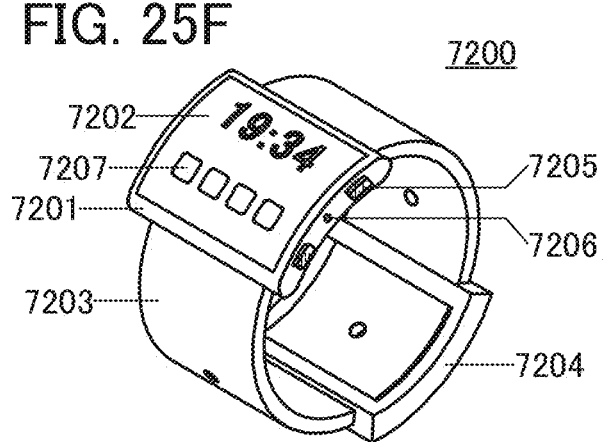

FIG. 25F illustrates an example of a watch-type portable information terminal. A portable information terminal 7200 includes a housing 7201, a display portion 7202, a band 7203, a buckle 7204, an operation button 7205, an input/output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power on/off, on/off of wireless communication, setting and cancellation of a silent mode, and setting and cancellation of a power saving mode can be performed. For example, the functions of the operation button 7205 can be set freely by setting the operation system incorporated in the portable information terminal 7200.

The portable information terminal 7200 can employ near field communication that is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input/output terminal 7206, and data can be directly transmitted to and received from another information terminal via a connector. In addition, charging via the input/output terminal 7206 is possible. Note that the charging operation may be performed by wireless power feeding without using the input/output terminal 7206.

The display portion 7202 of the portable information terminal 7200 includes the secondary battery of one embodiment of the present invention. When the secondary battery of one embodiment of the present invention is used, a lightweight portable information terminal with a long lifetime can be provided. For example, the secondary battery 7104 illustrated in FIG. 25E that is in the state of being curved can be provided in the housing 7201. Alternatively, the secondary battery 7104 illustrated in FIG. 25E can be provided in the band 7203 such that it can be curved.

The portable information terminal 7200 preferably includes a sensor. As the sensor, for example a human body sensor such as a fingerprint sensor, a pulse sensor, or a temperature sensor, a touch sensor, a pressure sensitive sensor, or an acceleration sensor is preferably mounted.

Figure 25G:
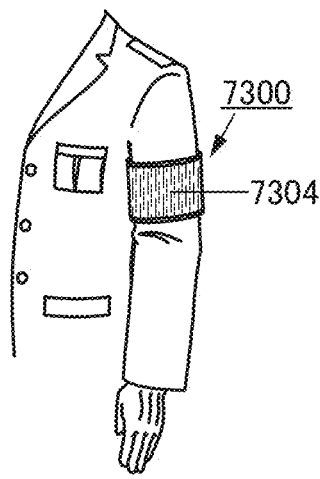

FIG. 25G illustrates an example of an armband display device. A display device 7300 includes a display portion 7304 and the secondary battery of one embodiment of the present invention. The display device 7300 can include a touch sensor in the display portion 7304 and can serve as a portable information terminal.

The display surface of the display portion 7304 is curved, and images can be displayed on the curved display surface. A display state of the display device 7300 can be changed by, for example, near field communication, which is a communication method based on an existing communication standard.

The display device 7300 includes an input/output terminal, and data can be directly transmitted to and received from another information terminal via a connector. In addition, charging via the input/output terminal is possible. Note that the charging operation may be performed by wireless power feeding without using the input/output terminal.

When the secondary battery of one embodiment of the present invention is used as the secondary battery included in the display device 7300, a lightweight display device with a long lifetime can be provided.

In addition, examples of electronic devices each including the secondary battery with excellent cycle characteristics described in the above embodiment are described with reference to FIG. 25H, FIGS. 26A to 26C, and FIG. 27.

When the secondary battery of one embodiment of the present invention is used as a secondary battery of a daily electronic device, a lightweight product with a long lifetime can be provided. Examples of the daily electronic device include an electric toothbrush, an electric shaver, and electric beauty equipment. As secondary batteries of these products, small and lightweight stick type secondary batteries with high capacity are desired in consideration of handling ease for users.

Figure 25H:
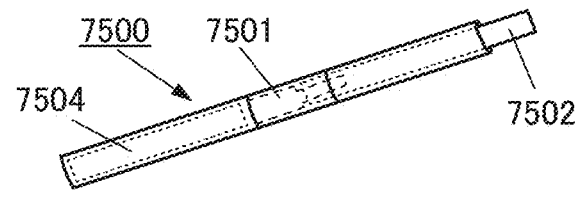

FIG. 25H is a perspective view of a device called a vaporizer (electronic cigarette). In FIG. 25H, an electronic cigarette 7500 includes an atomizer 7501 including a heating element, a secondary battery 7504 that supplies power to the atomizer, and a cartridge 7502 including a liquid supply bottle, a sensor, and the like. To improve safety, a protection circuit that prevents overcharge and overdischarge of the secondary battery 7504 may be electrically connected to the secondary battery 7504. The secondary battery 7504 in FIG. 25H includes an external terminal for connection to a charger. When the electronic cigarette 7500 is held by a user, the secondary battery 7504 becomes a tip portion; thus, it is preferred that the secondary battery 7504 have a short total length and be lightweight. With the secondary battery of one embodiment of the present invention, which has high capacity and excellent cycle characteristics, the small and lightweight electronic cigarette 7500 that can be used for a long time over a long period can be provided.

Figure 26A:
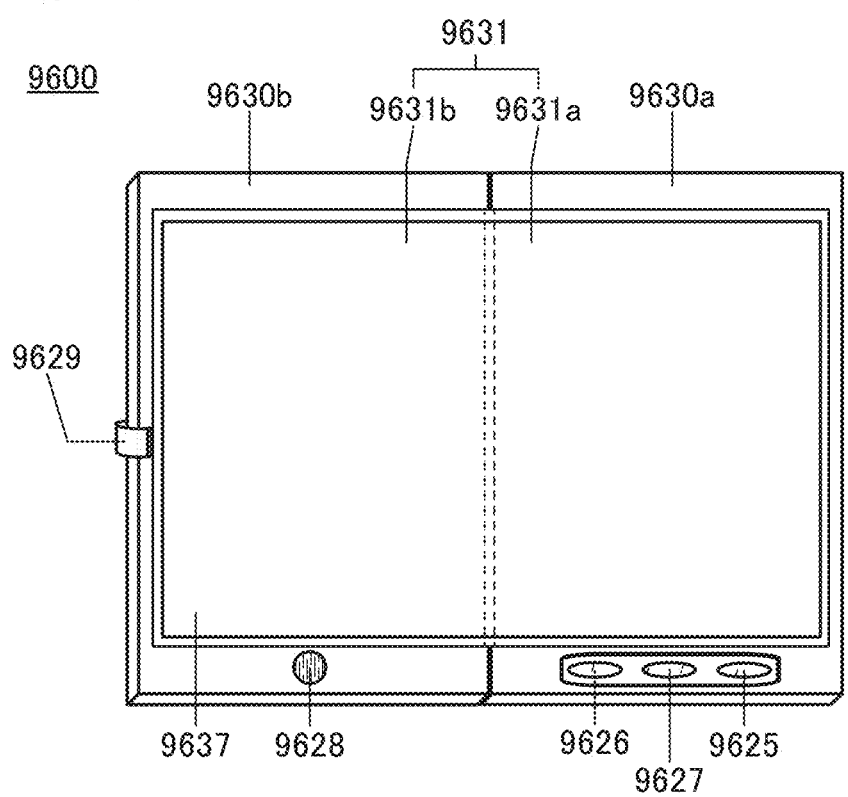
FIGS. 26A to 26C illustrate an example of an electronic device.
Figure 26B:
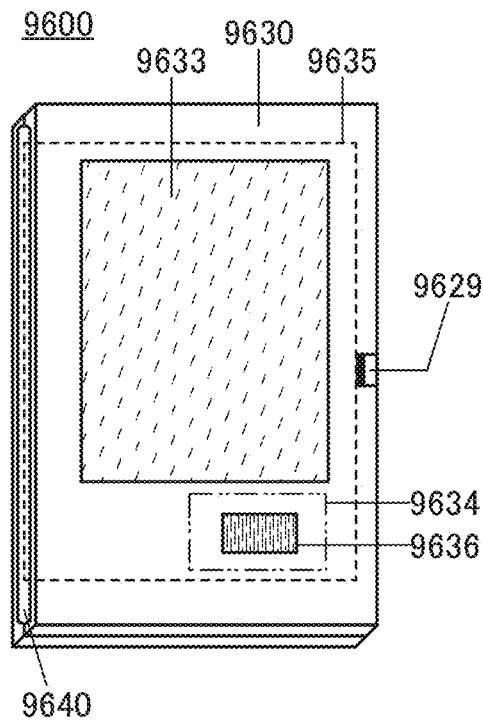

Next, FIGS. 26A and 26B illustrate an example of a tablet terminal that can be folded in half. A tablet terminal 9600 illustrated in FIGS. 26A and 26B includes a housing 9630a, a housing 9630b, a movable portion 9640 connecting the housings 9630a and 9630b, a display portion 9631 including a display portion 9631a and a display portion 9631b, switches 9625 to 9627, a fastener 9629, and an operation switch 9628. A flexible panel is used for the display portion 9631, whereby a tablet terminal with a larger display portion can be provided. FIG. 26A illustrates the tablet terminal 9600 that is opened, and FIG. 26B illustrates the tablet terminal 9600 that is closed.

The tablet terminal 9600 includes a power storage unit 9635 inside the housings 9630a and 9630b. The power storage unit 9635 is provided across the housings 9630a and 9630b, passing through the movable portion 9640.

Part of or the entire display portion 9631 can be a touch panel region, and data can be input by touching text, an input form, an image including an icon, and the like displayed on the region. For example, it is possible that keyboard buttons are displayed on the entire display portion 9631a on the housing 9630a side, and data such as text or an image is displayed on the display portion 9631b on the housing 9630b side.

In addition, it is possible that a keyboard is displayed on the display portion 9631b on the housing 9630b side, and data such as text or an image is displayed on the display portion 9631a on the housing 9630a side. Furthermore, it is possible that a switching button for showing/hiding a keyboard on a touch panel is displayed on the display portion 9631 and the button is touched with a finger, a stylus, or the like to display keyboard buttons on the display portion 9631.

In addition, touch input can be performed concurrently in a touch panel region in the display portion 9631a on the housing 9630a side and a touch panel region in the display portion 9631b on the housing 9630b side.

The switches 9625 to 9627 may function not only as an interface for operating the tablet terminal 9600 but also as an interface that can switch various functions. For example, at least one of the switches 9625 to 9627 may have a function of switching on/off of the tablet terminal 9600. For another example, at least one of the switches 9625 to 9627 may have a function of switching display between a portrait mode and a landscape mode and a function of switching display between monochrome display and color display. For another example, at least one of the switches 9625 to 9627 may have a function of adjusting the luminance of the display portion 9631. The display luminance of the display portion 9631 can be controlled in accordance with the amount of external light in use of the tablet terminal 9600 detected by an optical sensor incorporated in the tablet terminal 9600. Note that another sensing device including a sensor for measuring inclination, such as a gyroscope sensor or an acceleration sensor, may be incorporated in the tablet terminal, in addition to the optical sensor.

The display portion 9631a on the housing 9630a side and the display portion 9631b on the housing 9630b side have substantially the same display area in FIG. 26A; however, there is no particular limitation on the display areas of the display portions 9631a and 9631b, and the display portions may have different areas or different display quality. For example, one of the display portions 9631a and 9631b may display higher definition images than the other.

The tablet terminal 9600 is folded in half in FIG. 26B. The tablet terminal 9600 includes a housing 9630, a solar cell 9633, and a charge and discharge control circuit 9634 including a DCDC converter 9636. The power storage unit of one embodiment of the present invention is used as the power storage unit 9635.

As described above, the tablet terminal 9600 can be folded in half such that the housings 9630a and 9630b overlap with each other when not in use. Thus, the display portion 9631 can be protected, which increases the durability of the tablet terminal 9600. With the power storage unit 9635 including the secondary battery of one embodiment of the present invention, which has high capacity and excellent cycle characteristics, the tablet terminal 9600 that can be used for a long time over a long period can be provided.

The tablet terminal 9600 illustrated in FIGS. 26A and 26B can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal 9600, supplies electric power to a touch panel, a display portion, a video signal processing portion, and the like. Note that the solar cell 9633 can be provided on one or both surfaces of the housing 9630 and the power storage unit 9635 can be charged efficiently. The use of a lithium-ion battery as the power storage unit 9635 brings an advantage such as a reduction in size.

Figure 26C:
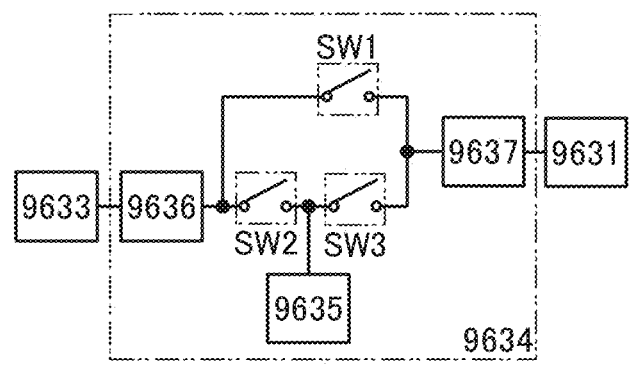

The structure and operation of the charge and discharge control circuit 9634 illustrated in FIG. 26B will be described with reference to a block diagram in FIG. 26C. The solar cell 9633, the power storage unit 9635, the DCDC converter 9636, a converter 9637, switches SW1 to SW3, and the display portion 9631 are illustrated in FIG. 26C, and the power storage unit 9635, the DCDC converter 9636, the converter 9637, and the switches SW1 to SW3 correspond to the charge and discharge control circuit 9634 in FIG. 26B.

First, an operation example in which electric power is generated by the solar cell 9633 using external light is described. The voltage of electric power generated by the solar cell is raised or lowered by the DCDC converter 9636 to a voltage for charging the power storage unit 9635. When the display portion 9631 is operated with the electric power from the solar cell 9633, the switch SW1 is turned on and the voltage of the electric power is raised or lowered by the converter 9637 to a voltage needed for operating the display portion 9631. When display on the display portion 9631 is not performed, the switch SW1 is turned off and the switch SW2 is turned on, so that the power storage unit 9635 can be charged.

Note that the solar cell 9633 is described as an example of a power generation unit; however, one embodiment of the present invention is not limited to this example. The power storage unit 9635 may be charged using another power generation unit such as a piezoelectric element or a thermoelectric conversion element (Peltier element). For example, the power storage unit 9635 may be charged with a non-contact power transmission module that transmits and receives power wirelessly (without contact), or with a combination of other charging units.

Figure 27:
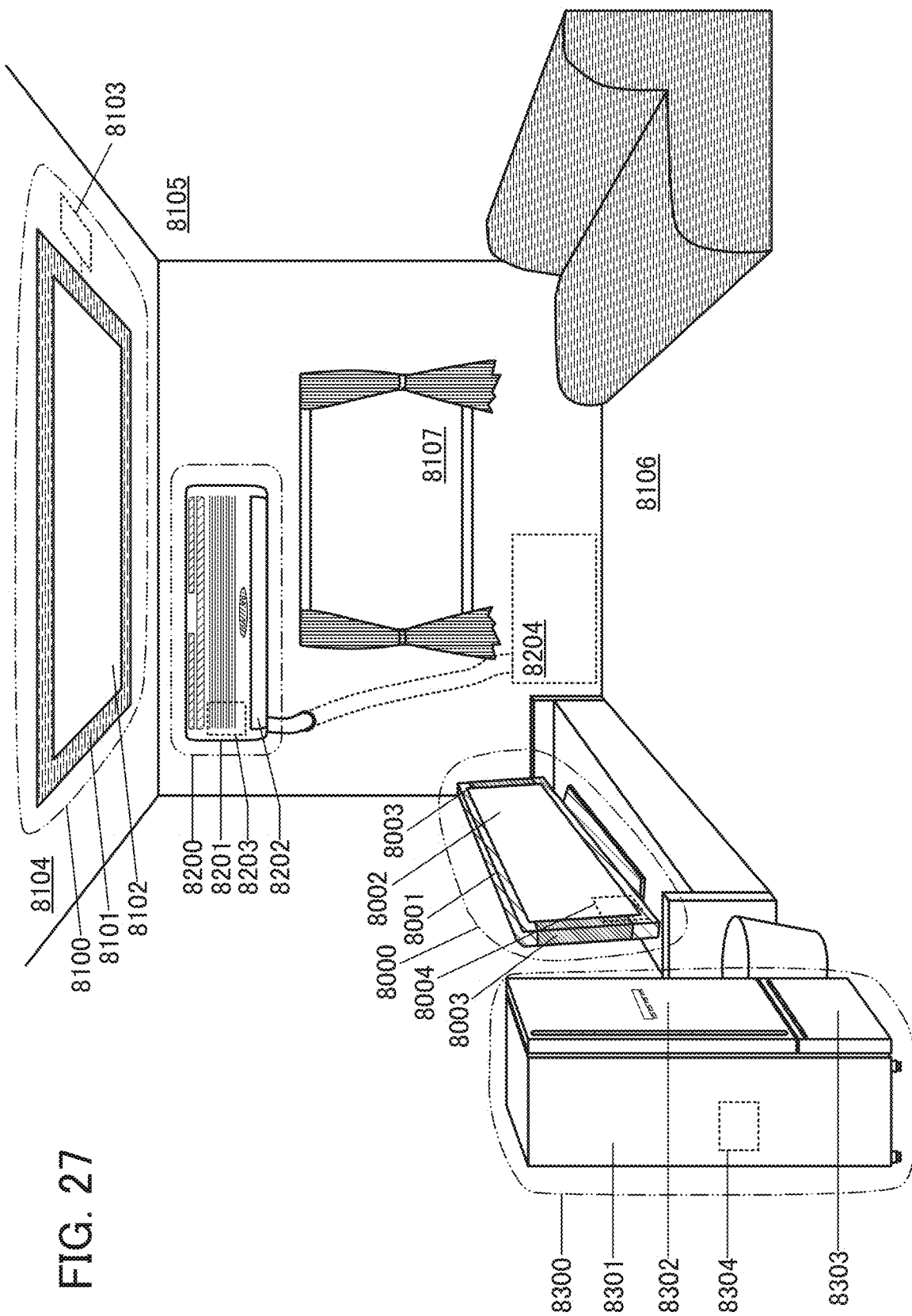
FIG. 27 illustrates examples of electronic devices.

FIG. 27 illustrates other examples of electronic devices. In FIG. 27, a display device 8000 is an example of an electronic device using a secondary battery 8004 of one embodiment of the present invention. Specifically, the display device 8000 corresponds to a display device for TV broadcast reception and includes a housing 8001, a display portion 8002, speaker portions 8003, the secondary battery 8004, and the like. The secondary battery 8004 of one embodiment of the present invention is provided in the housing 8001. The display device 8000 can receive electric power from a commercial power supply. Alternatively, the display device 8000 can use electric power stored in the secondary battery 8004. Thus, the display device 8000 can be operated with the use of the secondary battery 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 27, an installation lighting device 8100 is an example of an electronic device using a secondary battery 8103 of one embodiment of the present invention. Specifically, the lighting device 8100 includes a housing 8101, a light source 8102, the secondary battery 8103, and the like. Although FIG. 27 illustrates the case where the secondary battery 8103 is provided in a ceiling 8104 on which the housing 8101 and the light source 8102 are installed, the secondary battery 8103 may be provided in the housing 8101. The lighting device 8100 can receive electric power from a commercial power supply. Alternatively, the lighting device 8100 can use electric power stored in the secondary battery 8103. Thus, the lighting device 8100 can be operated with the use of the secondary battery 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 27 as an example, the secondary battery of one embodiment of the present invention can be used as an installation lighting device provided in, for example, a wall 8105, a floor 8106, a window 8107, or the like other than the ceiling 8104. Alternatively, the secondary battery can be used in a tabletop lighting device or the like.

As the light source 8102, an artificial light source that emits light artificially by using electric power can be used. Specifically, an incandescent lamp, a discharge lamp such as a fluorescent lamp, and light-emitting elements such as an LED and an organic EL element are given as examples of the artificial light source.

In FIG. 27, an air conditioner including an indoor unit 8200 and an outdoor unit 8204 is an example of an electronic device using a secondary battery 8203 of one embodiment of the present invention. Specifically, the indoor unit 8200 includes a housing 8201, an air outlet 8202, the secondary battery 8203, and the like. Although FIG. 27 illustrates the case where the secondary battery 8203 is provided in the indoor unit 8200, the secondary battery 8203 may be provided in the outdoor unit 8204. Alternatively, the secondary batteries 8203 may be provided in both the indoor unit 8200 and the outdoor unit 8204. The air conditioner can receive electric power from a commercial power supply. Alternatively, the air conditioner can use electric power stored in the secondary battery 8203. Particularly in the case where the secondary batteries 8203 are provided in both the indoor unit 8200 and the outdoor unit 8204, the air conditioner can be operated with the use of the secondary battery 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 27 as an example, the secondary battery of one embodiment of the present invention can be used in an air conditioner in which the functions of an indoor unit and an outdoor unit are integrated in one housing.

In FIG. 27, an electric refrigerator-freezer 8300 is an example of an electronic device using a secondary battery 8304 of one embodiment of the present invention. Specifically, the electric refrigerator-freezer 8300 includes a housing 8301, a refrigerator door 8302, a freezer door 8303, the secondary battery 8304, and the like. The secondary battery 8304 is provided inside the housing 8301 in FIG. 27. The electric refrigerator-freezer 8300 can receive electric power from a commercial power supply. Alternatively, the electric refrigerator-freezer 8300 can use electric power stored in the secondary battery 8304. Thus, the electric refrigerator-freezer 8300 can be operated with the use of the secondary battery 8304 of one embodiment of the present invention as an uninterruptible power supply even when electric power cannot be supplied from a commercial power supply due to power failure or the like.

Note that among the electronic devices described above, a high-frequency heating apparatus such as a microwave oven and an electronic device such as an electric rice cooker require high power in a short time. The tripping of a breaker of a commercial power supply in use of an electronic device can be prevented by using the secondary battery of one embodiment of the present invention as an auxiliary power supply for supplying electric power which cannot be supplied enough by a commercial power supply.

In addition, in a time period when electronic devices are not used, particularly when the proportion of the amount of electric power which is actually used to the total amount of electric power which can be supplied from a commercial power supply source (such a proportion is referred to as a usage rate of electric power) is low, electric power can be stored in the secondary battery, whereby the usage rate of electric power can be reduced in a time period when the electronic devices are used. For example, in the case of the electric refrigerator-freezer 8300, electric power can be stored in the secondary battery 8304 in night time when the temperature is low and the refrigerator door 8302 and the freezer door 8303 are not often opened or closed. On the other hand, in daytime when the temperature is high and the refrigerator door 8302 and the freezer door 8303 are frequently opened and closed, the secondary battery 8304 is used as an auxiliary power supply; thus, the usage rate of electric power in daytime can be reduced.

According to one embodiment of the present invention, the secondary battery can have excellent cycle characteristics and improved reliability. Furthermore, according to one embodiment of the present invention, a secondary battery with high capacity can be obtained; thus, the secondary battery itself can be made more compact and lightweight as a result of improved characteristics of the secondary battery. Thus, the secondary battery of one embodiment of the present invention is used in the electronic device described in this embodiment, whereby a more lightweight electronic device with a longer lifetime can be obtained. This embodiment can be combined with any of the other embodiments as appropriate.

Embodiment 5

In this embodiment, examples of vehicles each including the secondary battery of one embodiment of the present invention are described.

The use of secondary batteries in vehicles enables production of next-generation clean energy vehicles such as hybrid electric vehicles (HEVs), electric vehicles (EVs), and plug-in hybrid electric vehicles (PHEVs).

Figure 28A:
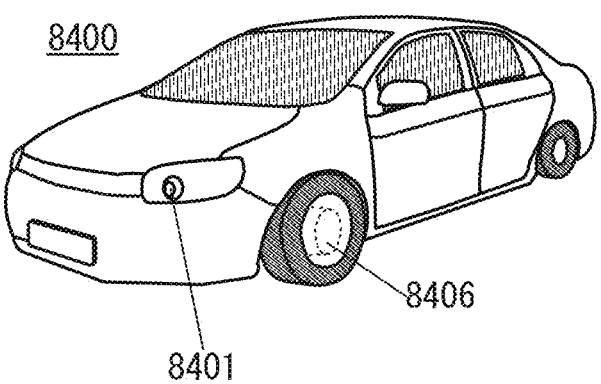
FIGS. 28A to 28C each illustrate an example of a vehicle.
Figure 28B:
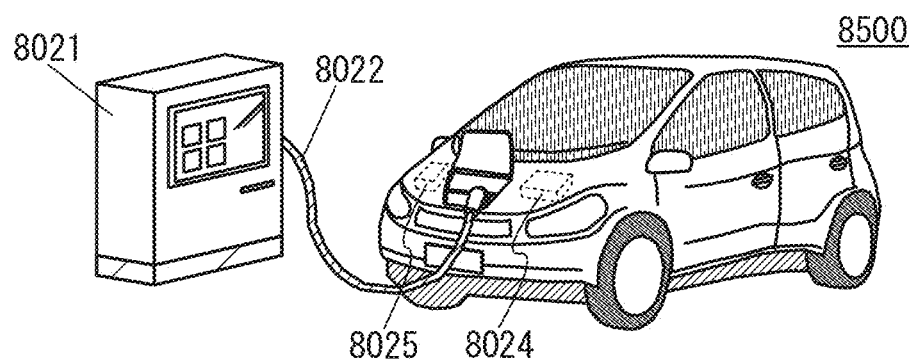
Figure 28C:
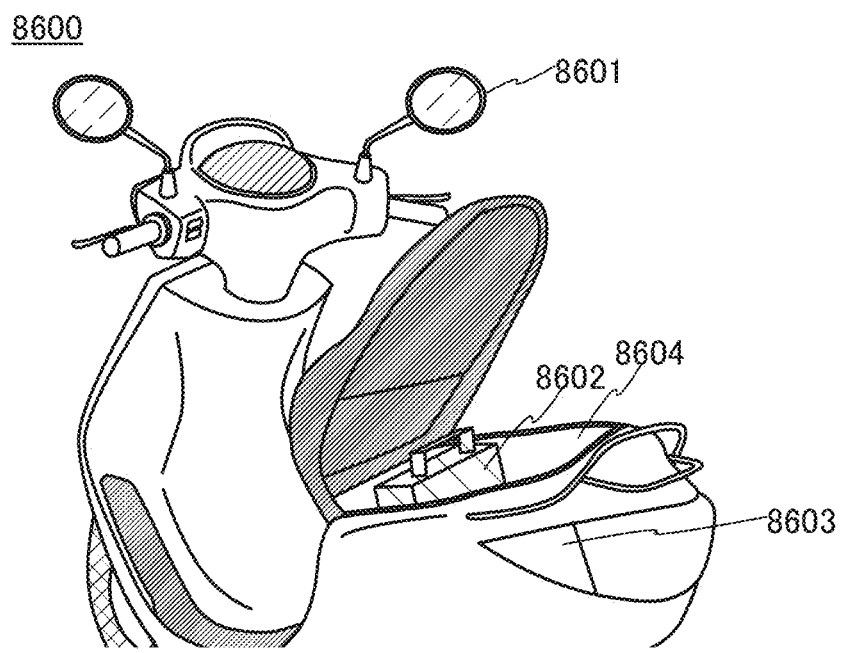

FIGS. 28A to 28C each illustrate an example of a vehicle including the secondary battery of one embodiment of the present invention. An automobile 8400 illustrated in FIG. 28A is an electric vehicle that runs on the power of an electric motor. Alternatively, the automobile 8400 is a hybrid electric vehicle capable of driving using either an electric motor or an engine as appropriate. The use of the secondary battery of one embodiment of the present invention allows fabrication of a high-mileage vehicle. The automobile 8400 includes the secondary battery. As the secondary battery, the modules of the secondary batteries illustrated in FIGS. 13C and 13D may be arranged to be used in a floor portion in the automobile. Alternatively, a battery pack in which a plurality of secondary batteries each of which is illustrated in FIGS. 16A and 16B are combined may be placed in the floor portion in the automobile. The secondary battery is used not only for driving an electric motor 8406, but also for supplying electric power to a light-emitting device such as a headlight 8401 or a room light (not illustrated).

The secondary battery can also supply electric power to a display device included in the automobile 8400, such as a speedometer or a tachometer. Furthermore, the secondary battery can supply electric power to a semiconductor device included in the automobile 8400, such as a navigation system.

FIG. 28B illustrates an automobile 8500 including the secondary battery. The automobile 8500 can be charged when the secondary battery is supplied with electric power through external charging equipment by a plug-in system, a contactless power feeding system, or the like. In FIG. 28B, the secondary battery 8024 included in the automobile 8500 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The ground-based charging apparatus 8021 may be a charging station provided in a commerce facility or a power source in a house. For example, with the use of a plug-in technique, the secondary battery 8024 included in the automobile 8500 can be charged by being supplied with electric power from outside. The charge can be performed by converting AC electric power into DC electric power through a converter such as an ACDC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charge can be performed not only when the vehicle is stopped but also when driven. In addition, the contactless power feeding system may be utilized to perform transmission and reception of electric power between vehicles. Furthermore, a solar cell may be provided in the exterior of the vehicle to charge the secondary battery when the vehicle stops or moves. To supply electric power in such a contactless manner, an electromagnetic induction method or a magnetic resonance method can be used.

FIG. 28C shows an example of a motorcycle including the secondary battery of one embodiment of the present invention. A motor scooter 8600 illustrated in FIG. 28C includes a secondary battery 8602, side mirrors 8601, and indicators 8603. The secondary battery 8602 can supply electric power to the indicators 8603.

Furthermore, in the motor scooter 8600 illustrated in FIG. 28C, the secondary battery 8602 can be held in a storage unit under seat 8604. The secondary battery 8602 can be held in the storage unit under seat 8604 even with a small size. The secondary battery 8602 is detachable; thus, the secondary battery 8602 is carried indoors when charged, and is stored before the motor scooter is driven.

According to one embodiment of the present invention, the secondary battery can have improved cycle characteristics and the capacity of the secondary battery can be increased. Thus, the secondary battery itself can be made more compact and lightweight. The compact and lightweight secondary battery contributes to a reduction in the weight of a vehicle, and thus increases the mileage. Furthermore, the secondary battery included in the vehicle can be used as a power source for supplying electric power to products other than the vehicle. In such a case, the use of a commercial power supply can be avoided at peak time of electric power demand, for example. Avoiding the use of a commercial power supply at peak time of electric power demand can contribute to energy saving and a reduction in carbon dioxide emissions. Moreover, the secondary battery with excellent cycle characteristics can be used over a long period; thus, the use amount of rare metals such as cobalt can be reduced.

This embodiment can be combined with any of the other embodiments as appropriate.

Example 1

In this example, positive electrode active materials of one embodiment of the present invention and comparative positive electrode active materials were formed, and their cha characteristics were analyzed by XPS, SEM, and XRD. In addition, the cycle characteristics during high-voltage charging were measured.

[Formation of Positive Electrode Active Material]

<<Sample 1>>

As Sample 1, a positive electrode active material containing cobalt as a transition metal was formed by the formation method described in Embodiment 1 with reference to FIG. 2. First, LiF and $MgF_2$ were weighted so that the molar ratio was 1:3, acetone was added as a solvent, and the materials were mixed and ground by a wet method. The mixing and the grinding were performed in a ball mill using a zirconia ball at 150 rpm for 1 hour. Then, the materials after the treatments were collected as the first mixture (Steps S11 to S14 in FIG. 2).

FIG. 29 shows the particle size distribution of LiF and $MgF_2$ before mixing and that of the first mixture after mixing. Particle size distribution was measured using a laser diffraction particle size analyzer (SALD-2200 manufactured by Shimadzu Corporation). The first mixture had D50 of 3.561 μm and a mode diameter of 4.008 μm. From FIG. 29 and these results, it was confirmed that the first mixture was sufficiently pulverized.

In Sample 1, CELLSEED C-10N manufactured by NIPPON CHEMICAL INDUSTRIAL CO., LTD. was used as lithium cobalt oxide synthesized in advance (Step S25 in FIG. 2). As described in Embodiment 1, CELLSEED C-10N is lithium cobalt oxide having D50 of approximately 12 μm and few impurities.

Next, the first mixture was weighted so that the atomic weight of magnesium contained in the first mixture was 0.5 atomic % with respect to the molecular weight of lithium cobalt oxide, and the first mixture and lithium cobalt oxide were mixed by a dry method. The mixing was performed in a ball mill using a zirconia ball at 150 rpm for 1 hour. Then, the materials after the treatments were collected as the second mixture (Steps S31 to S33 in FIG. 2).

Next, the second mixture was put in an alumina crucible and annealed at 850° C. in an oxygen atmosphere for 60 hours using a muffle furnace. At the time of annealing, the alumina crucible was covered with a lid. The flow rate of oxygen was 10 L/min. The temperature rising rate was 200° C./hr, and the temperature decreasing time was longer than or equal to 10 hours. The material after the heat treatment was collected as the positive electrode active material of Sample 1 (Steps S34 and S35 in FIG. 2).

<<Sample 2>>

Sample 2 (comparative example) was formed in the same manner as Sample 1 except that annealing was performed for 2 hours in Step S34 in FIG. 2.

<<Sample 3>>

Sample 3 (comparative example) was formed in the same manner as Sample 1 except that annealing was not performed in Step S34 in FIG. 2.

<<Sample 4>>

Lithium cobalt oxide (CELLSEED C-10N) not subjected to any treatment (Steps S31 to S35 in FIG. 2 were not carried out) was prepared as Sample 4 (comparative example).

<<Sample 5>>

In Sample 5, CELLSEED C-5H manufactured by NIPPON CHEMICAL INDUSTRIAL CO., LTD. was used as lithium cobalt oxide synthesized in advance (Step S25 in FIG. 2). In addition, annealing was performed at 900° C. for 2 hours in Step S34 in FIG. 2. For other than that, the formation method of Sample 1 can be referred to.

<<Sample 6>>

Lithium cobalt oxide (CELLSEED C-5H) not subjected to any treatment (Steps S31 to S35 were not carried out) was prepared as Sample 6 (comparative example).

<<Sample 7>>

In Sample 7, a magnesium source and a fluorine source were added to the starting material of lithium cobalt oxide and baking was performed to synthesize lithium cobalt oxide containing magnesium and fluorine. After that, annealing was performed.

Specifically, lithium carbonate, cobalt oxide, magnesium oxide, and lithium fluoride were used as the lithium source, the cobalt source, the magnesium source, and the fluorine source, respectively. Then, these elements were weighted to have an atomic ratio of $LiCo_{0.99}Mg_{0.01}O_{1.98}F_{0.02}$, and mixed in a ball mill.

Next, the mixture was put in an alumina crucible, the alumina crucible was covered with a lid, and baking was performed at 950° C. in a dry air atmosphere for 10 hours using a maffle furnace. The flow rate of dry air was 10 L/min. The temperature rising rate was 200° C./hr, and the temperature decreasing time was longer than or equal to 10 hours. The material after the heat treatment was collected as lithium cobalt oxide containing magnesium and fluorine.

Next, the lithium cobalt oxide containing magnesium and fluorine was put in an alumina crucible, the alumina crucible was covered with a lid, and annealing was performed at 800° C. in an oxygen atmosphere for 2 hours using a maffle furnace. The flow rate of oxygen was 10 L/min. The temperature rising rate was 200° C./hr and the temperature decreasing time was longer than or equal to 10 hours. The material after the heat treatment was collected as Sample 7.

<<Sample 8>>

Commercial lithium cobalt oxide containing magnesium and fluorine (CELLSEED C-20F manufactured by NIPPON CHEMICAL INDUSTRIAL CO., LTD.) was put in an alumina crucible, the alumina crucible was covered with a lid, and annealing was performed at 800° C. in an oxygen atmosphere for 2 hours using a maffle furnace. The flow rate of oxygen was 10 L/min. The temperature rising rate was 200° C./hr and the temperature decreasing time was longer than or equal to 10 hours. The material after the heat treatment was collected as Sample 8.

<<Sample 9>>

Lithium cobalt oxide containing magnesium and fluorine (CELLSEED C-20F manufactured by NIPPON CHEMICAL INDUSTRIAL CO., LTD.) not subjected to any treatment (Steps S31 to S35 were not carried out) was prepared as Sample 9 (comparative example).

<<Sample 10>>

In Sample 10, lithium cobalt oxide manufactured by Sigma-Aldrich Co. LLC (catalog No. 442704) having D50 of approximately 11 μm was used as lithium cobalt oxide synthesized in advance (Step S25 in FIG. 2). In addition, annealing was performed at 850° C. for 20 hours in Step S34 in FIG. 2. For other than that, the formation method of Sample 1 can be referred to.

<<Sample 11>>

Lithium cobalt oxide (No. 442704 manufactured by Sigma-Aldrich Co. LLC) not subjected to any treatment (Steps S31 to S35 were not carried out) was prepared as Sample 11 (comparative example).

<<Sample 12>>

In Sample 12, CELLSEED C-5hV manufactured by NIPPON CHEMICAL INDUSTRIAL CO., LTD. (having D50 of approximately 6 μm) was used as lithium cobalt oxide synthesized in advance (Step S25 in FIG. 2). This lithium cobalt oxide contained titanium at approximately 5,100 ppm wt as an impurity. In addition, annealing was performed at 800° C. for 2 hour in Step S34 in FIG. 2. For other than that, the formation method of Sample 1 can be referred to.

<<Sample 13>>

Sample 13 was formed in the same manner as Sample 12 except that annealing was performed at 850° C. for 60 hours in Step S34 in FIG. 2.

<<Sample 14>>

In Sample 14, lithium cobalt oxide (CELLSEED C-5hV manufactured by NIPPON CHEMICAL INDUSTRIAL CO., LTD.) not subjected to any treatment (Steps S31 to S35 were not carried out) was prepared as Sample 14 (comparative example).

<<Sample 15>>

In Sample 15 (comparative example), a layer containing aluminum was formed on the surface of lithium cobalt oxide synthesized in advance (CELLSEED C-5H manufactured by NIPPON CHEMICAL INDUSTRIAL CO., LTD.) by a sol-gel method, and then annealing was performed at 500° C. for 2 hours.

Specifically, aluminum isopropoxide and 2-propanol were mixed and lithium cobalt oxide (C-5H) was added thereto. At this time, the weight of aluminum isopropoxide was set to 0.0092 times that of lithium cobalt oxide. The mixture was stirred in a constant temperature bath at a relative humidity of 90% for 8 hours to make aluminum isopropoxide and $H_2O$ in the atmosphere react with each other, whereby a layer containing aluminum was formed on the surface of lithium cobalt oxide. After that, the lithium cobalt oxide was collected by filtration and dried under reduced pressure at 70° C. for 1 hour.

The dried lithium cobalt oxide with the layer containing aluminum on its surface was put in an alumina crucible, the alumina crucible was covered with a lid, and annealing was performed. The annealing was performed under the following conditions: the temperature was 500° C. (the temperature rising rate was 200° C./h); the retention time was 2 hours; and the flow rate of oxygen was 10 L/min. After that, the lithium cobalt oxide was cooled to room temperature for longer than or equal to 10 hours and shorter than or equal to 15 hours and collected as Sample 15.

Table 1 shows the formation conditions of Samples 1 to 15.

TABLE 1

| | Formation conditions | |
|---|---|---|
| | Additives | Annealing |
| Sample 1 | Mg source and F source are mixed with $LiCoO_2$ (12 μm) | 850° C. 60 hrs |
| Sample 2 (comparative example) | Mg source and F source are mixed with $LiCoO_2$ (12 μm) | 850° C. 2 hrs |
| Sample 3 (comparative example) | Mg source and F source are mixed with $LiCoO_2$ (12 μm) | not performed |
| Sample 4 (comparative example) | only $LiCoO_2$ (12 μm) | not performed |
| Sample 5 | Mg source and F source are added to $LiCoO_2$ (5 μm) | 900° C. 2 hrs |
| Sample 6 (comparative example) | only $LiCoO_2$ (5 μm) | not perfomed |

TABLE 1-continued

| | Formation conditions | |
|---|---|---|
| | Additives | Annealing |
| Sample 7 | Mg source and F source are mixed with starting material and baking is performed | 800° C. 2 hrs |
| Sample 8 | only $LiCoO_2$ (20 μm) containing Mg and F | 800° C. 2 hrs |
| Sample 9 (comparative example) | only $LiCoO_2$ (20 μm) containing Mg and F | not performed |
| Sample 10 | Mg source and F source are mixed with $LiCoO_2$ (11 μm) | 850° C. 20 hrs |
| Sample 11 (comparative example) | only $LiCoO_2$ (11 μm) | not per formed |
| Sample 12 (comparative example) | Mg source and F source are mixed with $LiCoO_2$ (6 μm) | 800° C. 2 hrs |
| Sample 13 (comparative example) | Mg source and F source are mixed with $LiCoO_2$ (6 μm) | 850° C. 60 hrs |
| Sample 14 (comparative example) | only $LiCoO_2$ (6 μm) | not perforated |
| Sample 15 (comparative example) | layer containing Al is formed on surface of $LiCoO_2$ (12 μm) by sol-gel method | 500° C. 2 hrs |

[XPS]

The surfaces of Samples 1 to 4 formed in the above manner were analyzed by XPS. Table 2 shows the concentrations of main elements (atomic %).

TABLE 2

| | Li | Co | O | Mg | F | C | Ca | Na | S | Si |
|---|---|---|---|---|---|---|---|---|---|---|
| Sample 1 | 11.1 | 11.2 | 44.7 | 5.7 | 5.0 | 14.2 | 2.2 | 3.3 | 2.1 | 0.5 |
| Sample 2 | 13.5 | 14.5 | 47.5 | 0.6 | 5.4 | 16.1 | 1.4 | 0.0 | 1.0 | 0.0 |
| Sample 3 | 15.1 | 15.0 | 48.7 | 0.2 | 2.6 | 16.5 | 0.4 | 0.5 | 1.0 | 0.0 |
| Sample 4 | 14.9 | 15.7 | 52.0 | 0.0 | 1.0 | 15.1 | 0.5 | 0.0 | 0.8 | 0.0 |

FIG. 30A is a graph obtained by extracting data on magnesium and fluorine from Table 2. In Sample 4 obtained not through addition of lithium fluoride and magnesium fluoride, the concentrations of fluorine and magnesium were low. In Sample 3 obtained through addition of microparticulated lithium fluoride and magnesium fluoride but not through annealing, the concentrations of fluorine and magnesium were not so high. This is probably because, in the case where a microparticle 1002 containing a certain element at a high concentration is attached onto the surface of a particle 1001 not containing the element, as illustrated in FIG. 30B1, it is difficult to detect the element from a detection region 1010 in the XPS surface analysis, as compared with the case where the particle 1001 has a region 1003 containing the element in a larger area in the detection region 1010 as illustrated in FIG. 30B2.

In Sample 2 obtained through 2-hour annealing after addition of lithium fluoride and magnesium fluoride, the fluorine concentration largely increased. Furthermore, in Sample 1 obtained through 60-hour annealing after addition of lithium fluoride and magnesium fluoride, the magnesium concentration also largely increased.

From the comparison result of Sample 1 and Sample 2, it was assumed that lithium fluoride having a low melting point (melting point: 848° C.) was melted first when annealing was performed, and distributed to the surface portion of the lithium cobalt oxide particle. Furthermore, when the annealing time was lengthened, the melted lithium fluoride decreased the melting point of magnesium fluoride (melting point: 1263° C.), magnesium fluoride was melted, and then distributed to the surface portion of the lithium cobalt oxide particle.

Figure 31:
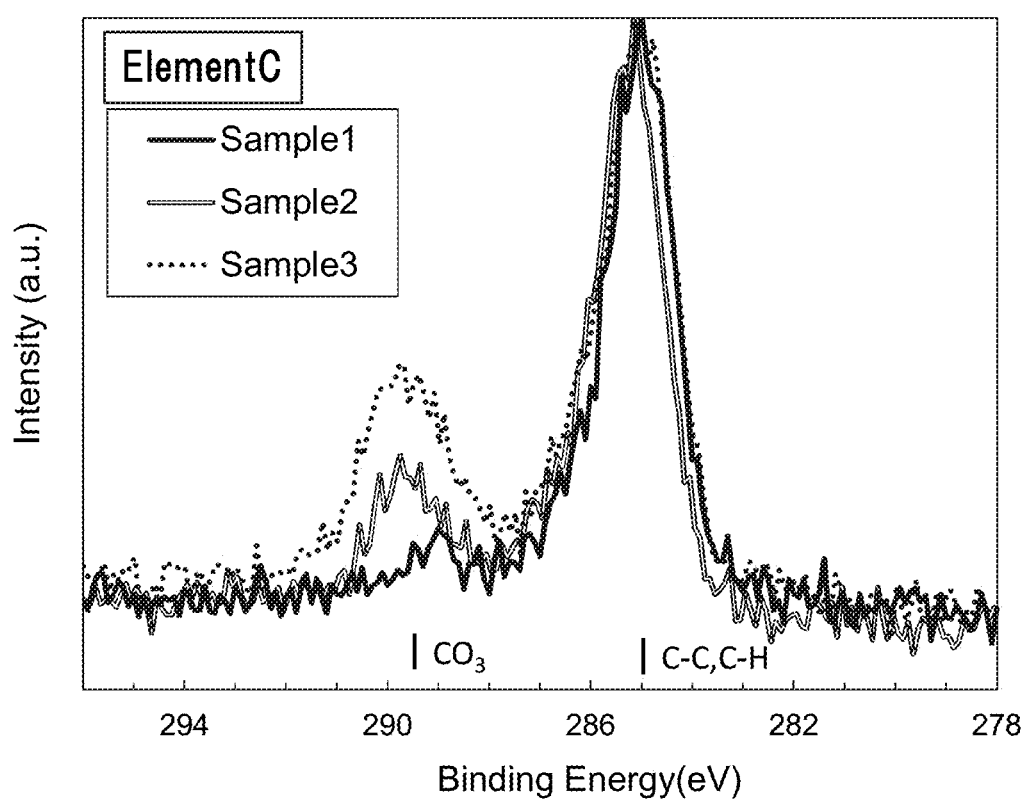
FIG. 31 is a graph showing XPS analysis results of positive electrode active materials in Example 1.

Next, FIG. 31 shows the result of narrow scanning analysis by XPS in a region showing the bonding state of carbon. Sample 3 obtained not through annealing had a high peak of $CO_3$ bonds. By contrast, $CO_3$ bonds decreased in Sample 2 obtained through 2-hour annealing, and $CO_3$ bonds further decreased in Sample 1 obtained through 60-hour annealing. Since there was high possibility that $CO_3$ bonds in the surface portion of lithium cobalt oxide particle were lithium carbonate ($Li_2Co_3$), lithium was considered to be prevented from being excessive by annealing and accordingly excellent lithium cobalt oxide was able to be formed.

[SEM Observation]

Next, SEM images of Samples 1 to 4 are shown in FIGS. 32A1, 32A2, 32B1, 32B2, 32C1, 32C2, 32D1, and 32D2. FIG. 32A1 is the SEM image of Sample 1, and FIG. 32A2 is its enlarged view. FIG. 32B1 is the SEM image of Sample 2, and FIG. 32B2 is its enlarged view. FIG. 32C1 is the SEM image of Sample 3, and FIG. 32C2 is its enlarged view. FIG. 32D1 is the SEM image of Sample 4, and FIG. 32D2 is its enlarged view.

In Sample 4, which is lithium cobalt oxide not subjected to any treatment, a lot of projections and depressions were observed at the surface. In Sample 3, microparticles considered to be lithium fluoride and magnesium fluoride attached onto the surface were observed.

By contrast, the surfaces of Sample 1 and Sample 2 obtained through annealing were smooth and unevenness was reduced. Sample 1 obtained through annealing for a longer time than Sample 2 tended to have less unevenness.

[Fabrication of Secondary Batteries]

Next, CR2032 coin-type secondary batteries (with a diameter of 20 mm and a height of 3.2 mm) were fabricated using the positive electrode active materials of Sample 1, Sample 2, and Samples 4 to 15 formed in the above manner.

A positive electrode formed by applying slurry in which the positive electrode active material formed in the above manner, acetylene black (AB), and polyvinylidene fluoride (PVDF) were mixed at a weight ratio of 95:3:2 to a current collector was used.

A lithium metal was used for a counter electrode.

As an electrolyte contained in each electrolyte solution, 1 mol/L lithium hexafluorophosphate ($LiPF_6$) was used, and as the electrolyte solution, a solution in which ethylene carbonate (EC) and diethyl carbonate (DEC) at a volume ratio of 3:7 and vinylene carbonate (VC) at a 2 wt % were mixed was used.

As a separator, 25-μm-thick polypropylene was used.

A positive electrode can and a negative electrode can were formed of stainless steel (SUS).

The positive electrode of the secondary battery using Sample 7 was pressurized at 210 kN. The positive electrodes of the secondary batteries using the other samples were not pressurized.

[Calculation of Lattice Constant from XRD Before Charging]

The positive electrodes using Sample 1, Sample 4, Samples 5 to 12, and Sample 14 before charging were analyzed by powder XRD using a CuKα1 ray. The XRD was performed in the air, and the each electrode was attached to a glass plate to maintain their flatness. The XRD apparatus was set for powder samples, and the heights of the samples were set in accordance with the measurement surface required by the apparatus.

On the obtained XRD patterns, background subtraction and Kα2 stripping were performed using DIFFRAC. EVA (XRD data analysis software manufactured by Bruker Corporation). Accordingly, signals derived from conductive additives, binders, airtight containers, and the like were also removed.

After that, the lattice constants were calculated using TOPAS. At this time, atomic positions and the like were not optimized and only the lattice constants were fitted. Table 3 shows good of fitness (GOF), the estimated crystallite sizes, and the lattice constants of the a-axis and the c-axis.

TABLE 3

| | Annealing | GOF | crystallite size (Å) | only lattice constant is variable a-axis (Å) | c-axis (Å) |
|---|---|---|---|---|---|
| Sample 1 | performed | 1.20 | 801 | 2.816 | 14.054 |
| Sample 4 (comparative example) | not performed | 1.24 | 778 | 2.816 | 14.051 |
| Sample 5 | performed | 1.18 | 604 | 2.816 | 14.053 |
| Sample 6 (comparative example) | not performed | 1.16 | 625 | 2.816 | 14.050 |
| Sample 7 | performed | 1.26 | 277.6 | 2.816 | 14.056 |
| Sample 8 | perforated | 1.23 | 873 | 2.816 | 14.053 |
| Sample 9 (comparative example) | not performed | 1.21 | 835 | 2.817 | 14.054 |
| Sample 10 | performed | 1.39 | 493.5 | 2.816 | 14.053 |
| Sample 11 (comparative example) | not performed | 1.32 | 602.5 | 2.816 | 14.052 |
| Sample 12 (comparative example) | performed | 1.22 | 214.2 | 2.816 | 14.065 |
| Sample 14 (comparative example) | not performed | 1.21 | 191.7 | 2.816 | 14.065 |

Sample 12 and Sample 14 containing titanium at approximately 5,100 ppm wt as an impurity each tended to have a larger lattice constant of the c-axis than the others.

[XRD Results Obtained After First Charging]

Secondary batteries using Samples 1, 2, 7, and 9 were subjected to the CCCV charging at 4.6 V. Specifically, after constant current charging was performed at 0.5 C until voltage reached 4.6 V, constant voltage charging was performed until the current value reached 0.01 C. Note that 1 C was set to 137 mA/g. Then, the secondary batteries in the charged state were disassembled in a glove box with an argon atmosphere to take out the positive electrodes, and the positive electrodes were washed with dimethyl carbonate (DMC) to remove the electrolyte solution. The positive electrodes were enclosed in airtight containers with an argon atmosphere and analyzed by XRD.

Figure 33:
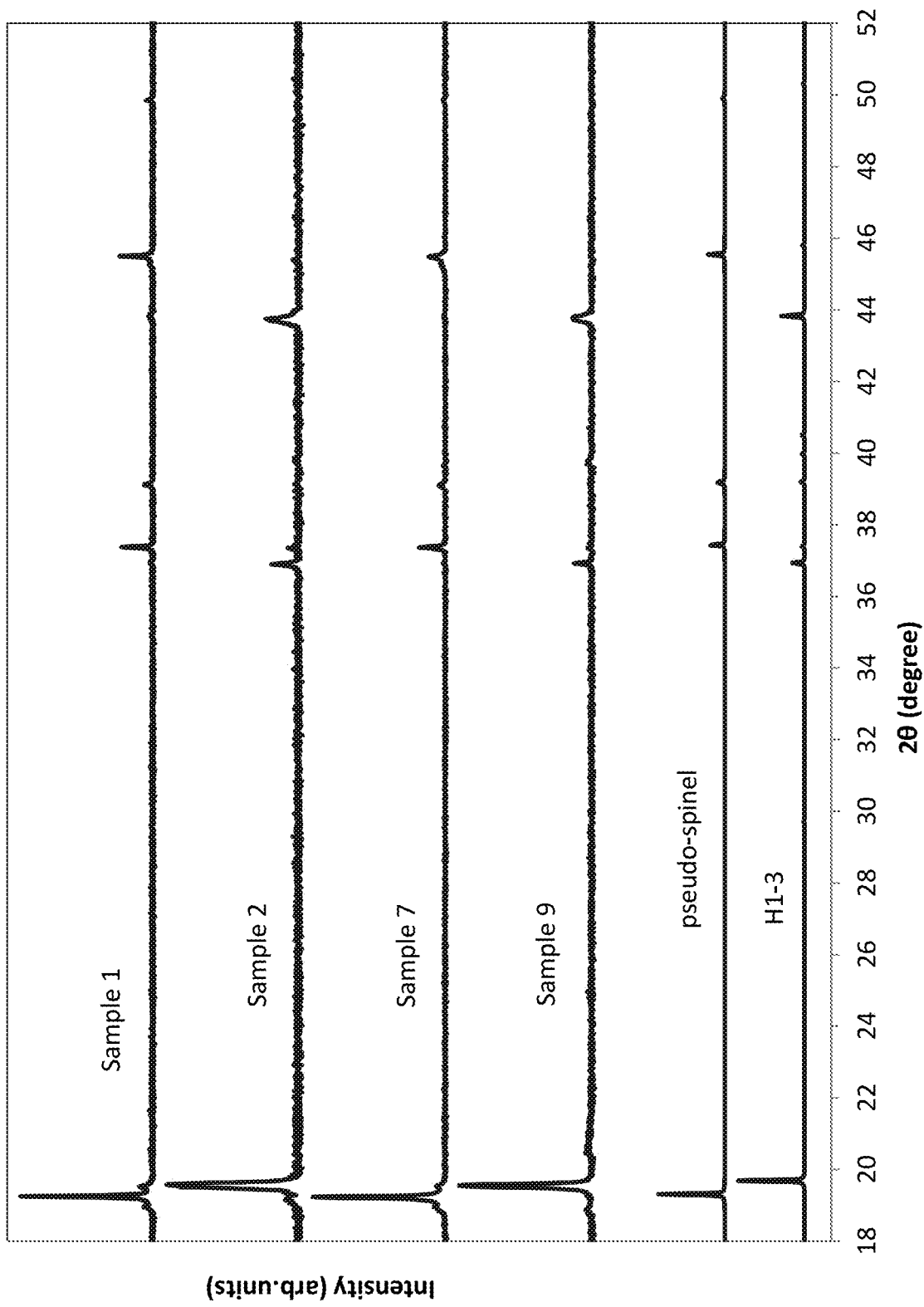
FIG. 33 shows XRD patterns of positive electrode active materials in Example 1.

FIG. 33 shows the XRD patterns of the positive electrodes of the secondary batteries using Samples 1, 2, 7, and 9 after being charged at 4.6 V. For comparison, patterns of the pseudo-spinel crystal structure and the H1-3 type structure are also shown.

It was revealed that Sample 1 and Sample 7 after being charged at 4.6 V had the pseudo-spinel crystal structure. It was assumed that Sample 1 in which the magnesium source and the fluorine source were mixed with lithium cobalt oxide had a sharper pattern than Sample 7 in which the magnesium source and the fluorine source were added to the starting material, and thus had higher crystallinity.

Meanwhile, it was revealed that Sample 2 obtained not through sufficient annealing and Sample 9 obtained not through annealing had the H1-3 type structure after being charged at 4.6 V. In addition, Sample 2 had apparently broader peaks than Sample 1 in its pattern, which suggested that Sample 2 had low crystallinity.

[XRD Results Obtained After First Charging for Each Charge Depth]

Next, secondary batteries using the positive electrode active materials of Sample 1 and Sample 2 were charged with charging voltages finely changed from 4.5 V to 4.65 V, and the charged states were analyzed by XRD.

Figure 34:
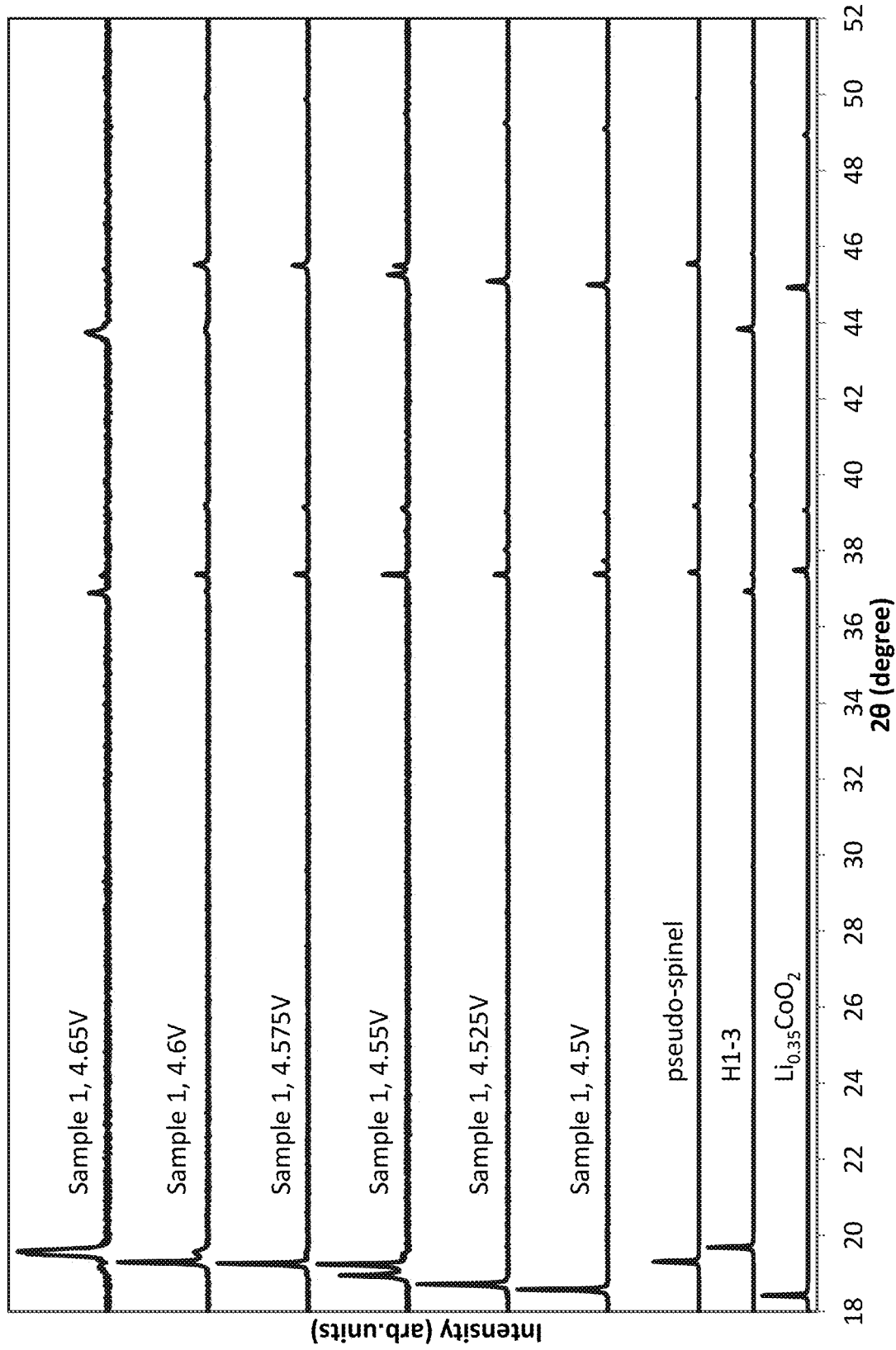
FIG. 34 shows XRD patterns of positive electrode active materials in Example 1.

FIG. 34 shows the XRD patterns of the positive electrode using the positive electrode active material of Sample 1 after the CCCV charging was performed once at 4.5 V, 4.525 V, 4.55 V, 4.575 V, 4.6 V, and 4.65 V. For comparison, the patterns of the pseudo-spinel crystal structure, the H1-3 type structure, and the crystal structure of $Li_{0.35}CoO_2$ with a charge depth of 0.65 (space group R-3m, O3) are also shown.

FIG. 34 revealed that the positive electrode active material of Sample 1 had the crystal structure of $Li_{0.35}CoO_2(O3)$ when charged at 4.5 V and 4.525 V.

In addition, when the charging was performed at 4.55 V, the peaks of the crystal structure of $Li_{0.35}CoO_2(O3)$ and the pseudo-spinel crystal structure were observed, which suggested that two crystal structures coexist in the positive electrode active material of Sample 1 charged at 4.55 V.

When the charging was performed at 4.575 V, the peaks of the pseudo-spinel crystal structure were observed.

Furthermore, when the charging was performed at 4.6 V, small peaks of the H1-3 type structure were observed in addition to the peaks of the pseudo-spinel crystal structure, which suggested that two crystal structures coexist in the positive electrode active material of Sample 1 charged at 4.6 V.

When the charging was performed at 4.65 V, the peaks of the H1-3 type structure were mainly observed. The peaks were broad, which suggested that the crystallinity was decreased.

As described above, in Sample 1 obtained through sufficient annealing, the phase changed from the crystal structure of $Li_{0.35}CoO_2(O3)$ into the pseudo-spinel crystal structure at a charging voltage of approximately 4.55 V, and the pseudo-spinel crystal structure was maintained at the charging voltage of approximately 4.6 V. The phase changed into the H1-3 type structure at a charging voltage of approximately 4.65 V.

Figure 35:
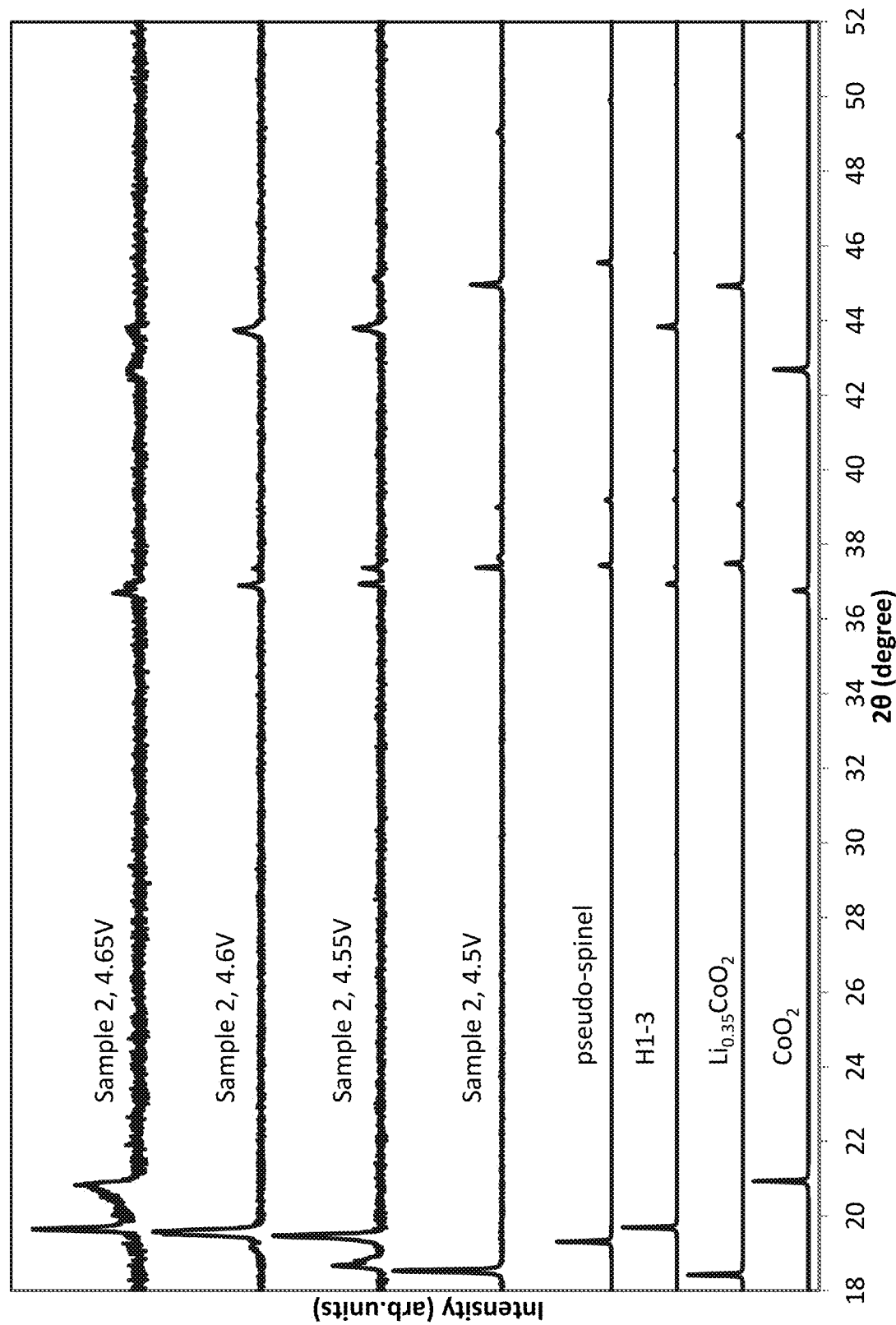
FIG. 35 shows XRD patterns of positive electrode active materials in Example 1.

FIG. 35 shows the XRD patterns of the positive electrode using the positive electrode active material of Sample 2 after the CCCV charging was performed at 4.5 V, 4.55 V, 4.6V, and 4.65 V. For comparison, the patterns of the pseudo-spinel crystal structure, the H1-3 type structure, the crystal structure of $Li_{0.35}CoO_2(O3)$, and the crystal structure of $CoO_2(O1)$ were also shown.

FIG. 35 revealed that the positive electrode active material of Sample 2 had the crystal structure of $Li_{0.35}CoO_2(O3)$ when charged at 4.5 V, similarly to Sample 1.

However, when the charging was performed at 4.55 V, the peaks of both the crystal structure of $Li_{0.35}CoO_2(O3)$ and the H1-3 type structure were observed, unlike in the case of Sample 1.

Furthermore, when the charging was performed at 4.6 V, the peaks of the H1-3 type structure were observed mainly, unlike in the case of Sample 1.

When the charging was performed at 4.65 V, the peaks of the crystal structure of $CoO_2(O1)$ were observed in addition to the peaks of the H1-3 type structure. The peaks were greatly broad, which suggested that the crystallinity was largely decreased.

As described above, in Sample 2 obtained not through sufficient annealing, the phase has already changed from the crystal structure of $Li_{0.35}CoO_2(O3)$ into the H1-3 type structure at a charging voltage of approximately 4.55 V.

As described in Embodiment 1, the H1-3 type structure has a structure in which $CoO_2$ layers are largely shift from those in the crystal structure in the discharged state and there is a big difference in volume; thus, the crystal structure is probably broken by repeating the phase change into the H1-3 type structure. Therefore, in practical use, the upper limit of charging voltage needs to be determined so that the phase does not change into the H1-3 type structure.

Accordingly, in the case of positive electrode active material whose phase changes into the H1-3 type structure at a charging voltage of approximately 4.55 V like Sample 2, the upper limit of charging voltage is set to lower than 4.55 V, for example, 4.5 V.

In the case of positive electrode active material that maintains the pseudo-spinel crystal structure even at a charging voltage of approximately 4.6 V like Sample 1, the upper limit of charging voltage can be set to 4.6 V. When the charging voltage can be increased, the capacity per weight of the positive electrode active material can be increased, which enables a high-capacity secondary battery.

[XRD Results Obtained After 10-Times Charging and Discharging (in the Discharged State)]

Next, secondary batteries using Sample 1 and Sample 2 were charged and discharged 10 times with high voltage. Specifically, after charging and discharging in which the CCCV charging (at 4.6 V) was performed and then the CC discharging (at 2.5 V) was performed were repeated 10 times, the secondary batteries in the discharged state were disassembled to take out the positive electrodes, and the positive electrodes were analyzed by XRD.

Figure 36:
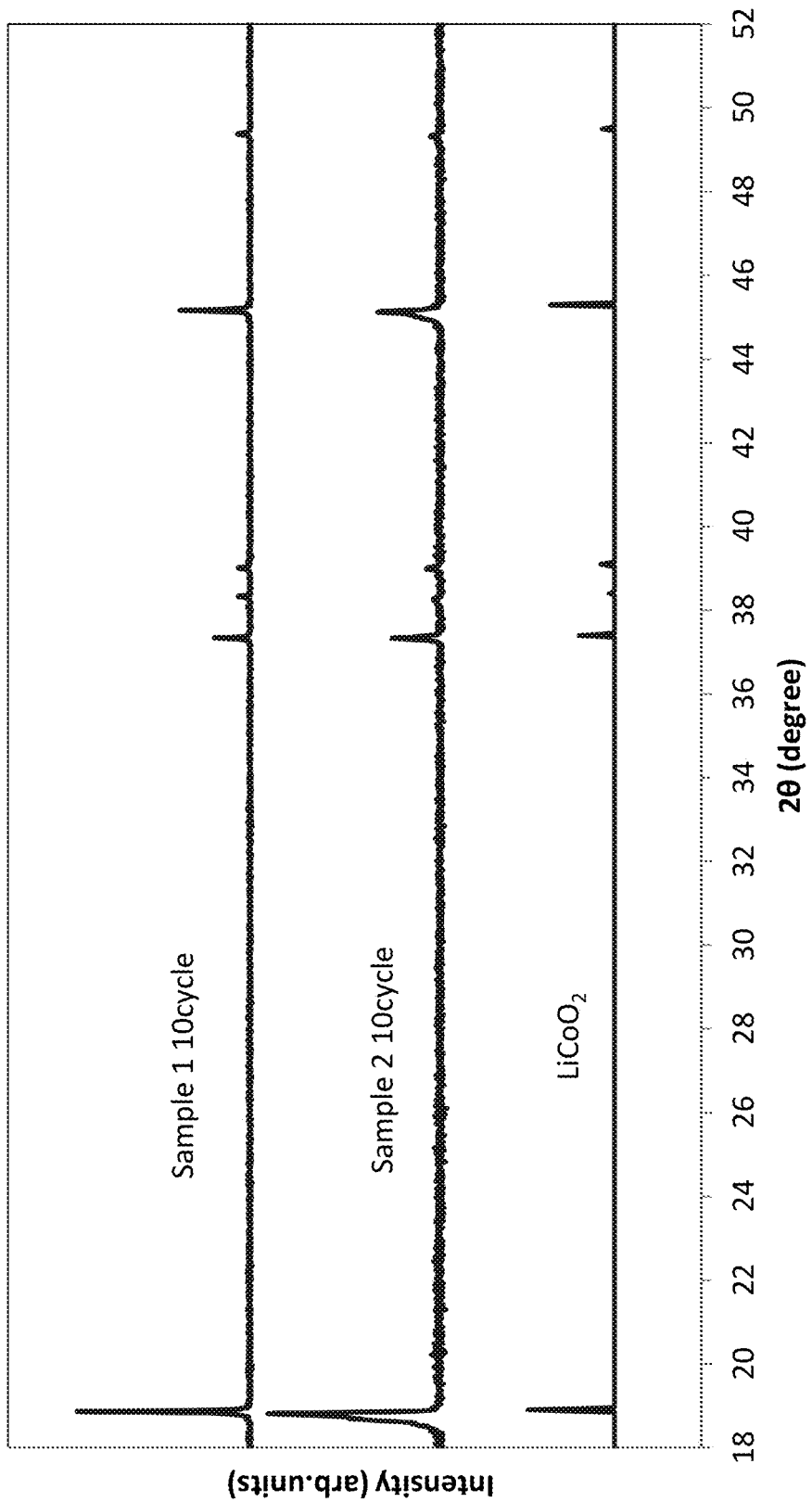
FIG. 36 shows XRD patterns of positive electrode active materials in Example 1.

FIG. 36 shows the XRD patterns of the positive electrodes of the secondary batteries using Sample 1 and Sample 2 after being charged and discharged 10 times. For comparison, the pattern of the ideal crystal structure of lithium cobalt oxide is also shown.

Sample 2, which was obtained not through sufficient annealing and had the H1-3 type structure at high-voltage charging, had apparently broad peaks in its pattern as compared with Sample 1, which was obtained through sufficient annealing and had the pseudo-spinel crystal structure at high-voltage charging. This suggested that the crystallinity of Sample 2 was lower than that of Sample 1.

[XRD Results Obtained After 100-Times Charging and Discharging (in the Charged State)]

Next, secondary batteries using Sample 1 and Sample 2 were charged and discharged 100 times, in which the CCCV charging (4.45 V) was performed and then the CC discharging (2.5 V) was performed. Then, the secondary batteries were charged at 4.6 V, the secondary batteries in the charged state were disassembled to take out the positive electrodes, and the positive electrodes were analyzed by XRD.

Figure 37:
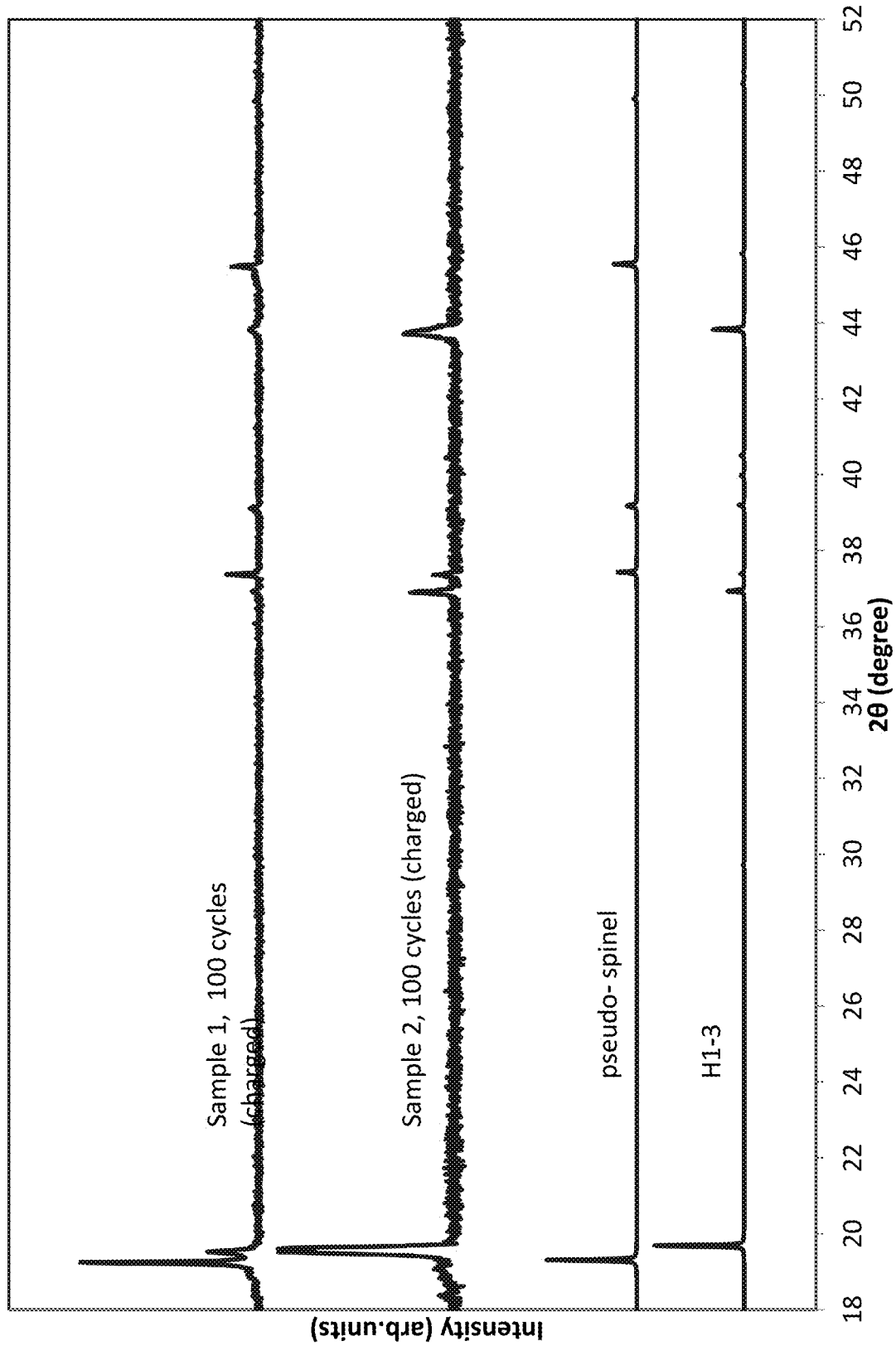
FIG. 37 shows XRD patterns of positive electrode active materials in Example 1.

FIG. 37 shows the XRD patterns of the positive electrodes of the secondary batteries using Sample 1 and Sample 2 which were charged with high voltage after charged and discharged 100 times. For comparison, the patterns of the pseudo-spinel crystal structure and the H1-3 type structure are also shown.

As shown in FIG. 37, the positive electrode active material of Sample 1 had the pseudo-spinel crystal structure even after 100 cycles of charging and discharging. The Rietveld analysis revealed that the proportion of the pseudo-spinel crystal structure was 43.6 wt % and that of the H1-3 type structure was 56.4 wt %.

Meanwhile, almost all the positive electrode active materials of Sample 2 had the H1-3 type structure. The peaks were greatly broad, which suggested that the crystallinity was largely decreased.

[Cycle Characteristics]

FIGS. 38A and 38B and FIGS. 39A and 39B show the measurement results of the cycle characteristics of secondary batteries using Samples 1, 2, 4, 5, 7, 10, 12, and 13. Note that in each of the measured secondary batteries, the carried amount of the positive electrode active material layer was more than or equal to 7 mg/cm$^2$ and less than or equal to 8 mg/cm$^2$.

Figure 38A:
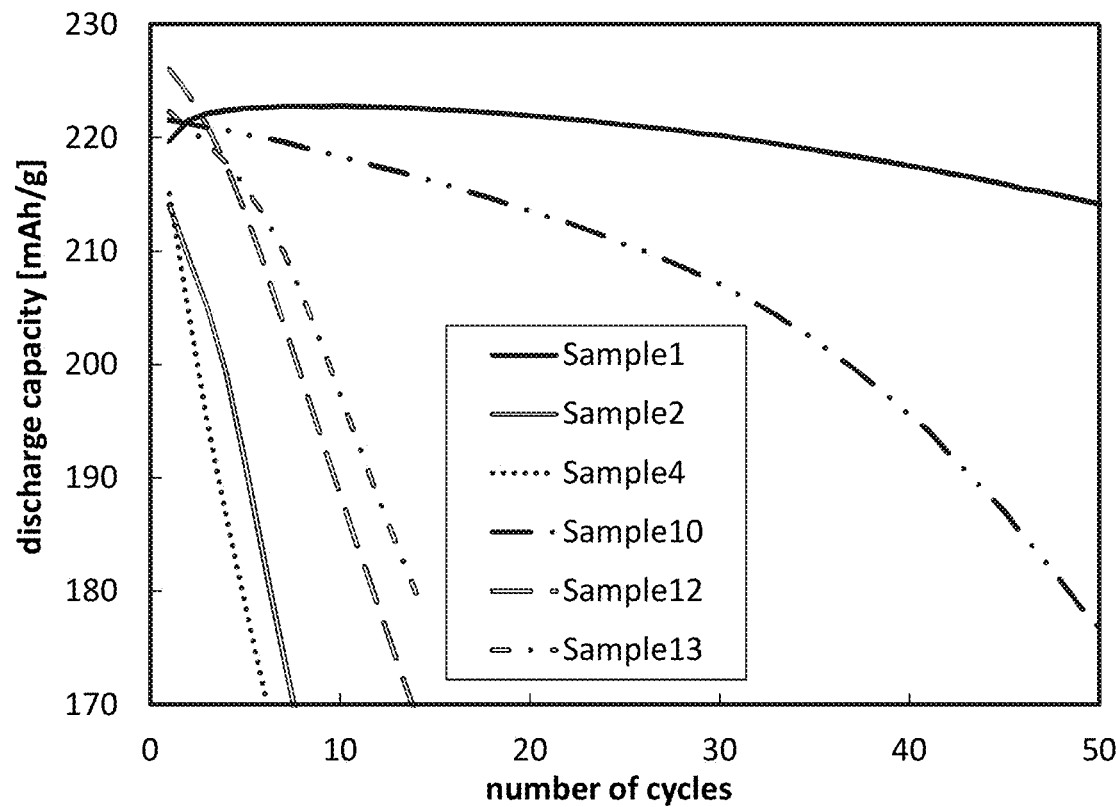
FIGS. 38A and 38B are each a graph showing cycle characteristics of secondary batteries using positive electrode active materials in Example 1.
Figure 38B:
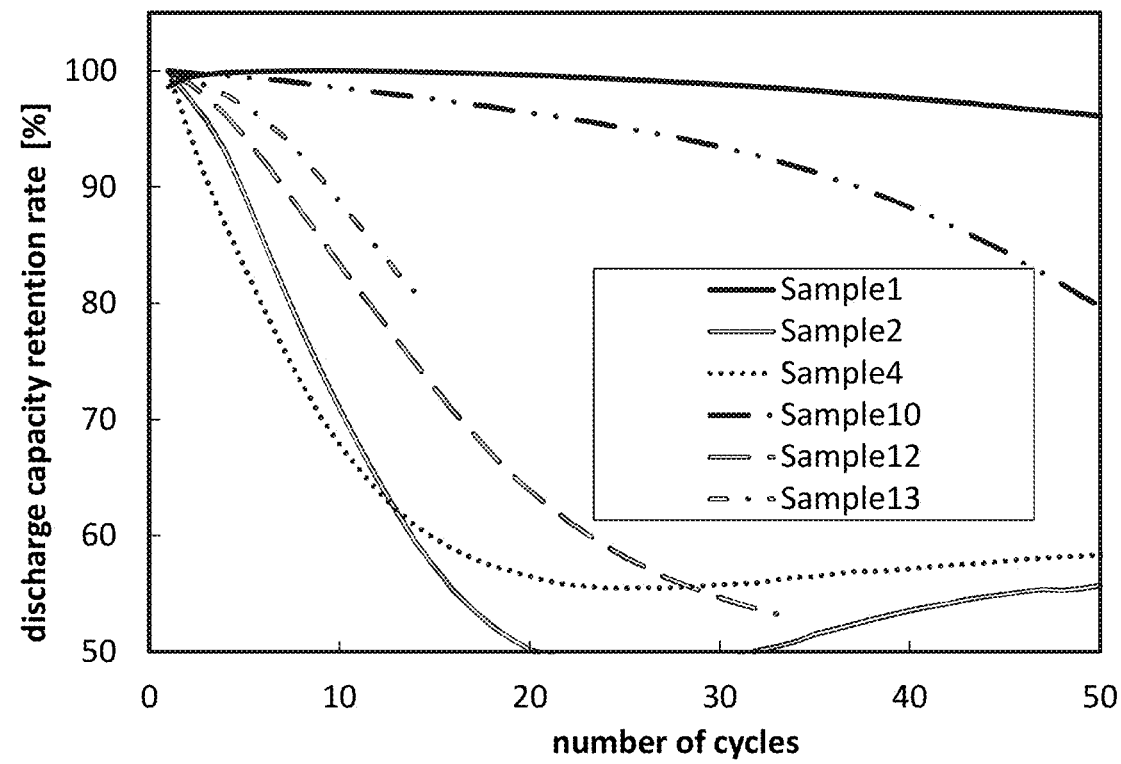

FIGS. 38A and 38B show the measurement results of Samples 1, 2, 4, 10, 12, and 13, on which 50 cycles of charging and discharging, the CCCV charging at 25° C. (0.5 C, 4.6 V, a termination current of 0.01 C) and the CC discharging (0.5 C, 2.5 V), were performed. FIG. 38A shows the discharge capacity and FIG. 38B shows the discharge capacity retention rate. Note that in FIGS. 38A and 38B, 1 C was set to 137 mA/g, which was a current value per weight of the positive electrode active material.

Sample 1 obtained through 60-hour annealing that had the pseudo-spinel crystal structure after high-voltage charging showed extremely excellent cycle characteristics. The discharge capacity retention rate after 50 cycles was 96.1%.

Meanwhile, Sample 4 not subjected to any treatment and Sample 2 obtained through 2-hour annealing that had the H1-3 type structure after high-voltage charging were largely degraded. The discharge capacity retention rate after 50 cycles was less than or equal to 60% in both samples.

Sample 10 obtained through annealing after mixing the magnesium source and the fluorine source with the lithium cobalt oxide (No. 442704) manufactured by Sigma-Aldrich Corporation, which was used as lithium cobalt oxide synthesized in advance, showed excellent cycle characteristics. The discharge capacity retention rate after 50 cycles was 79.8%.

Meanwhile, Sample 12 and Sample 13 using lithium cobalt oxide that contained titanium at approximately 5,100 ppm wt as an impurity were largely degraded, although annealing was performed after the lithium cobalt oxide was mixed with the magnesium source and the fluorine source. Sample 12 obtained through short annealing and Sample 13 obtained through long annealing had similar results.

Figure 39A:
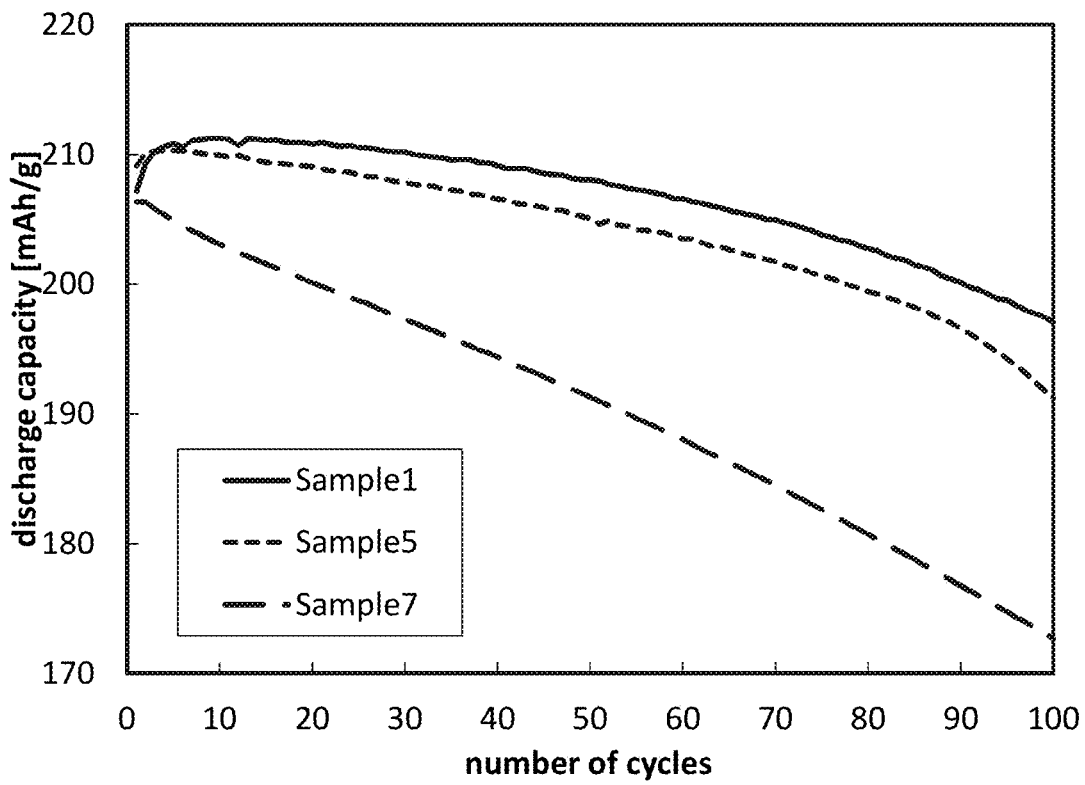
FIGS. 39A and 39B are each a graph showing cycle characteristics of secondary batteries using positive electrode active materials in Example 1.
Figure 39B:
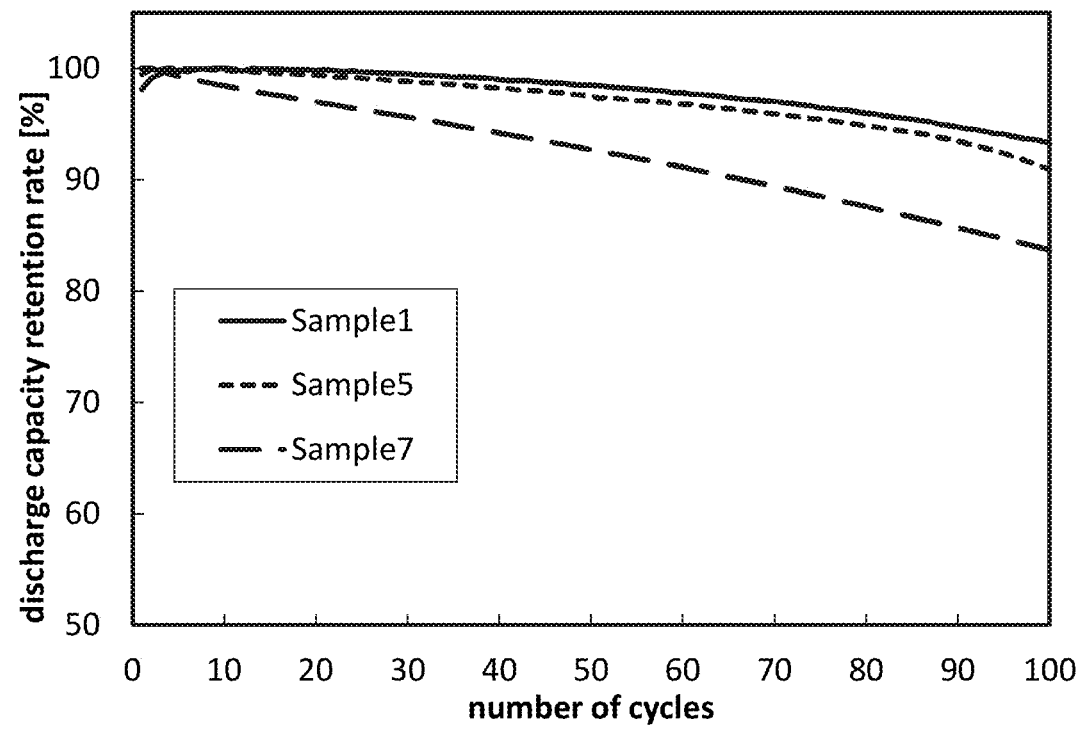

FIGS. 39A and 39B show the measurement results of Samples 1, 5, and 7 on which 100 cycles of charging and discharging were performed at 45° C. FIG. 39A shows the discharge capacity and FIG. 39B shows the discharge capacity retention rate. In FIGS. 39A and 39B, 1 C was set to 160 mA/g, which was a current value per weight of the positive electrode active material. As the measurement conditions, the CCCV charging (1.0 C, 4.55 V, a termination current of 0.05 C) and the CC discharging (1.0 C, 3.0 V) were performed.

When measured at 45° C., Sample 1 showed extremely excellent cycle characteristics. The discharge capacity retention rate after 100 cycles was 93.3%. Sample 5 formed in the same manner as Sample 1 except that lithium cobalt oxide with a small particle size was used and annealing was performed for 2 hours also showed extremely excellent cycle characteristics.

Furthermore, Sample 7 obtained through annealing after addition of the magnesium source and the fluorine source to the starting material and baking showed excellent cycle characteristics.

FIGS. 40A and 40B and FIGS. 41A and 41B show the cycle characteristics of Sample 1 and Sample 4 obtained by changing the carried amount of the positive electrode active material layer, the electrolyte solution, and the charging voltage from those in FIGS. 38A and 38B and FIGS. 39A and 39B.

In each of the measured secondary batteries, the carried amount of the positive electrode active material layer was set to more than or equal to 20 mg/cm$^2$. In addition, two kinds of electrolyte solutions, one in which ethylene carbonate (EC) and diethyl carbonate (DEC) at a volume ratio of 3:7 were mixed, and the other in which vinylene carbonate (VC) at a 2 wt % was further added to the solution, were used. The charging voltage was set to 4.5 V or 4.6 V.

Figure 40A:
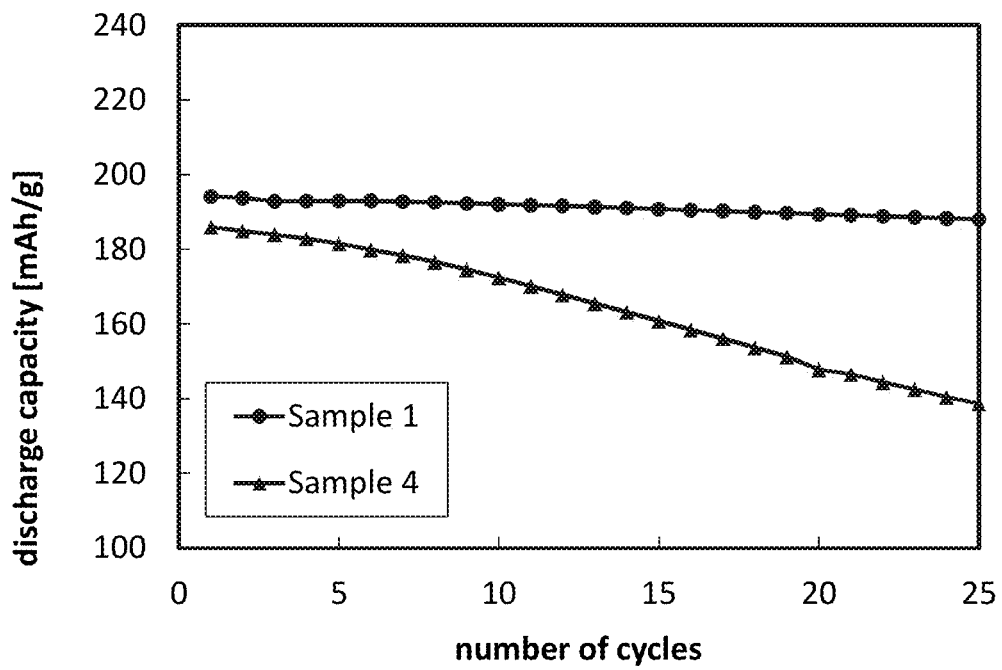
FIGS. 40A and 40B are each a graph showing cycle characteristics of secondary batteries using positive electrode actives material in Example 1.
Figure 40B:
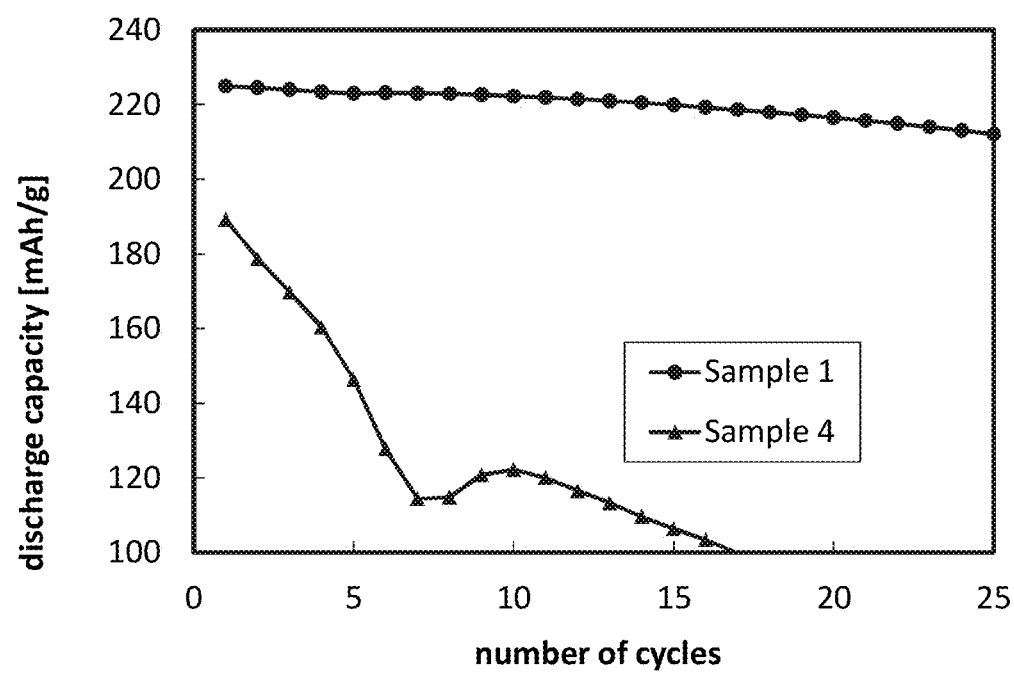

FIGS. 40A and 40B show the cycle characteristics of Sample 1 and Sample 4 using the electrolyte solution in which EC and DEC were mixed at a volume ratio of 3:7. FIG. 40A shows the cycle characteristics at a charging voltage of 4.5 V and FIG. 40B shows the cycle characteristics at a charging voltage of 4.6 V.

Figure 41A:
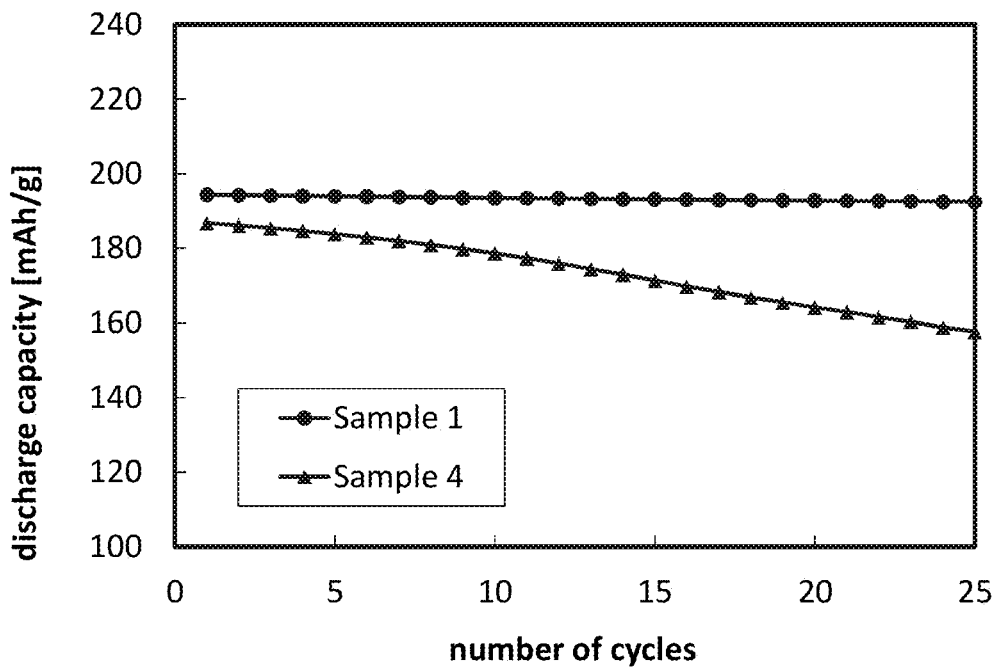
FIGS. 41A and 41B are each a graph showing cycle characteristics of secondary batteries using positive electrode active materials in Example 1.
Figure 41B:
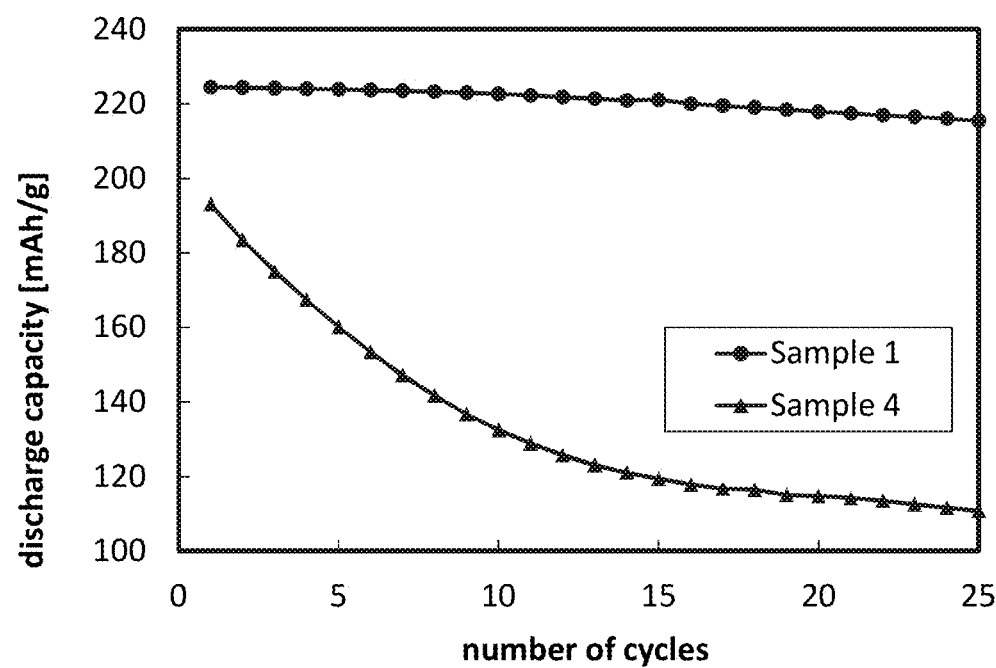

FIGS. 41A and 41B show the cycle characteristics of Sample 1 and Sample 4 using the electrolyte solution in which vinylene carbonate (VC) at a 2 wt % was further added to the solution having a volume ratio of 3:7. FIG. 41A shows the cycle characteristics at a charging voltage of 4.5 V and FIG. 41B shows the cycle characteristics at a charging voltage of 4.6 V.

As apparent from FIGS. 40A and 40B and FIGS. 41A and 41B, Sample 1 showed extremely excellent cycle characteristics even when the carried amount of the positive electrode active material layer, the electrolyte solution, and the charging voltage were changed.

The above results of various kinds of analysis revealed that a positive electrode active material having a pseudo-spinel crystal structure when charged with a high voltage of 4.6 V showed extremely excellent cycle characteristics. In addition, it was also revealed that, in order to have the pseudo-spinel crystal structure after high-voltage charging, it was effective that magnesium and fluorine were contained and annealing was performed at an appropriate temperature for an appropriate time. It was suggested that the appropriate time for annealing differed depending on the particle size or the composition of lithium cobalt oxide.

In addition, although annealing may be performed on lithium cobalt oxide in which magnesium and fluorine were added to the starting material and baking is performed, it was found to be more effective to perform annealing on lithium cobalt oxide with a small amount of impurities after being mixed with magnesium and fluorine.

Furthermore, from the comparison of the lattice constants and the cycle characteristics, it was revealed that the positive electrode active material tended to have excellent cycle characteristics when lithium cobalt oxide with a lattice constant of the c-axis of less than or equal to $14.060 \times 10^{-10}$ m was used and annealing was performed after the lithium cobalt oxide was mixed with a magnesium source and a fluorine source. This suggested that the positive electrode active material with excellent cycle characteristics was able to be obtained in the following manner: a composite oxide having a layered rock-salt crystal structure with less foreign element substitutions and $Co_3O_4$ having the spinel crystal structure was formed; a magnesium source and a fluorine source were added to the composite oxide; and then magnesium was inserted into the lithium position.

[Rate Characteristics]

Next, FIGS. 42A and 42B and FIGS. 43A and 43B show the measurement results of the rate characteristics of the secondary batteries using Sample 1 showing extremely excellent cycle characteristics and Sample 4 that is a comparative example obtained not through addition of the magnesium source and the fluorine source.

The coin cells for rate characteristics measurement were formed in the same manner as the above coin cells for XRD measurement, except that the carried amount carried amount of each positive electrode active material layer was set to more than or equal to 20.8 mg/cm$^2$ and less than or equal to 21.0 mg/cm$^2$. In the first charging, the upper limit voltage was set to 4.5 V or 4.6 V, and the CCCV charging was performed at 0.2 C, 4.6 V, and a cutoff current of 0.05 C. The first CC discharging was performed at 0.2 C and a cutoff voltage of 3.0 V. Here, 1 C was set to 200 mA/g, which was a current value per weight of the positive electrode active material. After the second charging and discharging, the measurement was performed by changing only discharging rate in the following order: 0.2 C charge/0.2 C discharge; 0.2 C charge/0.5 C discharge; 0.2 C charge/1.0 C discharge; and 0.2 C charge/2.0 C discharge. The measurement temperature was 25° C.

Figure 42A:
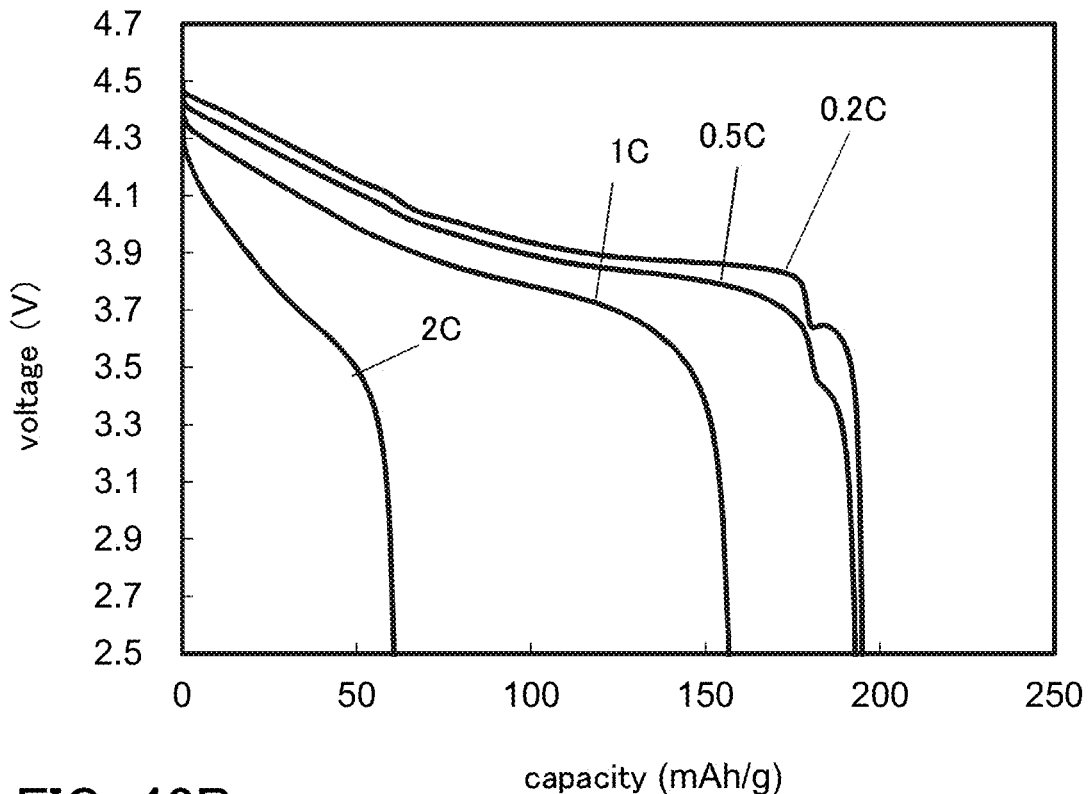
FIGS. 42A and 42B are each a graph showing rate characteristics of secondary batteries using positive electrode active materials in Example 1.
Figure 42B:
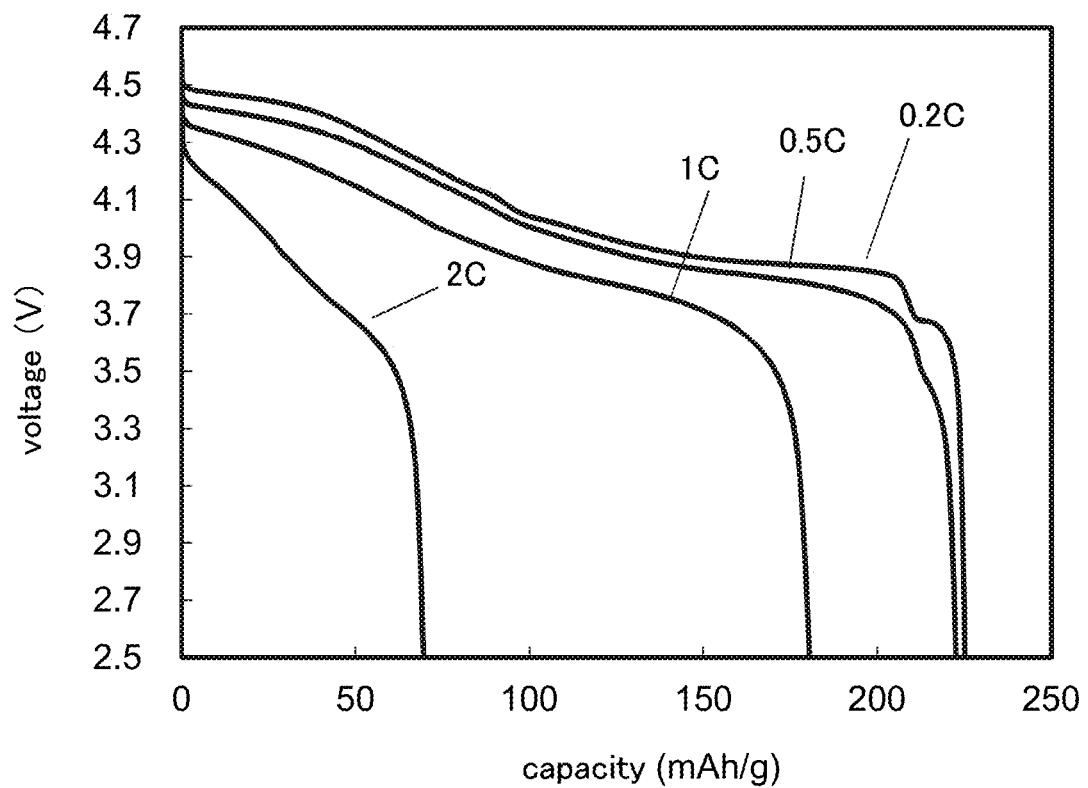
Figure 43A:
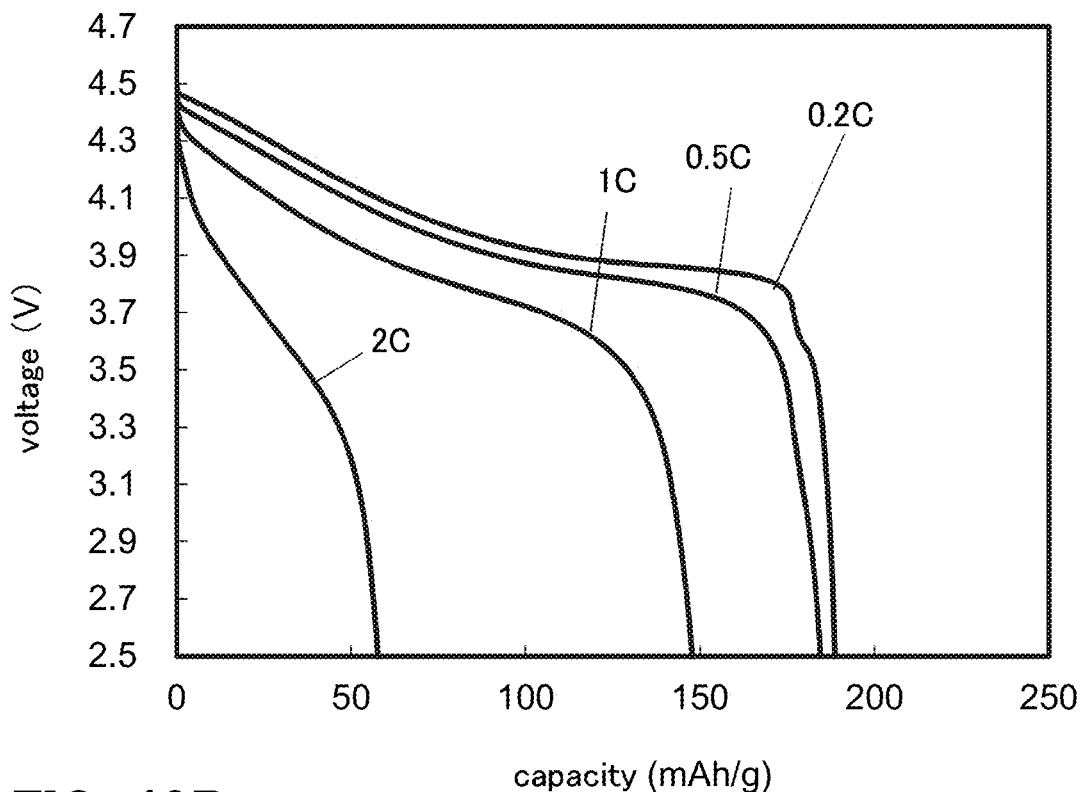
FIGS. 43A and 43B are each a graph showing rate characteristics of secondary batteries using positive electrode active materials in Example 1.
Figure 43B:
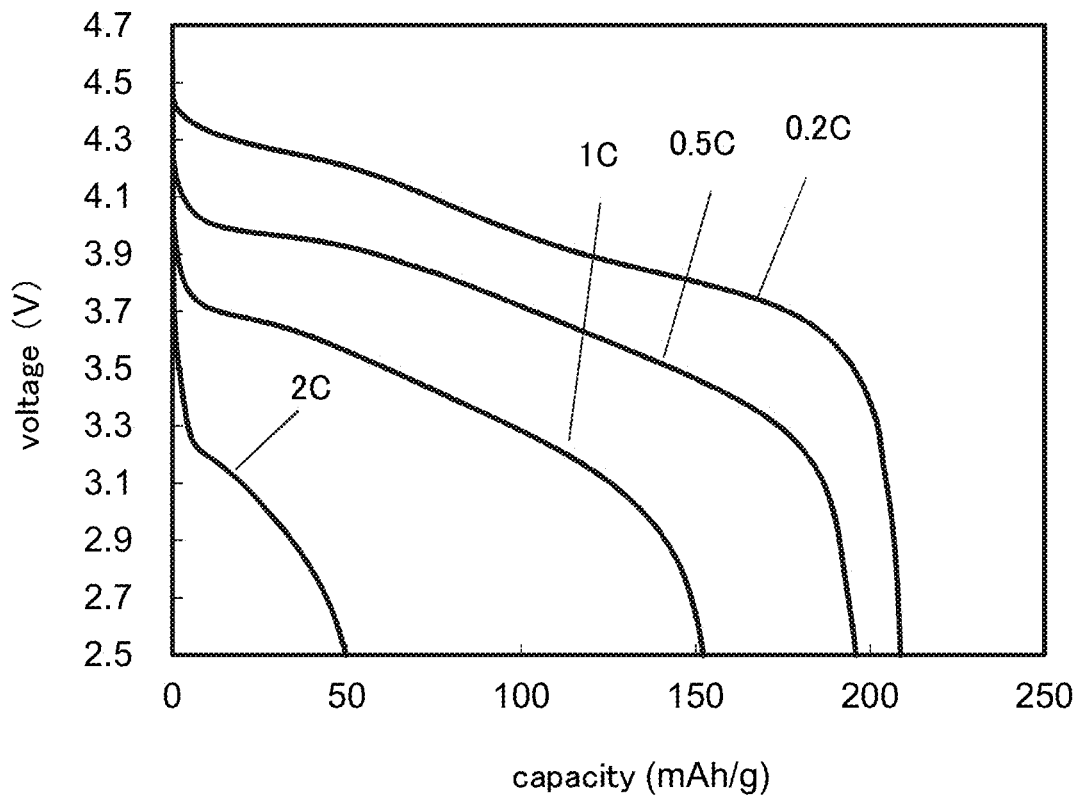

FIG. 42A shows the discharge curve of Sample 1 at a charging voltage of 4.5 V for each rate, and FIG. 42B shows the discharge curve of Sample 1 at a charging voltage of 4.6 V for each rate. FIG. 43A shows the discharge curve of Sample 4 at a charging voltage of 4.5 V for each rate, and FIG. 43B shows the discharge curve of Sample 4 at a charging voltage of 4.6 V for each rate.

As apparent from FIGS. 42A and 42B and FIGS. 43A and 43B, the secondary battery using Sample 1 showed more excellent rate characteristics than that using Sample 4 when charged with high voltage, and this tendency became more notable as the rate became higher.

In addition, when the secondary battery using Sample 1 was discharged at a low rate such as 0.2 C, a characteristic change in voltage appeared just before the end of discharging.

[Charge Curve and dQ/dVvsV Curve]

Next, the results of comparing the charge curves and dQ/dVvsV curves between the secondary batteries using Sample 1 of one embodiment of the present invention and Sample 15 obtained through 2-hour annealing at 500° C. after a layer containing aluminum was formed on the surface are shown.

Figure 44:
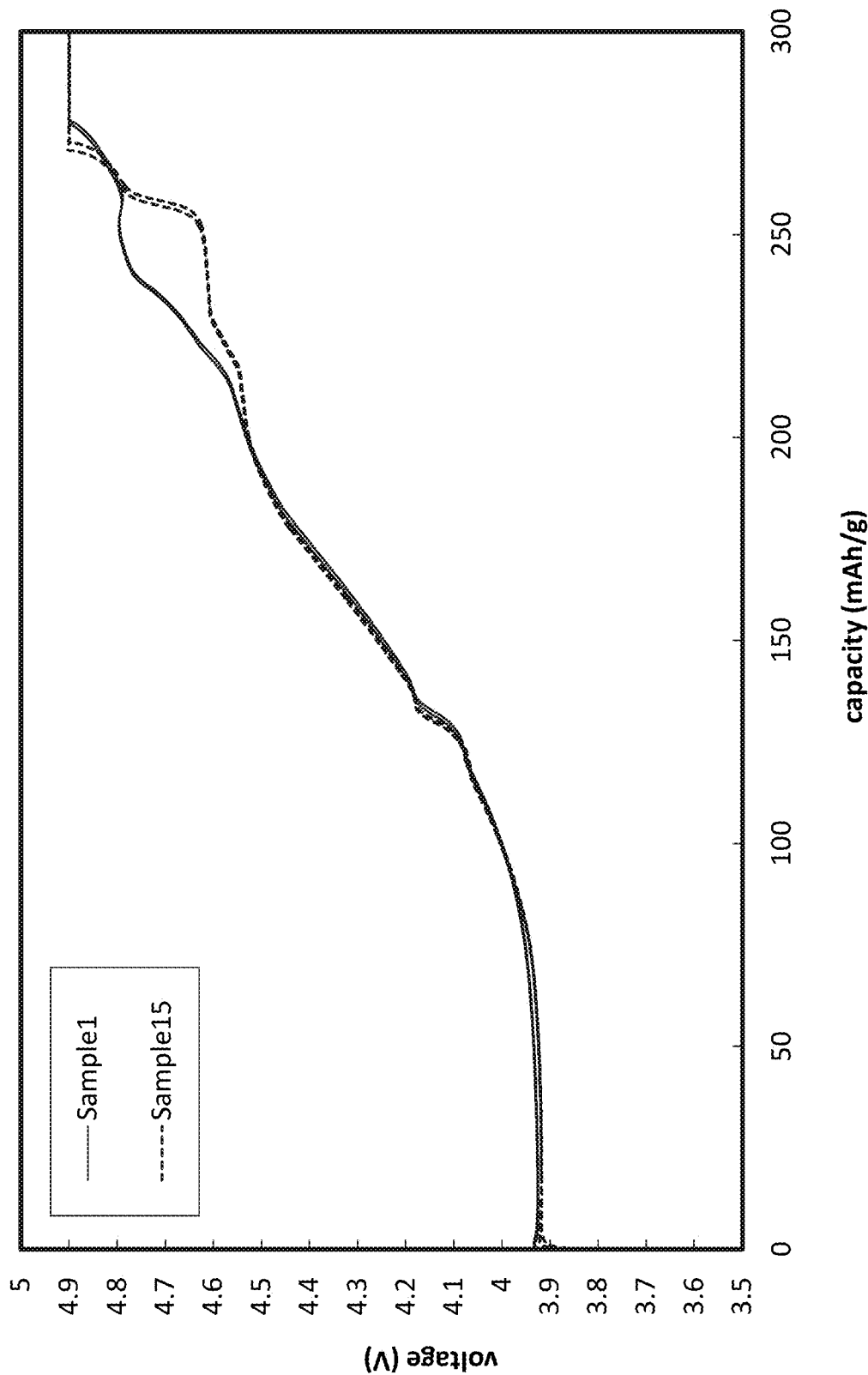
FIG. 44 is a graph showing charge capacity and voltage of Sample 1 and Sample 15 in Example 1.

FIG. 44 shows the charge curves of the secondary batteries using Sample 1 and Sample 15 after charged at 25° C. and 10 mAh/g until voltage reached 4.9 V. The solid line shows the charge curve of Sample 1 and the broken like shows that of Sample 15. Note that two secondary batteries using Sample 1 and two secondary batteries using Sample 15 were measured.

Figure 45A:
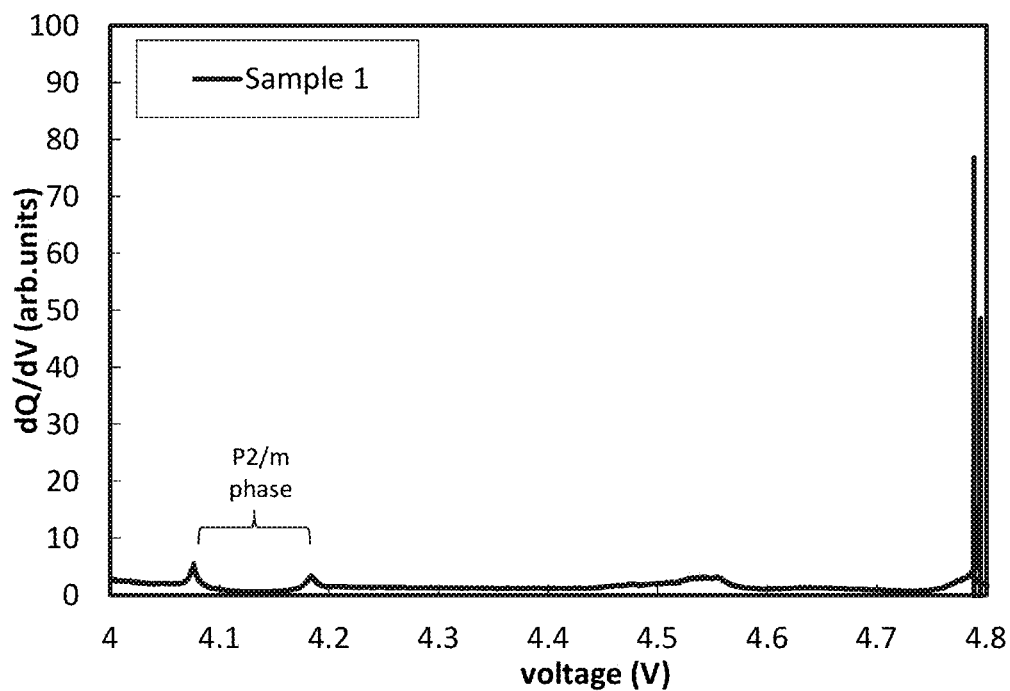
FIGS. 45A and 45B are graphs showing dQ/dVvsV of Sample 1 and Sample 15 in Example 1.
Figure 45B:
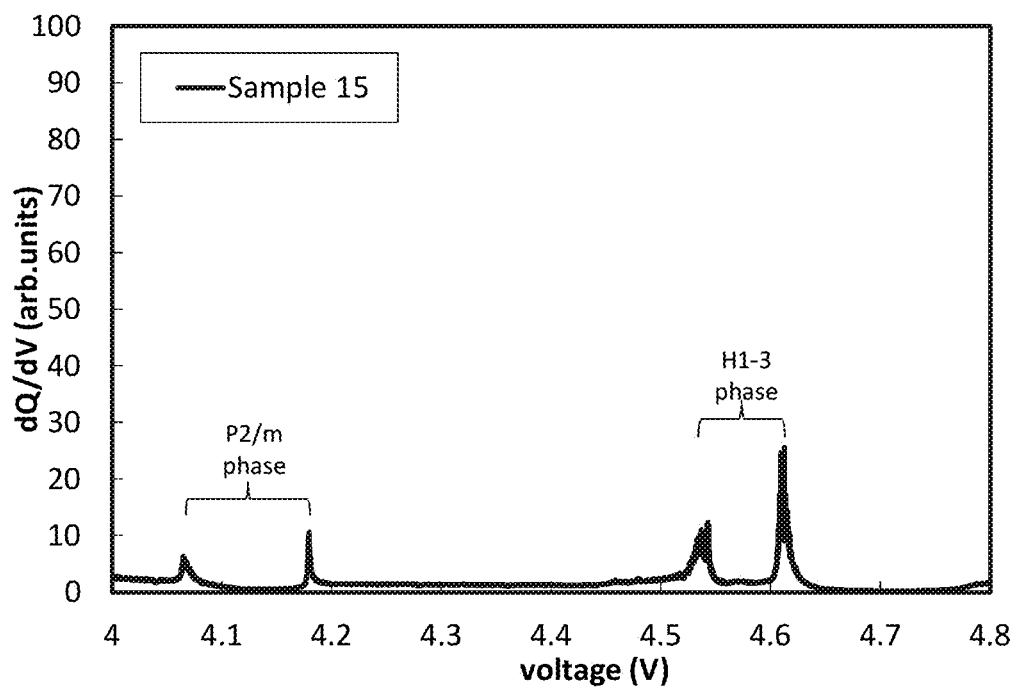

FIGS. 45A and 45B show the dQ/dVvsV curves showing the amount of change in voltage with respect to the charge capacity calculated from the data of FIG. 44. FIG. 45A shows the dQ/dVvsV curve of Sample 1, and FIG. 45B shows that of Sample 15.

As apparent from FIGS. 45A and 45B, in both Sample 1 and Sample 15, the peaks were observed at voltages of approximately 4.06 V and approximately 4.18 V, and the change in capacity with respect to voltage was nonlinear. Between these two peaks, Sample 1 and Sample 15 probably had the crystal structure with a charge depth of 0.5 (space group P2/m). In the space group P2/m with a charge depth of 0.5, lithium was arranged as illustrated in FIG. 4. It was considered that energy was consumed due to this arrangement of lithium, and thus the change in capacity with respect to voltage became nonlinear.

In Sample 15 (comparative example), large peaks were observed at approximately 4.54 V and approximately 4.61 V. Between these two peaks, Sample 15 probably had the H1-3 type structure.

Figure 46:
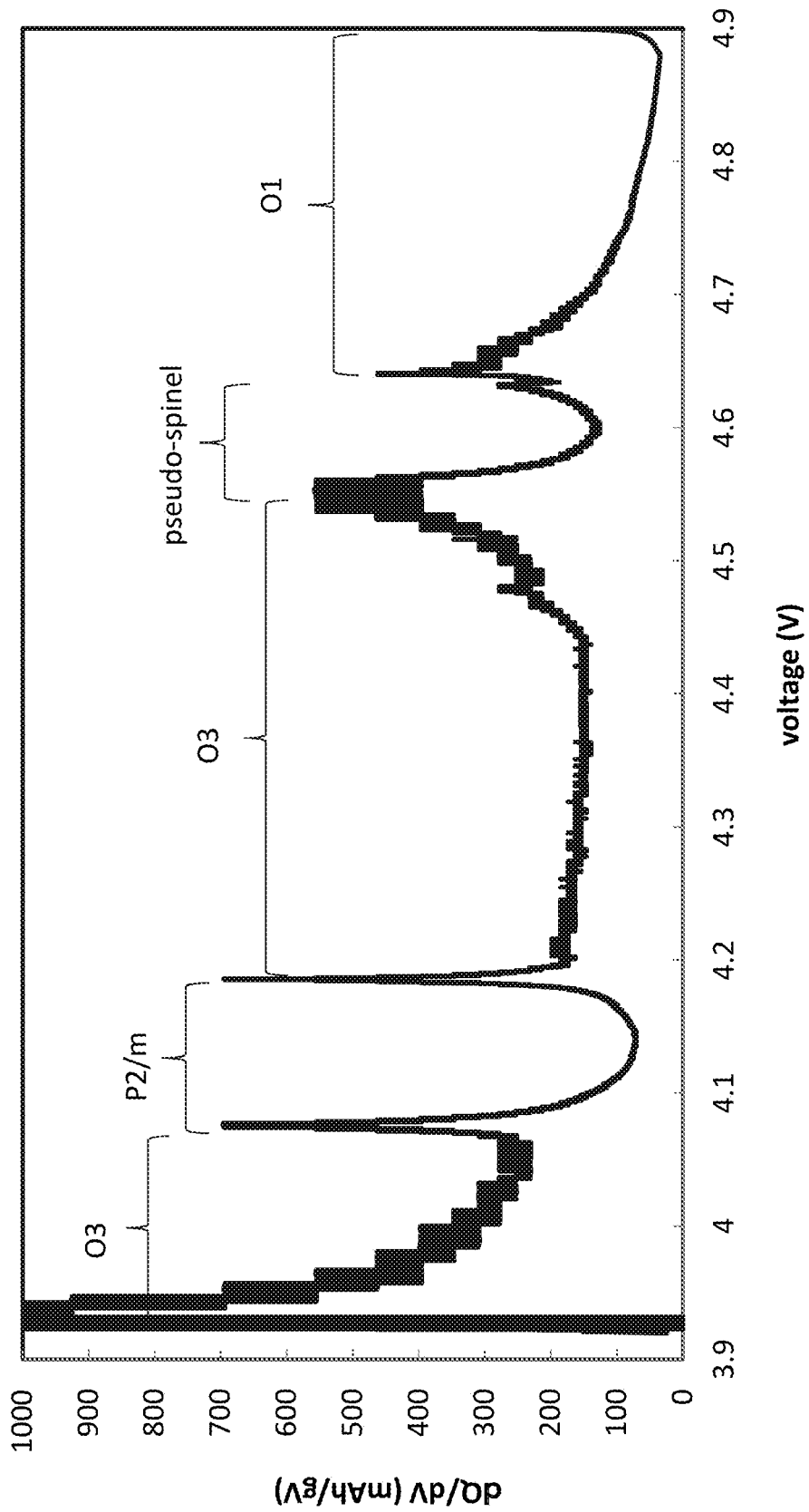
FIG. 46 is a graph showing dQ/dVvsV of Sample 1 in Example 1.

Meanwhile, in Sample 1 showing extremely excellent cycle characteristics, a clear peak did not appear around the above voltages although a small peak was observed at approximately 4.55 V. Here, the dQ/dVvsV curve calculated from more specific measurement results is shown in FIG. 46 and FIG. 47. FIG. 47 is an enlarged view of FIG. 46.

As shown in FIG. 47, peaks were observed at approximately 4.55 V and approximately 4.63 V when measured in detail. Between these two peaks, Sample 1 probably had the pseudo-spinel crystal structure. Between the peak at approximately 4.63 V and the peak at approximately 4.64 V, Sample 1 probably had the H1-3 type structure.

As described above, in the dQ/dVvsV curve of Sample 1, some peaks are extremely broad or small, in some cases. In such a case, there is a possibility that two crystal structures coexist. For example, the O3 phase and the pseudo spinel phase may coexist, or the pseudo spinel phase and the H1-3 phase may coexist.

[Discharge Curve and dQ/dVvsV Curve]

Next, the results of comparing the discharge curves and the dQ/dVvsV curves between the secondary batteries using Sample 1 of one embodiment of the present invention and Sample 4 that is a comparative example are shown.

Figure 48A:
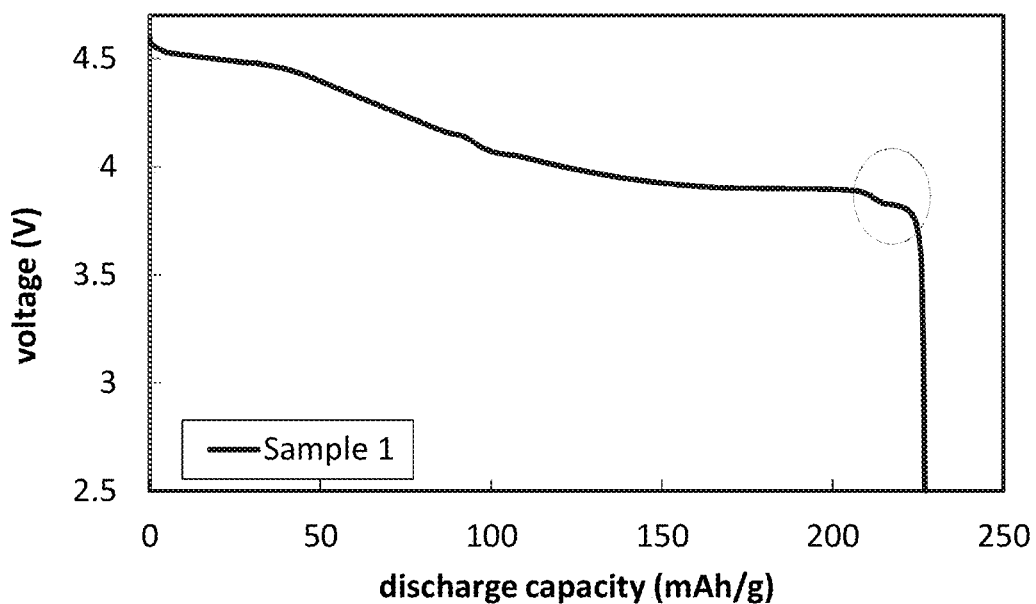
FIGS. 48A and 48B are graphs showing discharge capacity and voltage of Sample 1 and Sample 4 in Example 1.
Figure 48B:
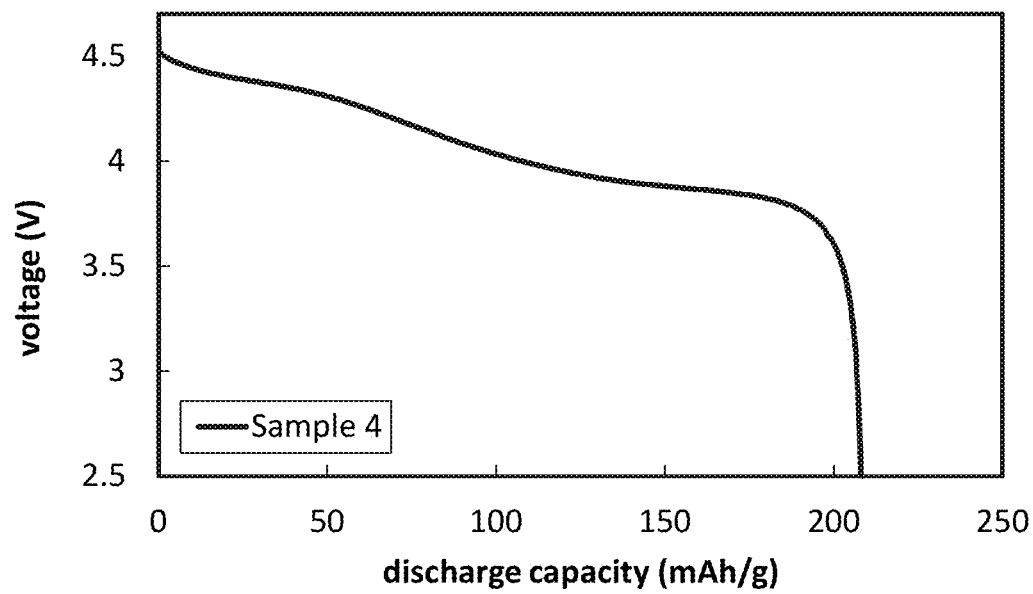

FIG. 48A shows the discharge curve of Sample 1 and FIG. 48B shows that of Sample 4. FIGS. 48A and 48B both show the discharge curve obtained by performing discharging after the CCCV charging at 4.6 V. For the discharging, CC discharging was performed until voltage reached 2.5 V The discharge rate was 0.05 C (1 C=200 mA/g).

As shown in FIG. 48A, a characteristic change in voltage was observed in Sample 1 just before the end of discharging (a portion surrounded by a broken line in FIG. 48A). This is the same voltage change as that observed in the discharging at a low rate shown in FIGS. 40A and 40B.

Figure 49A:
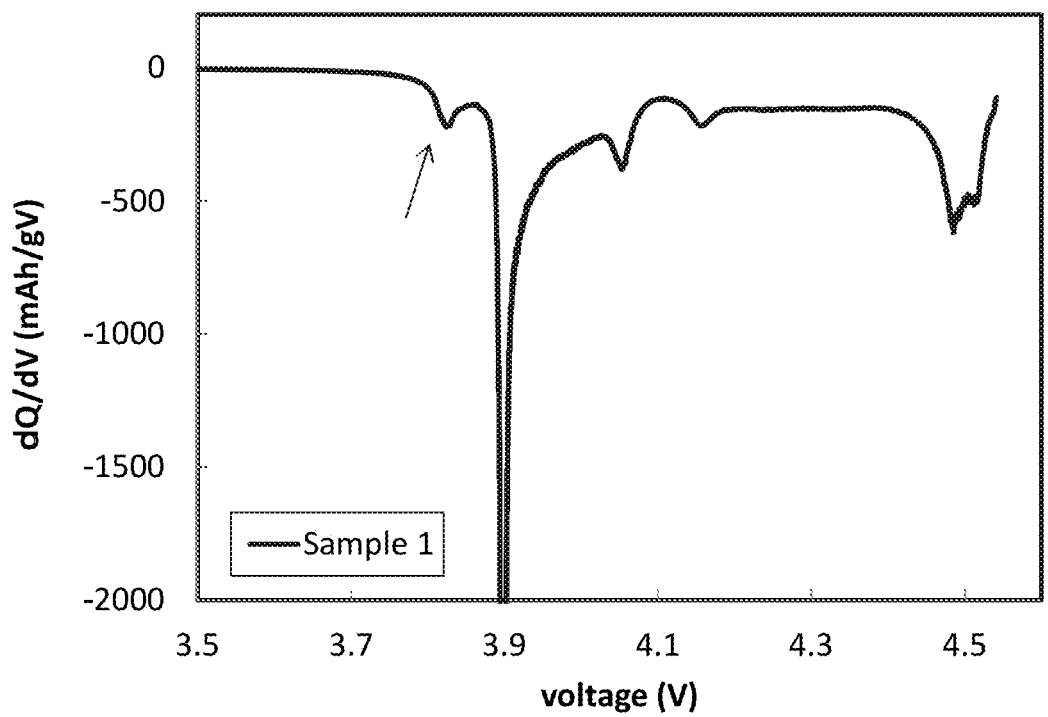
FIGS. 49A and 49B are graphs showing dQ/dVvsV of Sample 1 and Sample 4 in Example 1.
Figure 49B:
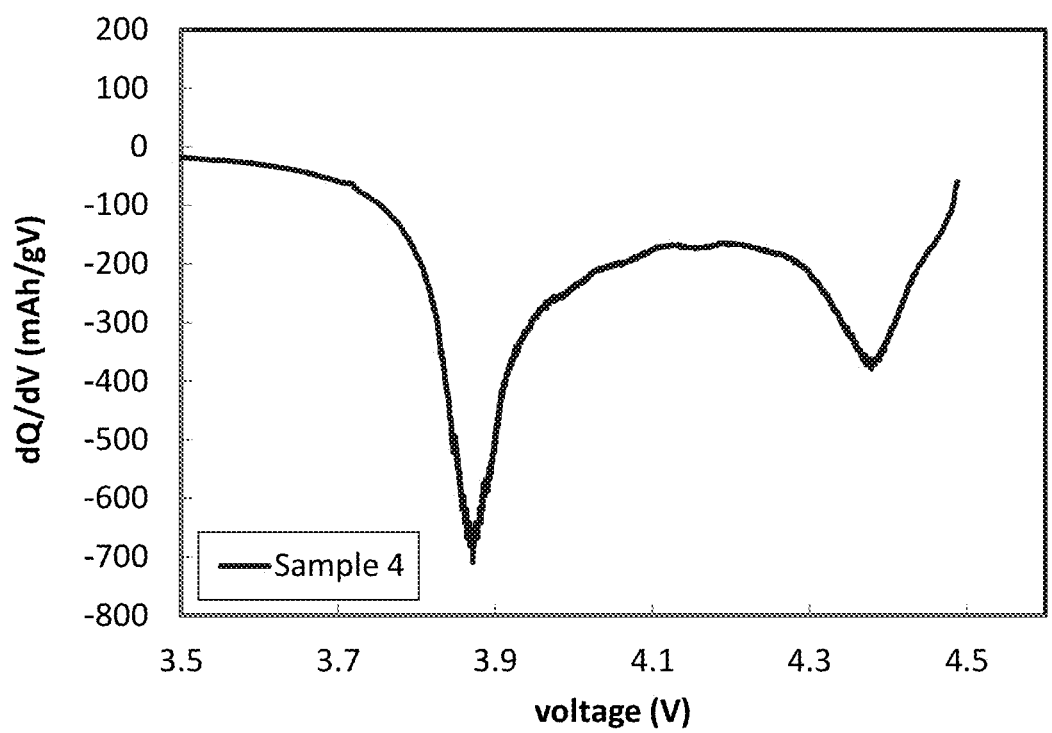

FIGS. 49A and 49B show the dQ/dVvsV curves showing the amount of shift in voltage with respect to capacity calculated from data of FIGS. 48A and 48B. FIG. 49A shows the dQ/dVvsV curve of Sample 1 and FIG. 49B shows that of Sample 4. For the clarity of the peaks, the graphs show only results in a region with the voltage of higher than or equal to 3.5 V.

As shown in FIG. 49B, in Sample 4 obtained not through addition of the magnesium source and the fluorine source, two large peaks having downward-projected shapes were observed at approximately 4.37 V and approximately 3.87 V, which clearly showed that the discharge curve of Sample 4 had two inflection points.

In Sample 1, as apparent from FIG. 49A, more peaks having downward-projected shapes were observed. The largest peak appeared at approximately 3.9 V. As indicated by an arrow in the graph, at least one peak appeared in the range of 3.5 V to 3.9 V. This peak indicated by the arrow showed the change in voltage at the portion surrounded by the broken line in FIG. 48A.

As described with reference to FIGS. 40A and 40B, FIGS. 48A and 48B, and FIGS. 49A and 49B, the positive electrode active material of Sample 1 of one embodiment of the present invention showed a characteristic change in voltage just before the end of discharging, when discharging was performed at a low rate such as less than or equal to 0.2 C after a high-voltage charging. This change can be clearly ascertained in the dQ/dVvsV curve if at least one peak appears in the voltage range of 3.5 V to 3.9 V.

Example 2

In this example, positive electrode active materials containing cobalt and nickel as transition metals were formed and their characteristics were analyzed by XRD.

[Formation of Positive Electrode Active Material]

<<Sample 21>>

As Sample 21, a positive electrode active material in which the proportion Ni/(Co+Ni), the proportion of nickel atoms (Ni) to the sum of cobalt atoms and nickel atoms (Co+Ni), was 0.01 was formed in the formation method described in Embodiment 1 with reference to FIG. 1.

First, as in Steps S11 to S14 in Embodiment 1 and Example 1, the first mixture in which LiF and $MgF_2$ were mixed at a molar ratio of 1:3 was formed.

Next, as in Steps S21 and S22 in Embodiment 1, source materials were weighted so that the atomic ratio was Li:Ni:Co=1:0.01:0.99 (Ni/(Co+Ni)=0.01) and mixed. Lithium carbonate, cobalt oxide, and nickel hydroxide were used as the lithium source, the cobalt source, and the nickel source, respectively. The mixing was performed at 300 rpm for 20 hours by a wet method after acetone was added.

Next, as in Steps S23 to S25 in Embodiment 1, the mixture was collected after baking at 900° C. for 10 hours using a maffle furnace with a dry air atmosphere, whereby a composite oxide containing lithium, cobalt, nickel, and oxygen was obtained. The flow rate of the dry air was 10 L/min. The temperature rising rate was 200° C./hr and the temperature decreasing time was longer than or equal to 10 hours.

Next, as in Steps S31 to S33 in Embodiment 1, the first mixture and the composite oxide containing lithium, cobalt, nickel, and oxygen were mixed, whereby the second mixture was obtained. The first mixture and the composite oxide were mixed so that the atomic weight of magnesium contained in the first mixture was 0.5 atomic % with respect to the sum of cobalt and nickel atoms.

Next, as in Steps S34 and S35 in Embodiment 1, the second mixture was collected after annealing at 850° C. in an oxygen atmosphere for 2 hours using a maffle furnace, whereby a positive electrode active material was obtained. The flow rate of oxygen was 10 L/min. The temperature rising rate was 200° C./hr and the temperature decreasing time was longer than or equal to 10 hours. The positive electrode active material obtained through the above steps was used as Sample 21.

<<Sample 22>>

A positive electrode active material was formed as Sample 22 (comparative example) in the same manner as Sample 21 except that LiF and $MgF_2$ were not added in Step S11 and annealing was not performed in Step S34.

<<Sample 23>>

A positive electrode active material was formed as Sample 23 in the same manner as Sample 21 except that the source materials were weighted to satisfy Ni/(Co+Ni)=0.075 in Step S21.

<<Sample 24>>

A positive electrode active material was formed as Sample 24 (comparative example) in the same manner as Sample 23 except that LiF and $MgF_2$ were not added in Step S11 and annealing was not performed in Step S34.

<<Sample 25>>

A positive electrode active material was formed as Sample 25 in the same manner as Sample 21 except that the source materials were weighted so that Ni/(Co+Ni)=0.1 in Step S21.

<<Sample 26>>

A positive electrode active material was formed as Sample 26 (comparative example) in the same manner as Sample 25 except that LiF and $MgF_2$ were not added in Step S11 and annealing was not performed in Step S34.

Table 4 shows the formation conditions of Samples 21 to 26.

TABLE 4

| | Formation conditions | | |
|---|---|---|---|
| | Ni/(Co + Ni) | Additives | Annealing |
| Sample 21 | 0.01 | LiF:$MgF_2$ = 1:3 | 850° C. 2 hrs |
| Sample 22 (comparative example) | 0.01 | No additive | not performed |
| Sample 23 | 0.75 | LiF:$MgF_2$ = 1:3 | 850° C. 2 hrs |
| Sample 24 (comparative example) | 0.75 | No additive | not performed |
| Sample 25 | 0.1 | LiF:$MgF_2$ = 1:3 | 850° C. 2 hrs |
| Sample 26 (comparative example) | 0.1 | No additive | not performed |

[Formation of Secondary Batteries]

Next, coin-type secondary batteries were formed similarly to the batteries in Example 1 using Samples 21 to 26 formed in the above manner.

[XRD Results Obtained After First Charging]

As in Example 1, the secondary batteries using Samples 21 to 26 were charged at CCCV and 4.6 V, the positive electrodes were taken out, and then the positive electrodes were analyzed by XRD.

Figure 50:
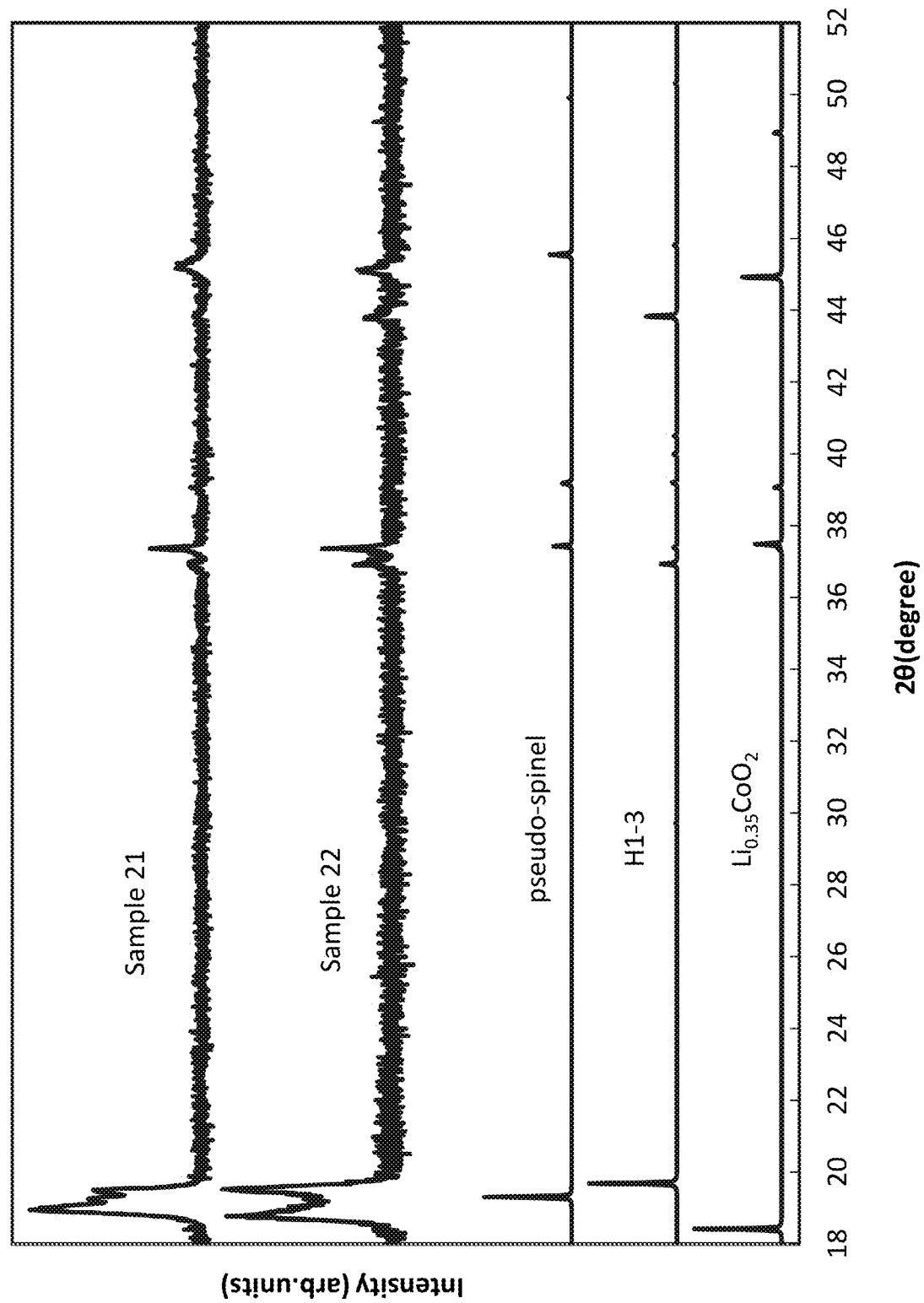
FIG. 50 shows XRD patterns of Sample 21 and Sample 22 in Example 2.
Figure 51B:
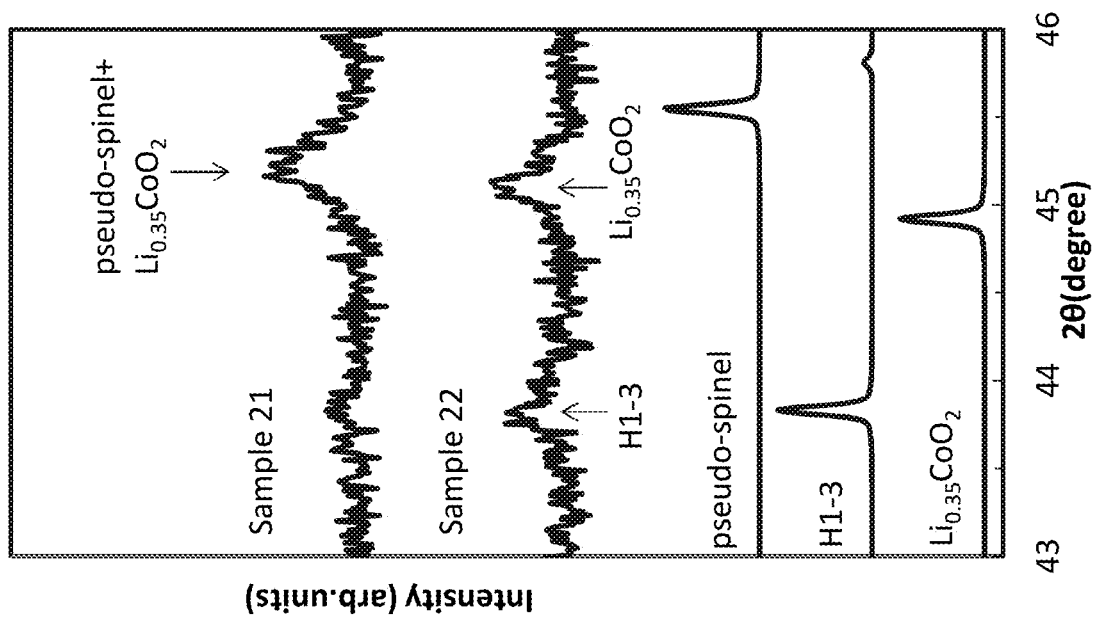
FIGS. 51A and 51B each show XRD patterns of Sample 21 and Sample 22 in Example 2.
Figure 51A:
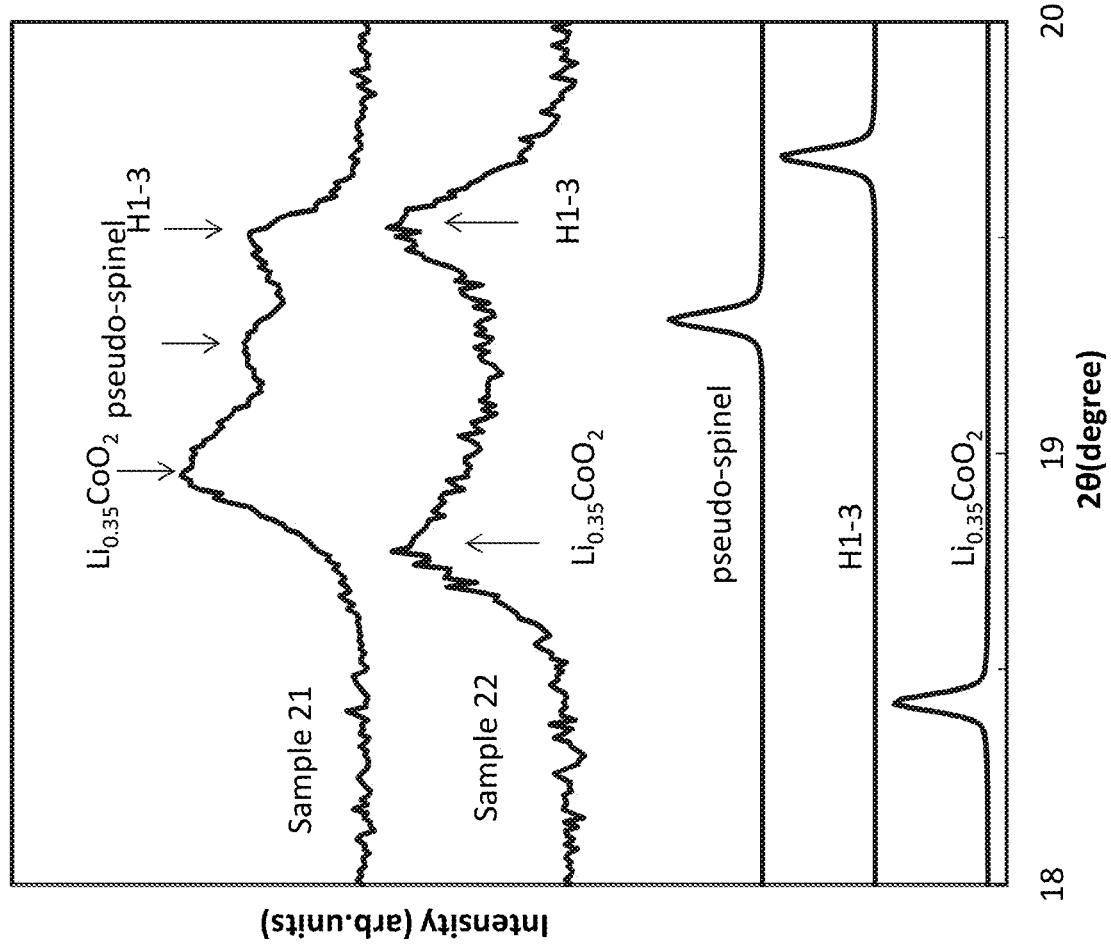

FIG. 50 and FIGS. 51A and 51B show the XRD patterns of the positive electrodes of the secondary batteries using Sample 21 and Sample 22 after being charged at 4.6 V. FIG. 51A is an enlarged graph of FIG. 50 at 2θ ranging from 18° to 20°. FIG. 51B is an enlarged graph of FIG. 50 at 2θ ranging from 43° to 46° in FIG. 50. For comparison, the patterns of the pseudo-spinel crystal structure, the H1-3 type structure, and the crystal structure of $Li_{0.35}CoO_2$ with a charge depth of 0.65 are also shown. Note that the pseudo-spinel crystal structure, the H1-3 type structure, and the crystal structure of $Li_{0.35}CoO_2$ whose patterns were calculated as comparative patterns to be shown in this example contained only cobalt as a transition metal, and did not contain nickel.

In Sample 21 obtained through annealing after addition of the magnesium source and the fluorine source, peaks of the pseudo-spinel crystal structure were observed. Peaks of the H1-3 type structure and the crystal structure of $Li_{0.35}CoO_2$ were also observed. In addition, some peaks shifted from the comparative patterns, which was probably due to the effect of nickel.

Meanwhile, in Sample 22 obtained not through addition of the magnesium source and the fluorine source and annealing, no peak of the pseudo-spinel crystal structure was observed. However, peaks of the H1-3 type structure and the crystal structure of $Li_{0.35}CoO_2$ were observed.

Figure 52:
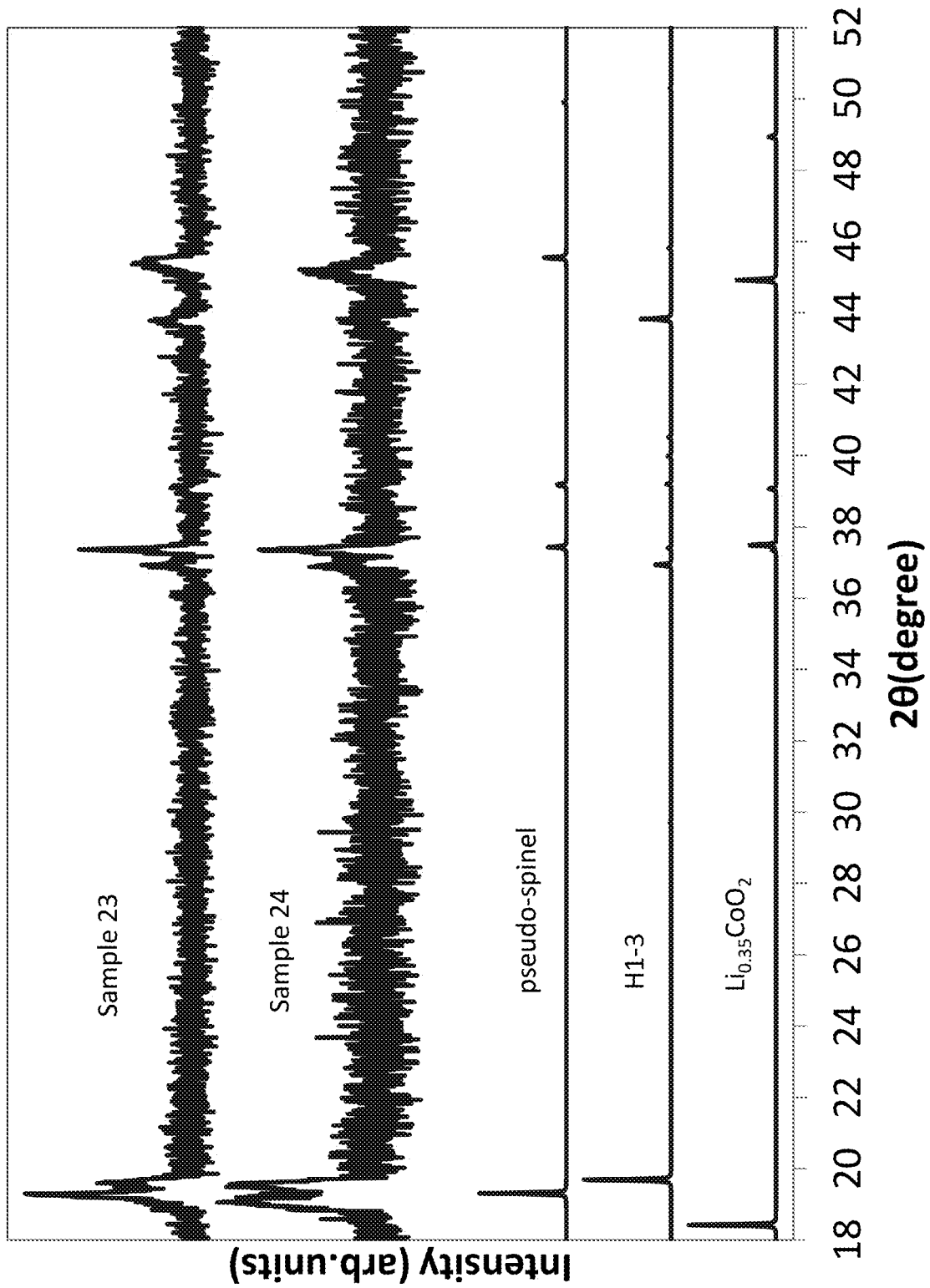
FIG. 52 shows XRD patterns of Sample 23 and Sample 24 in Example 2.

FIG. 52 shows the XRD patterns of the positive electrodes of the secondary batteries using Sample 23 and Sample 24 after being charged at 4.6 V. For comparison, the patterns of the pseudo-spinel crystal structure, the H1-3 type structure, and the crystal structure of $Li_{0.35}CoO_2$ with a charge depth of 0.65 are also shown.

In Sample 23 obtained through annealing after addition of the magnesium source and the fluorine source, peaks of the pseudo-spinel crystal structure and the H1-3 type structure were observed. The peaks of the pseudo-spinel crystal structure were dominant.

Meanwhile, in Sample 24 obtained not through addition of the magnesium source and the fluorine source and annealing, peaks of the H1-3 type structure and the crystal structure of $Li_{0.35}CoO_2$ were observed. The patterns showed a lot of noise and broad peaks, which suggested that the crystallinity was decreased.

Figure 53:
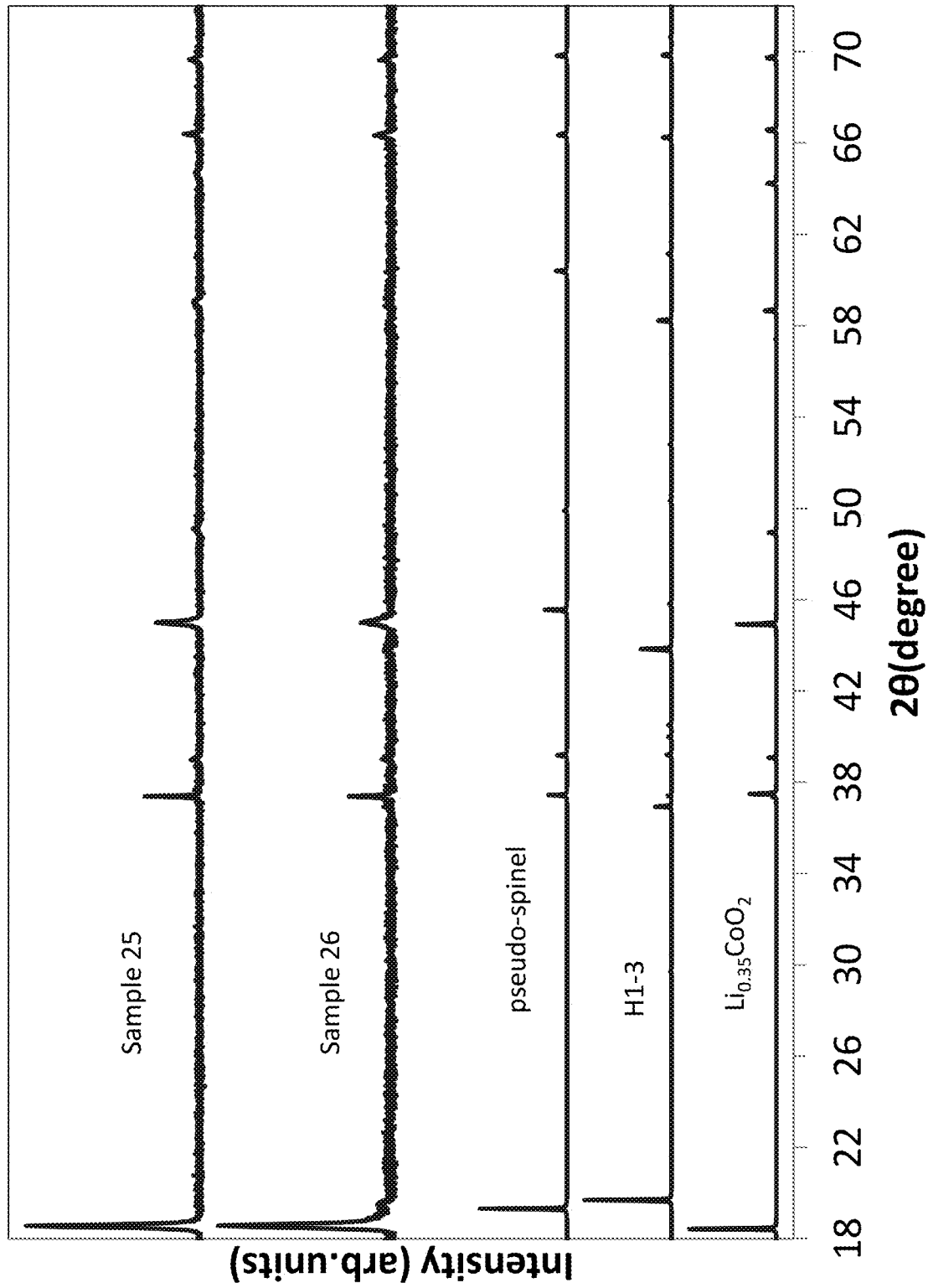
FIG. 53 shows XRD patterns of Sample 25 and Sample 26 in Example 2.

FIG. 53 shows the XRD patterns of the positive electrodes of the secondary batteries using Sample 25 and Sample 26 after being charged at 4.6 V. For comparison, the patterns of the pseudo-spinel crystal structure, the H1-3 type structure, and the crystal structure of $Li_{0.35}CoO_2$ with a charge depth of 0.65 are also shown.

In Sample 25 and Sample 26 in which Ni/(Co+Ni) was 0.1, no significant difference in crystal structure was observed. In addition, it was suggested that the crystal structures were neither the pseudo-spinel crystal structure, the H1-3 type structure, nor the crystal structure of $Li_{0.35}CoO_2$.

From FIG. 50, FIGS. 51A and 51B, FIG. 52, and FIG. 53, it was revealed that in the positive electrode active material containing lithium, a transition metal, and oxygen, in which cobalt and nickel were contained as main transition metals, Ni/(Co+Ni) was preferably less than 0.1, specifically less than or equal to 0.075. This is because, when Ni/(Co+Ni) is within the above range, the positive electrode active material obtained through annealing after addition of a magnesium source and a fluorine source has the pseudo-spinel crystal structure when charged at 4.6 V. As described in the above example, the positive electrode active material having the pseudo-spinel crystal structure when charged at 4.6 V shows excellent cycle characteristics.

Example 3

In this example, secondary batteries using the positive electrode active materials of one embodiment of the present invention were formed and differential scanning calorimetry (DSC) and charging-resistance test were performed.
<<Sample 27>>

Lithium phosphate was ground in a zirconia mortar.

The lithium phosphate ground in the mortar was mixed with Sample 1 formed in the above example. The amount of mixed lithium phosphate was 0.04 mol on the assumption that Sample 1 was 1 mol. The mixing was performed at 150 rpm for 1 hour in a ball mill using a zirconia ball. After the mixing, the mixture was made to pass through a sieve with an aperture width of 300 μmφ. After that, the mixture was put in an alumina crucible, the alumina crucible was covered with a lid, and annealing was performed at 850° C. in an oxygen atmosphere four 2 hours. Then, the mixture was made to pass through a sieve with an aperture width of 53 μmφ, whereby Sample 27 was obtained.
<<Sample 28>>

First, lithium phosphate was ground. The grinding was performed at 400 rpm for 60 hours in a ball mill using a zirconia ball. After the grinding, the lithium phosphate was made to pass through a sieve with an aperture width of 300 μmφ.

The lithium phosphate ground in the mortar was mixed to Sample 1 formed in the above Example. The amount of mixed lithium phosphate corresponded to 0.06 mol on the assumption that Sample 1 was 1 mol. The mixing was performed at 150 rpm for 1 hour in a ball mill using a zirconia ball. After the mixing, the mixture was made to pass through a sieve with an aperture width of 300 μmφ. After that, the mixture was put in an alumina crucible, the alumina crucible was covered with a lid, and annealing was performed at 750° C. in an oxygen atmosphere four 20 hours. Then, the mixture was made to pass through a sieve with an aperture width of 53 μmφ, whereby Sample 28 was obtained.
[Formation of Secondary Batteries]

Next, CR2032 coin-type secondary batteries were formed using Sample 27 and Sample 28 formed in the above manner and Sample 1 described in the above example.

A positive electrode formed by applying slurry in which the active material using Sample 1, 27, or 28, AB, and PVDF were mixed at a weight ratio of 95:3:2 to a current collector was used.

A lithium metal was used for a counter electrode.

As an electrolyte contained in an electrolyte solution, 1 mol/L lithium hexafluorophosphate ($LiPF_6$) can be used. As the electrolyte solution of a secondary battery described later whose charge and discharge characteristics were measured, a solution in which ethylene carbonate (EC) and diethyl carbonate (DEC) were mixed at a volume ratio of 3:7 was used. As the electrolyte solution of a secondary battery described later whose cycle characteristics were measured, a solution in which ethylene carbonate (EC) and diethyl carbonate (DEC) at a volume ratio of 3:7 and vinylene carbonate (VC) at 2 wt % were mixed was used.

As a separator, 25-μm-thick polypropylene was used.

A positive electrode can and a negative electrode can were formed of stainless steel (SUS).

The positive electrodes of the secondary batteries were pressurized at 210 kN/m and then further pressurized at 1467 kN/m. In the positive electrode using Sample 1, the carried amount carried amount was approximately 21 mg/cm² and the electrode density was approximately 3.9 g/cm³. In the positive electrode using Sample 28, the carried amount carried amount of was approximately 20 mg/cm² and the electrode density was approximately 3.7 g/cm³.
[Charge and Discharge Characteristics]

On the secondary batteries using Sample 1 and Sample 28, the CCCV charging (0.05 C, 4.5 V or 4.6 V, a termination current of 0.005 C) and the CC discharging (0.5 C, 2.5 V) were performed. Table 5 shows the charge capacity, the discharge capacity, and the coulombic efficiency at the first cycle. The coulombic efficiency is a value obtained by normalizing discharge capacity with charge capacity and represented by percentage. As shown in Table 5, excellent coulombic efficiencies were obtained.

TABLE 5

| positive electrode material | charge capacity (mAh/g) | discharge capacity (mAh/g) | coulombic efficiency (%) |
| --- | --- | --- | --- |
| Sample 1, charge at 4.5 V | 199 | 197 | 98.7 |
| Sample 28, charge at 4.5 V | 188 | 186 | 98.7 |
| Sample 1, charge at 4.6 V | 231 | 227 | 98.3 |
| Sample 28, charge at 4.6 V | 219 | 215 | 98.1 |

[Cycle Characteristics]

On the secondary batteries using Sample 1 and Sample 28, the CCCV charging (0.05 C, 4.5 V or 4.6 V, a termination current of 0.005 C) and the CC discharging (0.05 C, 2.5 V) were performed at 25° C. and 2 cycles were measured.

Figure 54A:
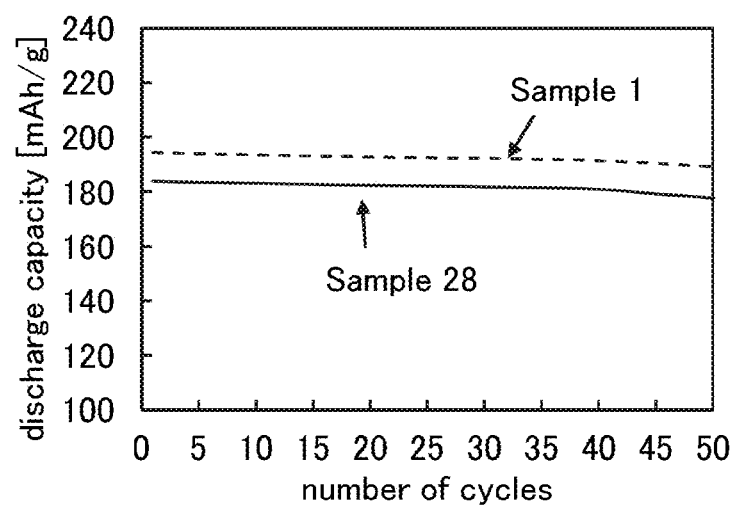
FIGS. 54A and 54B are each a graph showing charge and discharge cycle characteristics.
Figure 54B:
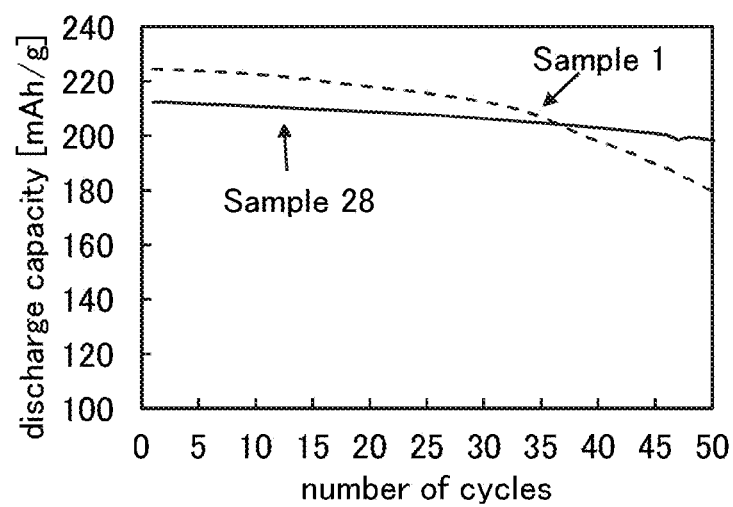

After that, the CCCV charging (0.2 C, 4.5 V or 4.6 V, a termination current of 0.02 C) and the CC discharging (0.2 C, 2.5 V) were repeatedly performed on the secondary batteries using Sample 1 and Sample 28, and then the cycle characteristics were measured. The capacity retention rate of Sample 1 after 25 cycles was 99.0% at a charging voltage of 4.5 V and 96.1% at a charging voltage of 4.6 V. The capacity retention rate of Sample 28 after 25 cycles was 99.0% at a charging voltage of 4.5 V and 97.8% at a charging voltage of 4.6 V. The capacity retention rate of Sample 1 after 50 cycles was 97.3% at a charging voltage of 4.5 V and 80.0% at a charging voltage of 4.6 V. The capacity retention rate of Sample 28 after 50 cycles was 96.6% at a charging voltage of 4.5 V and 93.5% at a charging voltage of 4.6 V. FIG. 54A shows the shift in discharge capacity at a charging voltage of 4.5 V and FIG. 54B shows the shift in discharge capacity at a charging voltage of 4.6 V. In each graph, the horizontal axis represents the number of cycles and the vertical axis represents discharge capacity. In Sample 28 covered with lithium phosphate, the charge and discharge capacity was decreased by the weight of lithium phosphate; however, the cycle characteristics were further improved. This was probably because the dissolution of an ion of metal such as cobalt from the positive electrode active material was inhibited by covering the positive electrode active material with lithium phosphate and thus decomposition of the electrolyte solution was inhibited.

[Differential Scanning Calorimetry Measurement]

On the secondary batteries using Samples 1, 27, and 28, the CCCV charging (0.05 C, 4.5 V or 4.6 V, termination current of 0.005 C) and the CC discharging (0.05 C, 2.5 V) were performed at 25° C. and 2 cycles were measured.

Next, the CCCV charging (0.05 C, 4.5 V or 4.6 V, a termination current of 0.005 C) was performed on the secondary batteries using Samples 1, 27, and 28. After that, the secondary batteries in the charged state were disassembled in a glove box with an argon atmosphere to take out the positive electrodes, and the positive electrodes were washed with dimethyl carbonate (DMC) to remove the electrolyte solution. Then, the positive electrodes were each stamped out to have a diameter of 3 mmφ.

Onto the stamped-out positive electrodes, 1 μL of an electrolyte solution was dropped and the positive electrodes were put into airtight containers made of SUS. As an electrolyte contained in each electrolytic solution, 1 mol/L lithium hexafluorophosphate ($LiPF_6$) was used, and as the electrolytic solution, a solution in which ethylene carbonate (EC) and diethyl carbonate (DEC) were mixed at a volume ratio of 3:7 was used.

Next, DSC measurement was performed. For the measurement, Thermo plus EV02 DSC8231, a high-sensitive differential scanning calorimeter manufactured by Rigaku Corporation, was used. The measurement conditions were as follows: the temperature range was from room temperature to 400° C. and the temperature rising rate was 5° C./min.

Figure 55A:
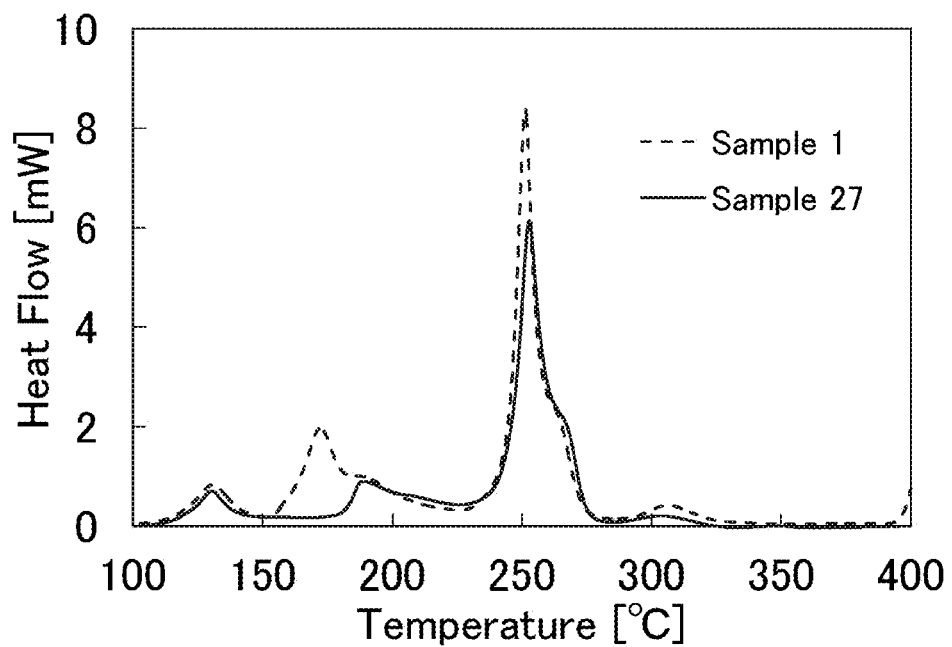
FIGS. 55A and 55B each show results of DSC measurement.
Figure 55B:
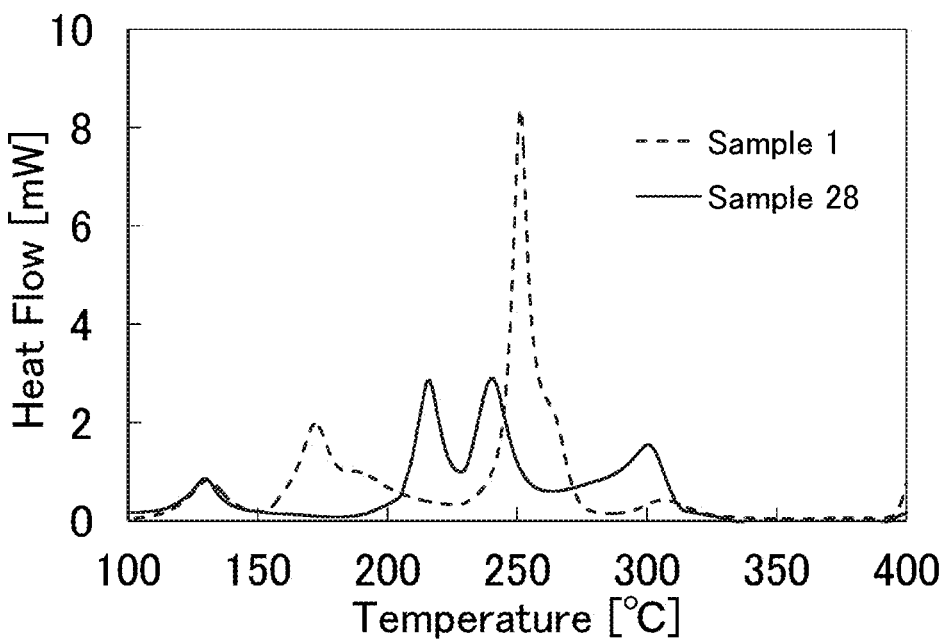

FIGS. 55A and 55B show the results of the DSC measurement. In each graph, the horizontal axis represents temperature and the vertical axis represents heat flow. FIG. 55A shows the comparison between Sample 1 and Sample 27, and FIG. 55B shows the comparison between Sample 1 and Sample 28.

As shown in FIG. 55A, the peaks were observed in the vicinities of 171° C. and 251° C. in Sample 1, and the temperatures at which the peaks appeared rose to the vicinities of 188° C. and 252° C. in Sample 27, and the integrated intensity showing the amount of heat generation decreased. Furthermore, as shown in FIG. 55B, the temperatures at which peaks appeared rose and the integrated intensity decreased in Sample 28. In particular, the integrated intensity significantly decreased in the range of 150° C. to 200° C. In view of the above, it was suggested that the thermal stability was improved by mixing the positive electrode active material with a compound containing phosphoric acid in the formation process of the positive electrode active material.

[Charging-Resistance Test]

On the secondary batteries using Sample 1 and Sample 28, the CCCV charging (0.05 C, 4.5 V or 4.6 V, termination current of 0.005 C) and the CC discharging (0.05 C, 2.5 V) were performed at 25° C. and 2 cycles were measured.

After that, the CCCV charging (0.05 C) was performed at 60° C. The upper limit voltage was set to 4.55 V or 4.65 V, and the time until the voltage of the secondary battery decreased below the value obtained by subtracting 0.01 V from the upper limit voltage (e.g., 4.54 V when the upper limit voltage was 4.55 V) was measured. In the case where the voltage of the secondary battery became lower than the upper limit voltage, phenomena such as short circuit might have occurred. Note that 1 C was set to 200 mA/g.

Table 6 shows the time measured at each secondary battery.

TABLE 6

| | Charging voltage | |
|---|---|---|
| | 4.55 V | 4.65 V |
| Sample 1 | 29 hr | 14 hr |
| Sample 28 | 106 hr | 218 hr |

In Sample 28, the voltage of the secondary battery took a long time to decrease, which suggested that the resistance to charging was improved by mixing positive electrode active material with a compound containing phosphoric acid in the formation process of the positive electrode active material.

Example 4

In this example, a secondary battery using the positive electrode active material of one embodiment of the present invention was formed, and the dissolution of metal was measured by an atomic absorption spectroscopy.

[Formation of Secondary Batteries]

First, laminated secondary batteries were formed using Sample 27 formed in the above matter and Sample 1 described in the above example.

A positive electrode formed by applying slurry in which an active material using Sample 1 and Sample 27, AB, and PVDF were mixed at a weight ratio of 95:3:2 to one side of a current collector was used.

A negative electrode formed by applying slurry in which an active material using graphite, VGCF (registered trademark), CMC-Na, and SBR were mixed at a weight ratio of 96:1:1:2, and viscosity was modified with pure water to one side of a current collector, and then dried to volatilize pure water was used. As the current collector, 18-μm-thick copper foil was used. The carried amount carried amount of the negative electrode was approximately 14 mg/cm².

As an electrolyte contained in each electrolytic solution, 1 mol/L lithium hexafluorophosphate (LiPF$_6$) was used, and as the electrolytic solution, a solution in which ethylene carbonate (EC) and diethyl carbonate (DEC) at a volume ratio of 3:7 and vinylene carbonate (VC) at a 2 wt % were mixed was used.

As a separator, 25-μm-thick polypropylene was used.

The formed secondary batteries were subjected to a process in which charging and discharging at a low rate were performed several times to let out a gas, aiming at aging.

On a secondary battery formed using the positive electrode containing Sample 1 or Sample 27 and the negative electrode containing graphite, the CCCV charging (0.05 C, 4.4 V, a termination current of 0.005 C) and the CC discharging (0.05 C, 2.5 V) were performed at 25° C. after aging. Here, 1 C was set to approximately 200 mA/g.

Next, the CCCV charging (0.05 C, 4.45 V, a termination current of 0.005 C) was performed. After that, the secondary battery was stored at 60° C. for 14 days.

Then, the CC discharging (0.05 C, 2.5 V) was performed at 25° C. Here, 1 C was set to 200 mA/g.

[Measurement by Atomic Absorption Spectroscopy]

Next, the secondary battery was disassembled in a glove box with an argon atmosphere to take out the negative electrode, and the negative electrode was washed with dimethyl carbonate (DMC) to remove the electrolyte solution. After that, the current collector was removed. Then, powders in the active material layer were mixed, approximately 0.1 mg of powder was taken out, and then the powder was measured by an atomic absorption spectroscopy.

The amount of cobalt was measured by a furnace atomic absorption spectroscopy. For this measurement, ContrAA 600, the continuum source atomic absorption spectrometer manufactured by Analytik Jena AG, was used. In the measurement, cobalt was atomized at 2500° C. and irradiated with a light with a wavelength of 235.8183 nm. Two secondary batteries using Sample 1 and two secondary batteries using Sample 27 were formed and the average value was calculated by performing the measurement 20 times for each cell.

The amount of cobalt obtained in Sample 1 was 9,722 ppm, and that of cobalt obtained in Sample 27 was 5,971 ppm. The amount of cobalt was a value normalized by the amount of cobalt contained in the positive electrode active material layer. Specifically, the amount of cobalt contained in the whole negative electrode of the secondary battery was calculated from the obtained measurement value, and then normalized by the amount of cobalt contained in the whole positive electrode of the secondary battery. The amount of cobalt was decreased in Sample 27. This was probably because dissolution of cobalt from the positive electrode active material was inhibited by mixing positive electrode active material with a compound containing phosphoric acid in the formation process of the positive electrode active material, and thus the amount of cobalt deposited on the negative electrode was reduced.

Example 5

In this example, a positive electrode active material of one embodiment of the present invention was formed and its characteristics were analyzed by XRD. In addition, the cycle characteristics during high-voltage charging were measured.

<<Sample 51>>

Sample 51 was formed in the same manner as Sample 1 described in Example 1 except that the annealing was performed for 8 hours in Step S34 in FIG. 2.

<<Sample 52>>

Sample 52 was formed in the same manner as Sample 1 described in Example 1 except that the annealing was performed for 30 hours in Step S34 in FIG. 2.

[XRD Results Obtained After First Charging]

As in Example 1, secondary batteries using Sample 51 and Sample 52 were formed and subjected to the first charging, and then XRD obtained after the first charging was measured.

Figure 56:
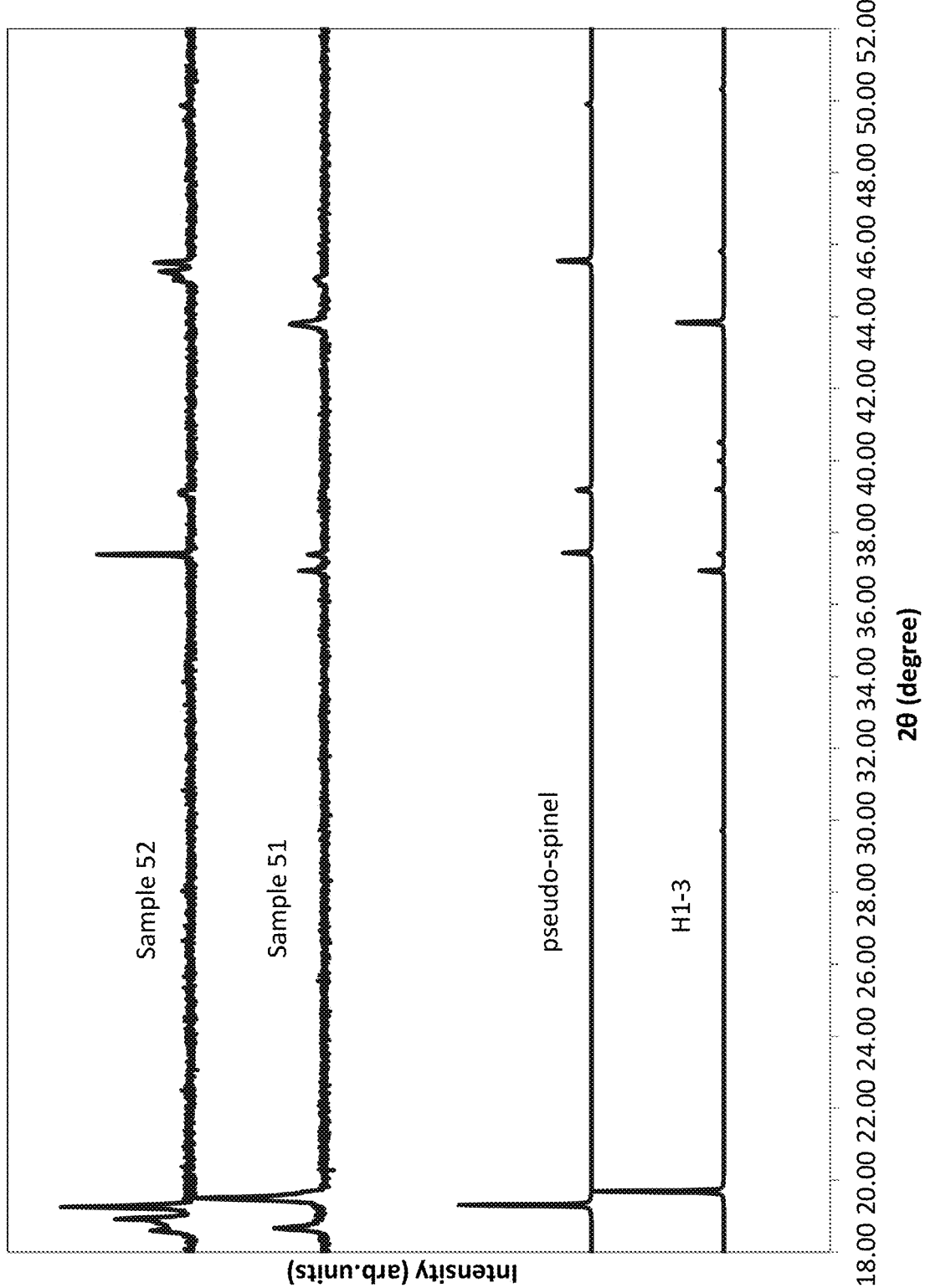
FIG. 56 shows XRD patterns.

FIG. 56 shows the XRD patterns of the positive electrodes of the secondary batteries using Sample 51 and Sample 52 obtained after being charged at 4.6 V.

It was revealed that Sample 52 had the pseudo-spinel crystal structure after being charged at 4.6 V. Meanwhile, it was suggested that Sample 51 had the H1-3 type structure. From these results, an excellent positive electrode active material was able to be obtained when annealing was performed for 30 hours as compared with the case where annealing was performed for 8 hours, suggesting that annealing was preferably performed for longer than 8 hours.

[Cycle Characteristics]

As in Example 1, cycle characteristics of the secondary batteries using Sample 51 and Sample 52 were measured.

The CCCV charging (1 C, 4.6 V, a termination current of 0.01 C) and the CC discharging (0.5 C, 2.5 V) were performed at 25° C. to measure the cycle characteristics. Here, 1 C was set to approximately 137 mA/g. The discharge capacity retention rate after 40 cycles of charging and discharging was 47.8% in Sample 28, 98.4% in Sample 29, and 97.6% in Sample 1 formed in Example 1.

Next, the CCCV charging (1 C, 4.55 V, a termination current of 0.05 C) and the CC discharging (1 C, 3.0 V) were performed at 45° C. to measure the cycle characteristics. Here, 1 C was set to approximately 160 mA/g. The discharge capacity retention rate after 100 cycles of charging and discharging was 39.4% in Sample 51, and 78.4% in Sample 52.

Sample 52 had excellent cycle characteristics when charged at 25° C. and 45° C. From this result, it was suggested that an excellent positive electrode active material was able to be obtained when annealing was performed for 30 hours.

Example 6

In this example, a positive electrode active material of one embodiment of the present invention was formed and its characteristics were analyzed by XRD. In addition, the cycle characteristics during high-voltage charging were measured.

<<Sample 61>>

Sample 61 was formed in the same manner as Sample 1 described in Example 1 except that MgF$_2$ was not added in Step S11 in FIG. 2. The first mixture was weighted so that the atomic weight of lithium contained in the first mixture was 1.17 atomic % with respect to the molecular weight of lithium cobalt oxide, and the first mixture and lithium cobalt oxide were mixed by a dry method.

<<Sample 62>>

Sample 62 was formed in the same manner as Sample 1 described in Example 1 except that Mg(OH)$_2$ was added instead of LiF and MgF$_2$ in Step S11 in FIG. 2. The first mixture was weighted so that the atomic weight of magnesium contained in the first mixture was 0.5 atomic % with respect to the molecular weight of lithium cobalt oxide, and the first mixture and lithium cobalt oxide were mixed by a dry method.

[XRD Results Obtained After First Charging]

As in Example 1, secondary batteries using Sample 61 and Sample 62 were formed and subjected to the first charging, and then XRD obtained after the first charging was measured.

Figure 57:
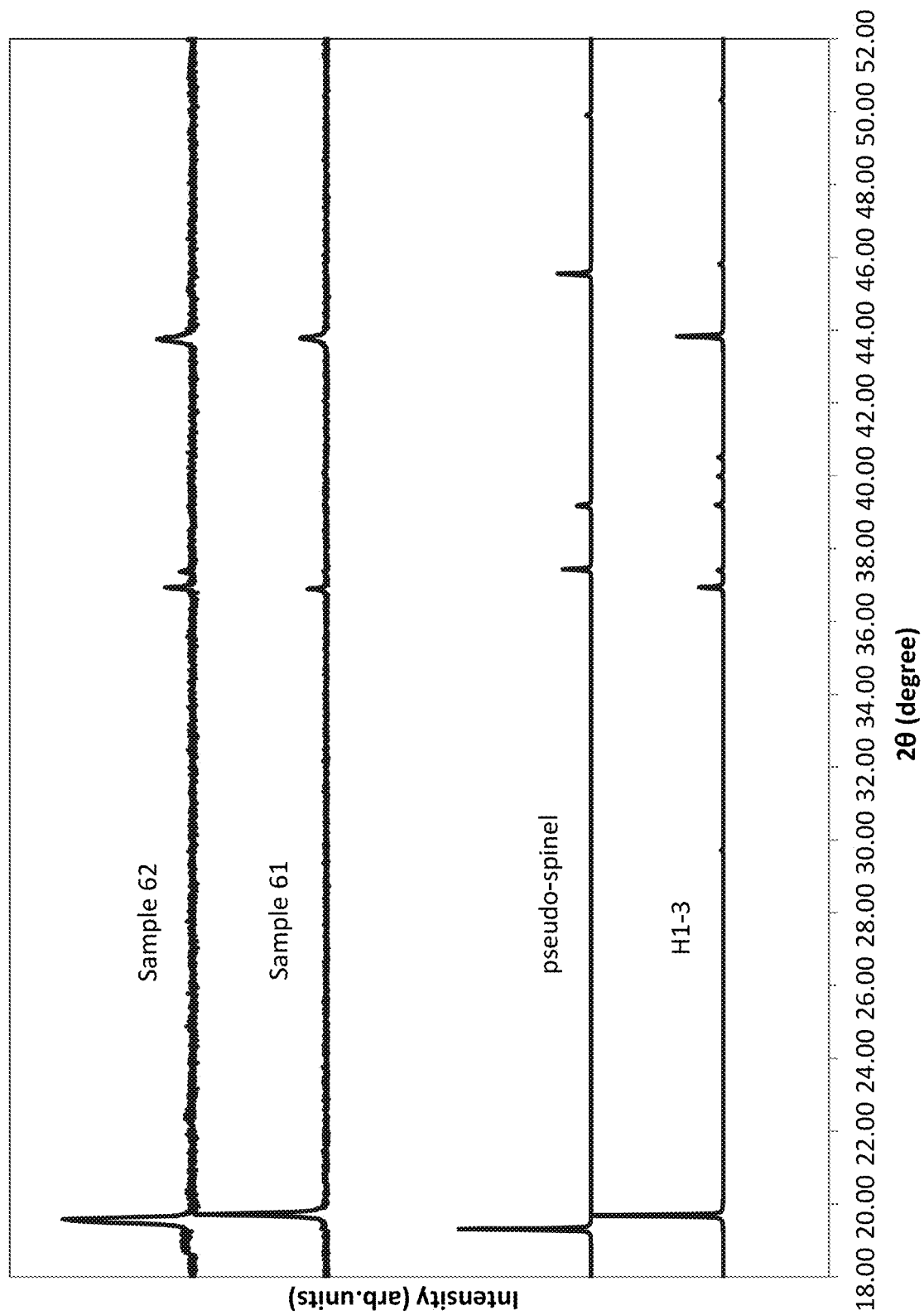
FIG. 57 shows XRD patterns.

FIG. 57 shows the XRD patterns of the positive electrodes of the secondary batteries using Sample 61 and Sample 62 obtained after being charged at 4.6 V.

Both Sample 61 and Sample 62 after being charged at 4.6 V had the H1-3 type structure rather than the pseudo-spinel crystal structure. From this result, it was suggested that an excellent positive electrode active material was able to be obtained when a compound containing lithium and a compound containing fluorine were used in Step S11.

[Cycle Characteristics]

Figure 58A:
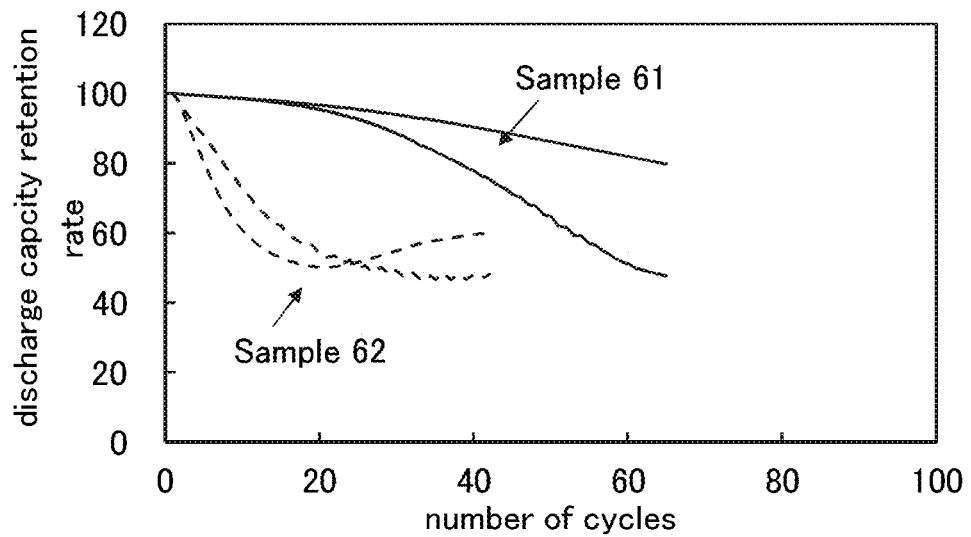
FIGS. 58A and 58B each show charge and discharge cycle characteristics.
Figure 58B:
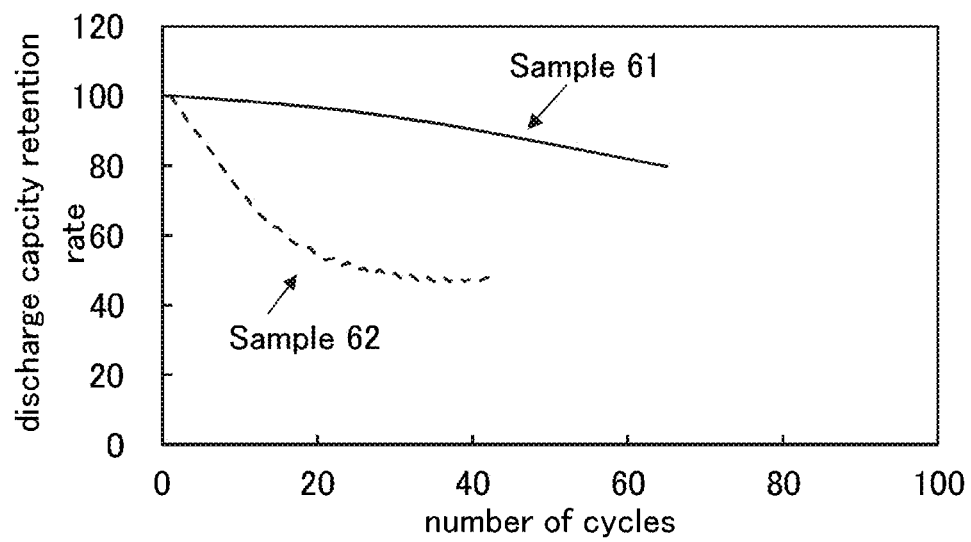

As in Example 1, the cycle characteristics of the secondary batteries using Sample 61 and Sample 62 were measured. FIG. 58A shows the results of cycle measurement under the conditions where the measurement temperature was 25° C. and charging voltage was 4.6 V, and FIG. 58B shows the results of cycle measurement under the conditions where the measurement temperature was 45° C. and charging voltage was 4.55 V. Compared with Sample 1 described in Example 1, a decrease in capacity with increasing number of charge and discharge cycles was notable in both Sample 61 and Sample 62. This was probably because the pseudo-spinel crystal structure was not observed clearly after high-voltage charging.

REFERENCE NUMERALS

100: positive electrode active material; 1001: particle; 1002: microparticle; 1003: region; and 1010: detection region.

This application is based on Japanese Patent Application Serial No. 2017-124100 filed with Japan Patent Office on Jun. 26, 2017, Japanese Patent Application Serial No. 2017-199061 filed with Japan Patent Office on Oct. 13, 2017, Japanese Patent Application Serial No. 2018-007052 filed with Japan Patent Office on Jan. 19, 2018, and Japanese Patent Application Serial No. 2018-072924 filed with Japan Patent Office on Apr. 5, 2018, the entire contents of which are hereby incorporated by reference.

The invention claimed is:

1. A method for manufacturing a positive electrode active material for a lithium-ion battery, the method comprising steps of:
forming a first mixture by mixing lithium fluoride (LiF) and magnesium fluoride ($MgF_2$);
pulverizing the first mixture to reduce a particle size of the first mixture, thereby yielding a pulverized first mixture;
forming a second mixture by mixing a composite oxide containing lithium, a transition metal, and oxygen with the pulverized first mixture; and
heating the second mixture at higher than or equal to 600° C. and lower than or equal to 950° C. and for longer than or equal to 3 hours,
wherein a molar ratio of the lithium fluoride (LiF) and the magnesium fluoride ($MgF_2$) in the first mixture is LiF:$MgF_2$=x:1 ($0.1 \leq x \leq 0.5$),
wherein in the composite oxide, concentrations of elements other than the lithium, the transition metal, and the oxygen are less than or equal to 5,000 ppm wt when analysis is performed by a glow discharge mass spectroscopy, and
wherein an atomic ratio of the transition metal (TM) in the composite oxide included in the second mixture to magnesium ($Mg_{Mix1}$) included in the first mixture is TM:$Mg_{Mix1}$=1:y ($0.0005 \leq y \leq 0.03$).

2. The method for manufacturing a positive electrode active material for a lithium-ion battery according to claim 1,
wherein forming the first mixture and pulverizing the first mixture are performed as wet methods.

3. The method for manufacturing a positive electrode active material for a lithium-ion battery according to claim 2,
wherein, in the wet methods, acetone is used as a solvent.

4. The method for manufacturing a positive electrode active material for a lithium-ion battery according to claim 1, wherein particles of the pulverized first mixture have an average diameter greater than or equal to 600 nm and less than or equal to 20 μm.

5. A method for manufacturing a positive electrode active material for a lithium-ion battery, the method comprising steps of:
forming a first mixture by mixing lithium fluoride (LiF) and magnesium fluoride ($MgF_2$);
pulverizing the first mixture to reduce a particle size of the first mixture, thereby yielding a pulverized first mixture;
forming a second mixture by mixing a composite oxide containing lithium, a transition metal, and oxygen with the pulverized first mixture; and
heating the second mixture at higher than or equal to 900° C. and for longer than or equal to 2 hours,
wherein a molar ratio of the lithium fluoride (LiF) and the magnesium fluoride ($MgF_2$) in the first mixture is LiF:$MgF_2$=x:1 ($0.1 \leq x \leq 0.5$),
wherein in the composite oxide, concentrations of elements other than the lithium, the transition metal, and the oxygen are less than or equal to 5,000 ppm wt when analysis is performed by a glow discharge mass spectroscopy, and
wherein an atomic ratio of the transition metal (TM) in the composite oxide included in the second mixture to magnesium ($Mg_{Mix1}$) included in the first mixture is TM:$Mg_{Mix1}$=1:y ($0.0005 \leq y \leq 0.03$).

6. The method for manufacturing a positive electrode active material for a lithium-ion battery according to claim 5,
wherein forming the first mixture and pulverizing the first mixture are performed as wet methods.

7. The method for manufacturing a positive electrode active material for a lithium-ion battery according to claim 6,
wherein, in the wet methods, acetone is used as a solvent.

8. The method for manufacturing a positive electrode active material for a lithium-ion battery according to claim 5, wherein particles of the pulverized first mixture have an average diameter greater than or equal to 600 nm and less than or equal to 20 μm.

9. A method for manufacturing a positive electrode active material for a lithium-ion battery, the method comprising steps of:
forming a first mixture by mixing lithium fluoride (LiF) and magnesium fluoride ($MgF_2$);
pulverizing the first mixture to reduce a particle size of the first mixture, thereby yielding a pulverized first mixture;
forming a second mixture by mixing a composite oxide containing lithium, cobalt, nickel, manganese, aluminum, and oxygen with the pulverized first mixture; and
heating the second mixture, wherein the heating is performed at any one of a first condition and a second condition, wherein the first condition is higher than or equal to 600° C. and lower than or equal to 950° C. and for longer than or equal to 3 hours, wherein the second condition is higher than or equal to 900° C. and for longer than or equal to 2 hours, wherein a molar ratio of the lithium fluoride (LiF) and the magnesium fluoride ($MgF_2$) in the first mixture is LiF:$MgF_2$=x:1 ($0.1 \leq x \leq 0.5$), wherein in the composite oxide, concentrations of elements other than the lithium, the cobalt, the nickel, the manganese, the aluminum, and the oxygen are less than or equal to 5,000 ppm wt when analysis is performed by a glow discharge mass spectroscopy, and wherein an atomic ratio of a transition metal (TM) in the composite oxide included in the second mixture to magnesium ($Mg_{Mix1}$) included in the first mixture is TM:$Mg_{Mix1}$=1:y ($0.0005 \leq y \leq 0.03$).

10. The method for manufacturing a positive electrode active material for a lithium-ion battery according to claim 9, wherein forming the first mixture and pulverizing the first mixture are performed as wet methods.

11. The method for manufacturing a positive electrode active material for a lithium-ion battery according to claim 10, wherein, in the wet methods, acetone is used as a solvent.

12. The method for manufacturing a positive electrode active material for a lithium-ion battery according to claim 9, wherein particles of the pulverized first mixture have an average diameter greater than or equal to 600 nm and less than or equal to 20 μm.

* * * * *